United States Patent
Hung et al.

(10) Patent No.: US 10,301,544 B2
(45) Date of Patent: May 28, 2019

(54) LIQUID-CRYSTAL MEDIUM

(71) Applicant: MERCK PATENT GMBH, Darmstadt (DE)

(72) Inventors: Gavin Hung, Taoyuan (TW); Lawrence Huang, Taoyuan (TW); Max Nien, Changhua (TW)

(73) Assignee: MERCK PATENT GMBH, Darmstadt (DE)

( * ) Notice: Subject to any disclaimer, the term of this patent is extended or adjusted under 35 U.S.C. 154(b) by 23 days.

(21) Appl. No.: 15/598,396

(22) Filed: May 18, 2017

(65) Prior Publication Data
US 2017/0335195 A1 Nov. 23, 2017

(30) Foreign Application Priority Data
May 19, 2016 (EP) .................................... 16170390

(51) Int. Cl.
*C09K 19/42* (2006.01)
*C09K 19/54* (2006.01)
(Continued)

(52) U.S. Cl.
CPC ............ *C09K 19/54* (2013.01); *C09K 19/062* (2013.01); *C09K 19/12* (2013.01); *C09K 19/20* (2013.01); *C09K 19/3003* (2013.01); *C09K 19/3066* (2013.01); *C09K 19/3098* (2013.01); *C09K 19/3402* (2013.01); *C09K 19/3472* (2013.01); *C09K 2019/0466* (2013.01); *C09K 2019/122* (2013.01); *C09K 2019/123* (2013.01); *C09K 2019/124* (2013.01); *C09K 2019/3004* (2013.01); *C09K 2019/3016* (2013.01); *C09K 2019/3024* (2013.01); *C09K 2019/3025* (2013.01); *C09K 2019/3027* (2013.01); *C09K 2019/3078* (2013.01); *C09K 2019/3422* (2013.01); *C09K 2019/3425* (2013.01)

(58) Field of Classification Search
CPC ....................................................... C09K 19/12
See application file for complete search history.

(56) References Cited

U.S. PATENT DOCUMENTS 9,650,572 B2 5/2017 Kawamura et al.
9,783,735 B2 10/2017 Kim et al.
(Continued)

FOREIGN PATENT DOCUMENTS

| EP | 2 883 938 A1 | 6/2015 |
| EP | 2 990 460 A1 | 3/2016 |
| EP | 2 993 216 A1 | 3/2016 |
| EP | 3 081 621 A1 | 10/2016 |
| EP | 3 127 991 A1 | 2/2017 |
| WO | 2016/146245 A1 | 9/2016 |
| WO | WO-2016146245 A1 * | 9/2016 ......... C09K 19/3491 |

OTHER PUBLICATIONS

European Search Report Corresponding to EP 17 17 1223—Date of Completion: Dec. 19, 2017.

*Primary Examiner* — Chanceity N Robinson
(74) *Attorney, Agent, or Firm* — Millen White Zelano and Branigan, PC; John Sopp

(57) ABSTRACT

A liquid-crystalline medium, in particular based on a mixture of polar compounds, having compounds of formulae Y, CY, PY and/or LY, and compounds of formula S1 and/or S2:

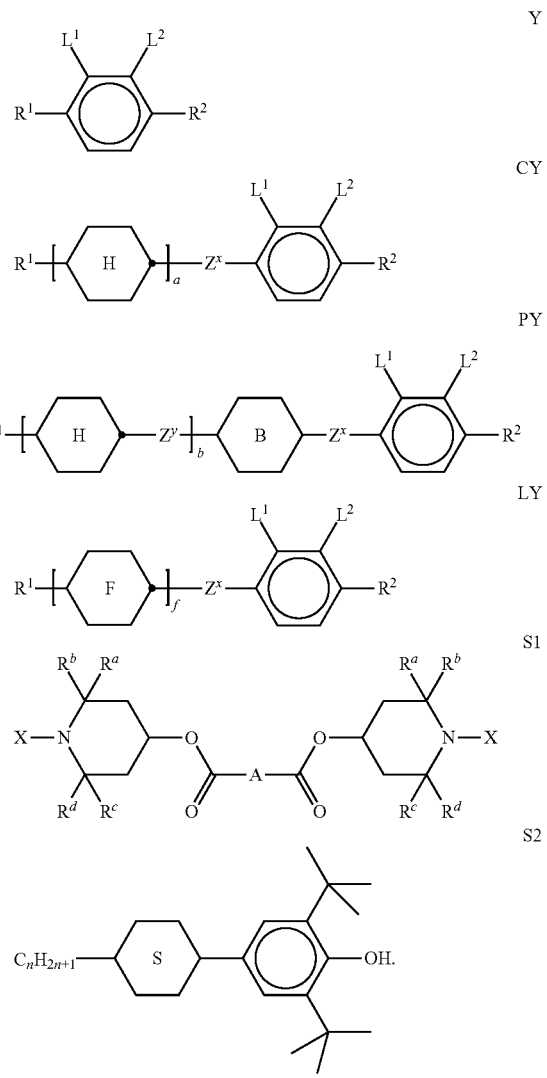

11 Claims, No Drawings

(51) Int. Cl.
*C09K 19/06* (2006.01)
*C09K 19/12* (2006.01)
*C09K 19/20* (2006.01)
*C09K 19/30* (2006.01)
*C09K 19/34* (2006.01)
*C09K 19/04* (2006.01)

(56) References Cited

U.S. PATENT DOCUMENTS

| | | | |
|---|---|---|---|
| 2016/0053178 A1* | 2/2016 | Hirschmann | C09K 19/12 |
| | | | 252/299.5 |
| 2016/0060524 A1 | 3/2016 | Kawamura et al. | |
| 2016/0060528 A1 | 3/2016 | Goetz et al. | |
| 2016/0304783 A1 | 10/2016 | Kim et al. | |
| 2017/0037316 A1* | 2/2017 | Goetz | G02F 1/137 |
| 2017/0362506 A1* | 12/2017 | Hirschmann | C09K 19/3491 |

* cited by examiner

LIQUID-CRYSTAL MEDIUM

The use of the medium for an active-matrix display, in particular based on the VA, PSA, PS-VA, PA-VA, PALC, FFS, PS-FFS, IPS or PS-IPS effect.

The invention relates to a liquid-crystalline medium, in particular based on a mixture of polar compounds, and to the use thereof for an active-matrix display, in particular based on the VA, PSA, PS-VA, PA-VA, PALC, FFS, PS-FFS, IPS or PS-IPS effect.

Media of this type can be used, in particular, for electro-optical displays having active-matrix addressing based on the ECB effect and for IPS (in-plane switching) displays or FFS (fringe field switching) displays.

The principle of electrically controlled birefringence, the ECB effect or also DAP (deformation of aligned phases) effect, was described for the first time in 1971 (M. F. Schieckel and K. Fahrenschon, "Deformation of nematic liquid crystals with vertical orientation in electrical fields", Appl. Phys. Lett. 19 (1971), 3912). This was followed by papers by J. F. Kahn (Appl. Phys. Lett. 20 (1972), 1193) and G. Labrunie and J. Robert (J. Appl. Phys. 44 (1973), 4869).

The papers by J. Robert and F. Clerc (SID 80 Digest Techn. Papers (1980), 30), J. Duchene (Displays 7 (1986), 3) and H. Schad (SID 82 Digest Techn. Papers (1982), 244) showed that liquid-crystalline phases must have high values for the ratio of the elastic constants $K_3/K_1$, high values for the optical anisotropy $\Delta n$ and values for the dielectric anisotropy of $\Delta\varepsilon \leq -0.5$ in order to be suitable for use in high-information display elements based on the ECB effect. Electro-optical display elements based on the ECB effect have a homeotropic edge alignment (VA technology=vertically aligned). Dielectrically negative liquid-crystal media can also be used in displays which use the so-called IPS or FFS effect.

Displays which use the ECB effect, as so-called VAN (vertically aligned nematic) displays, for example in the MVA (multi-domain vertical alignment, for example: Yoshide, H. et al., paper 3.1: "MVA LCD for Notebook or Mobile PCs . . . ", SID 2004 International Symposium, Digest of Technical Papers, XXXV, Book I, pp. 6 to 9, and Liu, C. T. et al., paper 15.1: "A 46-inch TFT-LCD HDTV Technology . . . ", SID 2004 International Symposium, Digest of Technical Papers, XXXV, Book II, pp. 750 to 753), PVA (patterned vertical alignment, for example: Kim, Sang Soo, paper 15.4: "Super PVA Sets New State-of-the-Art for LCD-TV", SID 2004 International Symposium, Digest of Technical Papers, XXXV, Book II, pp. 760 to 763), ASV (advanced super view, for example: Shigeta, Mitzuhiro and Fukuoka, Hirofumi, paper 15.2: "Development of High Quality LCDTV", SID 2004 International Symposium, Digest of Technical Papers, XXXV, Book II, pp. 754 to 757) modes, have established themselves as one of the three more recent types of liquid-crystal display that are currently the most important, in particular for television applications, besides IPS (in-plane switching) displays (for example: Yeo, S. D., paper 15.3: "An LC Display for the TV Application", SID 2004 International Symposium, Digest of Technical Papers, XXXV, Book II, pp. 758 & 759) and the long-known TN (twisted nematic) displays. The technologies are compared in general form, for example, in Souk, Jun, SID Seminar 2004, seminar M-6: "Recent Advances in LCD Technology", Seminar Lecture Notes, M-6/1 to M-6/26, and Miller, Ian, SID Seminar 2004, seminar M-7: "LCD-Television", Seminar Lecture Notes, M-7/1 to M-7/32. Although the response times of modern ECB displays have already been significantly improved by addressing methods with overdrive, for example: Kim, Hyeon Kyeong et al., paper 9.1: "A 57-in. Wide UXGA TFT-LCD for HDTV Application", SID 2004 International Symposium, Digest of Technical Papers, XXXV, Book I, pp. 106 to 109, the achievement of video-compatible response times, in particular on switching of grey shades, is still a problem which has not yet been satisfactorily solved.

Industrial application of this effect in electro-optical display elements requires LC phases, which have to satisfy a multiplicity of requirements. Particularly important here are chemical resistance to moisture, air and physical influences, such as heat, infrared, visible and ultraviolet radiation and direct and alternating electric fields.

Furthermore, industrially usable LC phases are required to have a liquid-crystalline mesophase in a suitable temperature range and low viscosity.

None of the hitherto-disclosed series of compounds having a liquid-crystalline mesophase includes a single compound which meets all these requirements.

Mixtures of two to 25, preferably three to 18, compounds are therefore generally prepared in order to obtain substances which can be used as LC phases. However, it has not been possible to prepare optimum phases easily in this way since no liquid-crystal materials having significantly negative dielectric anisotropy and adequate long-term stability were hitherto available.

Matrix liquid-crystal displays (MLC displays) are known. Non-linear elements which can be used for individual switching of the individual pixels are, for example, active elements (i.e. transistors). The term "active matrix" is then used, where a distinction can be made between two types:
1. MOS (metal oxide semiconductor) transistors on a silicon wafer as substrate
2. thin-film transistors (TFTs) on a glass plate as substrate.

In the case of type 1, the electro-optical effect used is usually dynamic scattering or the guest-host effect. The use of single-crystal silicon as substrate material restricts the display size, since even modular assembly of various part-displays results in problems at the joints.

In the case of the more promising type 2, which is preferred, the electro-optical effect used is usually the TN effect.

A distinction is made between two technologies: TFTs comprising compound semiconductors, such as, for example, CdSe, or TFTs based on polycrystalline or amorphous silicon. The latter technology is being worked on intensively worldwide.

The TFT matrix is applied to the inside of one glass plate of the display, while the other glass plate carries the transparent counterelectrode on its inside.

Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The term MLC displays here covers any matrix display with integrated non-linear elements, i.e. besides the active matrix, also displays with passive elements, such as varistors or diodes (MIM=metal-insulator-metal). MLC displays of this type are particularly suitable for TV applications (for example pocket TVs) or for high-information displays in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, pp. 141 ff., Paris; STROMER, M., Proc. Eurodisplay 84, September 1984: Design of Thin Film Transistors for Matrix Addressing of Television Liquid Crystal Displays, pp. 145 ff., Paris]. With decreasing resistance, the contrast of an MLC display deteriorates. Since the specific resistance of the liquid-crystal mixture generally drops over the life of an MLC display owing to interaction with the inside surfaces of the display, a high (initial) resistance is very important for displays that have to have acceptable resistance values over a long operating period.

There thus continues to be a great demand for MLC displays having very high specific resistance at the same time as a large working-temperature range, short response times and a low threshold voltage with the aid of which various grey shades can be produced.

The disadvantage of the frequently-used MLC-TN displays is due to their comparatively low contrast, the relatively high viewing-angle dependence and the difficulty of generating grey shades in these displays.

VA displays have significantly better viewing-angle dependencies and are therefore principally used for televisions and monitors. However, there continues to be a need here to improve the response times, in particular with respect to the use of televisions having frame rates (image change frequency/repetition rates) of greater than 60 Hz. At the same time, however, the properties, such as, for example, the low-temperature stability, must not be impaired.

The invention is based on the object of providing liquid-crystal mixtures, in particular for monitor and TV applications, which are based on the ECB effect or on the IPS or FFS effect, which do not have the above-mentioned disadvantages or only do so to a reduced extent. In particular, it must be ensured for monitors and televisions that they also operate at extremely high and extremely low temperatures and at the same time have short response times and at the same time have improved reliability behaviour, in particular have no or significantly reduced image sticking after long operating times.

It was surprisingly that it is possible to improve the rotational viscosities, and the ratio of rotational viscosity and elastic constants, and thus the response times, while maintaining a high reliability and high VHR values, when using a liquid-crystal mixture as disclosed and claimed hereinafter, which contains a stabilizer of formula S1 and a stabilizer of formula S2, and further contains one or more compounds having negative dielectric anisotropy.

The LC media according to the present invention also solve the problem of low reliability due to free radicals which are generated for example on the surface of the polyimide alignment layer, especially in LC media with negative dielectric anisotropy. This can lead to reduced VHR values and low reliability when the LC medium is exposed to external stress, especially during the LC display manufacturing process, for example in process steps like ODF (one drop filling), sealant curing, heat alignment and/or cell assembly.

The use of an LC mixture as disclosed and claimed hereinafter having negative dielectric anisotropy surprisingly results in very low rotational viscosities and in a reduction in the ratio of rotational viscosity and elastic constants, while maintaining a high reliability and high VHR values also after UV exposure.

Liquid-crystal mixtures, preferably VA, PS (=polymer stabilised)-VA, PA (=photo alignment)-VA, IPS, PS-IPS, PS-FFS, FFS mixtures, in particular UB-FFS (ultra brightness fringe field switching) mixtures, which have short response times, at the same time good phase properties and good low-temperature behaviour can therefore be prepared.

SUMMARY OF THE INVENTION

An aspect of the invention relates to a liquid crystal (LC) medium comprising one or more compounds selected from the compounds of formulae Y, CY, PY and LY, one or more compounds selected from the compounds of formula S1 and one or more compounds selected from the compounds of formula S2:

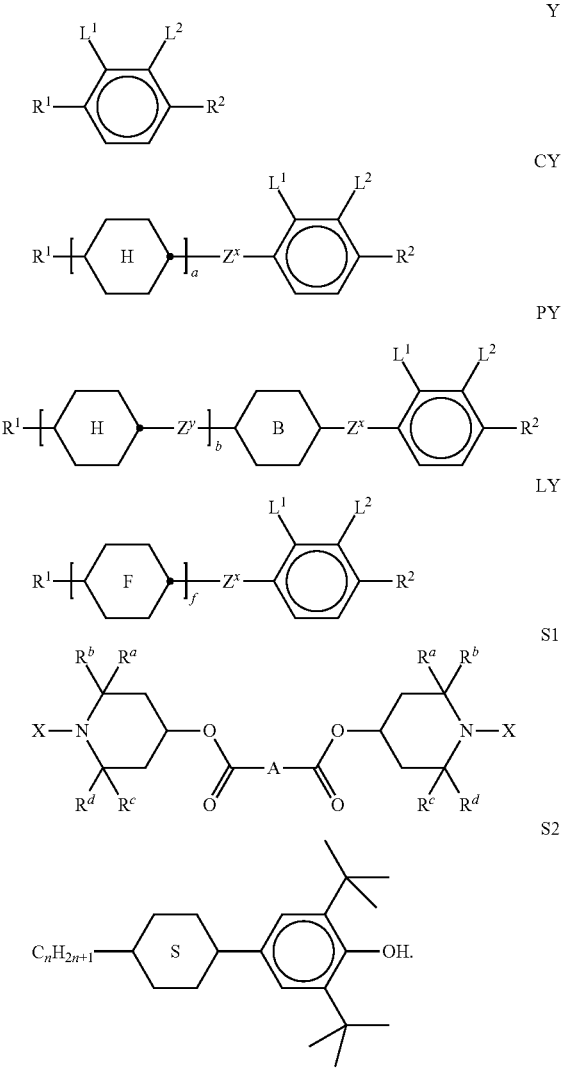

wherein the individual radicals, independently of each other and on each occurrence identically or differently, have the following meanings:

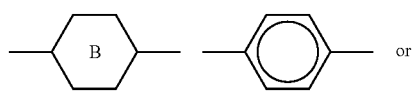

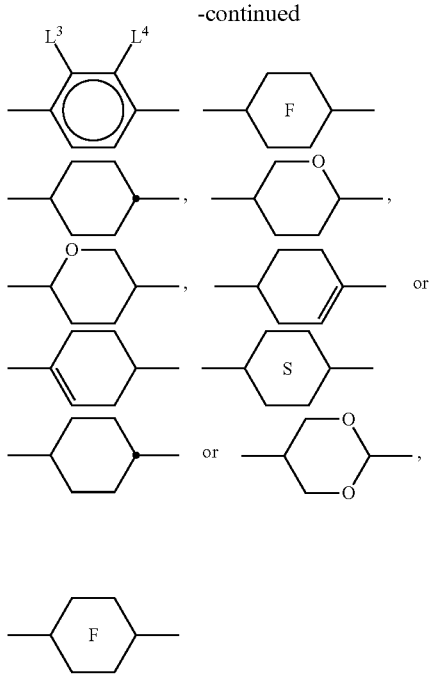

with at least one ring being cyclohexenylene, $R^1$ and $R^2$ are, each independently, alkyl having 1 to 12 C atoms, where, in addition, one or two non-adjacent $CH_2$ groups may be replaced by —O—, —CH=CH—, —CO—, —OCO— or —COO— in such a way that O atoms are not linked directly to one another, preferably alkyl or alkoxy having 1 to 6 C atoms, $Z^x$ and $Z^y$ are, each independently, —$CH_2CH_2$—, —CH=CH—, —$CF_2O$—, —$OCF_2$—, —$CH_2O$—, —$OCH_2$—, —CO—O—, —O—CO—, —$C_2F_4$—, —CF=CF—, —CH=CH—$CH_2O$— or a single bond, preferably a single bond, $L^{1-4}$ are, each independently, F, Cl, $OCF_3$, $CF_3$, $CH_3$, $CH_2F$, or $CHF_2$, $R^{a-d}$ are, each independently, straight chain or branched alkyl with 1 to 10 C atoms, preferably with 1 to 6 C atoms, very preferably with 1 to 4 C atoms, most preferably methyl, X is H, $CH_3$, OH or O., A is straight-chain, branched or cyclic alkylene with 1 to 20 C-atoms which is optionally substituted, a is 1 or 2, b is 0 or 1, f is 1 or 2, n is an integer from 1 to 6, preferably 3.

The invention furthermore relates to an LC medium as described above and below, which additionally comprises one or more polymerisable compounds.

The invention furthermore relates to an LC medium or LC display as described above and below, wherein the polymerisable compounds are polymerised.

The invention furthermore relates to a process for preparing an LC medium as described above and below, comprising the steps of mixing one or more compounds of formula Y, CY, PY and/or LY with one or more compounds of formula S1 and one or more compounds of formula S2, and optionally with further LC compounds and/or additives.

The invention further relates to the use of LC medium in LC displays.

The invention furthermore relates to an LC display, in particular a VA, PS-VA, PA-VA, IPS, PS-IPS, PS-FFS or FFS display, in particular an UB-FFS display, comprising an LC medium as described above and below.

The mixtures according to the invention preferably exhibit very broad nematic phase ranges having clearing points, for example, ≥70° C., preferably ≥75° C., in particular ≥80° C., very favourable values for the capacitive threshold, relatively high values for the voltage holding ratio (VHR) and at the same time very good low-temperature stabilities at −20° C. and −30° C., as well as very low rotational viscosities (preferably ≤250 mPa·s, very preferably ≤200 mPa·s, at 20° C.) and short response times.

The mixtures according to the invention are furthermore distinguished by the fact that, in addition to the improvement in the rotational viscosity $\gamma_1$, high reliability and high VHR values, even after UV exposure, can be achieved.

The mixtures according to the invention are furthermore distinguished by the fact that, in addition to the improvement in the rotational viscosity $\gamma_1$, relatively high values of the elastic constant $K_3$ for improving the response times can be observed. In particular, the mixtures according to the invention have a particularly low value for the ratio $\gamma_1/K_3$ of rotational viscosity 71 and elastic constant $K_3$, which is an indicator of a fast response time.

Preferred compounds of formula S1 are selected from the following subformulae

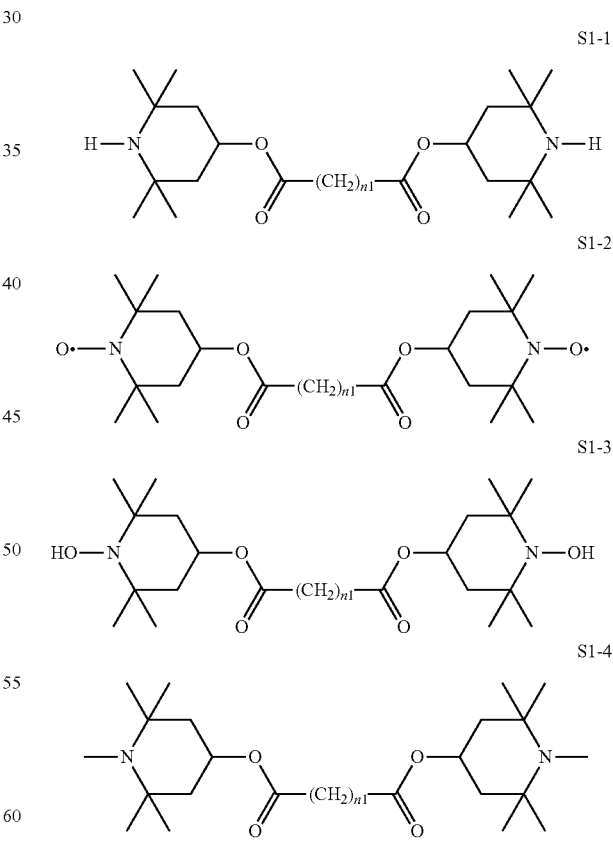

wherein n1 is an integer from 2 to 12 and wherein one or more H-atoms in the radical $(CH_2)_{n1}$ are optionally replaced by a methyl, ethyl, propyl, butyl, pentyl or hexyl group.

Very preferred compounds of formula S1 are selected from the following subformulae

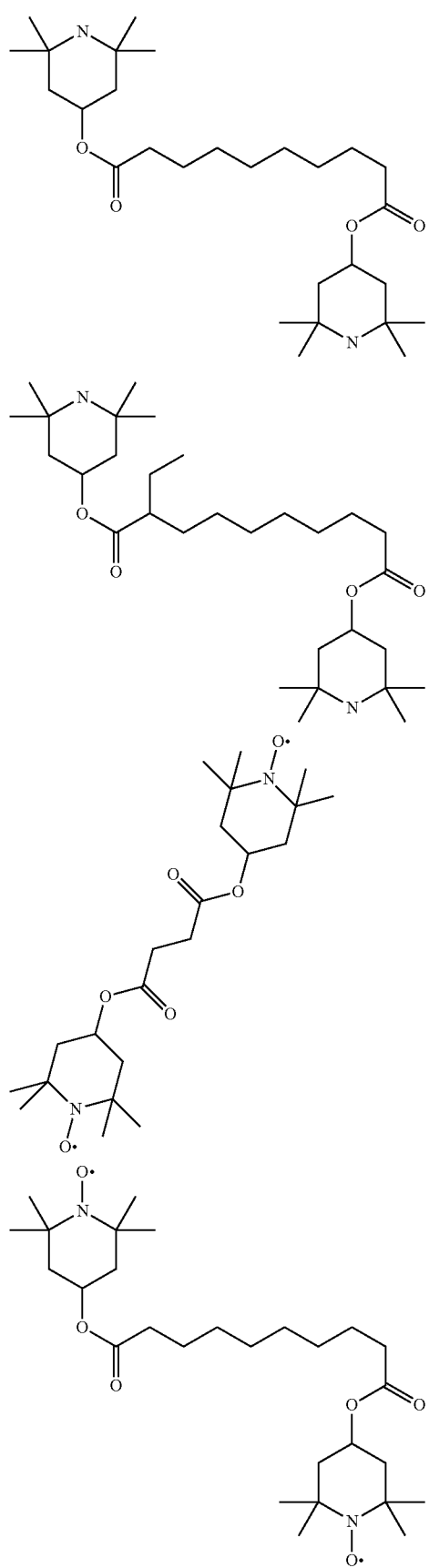

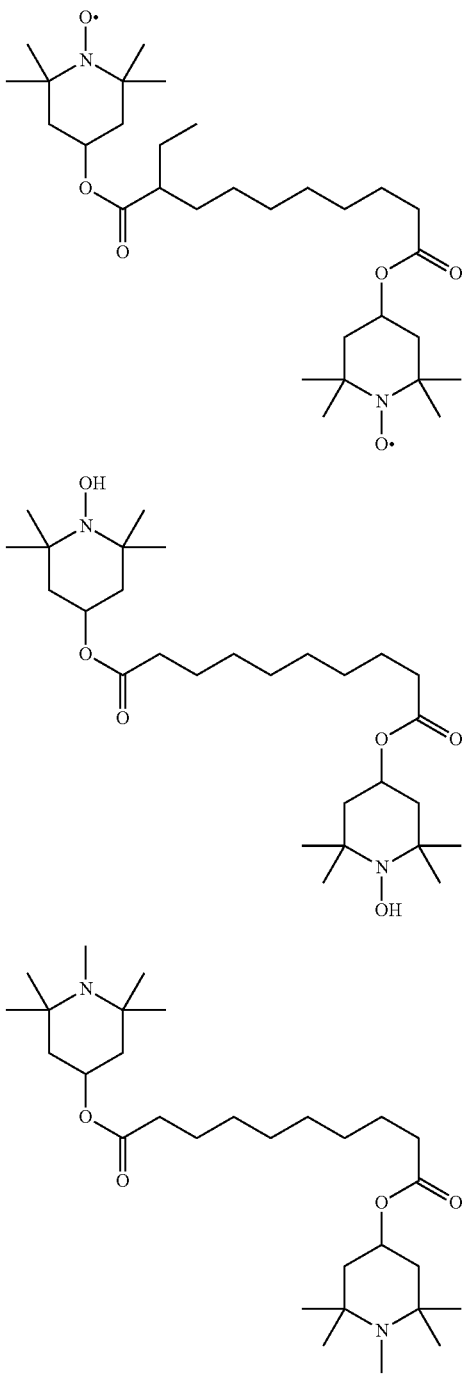

In a first preferred embodiment of the present invention, the compounds of formula S1 are selected from those wherein X is H or CH$_3$, preferably H. Preferred compounds of this first preferred embodiment are those of formula S1-1 and S1-4, and subformulae S1-1a, S1-1 b and S1-4a above.

In a second preferred embodiment of the present invention, the compounds of formula S1 are selected from those wherein X is O* or OH, preferably O*. Preferred compounds of this second preferred embodiment are those of formula S1-2 and S1-3, preferably S1-2, and subformulae S1-2a, S1-2b, S1-2c and S1-3a above. Especially preferred are compounds of formula S1-2a, S1-2b, S1-2c, most preferred those of formula S1-2a.

In a third preferred embodiment of the present invention, the compounds of formula S1 are selected from those wherein A is branched alkylene with 2 to 20 C atoms which is optionally substituted by one or more groups $L^A$, wherein these substituents $L^A$ are selected from F, and straight-chain or branched alkyl, alkoxy, alkylcarbonyl, alkoxycarbonyl, alkylcarbonyloxy and alkoxycarbonyloxy, each having 1 to 12 C atoms and in which one or more H atoms may optionally be replaced by F or Cl.

Preferred compounds of this third preferred embodiment are those of formula S1-5 below and those of subformulae S1-1 b and S1-2c above.

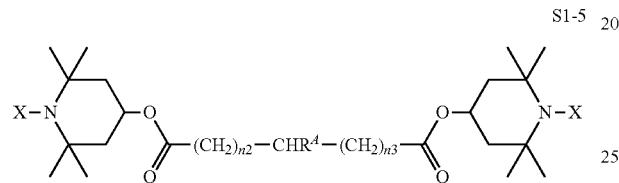

S1-5 wherein

X is H, CH$_3$, OH or O., preferably H or O., $R^A$ is methyl, ethyl, propyl, butyl, pentyl or hexyl, n2 is 0 or an integer from 1 to 12, preferably 0, and n3 is or an integer from 1 to 12.

Preferred compounds of formula S1-5 are those of subformulae S1-1 b and S1-2c above.

Preferred compounds of formula S2 are selected from the following subformulae

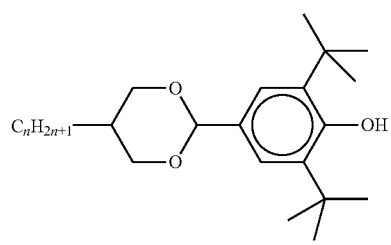

S2-1

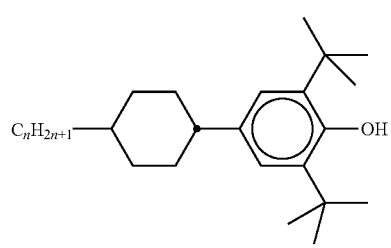

S2-2

Very preferred are compounds of formula S2-1.

Very preferred compounds of formula S2 are selected from the following subformulae

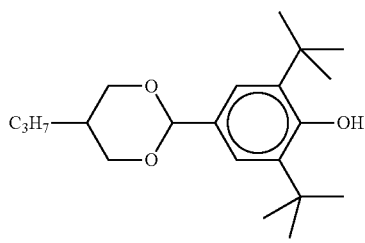

S2-1a

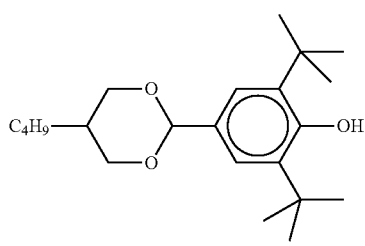

S2-1b

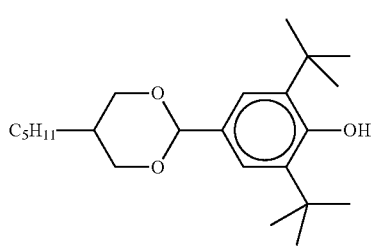

S2-1c

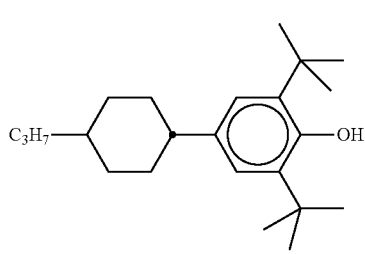

S2-2a

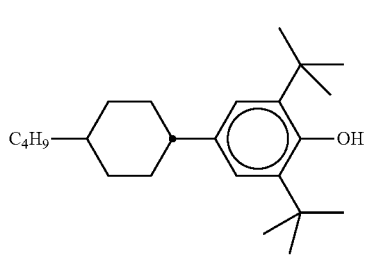

S2-2b

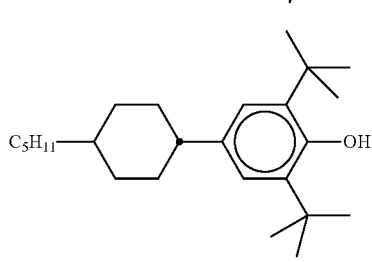

S2-2c

Very preferred are compounds of formula S2-1a.

Preferably the proportion of compounds of formula S1 or its subformulae in the LC medium is from 10 to 1000 ppm, very preferably from 50 to 1000 ppm.

Preferably the proportion of compounds of formula S2 or its subformulae in the LC medium is from 10 to 1000 ppm, very preferably from 50 to 1000 ppm.

Preferably the LC medium contains 2 to 5, very preferably 2 or 3, most preferably 2 compounds selected from formula S1 and S2 or their subformulae.

In a preferred embodiment of the present invention the LC medium contains one or more compounds of formula S1 and one or more compounds of formula S2.

The compounds of formula S1 are especially suitable as light stabilizer to protect the LC medium in the display against UV stress. The compounds of formula S2 are especially suitable as heat stabilizer to protect the LC medium in the display cell against high temperature stress. The LC media according to this preferred embodiment combines both stabilizers, resulting in higher VHR and higher reliability compared to LC media containing only one stabilizer. Very preferably the LC medium according to this preferred embodiment contains a compound of formula S1-1 or S1-2 and a compound of formulae S2-1, most preferably a compound of formula S1-1a or S1-2a and a compound of formula S2-1a.

In another preferred embodiment of the present invention the LC medium contains two or more compounds of formula S1. Very preferably the LC medium according to this preferred embodiment contains a compound of formula S1-1 and a compound of formula S1-2, most preferably a compound of formula S1-1a and a compound of formula S1-2a.

In the compounds of formula Y, preferably both radicals $L^1$ and $L^2$ denote F.

The compounds of the formula Y are preferably selected from the group consisting of the following sub-formulae:

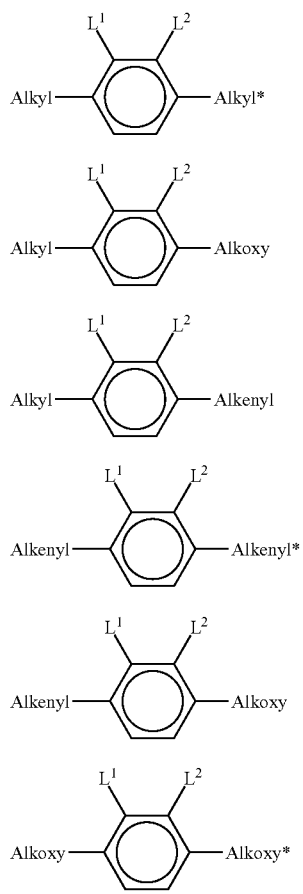

-continued

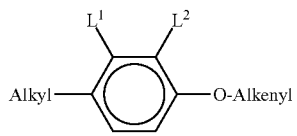
Y7

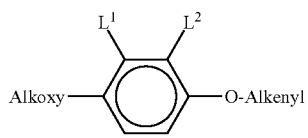
Y8

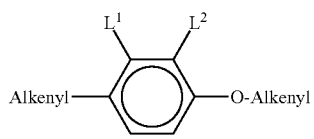
Y9

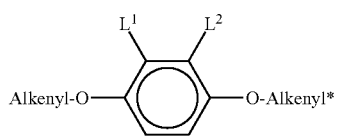
Y10 in which, Alkyl and Alkyl* each, independently of one another, denote a straight-chain alkyl radical having 1-6 C atoms, Alkoxy denotes a straight-chain alkoxy radical having 1-6 C atoms, Alkenyl and Alkenyl* each, independently of one another, denote a straight-chain alkenyl radical having 2-6 C atoms. Alkenyl and Alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Particularly preferred compounds of the formula Y are selected from the group consisting of the following sub-formulae:

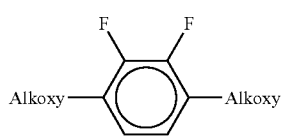
Y6A

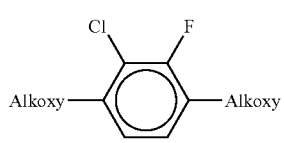
Y6B wherein Alkoxy preferably denotes straight-chain alkoxy with 3, 4, or 5 C atoms.

Very preferred compounds of formula Y are those of formula Y6A1

Y6A1

$H_9C_4O$—⌬—$OC_4H_9$ (with F, F on top)

In the compounds of formula CY, preferably both L¹ and L² denote F or one of L¹ and L² denotes F and the other denotes Cl. Very preferably both L¹ and L² denote F.
The compounds of the formula CY are preferably selected from the group consisting of the following sub-formulae:
CY1
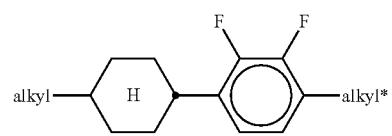
CY2
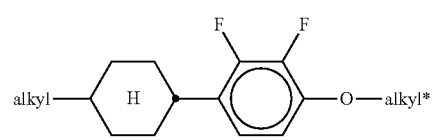
CY3
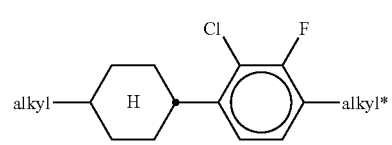
CY4
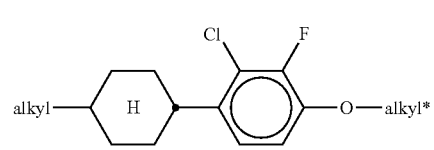
CY5
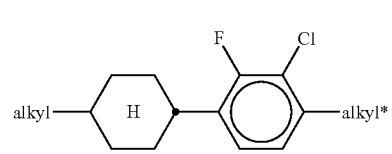
CY6
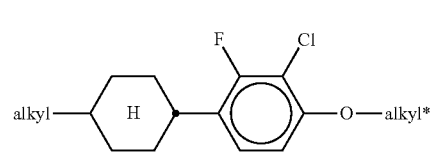
CY7
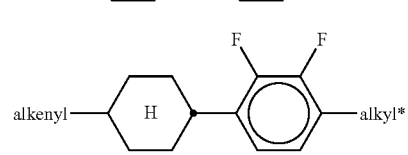
CY8
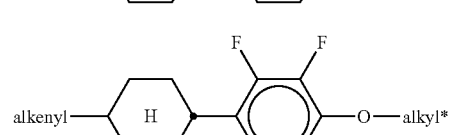
CY9
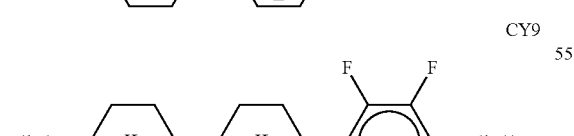
CY10
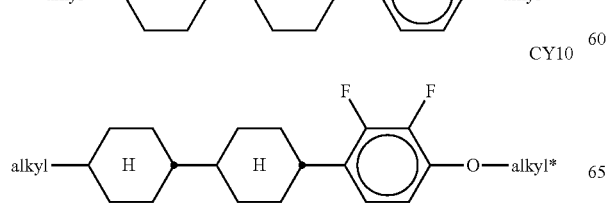
-continued
CY11
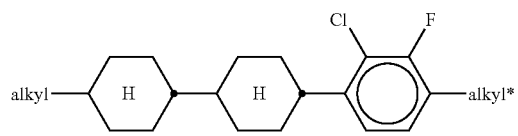
CY12
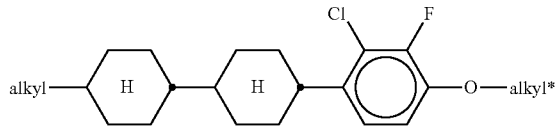
CY13
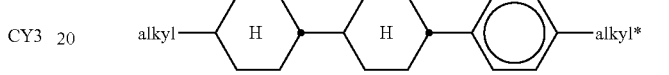
CY14
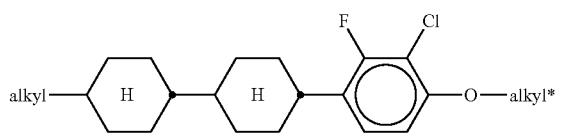
CY15
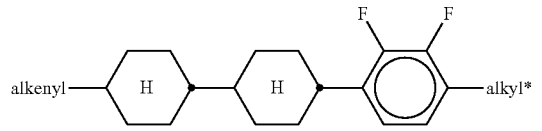
CY16
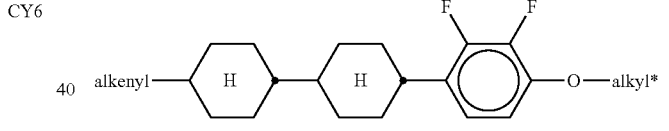
CY17
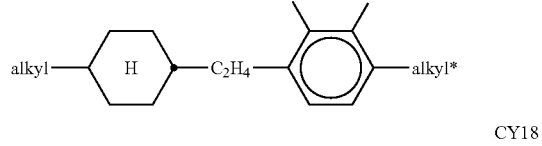
CY18
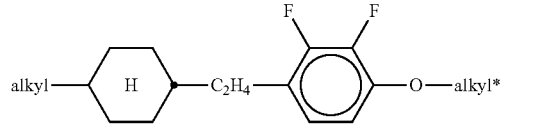
CY19
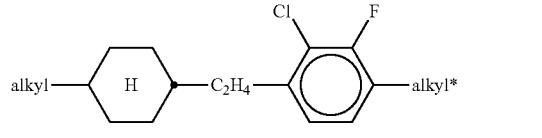
CY20
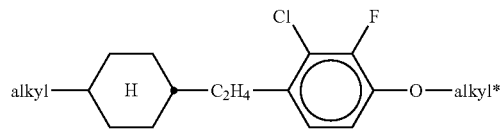

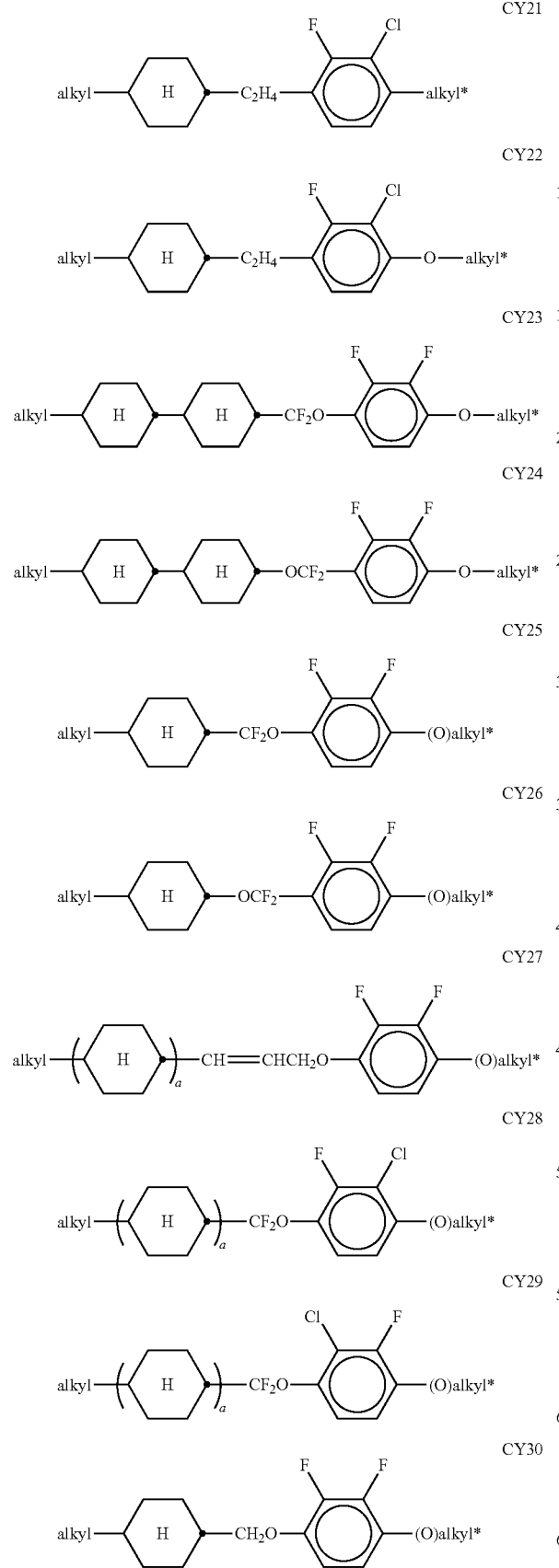

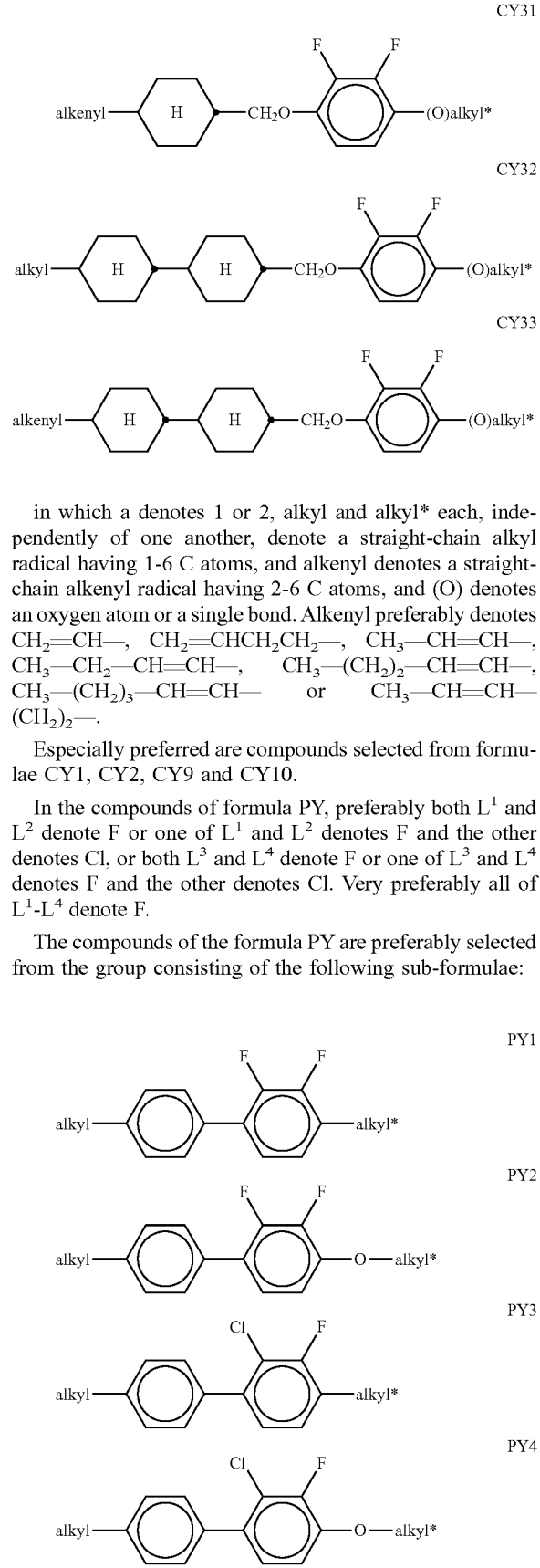

in which a denotes 1 or 2, alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Especially preferred are compounds selected from formulae CY1, CY2, CY9 and CY10.

In the compounds of formula PY, preferably both $L^1$ and $L^2$ denote F or one of $L^1$ and $L^2$ denotes F and the other denotes Cl, or both $L^3$ and $L^4$ denote F or one of $L^3$ and $L^4$ denotes F and the other denotes Cl. Very preferably all of $L^1$-$L^4$ denote F.

The compounds of the formula PY are preferably selected from the group consisting of the following sub-formulae:

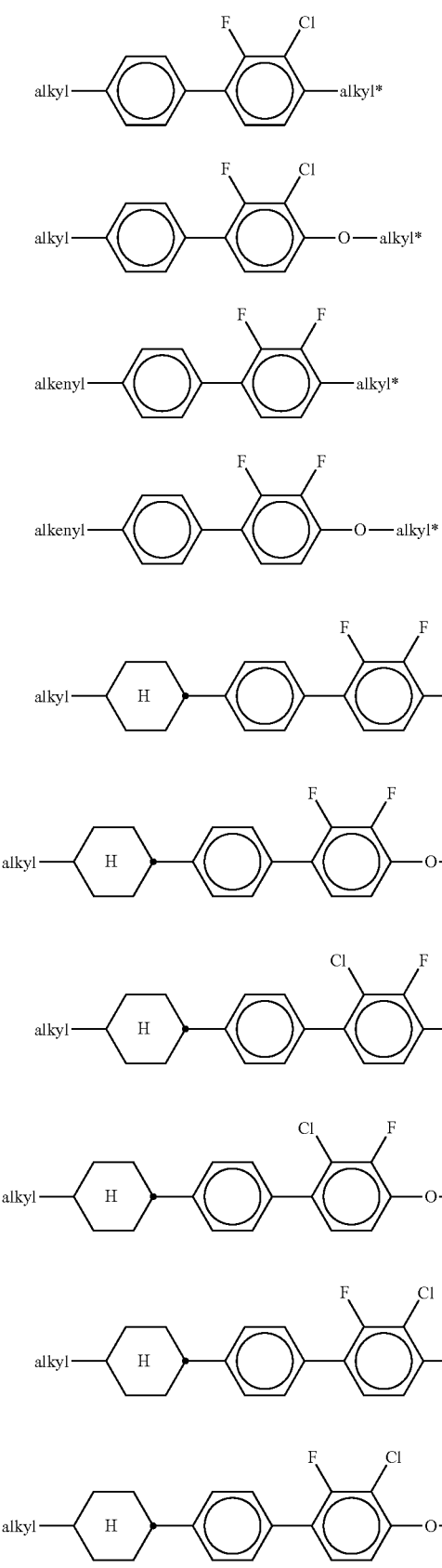

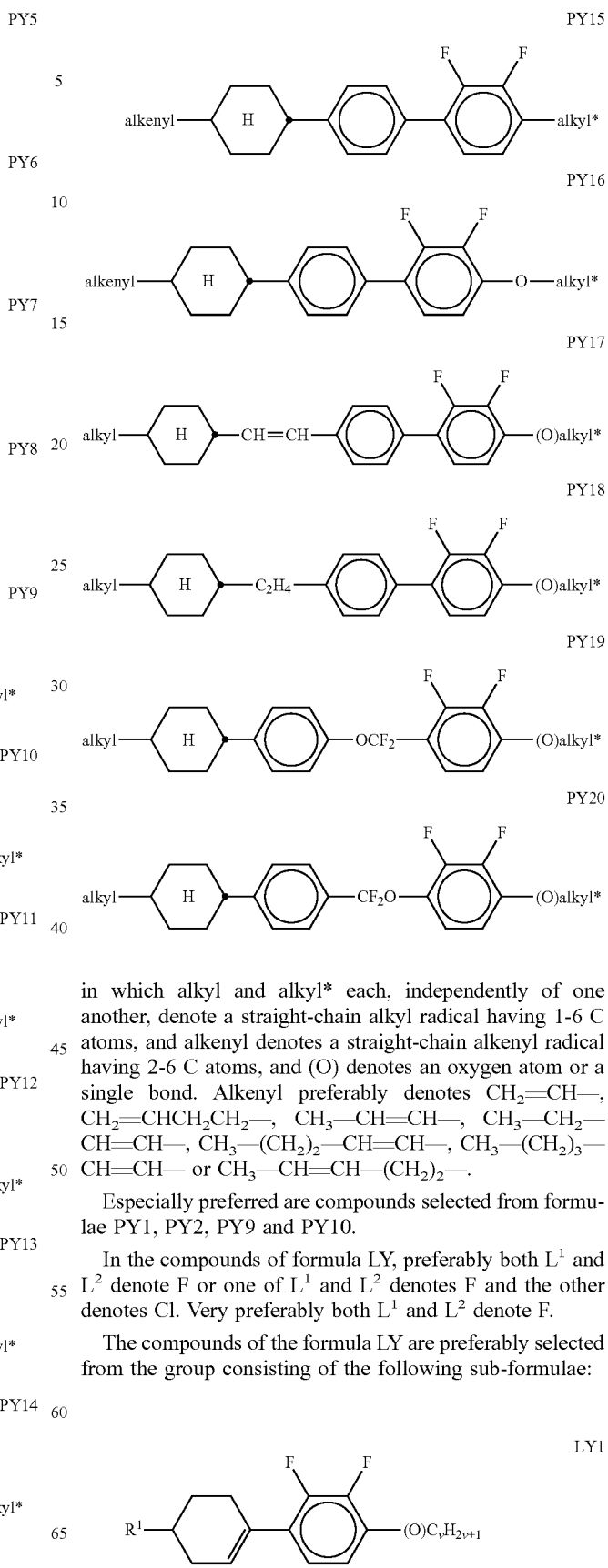

in which alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

Especially preferred are compounds selected from formulae PY1, PY2, PY9 and PY10.

In the compounds of formula LY, preferably both L$^1$ and L$^2$ denote F or one of L$^1$ and L$^2$ denotes F and the other denotes Cl. Very preferably both L$^1$ and L$^2$ denote F.

The compounds of the formula LY are preferably selected from the group consisting of the following sub-formulae:

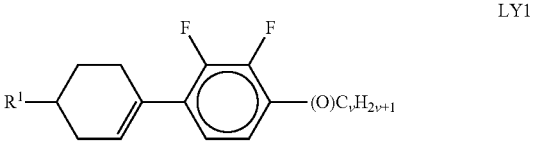

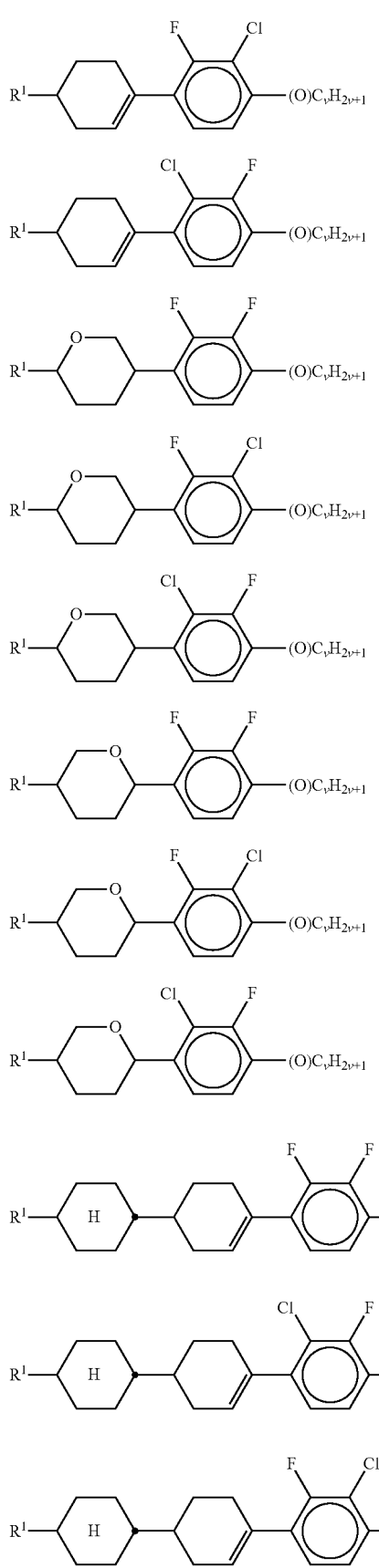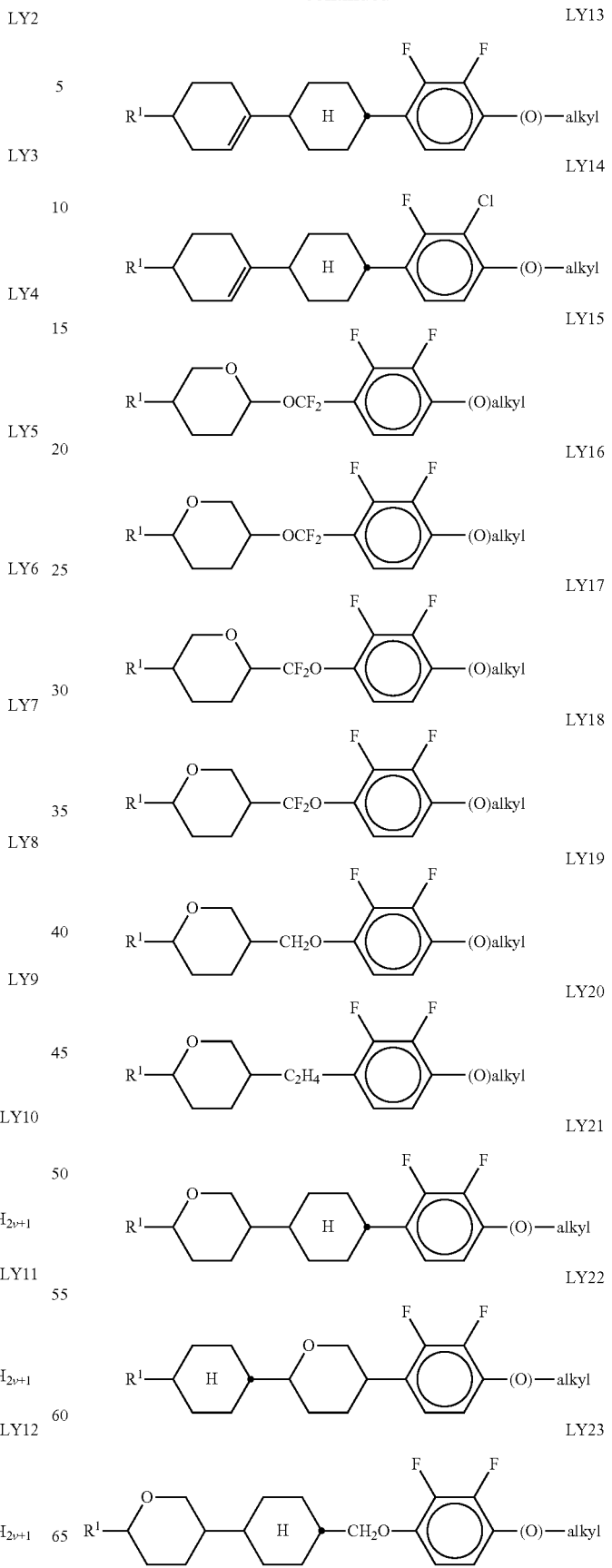

LY24

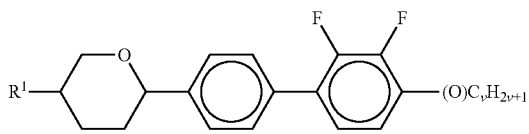

in which R¹ has the meaning indicated above, alkyl denotes a straight-chain alkyl radical having 1-6 C atoms, (O) denotes an oxygen atom or a single bond, and v denotes an integer from 1 to 6. R¹ preferably denotes straight-chain alkyl having 1 to 6 C atoms or straight-chain alkenyl having 2 to 6 C atoms, in particular $CH_3$, $C_2H_5$, n-$C_3H_7$, n-$C_4H_9$, n-$C_5H_{11}$, $CH_2$=CH—, $CH_2$=CHCH$_2$CH$_2$—, $CH_3$—CH=CH—, $CH_3$—CH$_2$—CH=CH—, $CH_3$—(CH$_2$)$_2$—CH=CH—, $CH_3$—(CH$_2$)$_3$—CH=CH— or $CH_3$—CH=CH—(CH$_2$)$_2$—. Very preferred are compounds of formula LY10.

In a first preferred embodiment the LC medium has negative dielectric anisotropy. Such LC media are especially suitable for use in VA, UB-FFS, PS-VA and PS-UB-FFS displays.

Preferred LC media with negative dielectric anisotropy comprise one or more compounds selected from formulae CY and PY, and optionally one or more compounds selected from formulae Y and LY.

In LC media with negative dielectric anisotropy, the concentration of compounds of formula CY, PY, LY and Y or their subformulae is preferably from 10 to 70% by weight, very preferably from 15 to 50% by weight.

In LC media with negative dielectric anisotropy the concentration of compounds of formula CY or its subformulae is preferably from 2 to 40% by weight, very preferably from 3 to 30% by weight.

In LC media with negative dielectric anisotropy the concentration of compounds of formula PY or its subformulae is preferably from 5 to 50% by weight, very preferably from 10 to 40% by weight.

In LC media with negative dielectric anisotropy the concentration of compounds of formula LY or its subformulae is preferably from 0 to 20% by weight, very preferably from 1 to 15% by weight.

In LC media with negative dielectric anisotropy the concentration of compounds of formula Y or its subformulae is preferably from 0 to 20% by weight, very preferably from 1 to 15% by weight.

In a second preferred embodiment the LC medium, although containing one or more compounds of formula CY, PY, LY and/or Y, has positive dielectric anisotropy (so-called "hybrid mixtures"). Such LC media are especially suitable for use in IPS, FFS, PS-IPS and PS-FFS displays.

Preferred LC media with positive dielectric anisotropy contain one or more, preferably only one, compound of formula CY or its subformulae.

Further preferred LC media with positive dielectric anisotropy contain one or more, preferably only one, compound of formula PY or its subformulae.

Further preferred LC media with positive dielectric anisotropy contain one or more, preferably only one, compound of formula Y or its subformulae.

Further preferred LC media with positive dielectric anisotropy contain one or more, preferably only one, compound of formula LY or its subformulae.

In LC media with positive dielectric anisotropy, the concentration of compounds of formula Y, CY, PY and LY or their subformulae is preferably from 1 to 20% by weight, very preferably from 2 to 15% by weight.

Preferred LC media having negative dielectric anisotropy are selected from the preferred embodiments below, including any combinations thereof.

a) The LC medium additionally contains one or more alkenyl compounds selected from formulae AN and AY

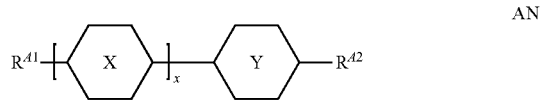

AN

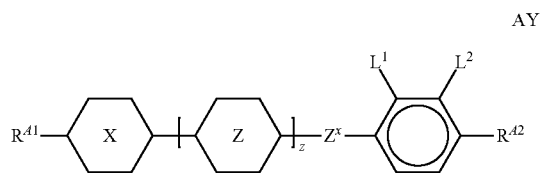

AY in which the individual radicals, on each occurrence identically or differently, and each, independently of one another, have the following meaning:

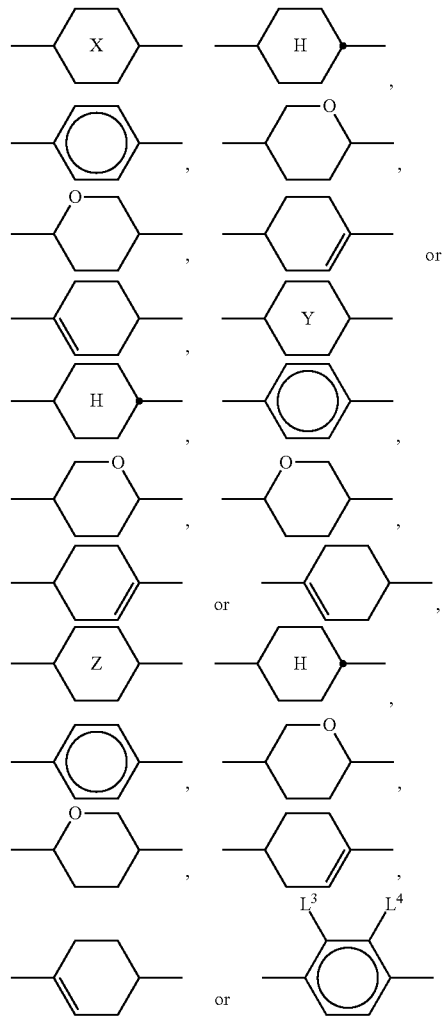

$R^{A1}$ is alkenyl having 2 to 9 C atoms or, if at least one of the rings X, Y and Z denotes cyclohexenyl, also one of the meanings of $R^{A2}$, $R^{A2}$ is alkyl having 1 to 12 C atoms, in which, in addition, one or two non-adjacent CH$_2$ groups may be replaced by —O—, —CH=CH—, —CO—, —OCO— or —COO— in such a way that O atoms are not linked directly to one another, $Z^x$ is —CH$_2$CH$_2$—, —CH=CH—, —CF$_2$O—, —OCF$_2$—, —CH$_2$O—, —OCH$_2$—, —CO—O—, —O—CO—, —C$_2$F$_4$—, —CF=CF—, —CH=CH—CH$_2$O—, or a single bond, preferably a single bond, $L^{1,2}$ is H, F, Cl, OCF$_3$, CF$_3$, CH$_3$, CH$_2$F or CF$_2$H, preferably H, F or Cl, x is 1 or 2, z is 0 or 1.

Preferred compounds of formula AN and AY are those wherein $R^{A2}$ is selected from ethenyl, propenyl, butenyl, pentenyl, hexenyl and heptenyl.

In a preferred embodiment, the LC medium comprises one or more compounds of formula AN selected from the following sub-formulae:

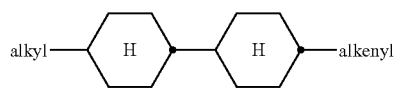
AN1

AN2

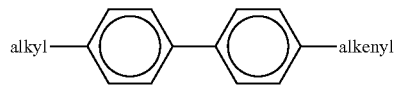
AN3

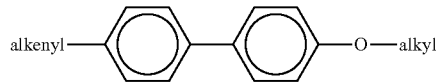
AN4

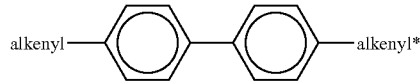
AN5

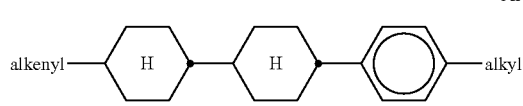
AN6

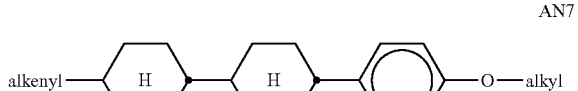
AN7

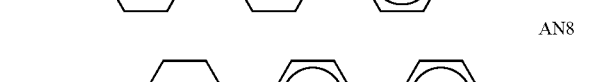
AN8

AN9

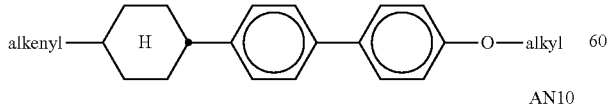
AN10

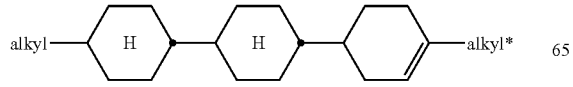
AN11

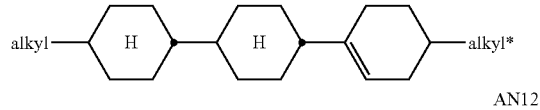
AN12

in which alkyl and alkyl* each, independently of one another, denote a straight-chain alkyl radical having 1-6 C atoms, and alkenyl and alkenyl* each, independently of one another, denote a straight-chain alkenyl radical having 2-7 C atoms. Alkenyl and alkenyl* preferably denote CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

Preferably the LC medium comprises one or more compounds selected from formulae AN1, AN2 AN3 and AN6, very preferably one or more compounds of formula AN1 and/or AN6.

In another preferred embodiment the LC medium comprises one or more compounds of formula AN selected from the following sub-formulae:

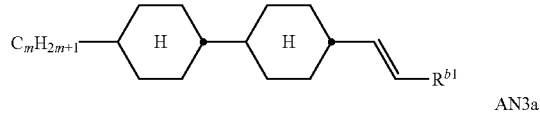
AN1a

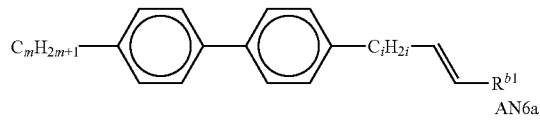
AN3a

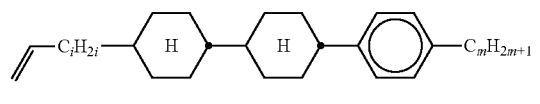
AN6a in which m denotes 1, 2, 3, 4, 5 or 6, i denotes 0, 1, 2 or 3, and $R^{b1}$ denotes H, CH$_3$ or C$_2$H$_5$.

In another preferred embodiment the LC medium comprises one or more compounds selected from the following sub-formulae:

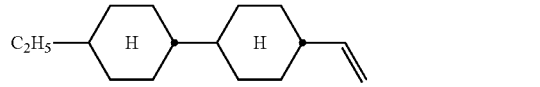
AN1a1

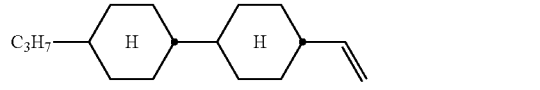
AN1a2

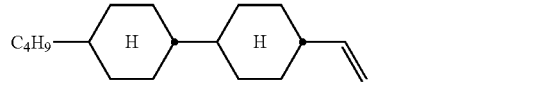
AN1a3

Most preferred are compounds of formula AN1a2, AN1a5, AN6a1 and AN6a2.

In another preferred embodiment the LC medium comprises one or more compounds of formula AY selected from the following sub-formulae:

AY17
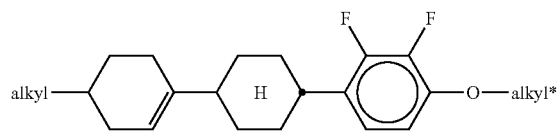

AY18
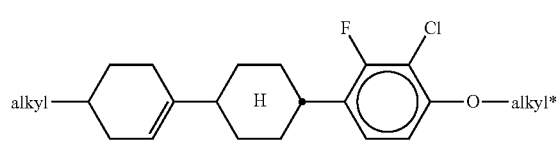

AY19
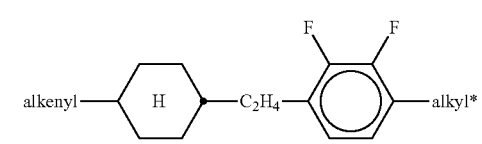

AY20
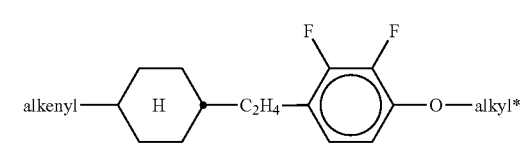

AY21
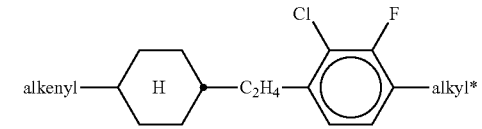

AY22
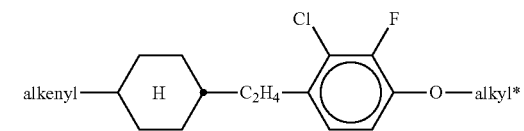

AY23
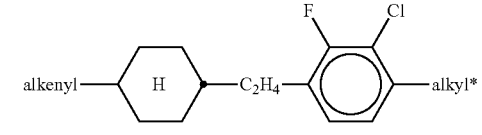

AY24
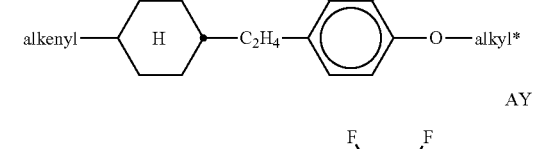

AY25
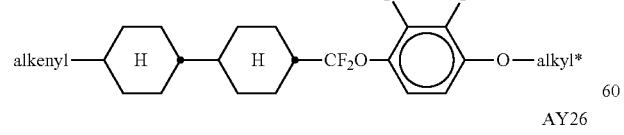

AY26
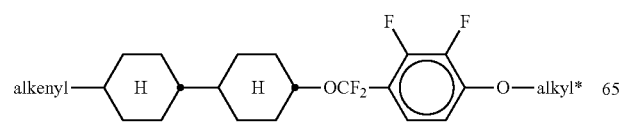

AY27
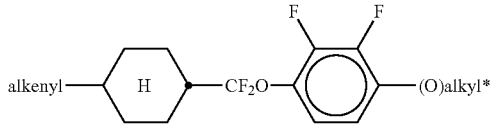

AY28
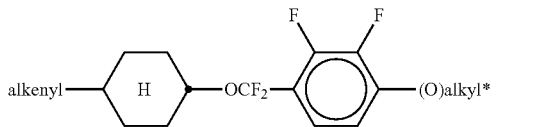

AY29
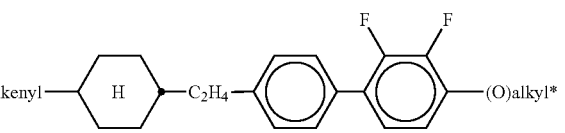

AY30
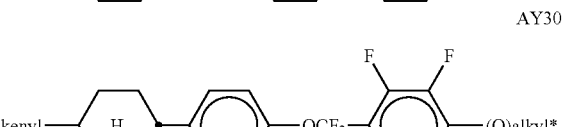

AY31
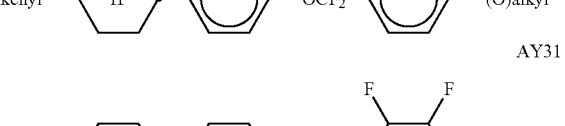

in which alkyl and alkyl* each, independently of one another, denote a straight-chain alkyl radical having 1-6 C atoms, "(O)" denotes an O-atom or a single bond, and alkenyl and alkenyl* each, independently of one another, denote a straight-chain alkenyl radical having 2-7 C atoms. Alkenyl and alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

In another preferred embodiment the LC medium comprises one or more compounds of formula AY selected from the following sub-formulae:

AY5a
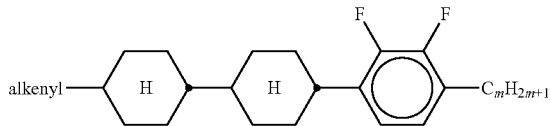

AY6a
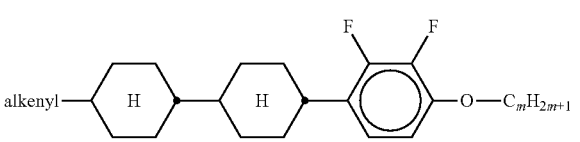

AY9a
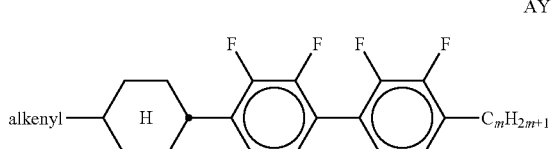

-continued

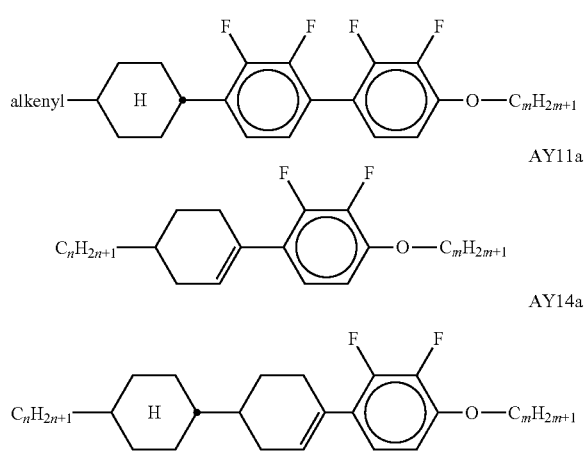

in which m and n each, independently of one another, denote 1, 2, 3, 4, 5 or 6, and alkenyl denotes CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

Preferably the proportion of compounds of formula AN and AY in the LC medium is from 2 to 70% by weight, very preferably from 5 to 60% by weight, most preferably from 10 to 50% by weight.

Preferably the LC medium contains 1 to 5, preferably 1, 2 or 3 compounds selected from formulae AN and AY.

In another preferred embodiment of the present invention the LC medium comprises one or more compounds of formula AY14, very preferably of AY14a. The proportion of compounds of formula AY14 or AY14a in the LC medium is preferably 3 to 20% by weight.

The addition of compounds of formula AN and/or AY containing one or two alkenyl groups enables a reduction of the viscosity and response time of the LC medium.

b) LC medium which additionally comprises one or more compounds of the following formula:

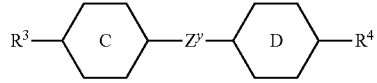 ZK in which the individual radicals have the following meanings:

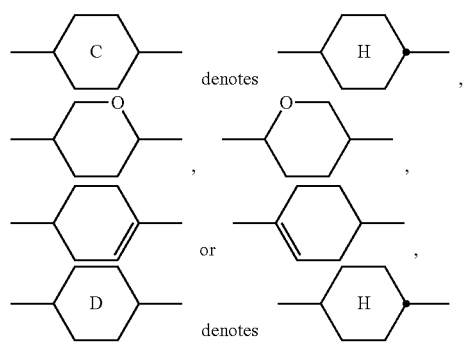

R$^3$ and R$^4$ each, independently of one another, denote alkyl having 1 to 12 C atoms, in which, in addition, one or two non-adjacent CH$_2$ groups may be replaced by —O—, —CH=CH—, —CO—, —O—CO— or —CO—O— in such a way that O atoms are not linked directly to one another, Z$^y$ denotes —CH$_2$CH$_2$—, —CH=CH—, —CF$_2$O—, —OCF$_2$—, —CH$_2$O—, —OCH$_2$—, —CO—O—, —O—CO—, —C$_2$F$_4$—, —CF=CF—, —CH=CH—CH$_2$O— or a single bond, preferably a single bond.

The compounds of the formula ZK are preferably selected from the group consisting of the following sub-formulae:

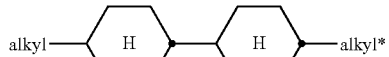 ZK1

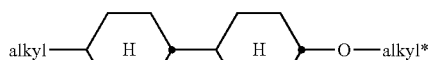 ZK2

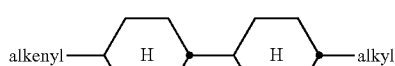 ZK3

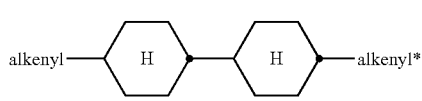 ZK4

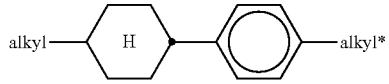 ZK5

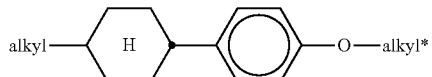 ZK6

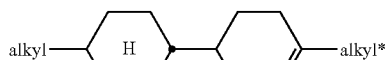 ZK7

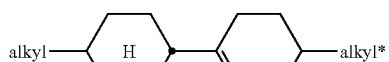 ZK8

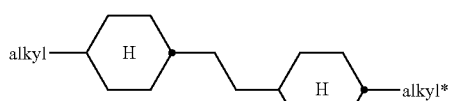 ZK9

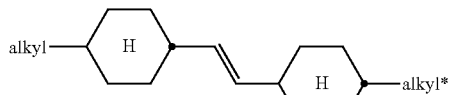 ZK10 in which alkyl and alkyl* each, independently of one another, denote a straight-chain alkyl radical having 1-6 C atoms, and alkenyl denotes a straight-chain alkenyl radical having 2-6 C atoms. Alkenyl preferably denotes CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

Especially preferred are compounds of formula ZK1.

Particularly preferred compounds of formula ZK are selected from the following sub-formulae:

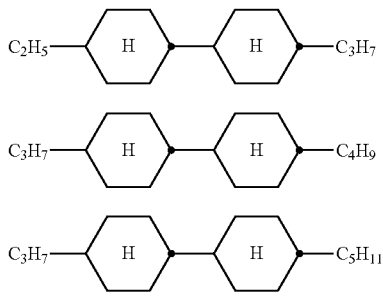

wherein the propyl, butyl and pentyl groups are straight-chain groups.

Most preferred are compounds of formula ZK1a.

c) LC medium which additionally comprises one or more compounds of the following formula:

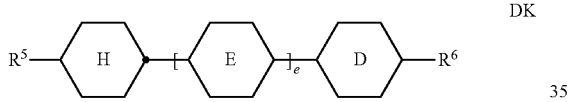

in which the individual radicals on each occurrence, identically or differently, have the following meanings:

R$^5$ and R$^6$ each, independently of one another, denote alkyl having 1 to 12 C atoms, where, in addition, one or two non-adjacent CH$_2$ groups may be replaced by —O—, —CH=CH—, —CO—, —OCO— or —COO— in such a way that O atoms are not linked directly to one another, preferably alkyl or alkoxy having 1 to 6 C atoms,

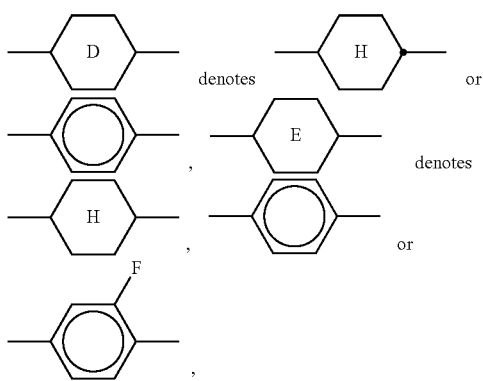

e denotes 1 or 2.

The compounds of the formula DK are preferably selected from the group consisting of the following sub-formulae:

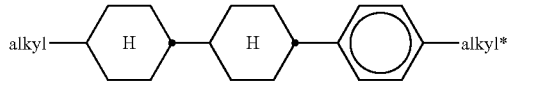
DK1

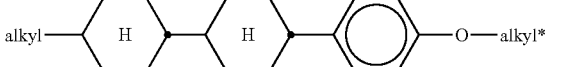
DK2

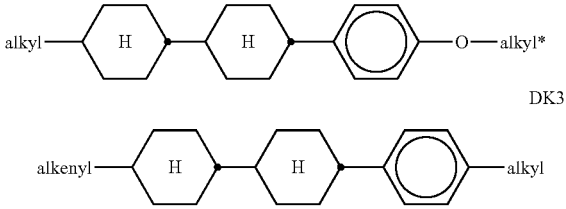
DK3

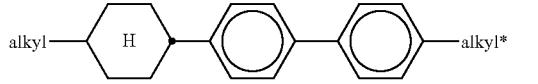
DK4

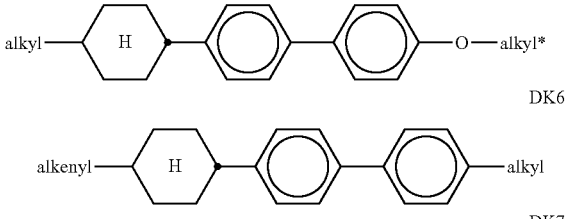
DK5

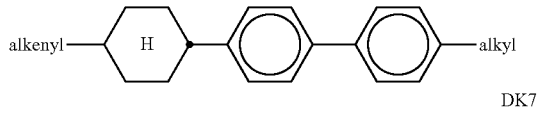
DK6

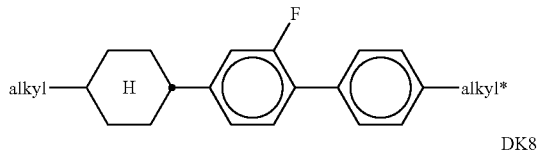
DK7

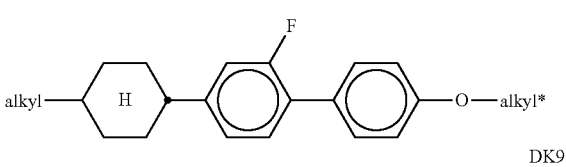
DK8

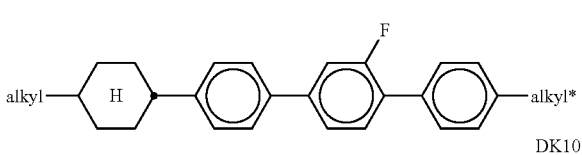
DK9

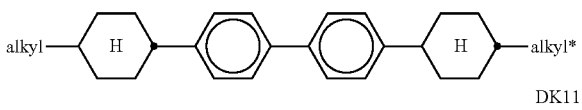
DK10

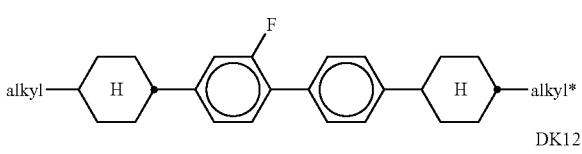
DK11

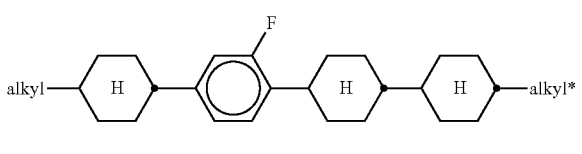
DK12 in which alkyl and alkyl* each, independently of one another, denote a straight-chain alkyl radical having 1-6 C atoms, and alkenyl denotes a straight-chain alkenyl radical having 2-6 C atoms. Alkenyl preferably denotes CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

d) LC medium which additionally comprises one or more compounds selected from the group consisting of the following formulae:

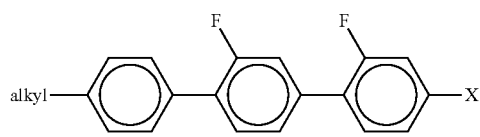

G1

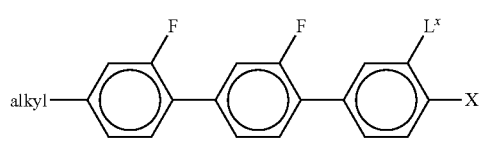

G2

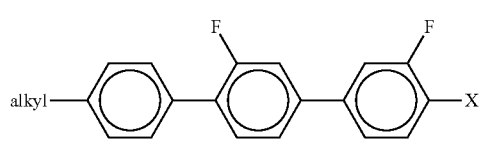

G3

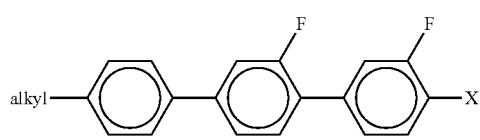

G4 in which alkyl denotes C$_{1-6}$-alkyl, L$^x$ denotes H or F, and X denotes F, Cl, OCF$_3$, OCHF$_2$ or OCH=CF$_2$. Particular preference is given to compounds of the formula G1 in which X denotes F.

e) LC medium which additionally comprises one or more compounds selected from the group consisting of the following formulae:

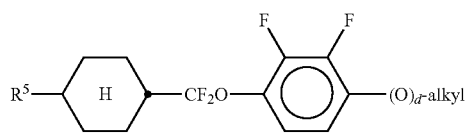

OY1

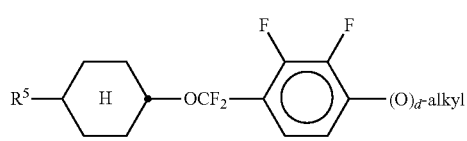

OY2

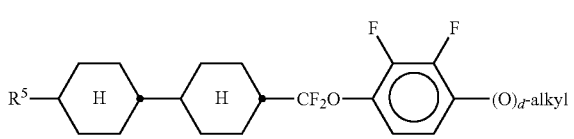

OY3

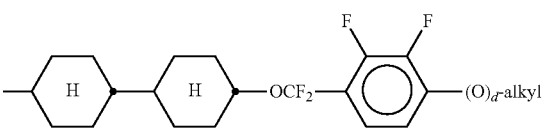

OY4

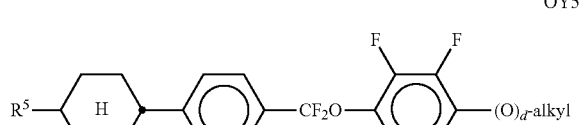

OY5

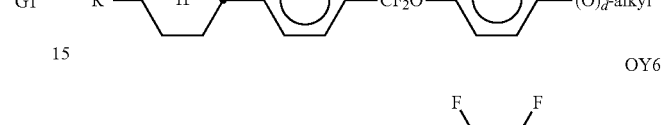

OY6

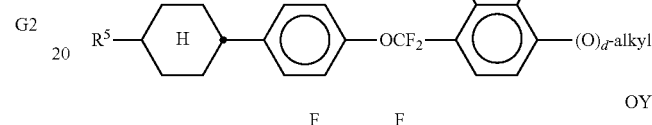

OY7

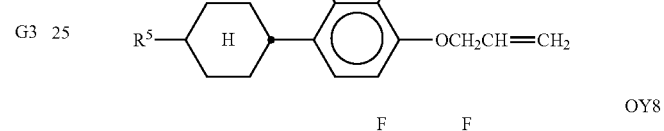

OY8

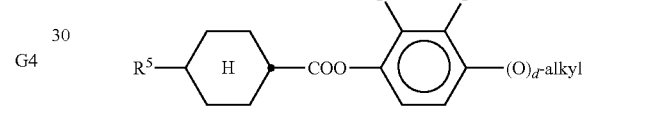

OY9

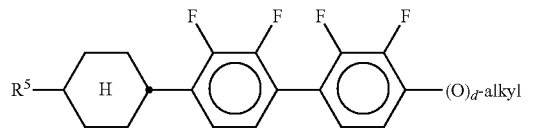

OY10

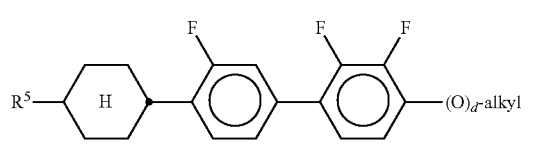

OY11

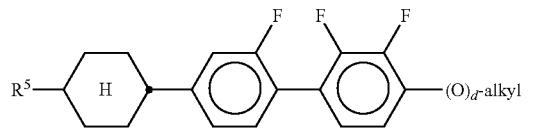

OY12

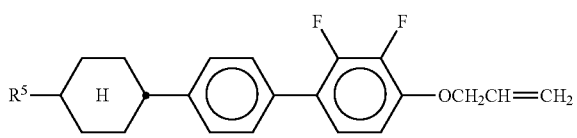

OY13

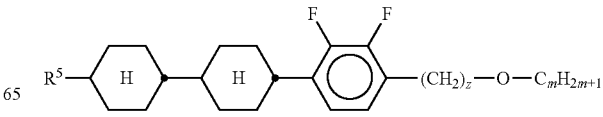

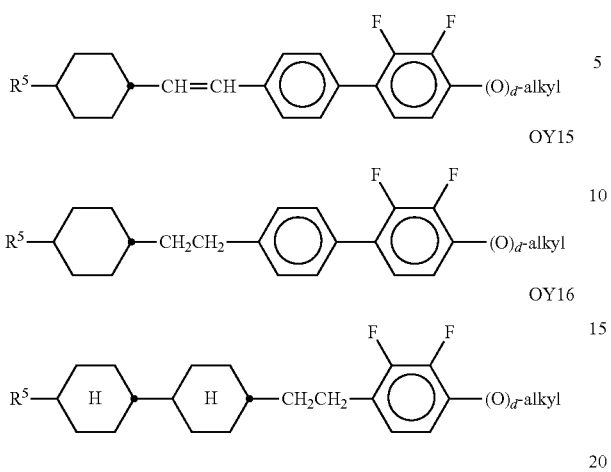

OY14

OY15

OY16 in which $R^5$ has one of the meanings indicated above, alkyl denotes $C_{1-6}$-alkyl, d denotes 0 or 1, and z and m each, independently of one another, denote an integer from 1 to 6. $R^5$ in these compounds is particularly preferably $C_{1-6}$-alkyl or -alkoxy or $C_{2-6}$-alkenyl, d is preferably 1. The LC medium according to the invention preferably comprises one or more compounds of the above-mentioned formulae in amounts of ≥5% by weight.

f) LC medium which additionally comprises one or more biphenyl compounds selected from the group consisting of the following formulae:

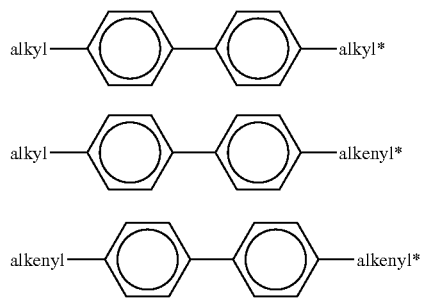

B1

B2

B3 in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

The proportion of the biphenyls of the formulae B1 to B3 in the LC mixture is preferably at least 3% by weight, in particular ≥5% by weight.

The compounds of the formula B2 are particularly preferred.

The compounds of the formulae B1 to B3 are preferably selected from the group consisting of the following sub-formulae:

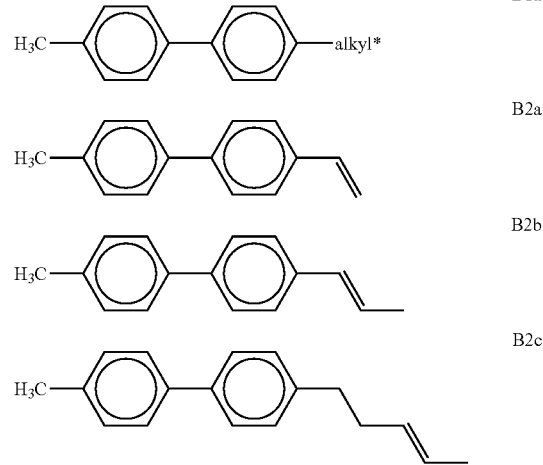

B1a

B2a

B2b

B2c in which alkyl* denotes an alkyl radical having 1-6 C atoms. The medium according to the invention particularly preferably comprises one or more compounds of the formulae B1a and/or B2c.

g) LC medium which additionally comprises one or more terphenyl compounds of the following formula:

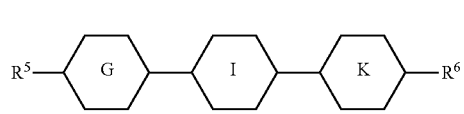

T in which $R^5$ and $R^6$ each, independently of one another, have one of the meanings indicated above, and

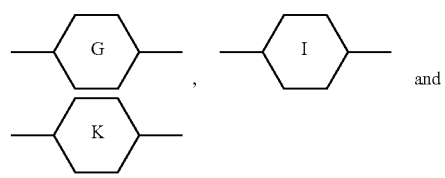

each, independently of one another, denote

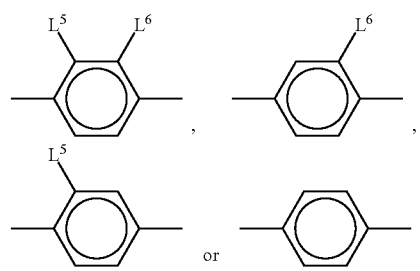

in which $L^5$ denotes F or Cl, preferably F, and $L^6$ denotes F, Cl, $OCF_3$, $CF_3$, $CH_3$, $CH_2F$ or $CHF_2$, preferably F.

The compounds of the formula T are preferably selected from the group consisting of the following sub-formulae:

T1
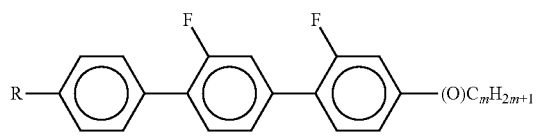
T2
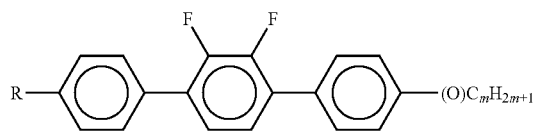
T3
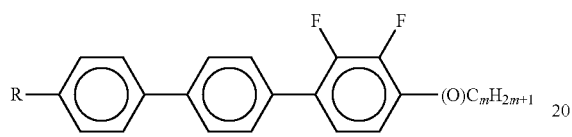
T4
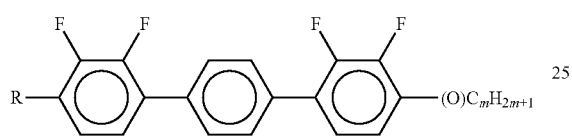
T5
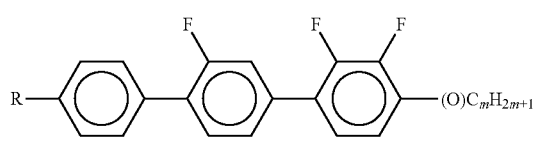
T6
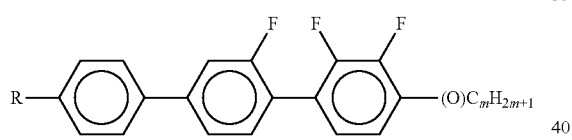
T7
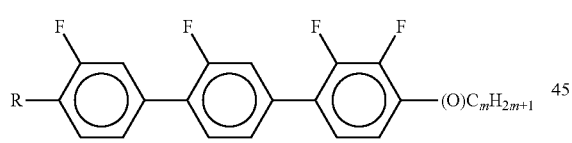
T8
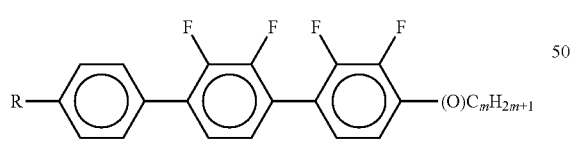
T9
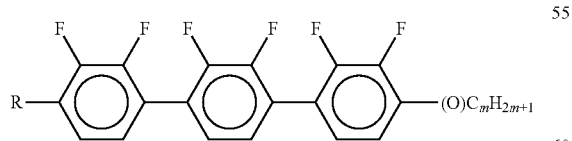
T10
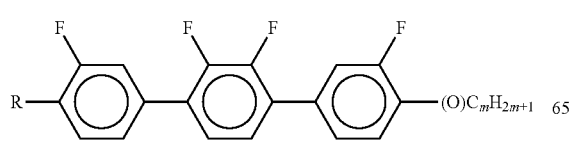
-continued
T11
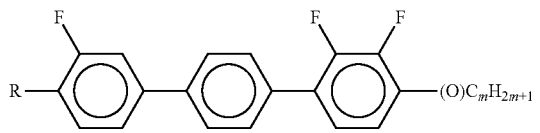
T12
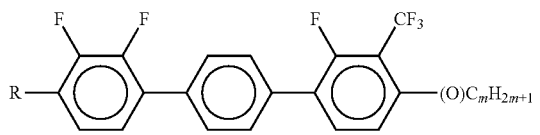
T13
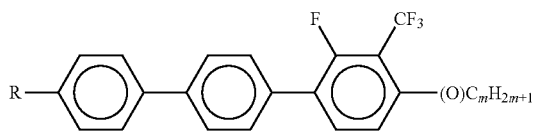
T14
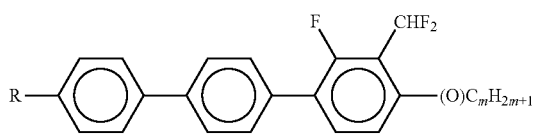
T15
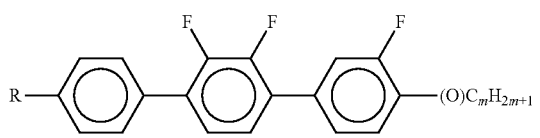
T16
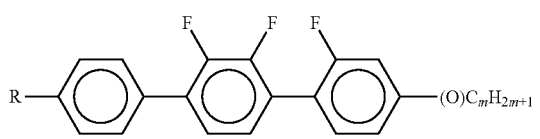
T17
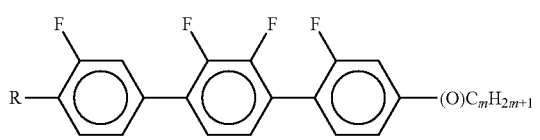
T18
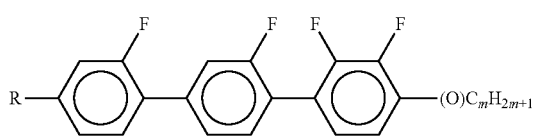
T19
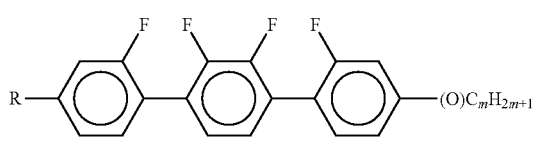
T20
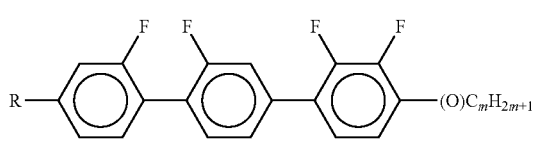

-continued

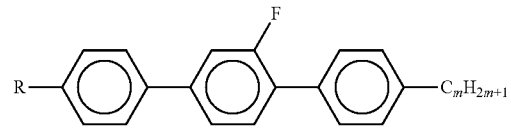
T21

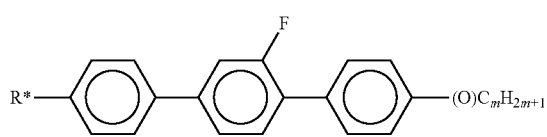
T22

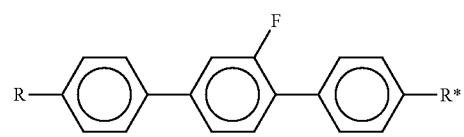
T23

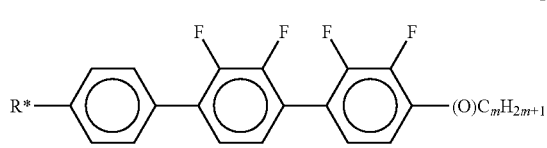
T24 in which R denotes a straight-chain alkyl or alkoxy radical having 1-7 C atoms, R* denotes a straight-chain alkenyl radical having 2-7 C atoms, (O) denotes an oxygen atom or a single bond, and m denotes an integer from 1 to 6. R* preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

R preferably denotes methyl, ethyl, propyl, butyl, pentyl, hexyl, methoxy, ethoxy, propoxy, butoxy or pentoxy.

Particular preference is given to compounds of the formulae T1, T2, T3 and T21. In these compounds, R preferably denotes alkyl, furthermore alkoxy, each having 1-5 C atoms.

Preferably the LC medium does not contain more than 20% of a terphenyl compound of formula T or any other compound with a terphenyl group.

h) LC medium which additionally comprises one or more quaterphenyl compounds selected from the group consisting of the following formulae:

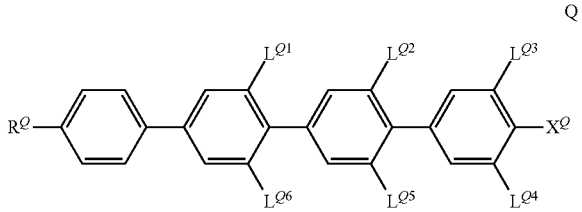
Q wherein
$R^Q$ is alkyl, alkoxy, oxaalkyl or alkoxyalkyl having 1 to 9 C atoms or alkenyl or alkenyloxy having 2 to 9 C atoms, all of which are optionally fluorinated,
$X^Q$ is F, Cl, halogenated alkyl or alkoxy having 1 to 6 C atoms or halogenated alkenyl or alkenyloxy having 2 to 6 C atoms,
$L^{Q1}$ to $L^{Q6}$ independently of each other are H or F, with at least one of $L^{Q1}$ to $L^{Q6}$ being F.

Preferred compounds of formula Q are those wherein $R^e$ denotes straight-chain alkyl with 2 to 6 C-atoms, very preferably ethyl, n-propyl or n-butyl.

Preferred compounds of formula Q are those wherein $L^{Q3}$ and $L^{Q4}$ are F.

Further preferred compounds of formula Q are those wherein $L^{Q3}$, $L^{Q4}$ and one or two of $L^{Q1}$ and $L^{Q2}$ are F.

Preferred compounds of formula Q are those wherein $X^e$ denotes F or $OCF_3$, very preferably F.

The compounds of formula Q are preferably selected from the following subformulae

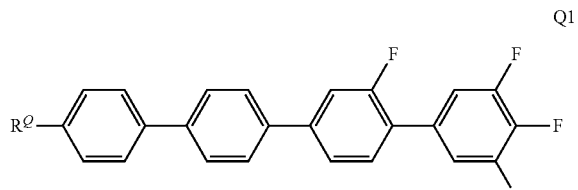
Q1

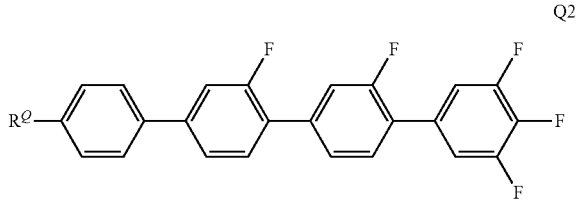
Q2 wherein $R^Q$ has one of the meanings of formula Q or one of its preferred meanings given above and below, and is preferably ethyl, n-propyl or n-butyl.

Especially preferred are compounds of formula Q1, in particular those wherein $R^Q$ is n-propyl.

Preferably the proportion of compounds of formula Q in the LC medium is from >0 to ≤5% by weight, very preferably from 0.1 to 2% by weight, most preferably from 0.2 to 1.5% by weight.

Preferably the LC medium contains 1 to 5, preferably 1 or 2 compounds of formula Q.

The addition of quaterphenyl compounds of formula Q to the LC medium mixture enables to reduce ODF mura (i.e., the occurrence of mura in the display, especially when the LC medium is filled in the display by using the one drop filling (ODF) method), whilst maintaining high UV absorption, enabling quick and complete polymerisation, enabling strong and quick tilt angle generation, and increasing the UV stability of the LC medium.

Besides, the addition of compounds of formula Q, which have positive dielectric anisotropy, to the LC medium with negative dielectric anisotropy allows a better control of the values of the dielectric constants E and e, and in particular enables to achieve a high value of the dielectric constant E while keeping the dielectric anisotropy Δε constant, thereby reducing the kick-back voltage and reducing image sticking.

i) LC medium which additionally comprises one or more compounds selected from the group consisting of the following formulae:

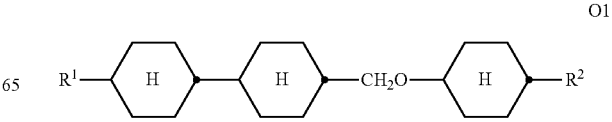
O1

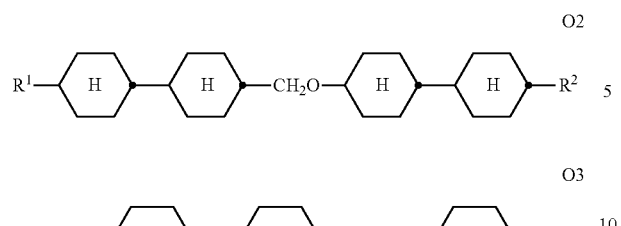

in which $R^1$ and $R^2$ have the meanings indicated above and preferably each, independently of one another, denote straight-chain alkyl having 1 to 6 C atoms or straight-chain alkenyl having 2 to 6 C atoms.

Preferred media comprise one or more compounds selected from the formulae 01, 03 and 04.

k) LC medium which additionally comprises one or more compounds of the following formula:

in which $R^9$ denotes H, $CH_3$, $C_2H_5$ or n-$C_3H_7$, (F) denotes an optional fluorine substituent, and q denotes 1, 2 or 3, and $R^7$ has one of the meanings indicated for $R^1$, preferably in amounts of >3% by weight, in particular ≥5% by weight and very particularly preferably 5-30% by weight.

Particularly preferred compounds of the formula FI are selected from the group consisting of the following sub-formulae:

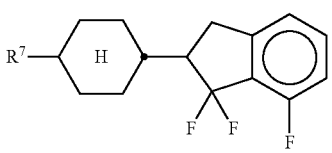

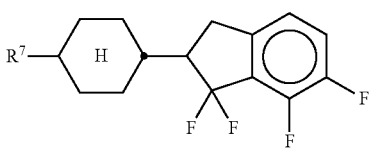

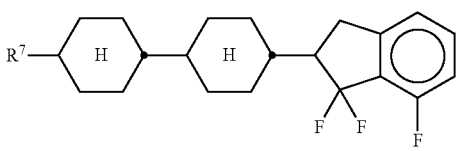

FI4
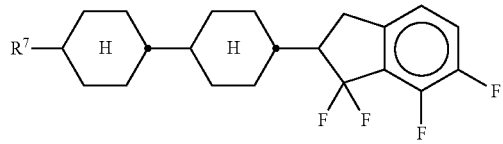

FI5
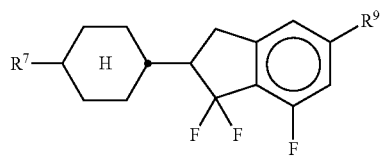

FI6
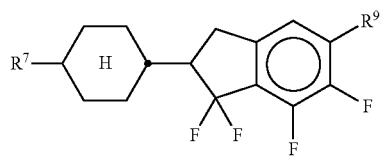

FI7
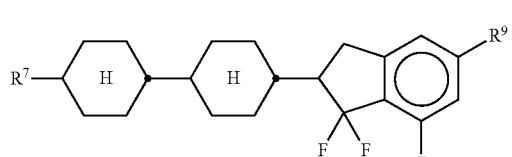

FI8
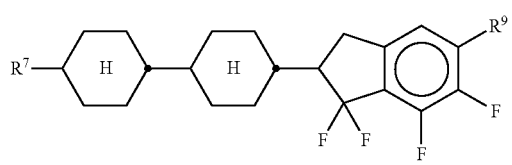

in which R⁷ preferably denotes straight-chain alkyl, and R⁹ denotes $CH_3$, $C_2H_5$ or n-$C_3H_7$. Particular preference is given to the compounds of the formulae FI1, FI2 and FI3.

l) LC medium which additionally comprises one or more compounds selected from the group consisting of the following formulae:

VK1
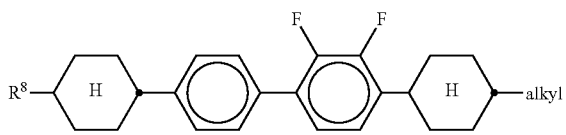

VK2
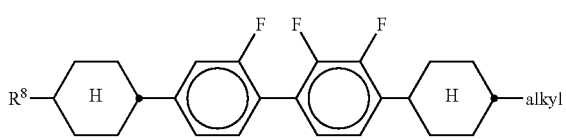

VK3
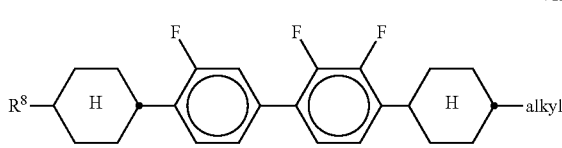

VK4
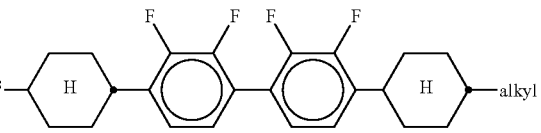

in which R⁸ has the meaning indicated for R¹, and alkyl denotes a straight-chain alkyl radical having 1-6 C atoms.

m) LC medium which additionally comprises one or more compounds which contain a tetrahydronaphthyl or naphthyl unit, such as, for example, the compounds selected from the group consisting of the following formulae:

N1
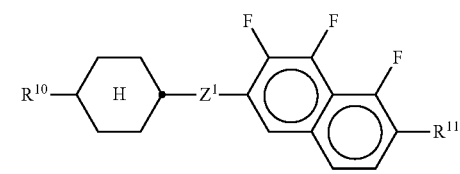

N2
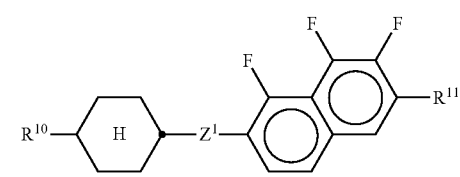

N3
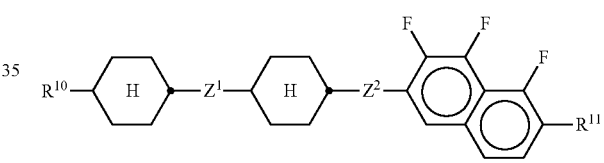

N4
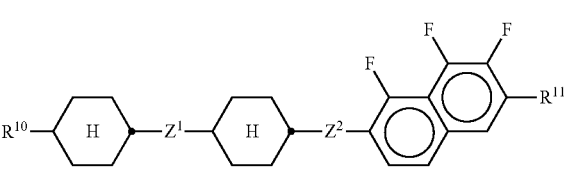

N5
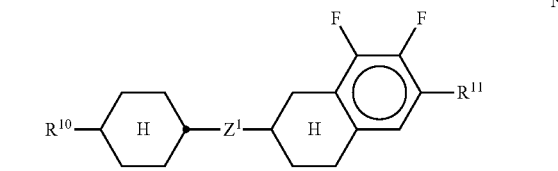

N6
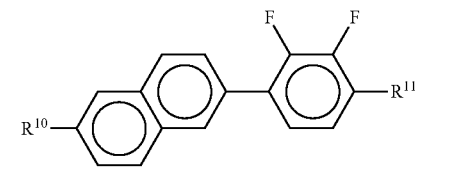

N7
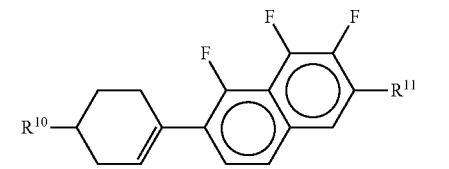

-continued

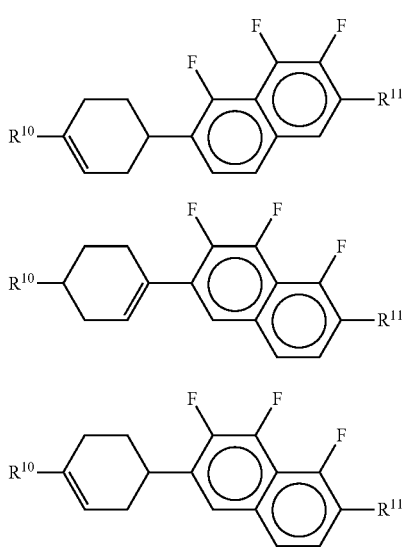

in which
R[10] and R[11] each, independently of one another, denote alkyl having 1 to 12 C atoms, where, in addition, one or two non-adjacent CH$_2$ groups may be replaced by —O—, —CH=CH—, —CO—, —OCO— or —COO— in such a way that O atoms are not linked directly to one another, preferably alkyl or alkoxy having 1 to 6 C atoms,
and R[10] and R[11] preferably denote straight-chain alkyl or alkoxy having 1 to 6 C atoms or straight-chain alkenyl having 2 to 6 C atoms, and
Z[1] and Z[2] each, independently of one another, denote —C$_2$H$_4$—, —CH=CH—, —(CH$_2$)$_4$—, —(CH$_2$)$_{30}$—, —O(CH$_2$)$_3$—, —CH=CH—CH$_2$CH$_2$—, —CH$_2$CH$_2$CH=CH—, —CH$_2$O—, —OCH$_2$—, —CO—O—, —O—CO—, —C$_2$F$_4$—, —CF=CF—, —CF=CH—, —CH=CF—, —CH$_2$— or a single bond.

n) LC medium which additionally comprises one or more difluorodibenzo-chromans and/or chromans of the following formulae:

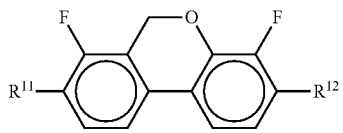
BC

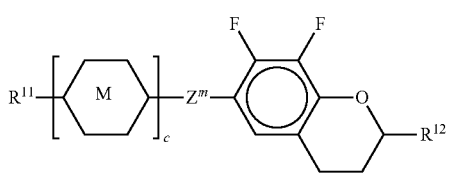
CR

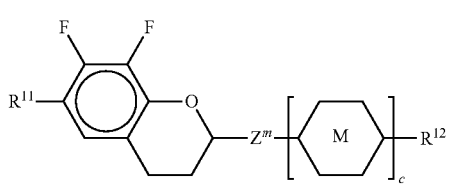
RC in which
R[11] and R[12] each, independently of one another, have one of the meanings indicated above for R[11],
ring M is trans-1,4-cyclohexylene or 1,4-phenylene,
Z[m] —C$_2$H$_4$—, —CH$_2$O—, —OCH$_2$—, —CO—O— or —O—CO—,
c is 0, 1 or 2,
preferably in amounts of 3 to 20% by weight, in particular in amounts of 3 to 15% by weight.

Particularly preferred compounds of the formulae BC, CR and RC are selected from the group consisting of the following sub-formulae:

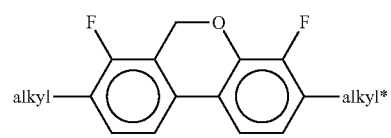
BC1

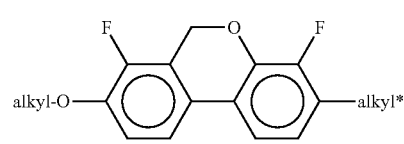
BC2

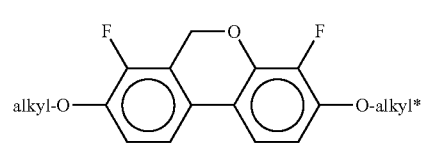
BC3

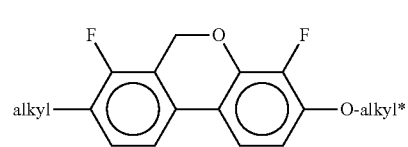
BC4

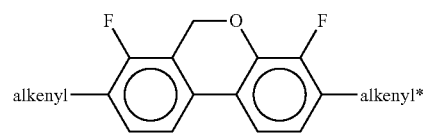
BC5

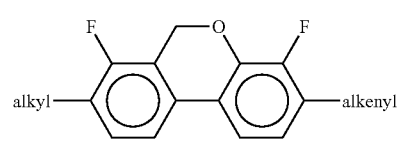
BC6

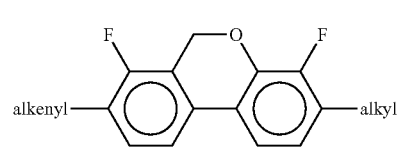
BC7

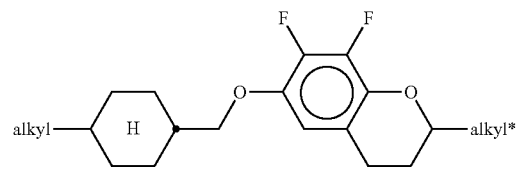
CR1

CR2
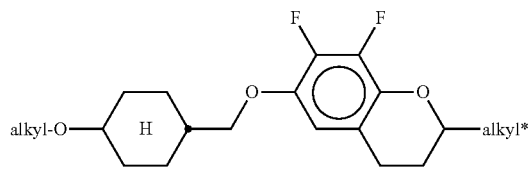

CR3
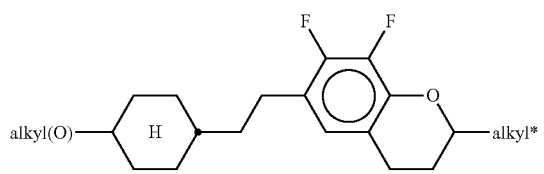

CR4
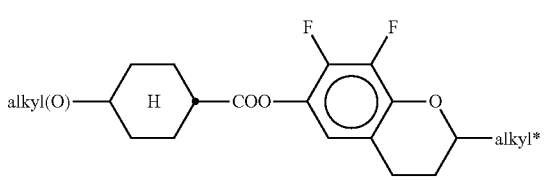

CR5
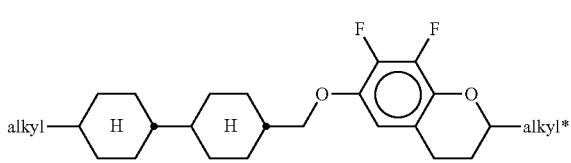

CR6
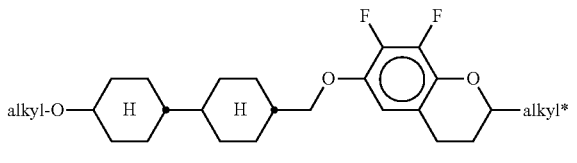

CR7
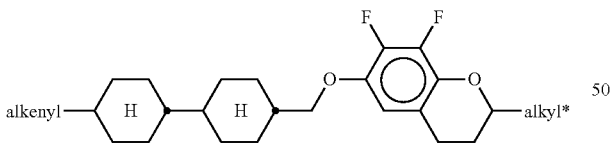

CR8
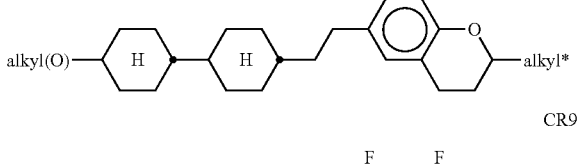

CR9
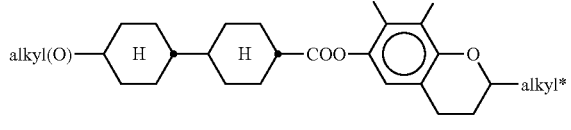

RC1
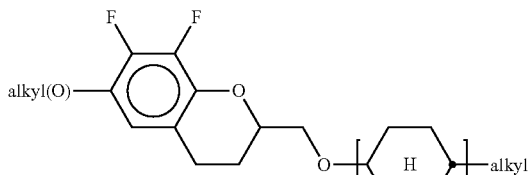

RC2
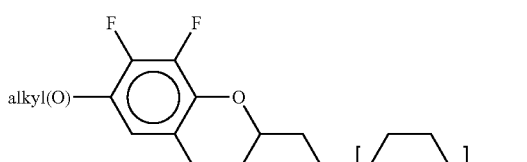

RC3
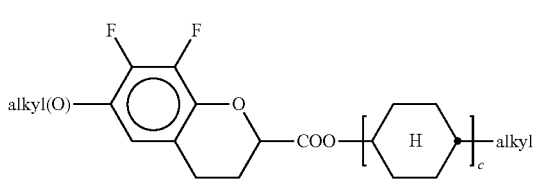

in which alkyl and alkyl* each, independently of one another, denote a straight-chain alkyl radical having 1-6 C atoms, (O) denotes an oxygen atom or a single bond, c is 1 or 2, and alkenyl and alkenyl* each, independently of one another, denote a straight-chain alkenyl radical having 2-6 C atoms. Alkenyl and alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Very particular preference is given to mixtures comprising one, two or three compounds of the formula BC-2.

o) LC medium which additionally comprises one or more fluorinated phenanthrenes and/or dibenzofurans of the following formulae:

PH
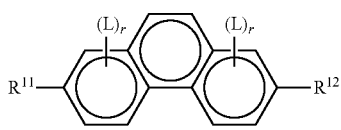

BF
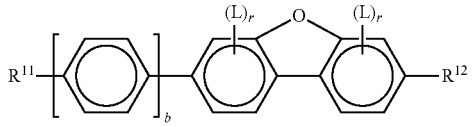

in which $R^{11}$ and $R^{12}$ each, independently of one another, have one of the meanings indicated above for $R^1$, b denotes 0 or 1, L denotes F, and r denotes 1, 2 or 3.

Particularly preferred compounds of the formulae PH and BF are selected from the group consisting of the following sub-formulae:

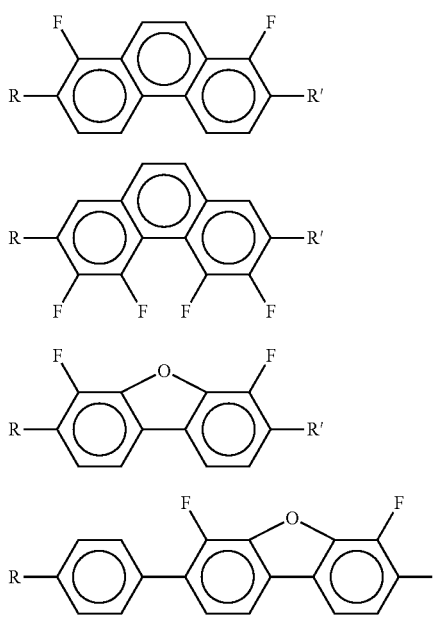

in which R and R' each, independently of one another, denote a straight-chain alkyl or alkoxy radical having 1-7 C atoms.

p) LC medium which comprises one or more compounds selected from formula AN as defined above or its preferred subformulae, preferably selected from formulae AN1-AN12, more preferably selected from formulae AN1a, AN3a and AN6a, most preferably selected from formulae AN1a2, AN1a5, AN6a1 and AN6a2. Preferably the LC medium contains 1 to 5, preferably 1, 2 or 3 compounds selected from these formulae. The proportion of these compounds in the LC medium is preferably from 2 to 60% by weight, very preferably from 5 to 45% by weight, most preferably from 10 to 40% by weight.

q) LC medium which comprises 1 to 5, preferably 1, 2 or 3, polymerisable compounds, preferably selected from polymerisable compounds of formula M or sub-formulae thereof. The proportion of polymerisable compounds, in particular of the formula M or sub-formulae thereof, in the mixture as a whole is 0.05 to 5%, preferably 0.1 to 1%.

r) LC medium which comprises 1 to 8, preferably 1 to 5, compounds of the formulae CY1, CY2, PY1 and/or PY2. The proportion of these compounds in the mixture as a whole is preferably 5 to 60%, particularly preferably 10 to 35%. The content of these individual compounds is preferably in each case 2 to 20%.

s) LC medium which comprises 1 to 8, preferably 1 to 5, compounds of the formulae CY9, CY10, PY9 and/or PY10. The proportion of these compounds in the mixture as a whole is preferably 5 to 60%, particularly preferably 10 to 35%. The content of these individual compounds is preferably in each case 2 to 20%.

t) LC medium which comprises 1 to 10, preferably 1 to 8, compounds of the formula ZK, in particular compounds of the formulae ZK1, ZK2 and/or ZK6. The proportion of these compounds in the mixture as a whole is preferably 3 to 25%, particularly preferably 5 to 45%. The content of these individual compounds is preferably in each case 2 to 20%.

t) LC medium in which the proportion of compounds of the formulae CY, PY and ZK in the mixture as a whole is greater than 70%, preferably greater than 80%.

u) LC medium in which the LC host mixture contains one or more compounds containing an alkenyl group, preferably selected from the group consisting of formula CY, PY and LY, wherein one or both of $R^1$ and $R^2$ denote straight-chain alkenyl having 2-6 C atoms, formula ZK and DK, wherein one or both of $R^3$ and $R^4$ or one or both of $R^5$ and $R^6$ denote straight-chain alkenyl having 2-6 C atoms, and formula B2 and B3, very preferably selected from formulae CY15, CY16, CY24, CY32, PY15, PY16, ZK3, ZK4, DK3, DK6, B2 and B3, most preferably selected from formulae ZK3, ZK4, B2 and B3. The concentration of these compounds in the LC host mixture is preferably from 2 to 70%, very preferably from 3 to 55%.

v) LC medium which contains one or more, preferably 1 to 5, compounds selected of formula PY1-PY8, very preferably of formula PY2. The proportion of these compounds in the mixture as a whole is preferably 1 to 30%, particularly preferably 2 to 20%. The content of these individual compounds is preferably in each case 1 to 20%.

w) LC medium which contains one or more, preferably 1, 2 or 3, compounds of formula T1 and/or T2. The content of these compounds in the mixture as a whole is preferably 1 to 20%.

Preferred LC media having positive dielectric anisotropy are selected from the preferred embodiments below, including any combinations thereof.

aa) The LC medium additionally comprises one or more compounds selected from the group consisting of compounds of formula AA and BB

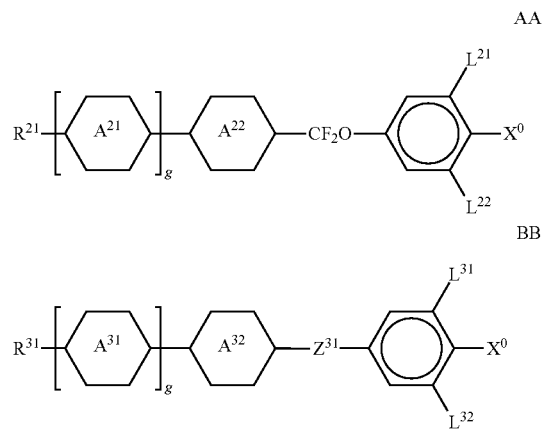

in which the individual radicals have the following meanings:

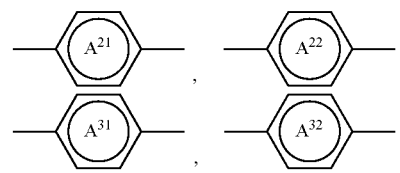

are each, independently of one another, and on each occurrence, identically or differently

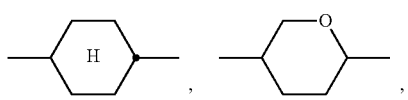

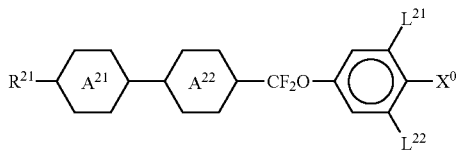

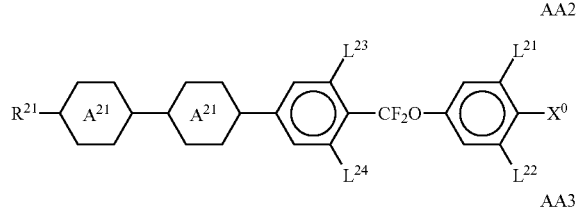

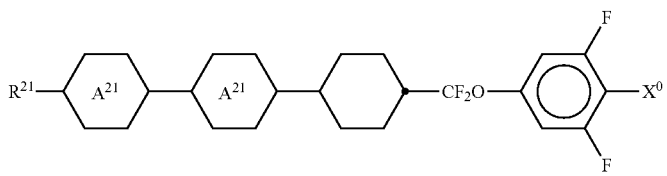

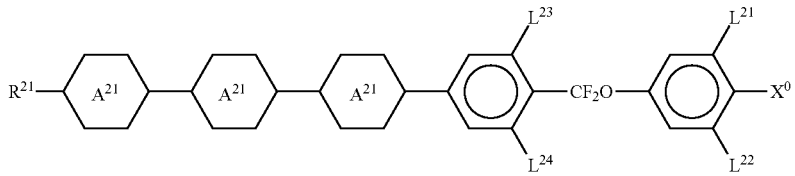

-continued

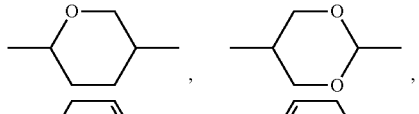

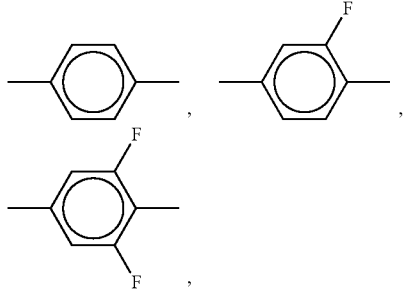

$R^{21}$, $R^{31}$ are each, independently of one another, alkyl, alkoxy, oxaalkyl or alkoxyalkyl having 1 to 9 C atoms or alkenyl or alkenyloxy having 2 to 9 C atoms, all of which are optionally fluorinated, $X^0$ is F, Cl, halogenated alkyl or alkoxy having 1 to 6 C atoms or halogenated alkenyl or alkenyloxy having 2 to 6 C atoms, $Z^{31}$ is —CH$_2$CH$_2$—, —CF$_2$CF$_2$—, —COO—, trans-CH=CH—, trans-CF=CF—, —CH$_2$O— or a single bond, preferably —CH$_2$CH$_2$—, —COO—, trans-CH=CH— or a single bond, particularly preferably —COO—, trans-CH=CH— or a single bond, $L^{21}$, $L^{22}$, $L^{31}$, $L^{32}$ is H or F, g is 0, 1, 2 or 3.

$X^0$ is preferably F, Cl, CF$_3$, CHF$_2$, OCF$_3$, OCHF$_2$, OCFHCF$_3$, OCFHCHF$_2$, OCFHCHF$_2$, OCF$_2$CH$_3$, OCF$_2$CHF$_2$, OCF$_2$CHF$_2$, OCF$_2$CF$_2$CHF$_2$, OCF$_2$CF$_2$CHF$_2$, OCFHCF$_2$CF$_3$, OCFHCF$_2$CHF$_2$, OCF$_2$CF$_2$CF$_3$, OCF$_2$CF$_2$CClF$_2$, OCClFCF$_2$CF$_3$ or CH=CF$_2$, very preferably F or OCF$_3$ The compounds of formula AA are preferably selected from the group consisting of the following formulae:

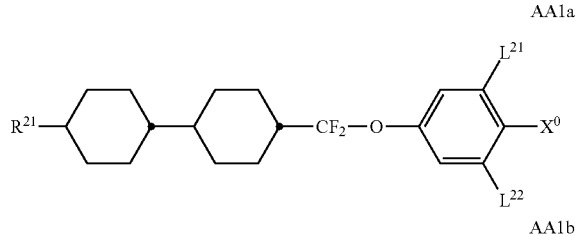

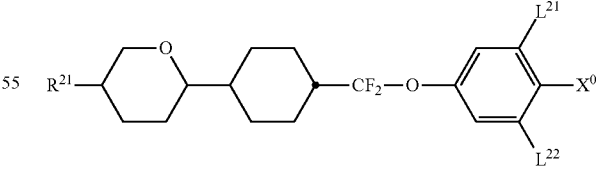

in which $A^{21}$, $R^{21}$, $X^0$, $L^{21}$ and $L^{22}$ have the meanings given in formula AA, $L^{23}$ and $L^{24}$ each, independently of one another, are H or F, and $X^0$ is preferably F. Particularly preferred are compounds of formulae AA1 and AA2.

Particularly preferred compounds of formula AA1 are selected from the group consisting of the following subformulae:

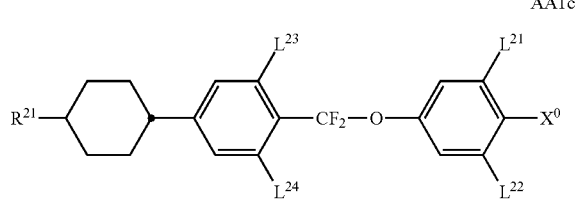

-continued

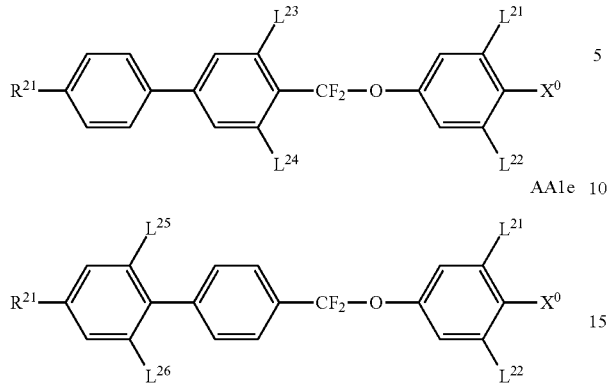

in which $R^{21}$, $X^0$, $L^{21}$ and $L^{22}$ have the meaning given in formula AA1, $L^{23}$, $L^{24}$, $L^{25}$ and $L^{26}$ are each, independently of one another, H or F, and $X^0$ is preferably F.

Very particularly preferred compounds of formula AA1 are selected from the group consisting of the following subformulae:

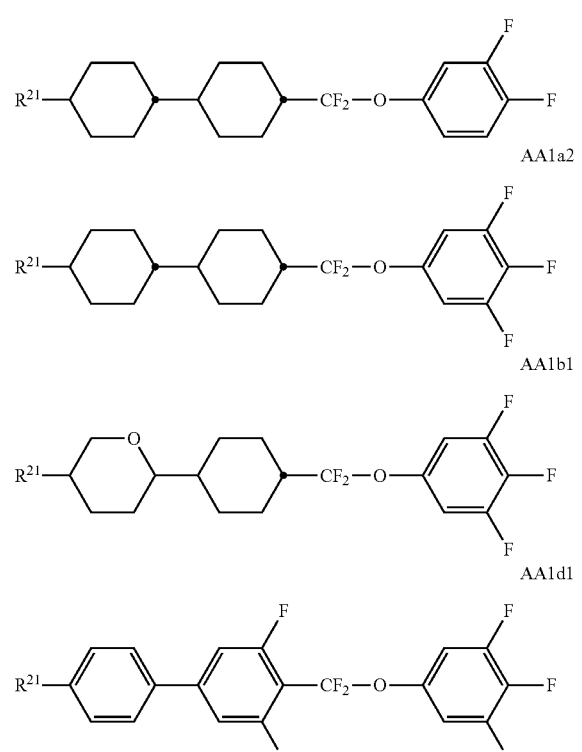

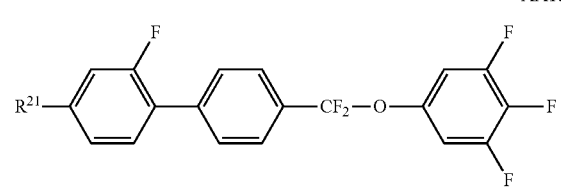

In which $R^{21}$ is as defined in formula AA1.

Very preferred compounds of formula AA2 are selected from the group consisting of the following subformulae:

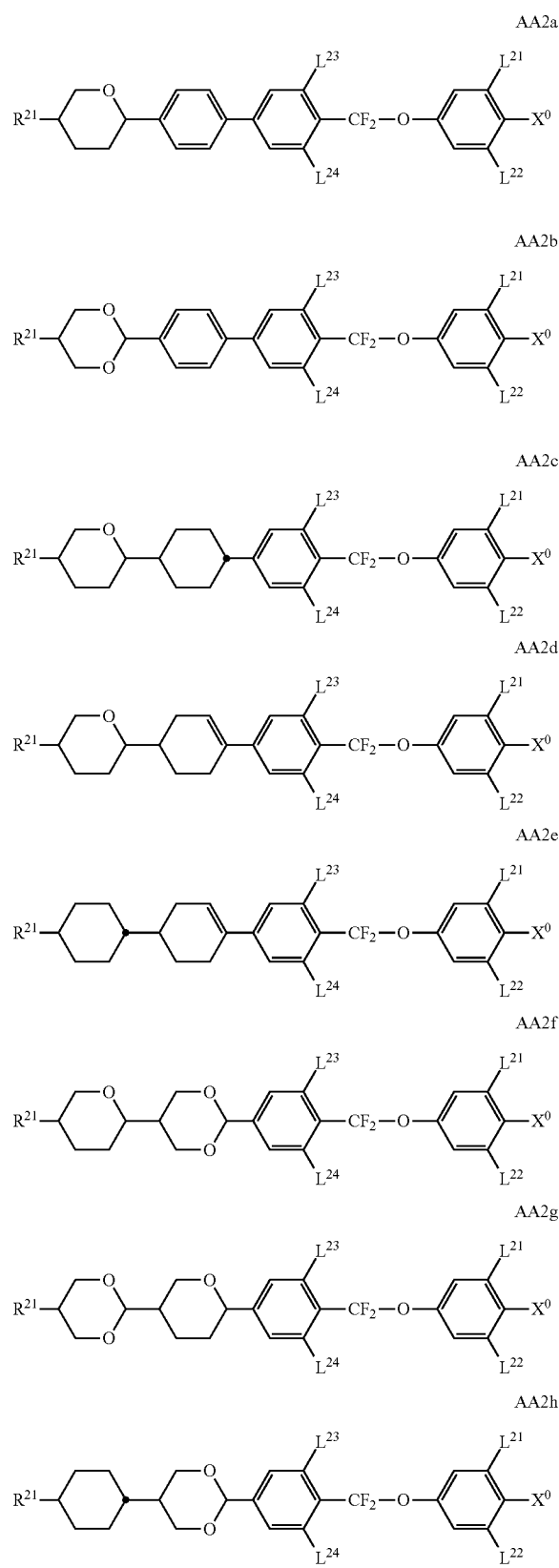

AA2i

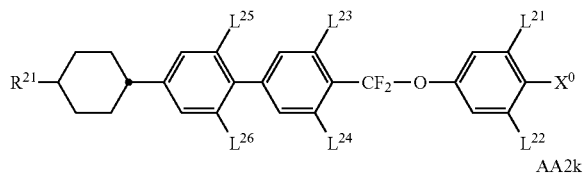

AA2k

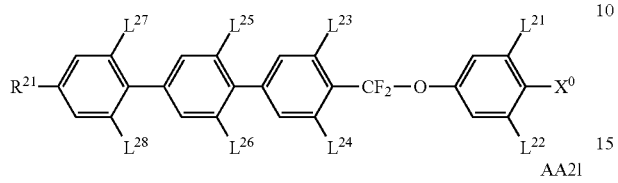

AA2l

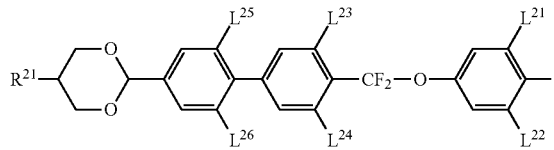

in which $R^{21}$, $X^0$, $L^{21}$ and $L^{22}$ have the meaning given in formula AA2, $L^{23}$, $L^{24}$, $L^{25}$ and $L^{26}$ each, independently of one another, are H or F, and $X^0$ is preferably F.

Very particularly preferred compounds of formula AA2 are selected from the group consisting of the following subformulae:

AA2a1

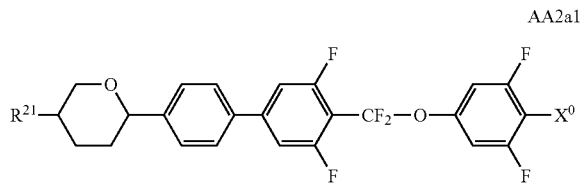

AA2c1

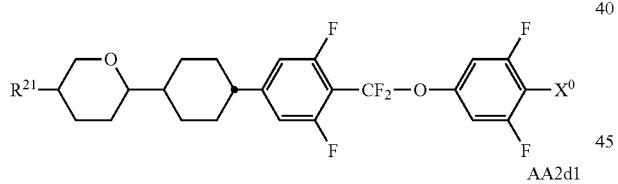

AA2d1

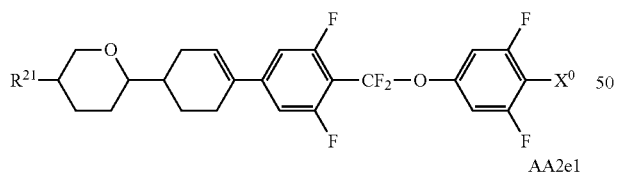

AA2e1

AA2f1

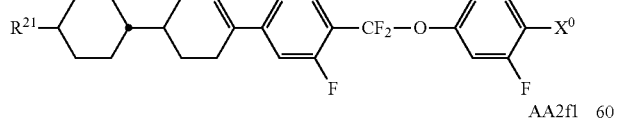

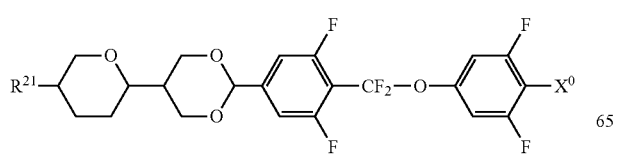

AA2h1

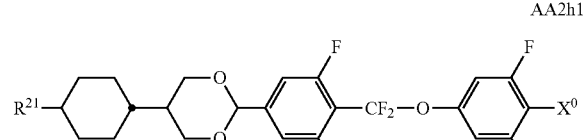

AA2i1

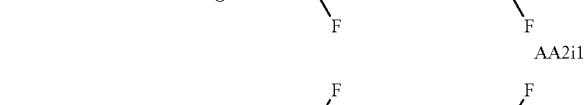

AA2i2

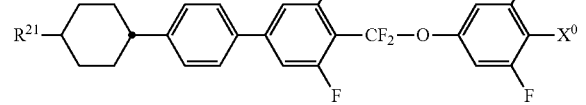

AA2k1

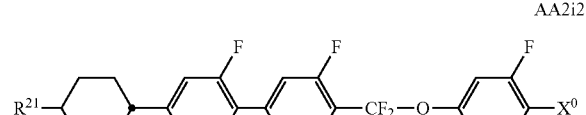

AA2k2

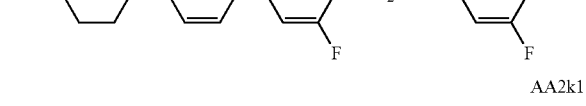

AA2l1

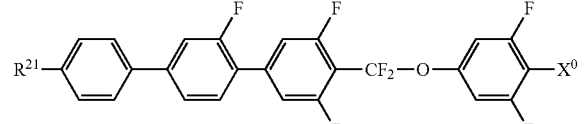

in which $R^{21}$ and $X^0$ are as defined in formula AA2.

Particularly preferred compounds of formula AA3 are selected from the group consisting of the following subformulae:

AA3a

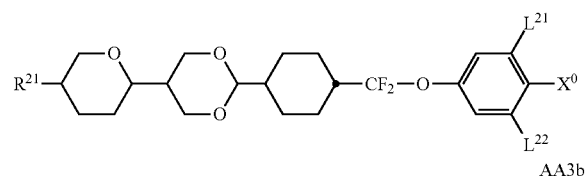

AA3b

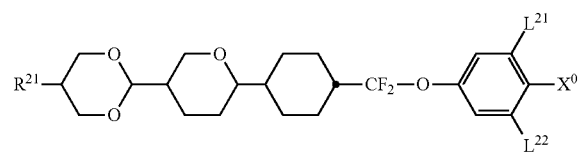

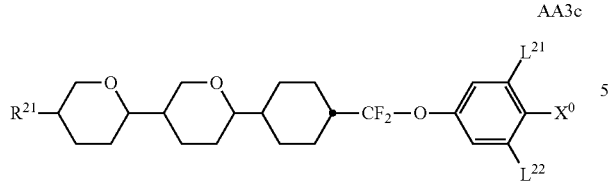

AA3c in which $R^{21}$, $X^0$, $L^{21}$ and $L^{22}$ have the meaning given in formula AA3, and $X^0$ is preferably F.

Particularly preferred compounds of formula AA4 are selected from the group consisting of the following subformulae:

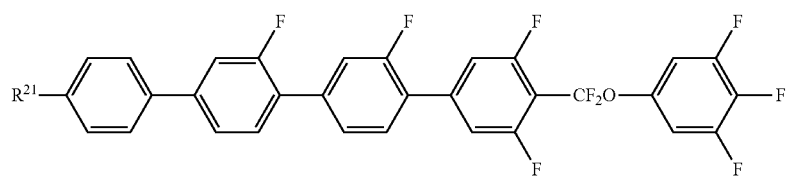

AA4a in which $R^{21}$ is as defined in formula AA4.

The compounds of formula BB are preferably selected from the group consisting of the following formulae:

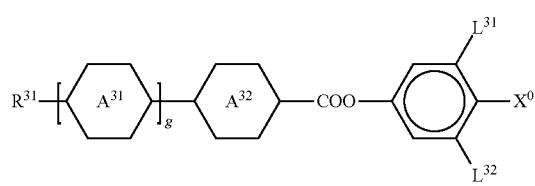

BB1

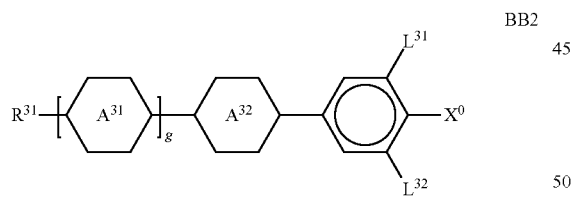

BB2

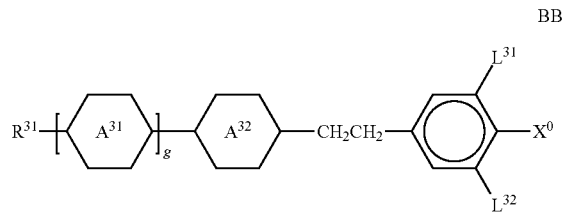

BB3 in which g, $A^{31}$, $A^{32}$, $R^{31}$, $X^0$, $L^{31}$ and $L^{32}$ have the meanings given in formula BB, and $X^0$ is preferably F. Particularly preferred are compounds of formulae BB1 and BB2.

Particularly preferred compounds of formula BB1 are selected from the group consisting of the following subformulae:

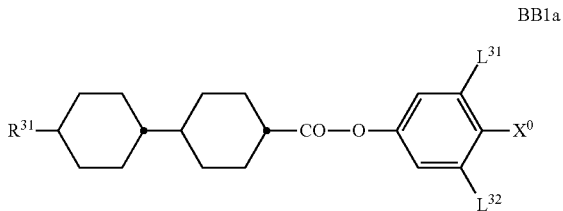

BB1a

-continued

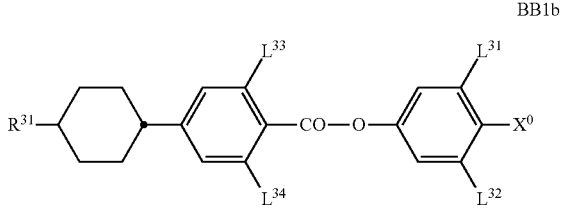

BB1b in which $R^{31}$, $X^0$, $L^{31}$ and $L^{32}$ have the meaning given in formula BB1, and $X^0$ is preferably F.

Very particularly preferred compounds of formula BB1a are selected from the group consisting of the following subformulae:

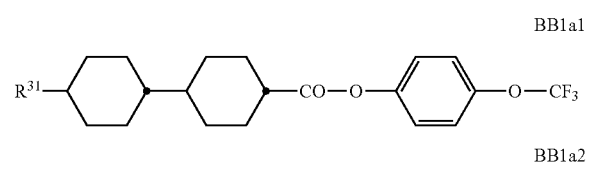

BB1a1

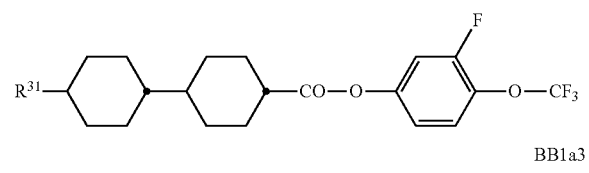

BB1a2

BB1a3

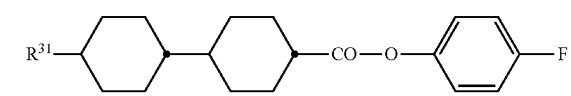

BB1a4

BB1a5

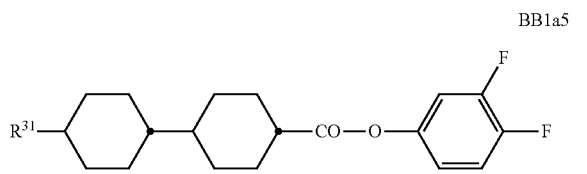

BB1a6

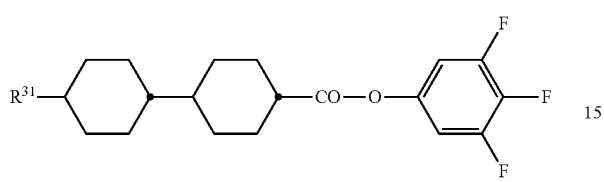

in which R³¹ is as defined in formula BB1.

Very particularly preferred compounds of formula BB1 b are selected from the group consisting of the following subformulae:

BB1b1

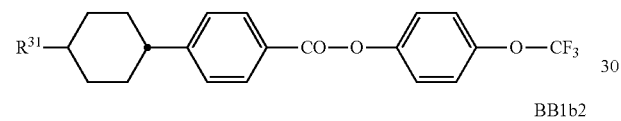

BB1b2

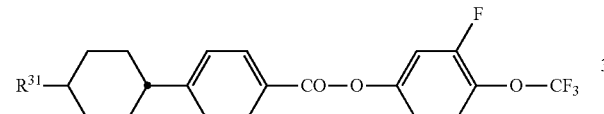

BB1b3

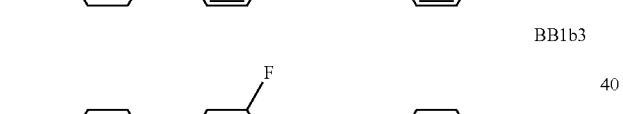

BB1b4

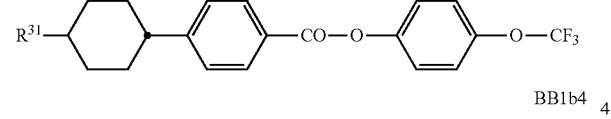

in which R³¹ is as defined in formula BB1.

Particularly preferred compounds of formula BB2 are selected from the group consisting of the following subformulae:

BB2a

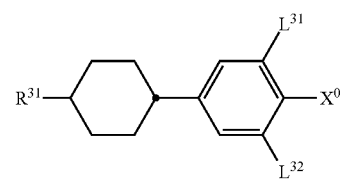

BB2b

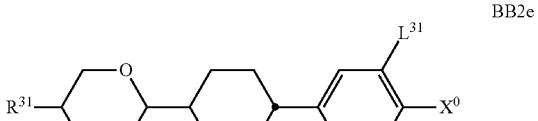

BB2c

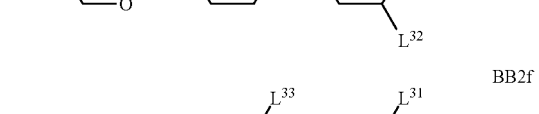

BB2d

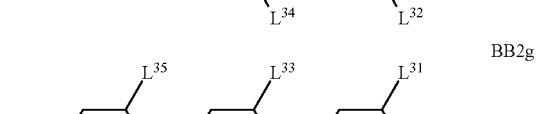

BB2e

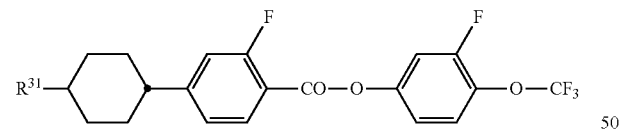

BB2f

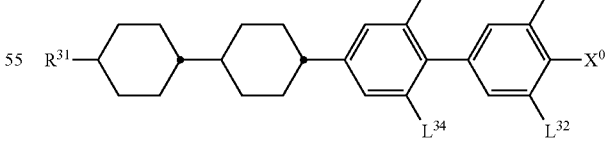

BB2g

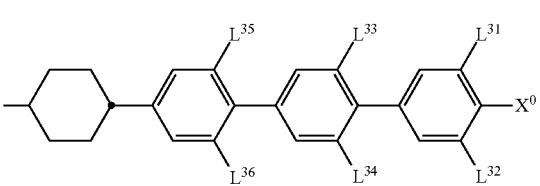

BB2h

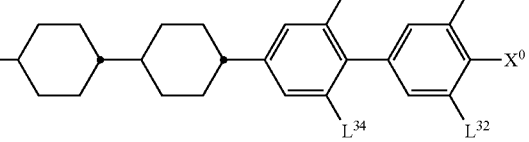

BB2i

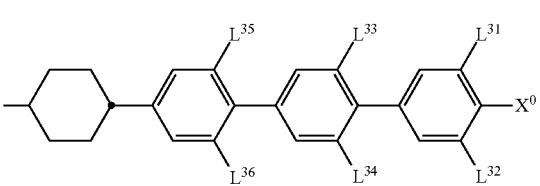

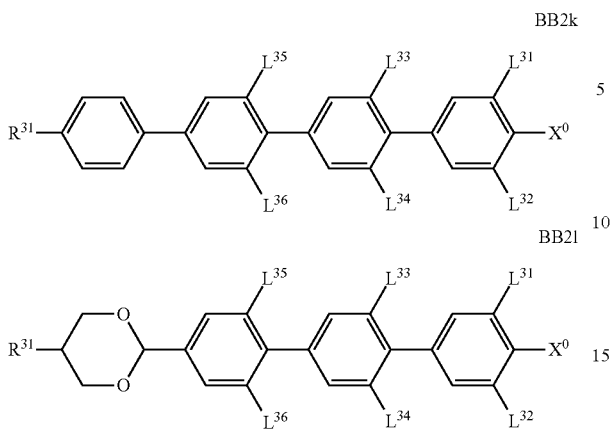

in which $R^{31}$, $X^0$, $L^{31}$ and $L^{32}$ have the meaning given in formula BB2, $L^{33}$, $L^{34}$, $L^{35}$ and $L^{36}$ are each, independently of one another, H or F, and $X^0$ is preferably F.

Very particularly preferred compounds of formula BB2 are selected from the group consisting of the following subformulae:

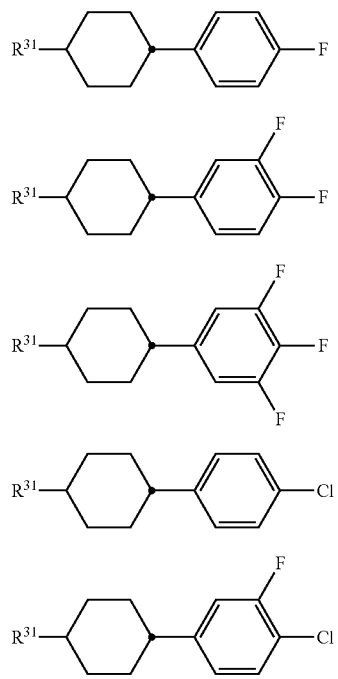

in which $R^{31}$ is as defined in formula BB2.

Very particularly preferred compounds of formula BB2b are selected from the group consisting of the following subformulae

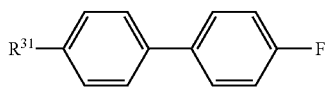

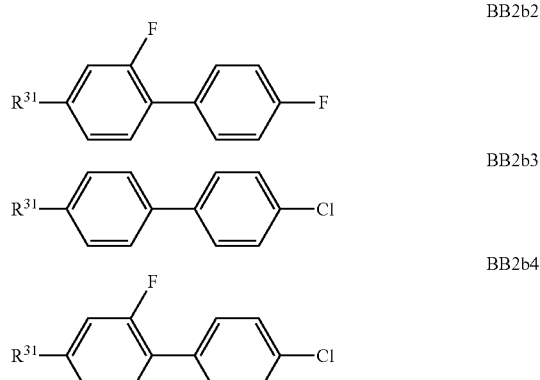

in which $R^{31}$ is as defined in formula BB2.

Very particularly preferred compounds of formula BB2c are selected from the group consisting of the following subformulae:

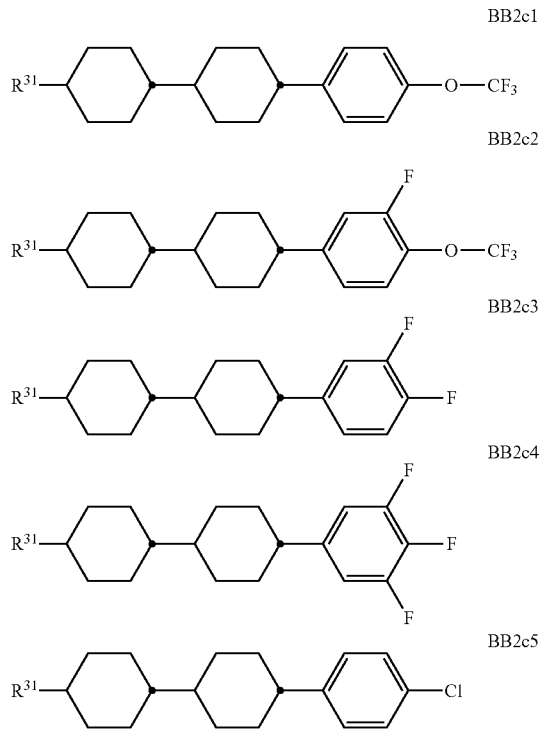

in which $R^{31}$ is as defined in formula BB2.

Very particularly preferred compounds of formula BB2d and BB2e are selected from the group consisting of the following subformulae:

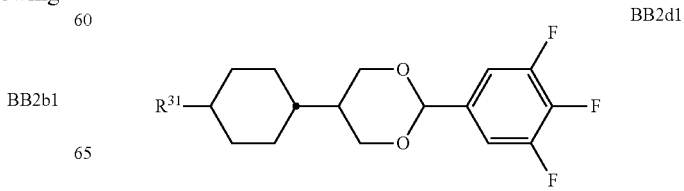

BB2e1

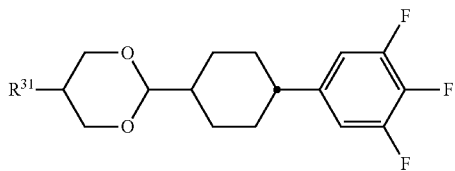

in which R³¹ is as defined in formula BB2.

Very particularly preferred compounds of formula BB2f are selected from the group consisting of the following subformulae:

BB2f1

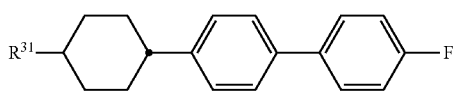

BB2f2

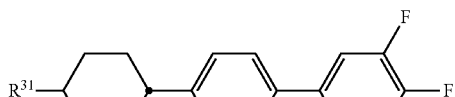

BB2f3

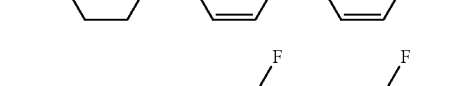

BB2f4

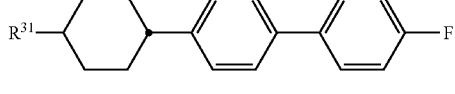

BB2f5

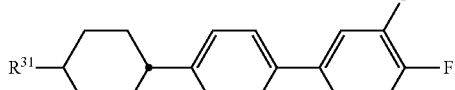

in which R³¹ is as defined in formula BB2.

Very particularly preferred compounds of formula BB2g are selected from the group consisting of the following subformulae:

BB2g1

BB2g2

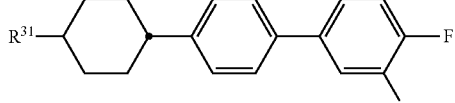

BB2g3

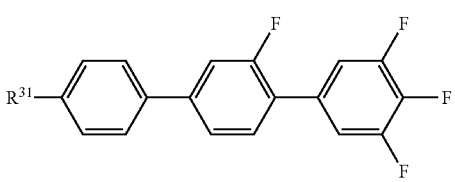

BB2g4

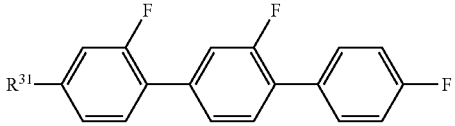

BB2g5

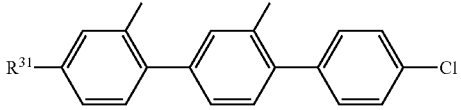

in which R³¹ is as defined in formula BB2.

Very particularly preferred compounds of formula BB2h are selected from the group consisting of the following subformulae:

BB2h1

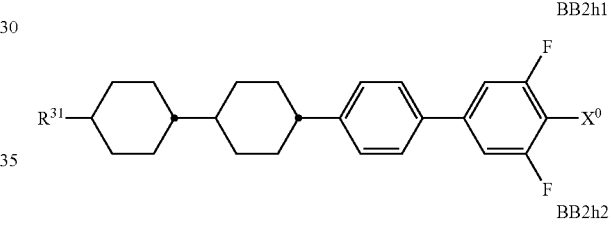

BB2h2

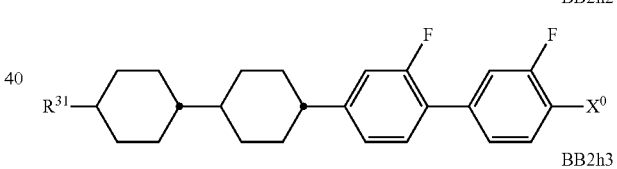

BB2h3

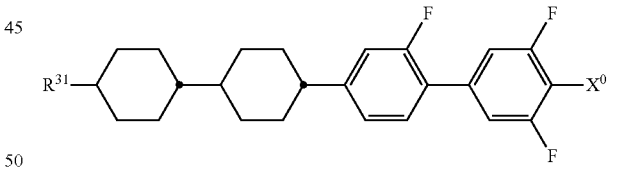

in which R³¹ and X⁰ are as defined in formula BB2.

Very particularly preferred compounds of formula BB2i are selected from the group consisting of the following subformulae:

BB2i1

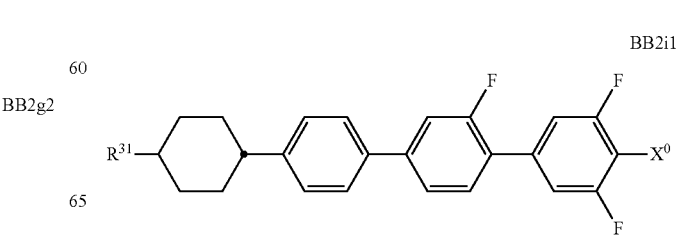

BB2i2

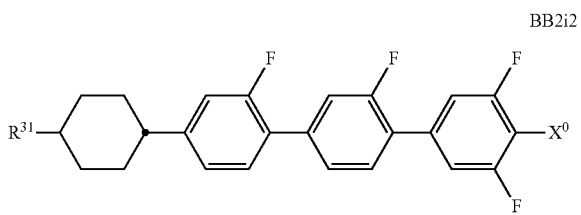

in which R³¹ and X⁰ are as defined in formula BB2.

Very particularly preferred compounds of formula BB2k are selected from the group consisting of the following subformulae:

BB2k1

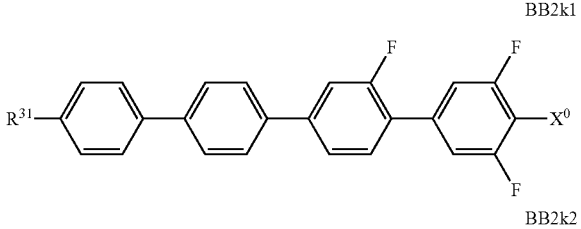

BB2k2

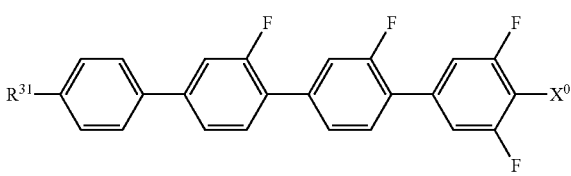

in which R³¹ and X⁰ are as defined in formula BB2.

Very particularly preferred compounds of formula BB2l are selected from the group consisting of the following subformulae:

BB2l1

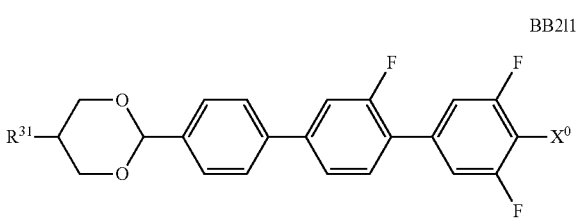

BB2l2

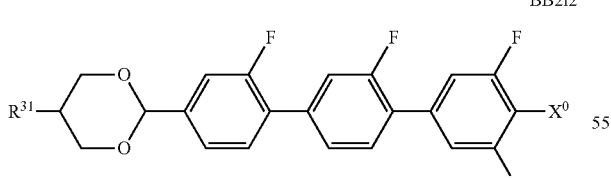

in which R³¹ and X⁰ are as defined in formula BB2.

Alternatively to, or in addition to, the compounds of formula BB1 and/or BB2 the LC media may also comprise one or more compounds of formula BB3 as defined above.

Particularly preferred compounds of formula BB3 are selected from the group consisting of the following subformulae:

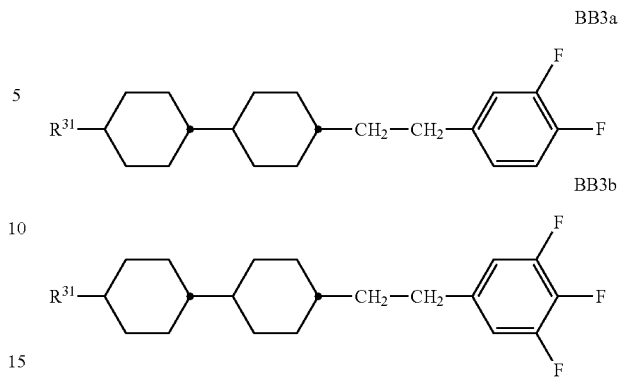

in which R³¹ is as defined in formula BB3.

bb) The LC medium additionally comprises one or more compounds selected from formula CC

CC

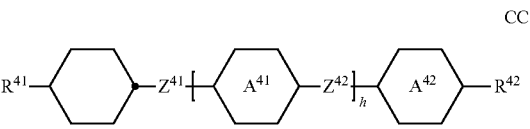

in which the individual radicals have the following meanings:

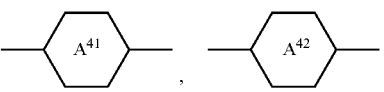

are each, independently of one another, and on each occurrence, identically or differently

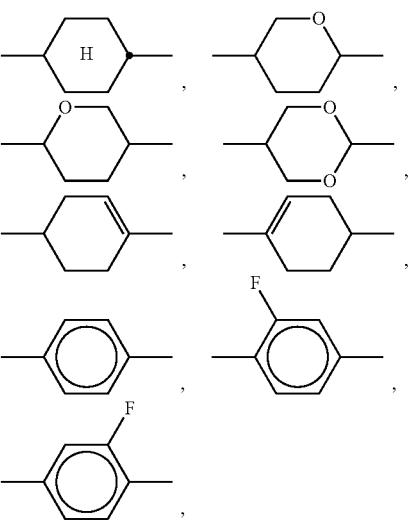

R⁴¹, R⁴² are each, independently of one another, alkyl, alkoxy, oxaalkyl or alkoxyalkyl having 1 to 9 C atoms or alkenyl or alkenyloxy having 2 to 9 C atoms, all of which are optionally fluorinated, Z⁴¹, Z⁴² are, each independently of one another, —CH₂CH₂—, —COO—, trans-CH=CH—, trans- CF=CF—, —CH₂O—, —CF₂O—, —C≡C— or a single bond, preferably a single bond,
h is 0, 1, 2 or 3.

Particularly preferred compounds of formula CC are selected from the group consisting of the following subformulae:

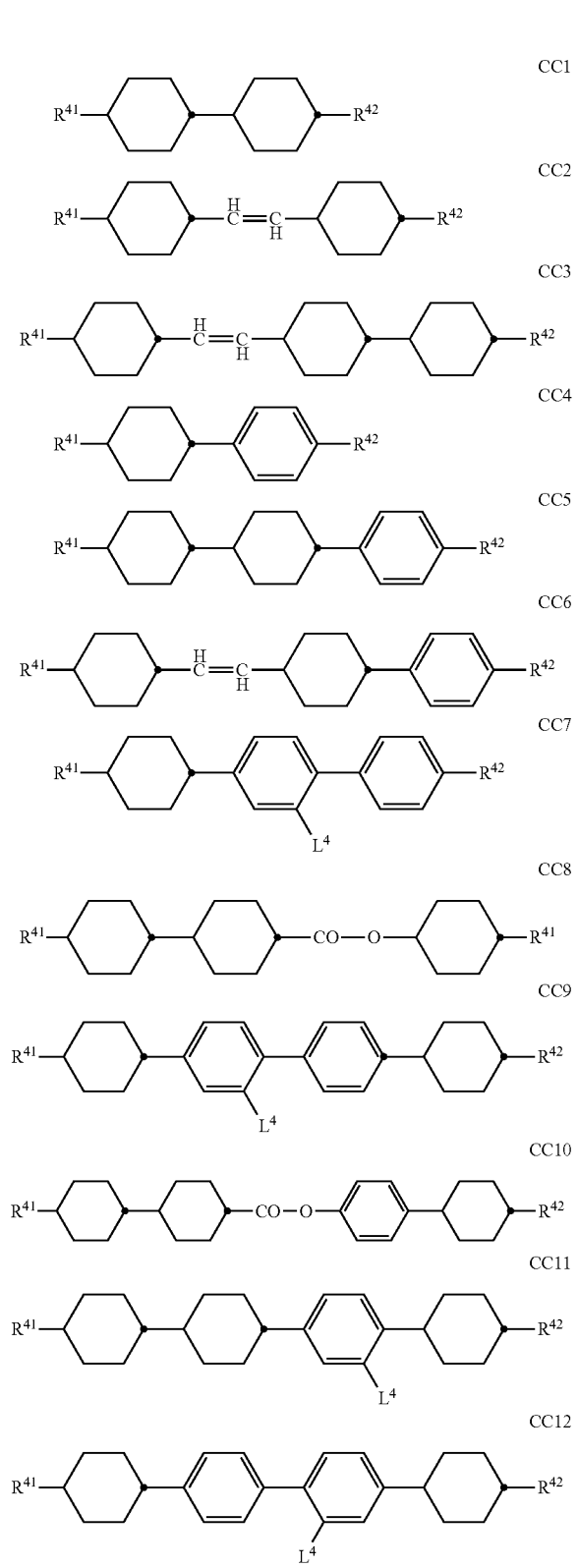

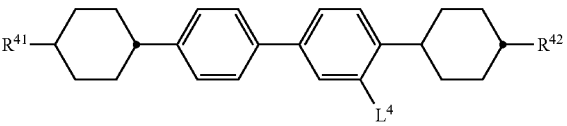

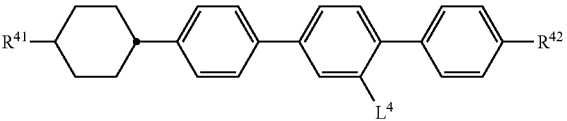

In which $R^{41}$ and $R^{42}$ have the meanings given in formula CC, and preferably denote each, independently of one another, alkyl, alkoxy, fluorinated alkyl or fluorinated alkoxy with 1 to 7 C atoms, or alkenyl, alkenyloxy, alkoxyalkyl or fluorinated alkenyl with 2 to 7 C atoms, and $L^4$ is H or F.

cc) The LC medium additionally comprises one or more compounds selected from formula DD

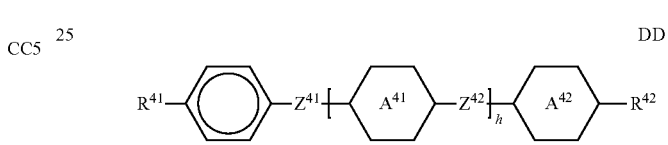

In which $A^{41}$, $A^{42}$, $Z^{41}$, $Z^{42}$, $R^{41}$, $R^{42}$ and h have the meanings given in formula CC.

Particularly preferred compounds of formula DD are selected from the group consisting of the following subformulae:

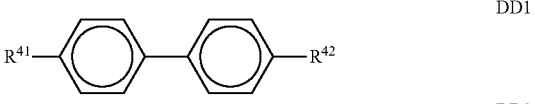

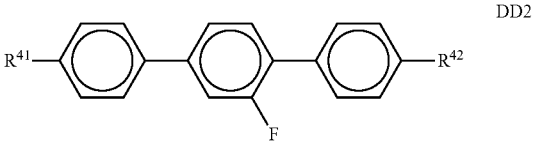

in which $R^{41}$ and $R^{42}$ have the meanings given in formula DD and $R^{41}$ preferably denotes alkyl, and in formula DD1 $R^{42}$ preferably denotes alkenyl, particularly preferably —(CH₂)₂—CH=CH—CH₃, and in formula DD2 $R^{42}$ preferably denotes alkyl, —(CH₂)₂—CH=CH₂ or —(CH₂)₂—CH=CH—CH₃.

dd) The proportion of the compounds of formula AA and BB in the LC medium is from 2 to 60% by weight, more preferably from 3 to 35% by weight, and very particularly preferably from 4 to 30% by weight in the mixture as a whole.

ee) The proportion of the compounds of formula CC and DD in the LC medium is from 2 to 70% by weight, more preferably from 5 to 65% by weight, even more preferably from 10 to 60% by weight, and very particularly preferably from 10%, preferably 15%, to 55% by weight in the mixture as a whole.

ff) The LC medium additionally comprises one or more compounds selected from formula AN as defined above or its preferred subformulae, preferably selected from formulae AN1-AN12, more preferably selected from formulae AN1a, AN3a and AN6a, most preferably selected from formulae AN1a2, AN1a5, AN6a1 and AN6a2. Preferably the LC medium contains 1 to 5, preferably 1, 2 or 3 compounds selected from these formulae. The proportion of these compounds in the LC medium is preferably from 2 to 60% by weight, very preferably from 5 to 45% by weight, most preferably from 10 to 40% by weight.

gg) The LC medium comprises 1, 2 or 3, preferably 1, compounds selected from formulae CY, PY, LY and Y or their subformulae. The proportion of these compounds in the LC medium is preferably 1 to 20%, particularly preferably 2 to 15%. The content of these individual compounds is preferably in each case 1 to 20%.

hh) The LC medium comprises 1 to 5, preferably 1, 2 or 3, polymerisable compounds, preferably selected from polymerisable compounds of formula M or sub-formulae thereof. The proportion of the polymerisable compounds, in particular of the formula M or sub-formulae thereof, in the LC medium is 0.05 to 5%, preferably 0.1 to 1%.

In some preferred embodiments of the present invention the LC medium additionally comprises one or more polymerisable compounds. The polymerisable compounds are preferably selected from formula M

$$R^a\text{—}B^1\text{—}(Z^b\text{—}B^2)_m\text{—}R^b \qquad M$$

in which the individual radicals, on each occurrence identically or differently, and each, independently of one another, have the following meaning:

$R^a$ and $R^b$ are, independently, P, P-Sp-, H, F, Cl, Br, I, —CN, —NO$_2$, —NCO, —NCS, —OCN, —SCN, SF$_5$ or straight-chain or branched alkyl having 1 to 25 C atoms, in which, in addition, one or more non-adjacent CH$_2$ groups may each be replaced, independently of one another, by —C(R$^0$)=C(R$^{00}$)—, —C≡C—, —N(R$^{00}$)—, —O—, —S—, —CO—, —CO—O—, —O—CO—, —O—CO—O— in such a way that 0 and/or S atoms are not linked directly to one another, and in which, in addition, one or more H atoms may be replaced by F, Cl, Br, I, CN, P or P-Sp-, where, if $B^1$ and/or $B^2$ contain a saturated C atom, $R^a$ and/or $R^b$ may also denote a radical which is spiro-linked to this saturated C atom, wherein at least one of the radicals $R^a$ and $R^b$ denotes or contains a group P or P-Sp-, P is a polymerisable group, Sp is a spacer group or a single bond, $B^1$ and $B^2$ are, independently, an aromatic, heteroaromatic, alicyclic or heterocyclic group, preferably having 4 to 25 ring atoms, which may also contain fused rings, and which is unsubstituted, or mono- or polysubstituted by L, $Z^b$ is —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, CR$^0$R$^{00}$ or a single bond, $R^0$ and $R^{00}$ each, independently of one another, denote H or alkyl having 1 to 12 C atoms, m denotes 0, 1, 2, 3 or 4, n1 denotes 1, 2, 3 or 4, L is P, P-Sp-, OH, CH$_2$OH, F, Cl, Br, I, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, Cl, P or P-Sp-, P and Sp have the meanings indicated above, $Y^1$ denotes halogen, $R^x$ denotes P, P-Sp-, H, halogen, straight-chain, branched or cyclic alkyl having 1 to 25 C atoms, in which, in addition, one or more non-adjacent CH$_2$ groups may be replaced by —O—, —S—, —CO—, —CO—O—, —O—CO—, —O—CO—O— in such a way that O and/or S atoms are not linked directly to one another, and in which, in addition, one or more H atoms may be replaced by F, Cl, P or P-Sp-, an optionally substituted aryl or aryloxy group having 6 to 40 C atoms, or an optionally substituted heteroaryl or heteroaryloxy group having 2 to 40 C atoms.

Particularly preferred compounds of the formula I are those in which $B^1$ and $B^2$ each, independently of one another, denote 1,4-phenylene, 1,3-phenylene, naphthalene-1,4-diyl, naphthalene-2,6-diyl, phenanthrene-2,7-diyl, 9,10-dihydrophenanthrene-2,7-diyl, anthracene-2,7-diyl, fluorene-2,7-diyl, coumarine, flavone, where, in addition, one or more CH groups in these groups may be replaced by N, cyclohexane-1,4-diyl, in which, in addition, one or more non-adjacent CH$_2$ groups may be replaced by O and/or S, 1,4-cyclohexenylene, bicycle[1.1.1]-pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, where all these groups may be unsubstituted or mono- or polysubstituted by L as defined above.

Particularly preferred compounds of the formula M are those in which $B^1$ and $B^2$ each, independently of one another, denote 1,4-phenylene, 1,3-phenylene, naphthalene-1,4-diyl or naphthalene-2,6-diyl, Very preferred compounds of formula M are selected from the following formulae:

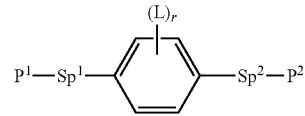

M1

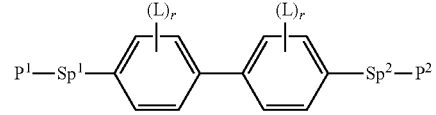

M2

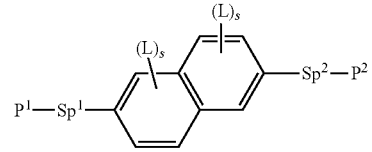

M3

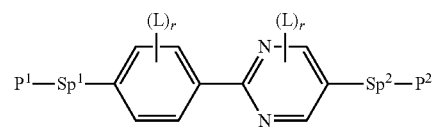

M4

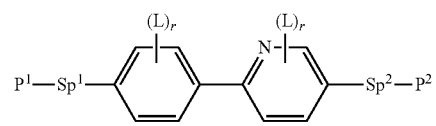

M5

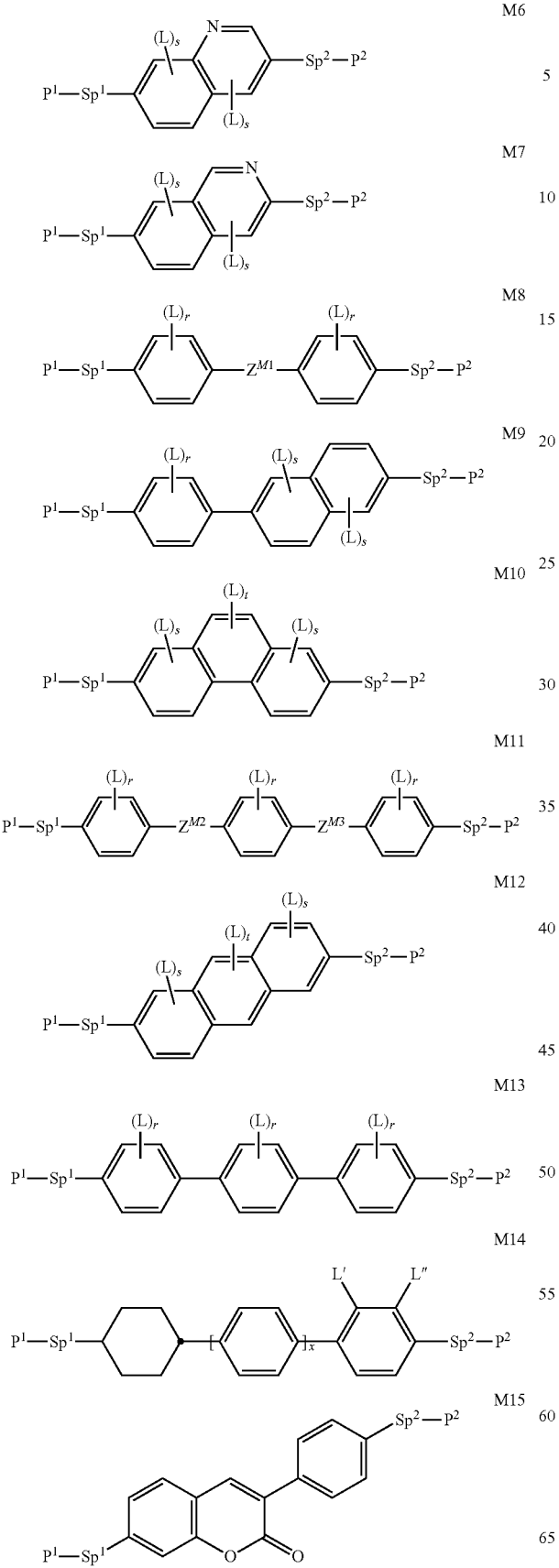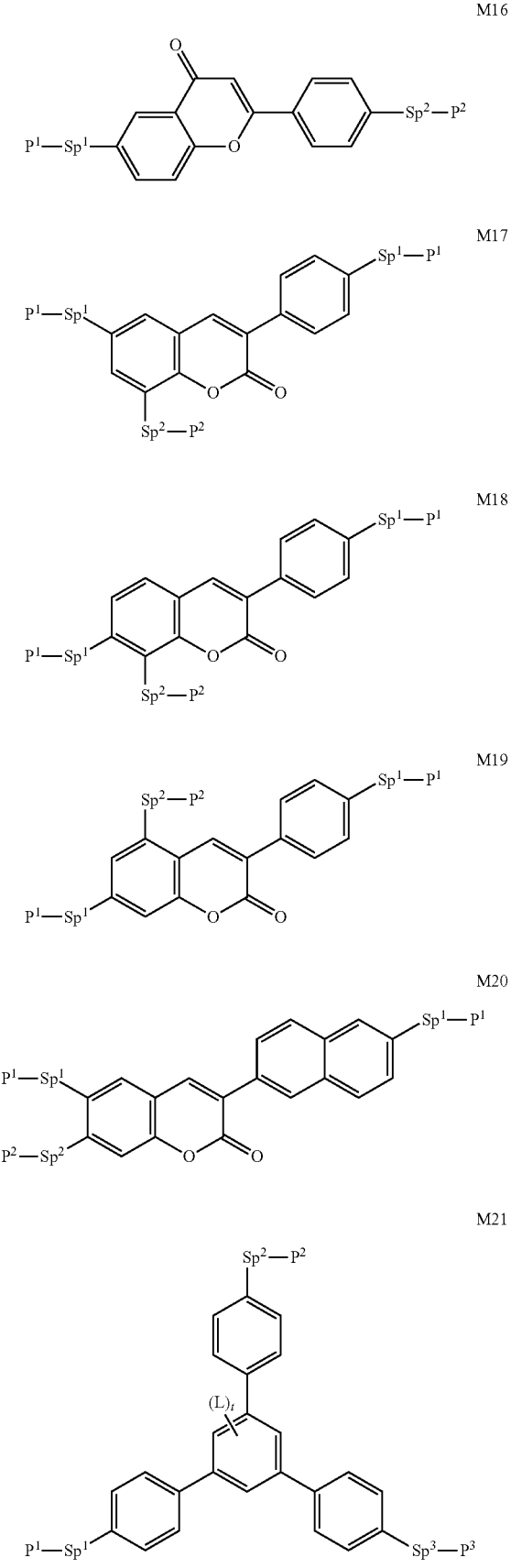

-continued

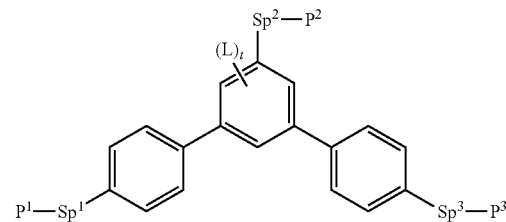
M22

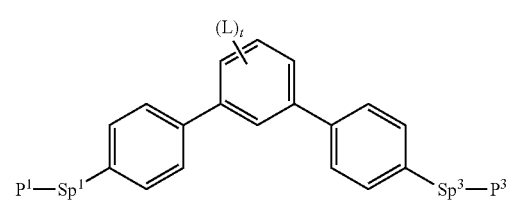
M23

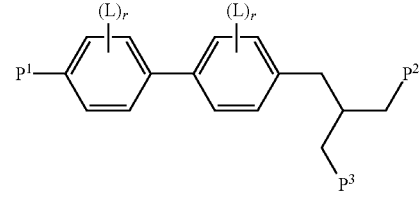
M24

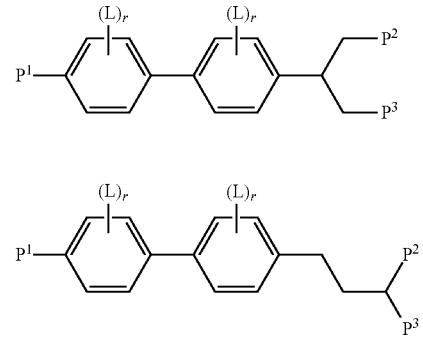
M25

M26

M27

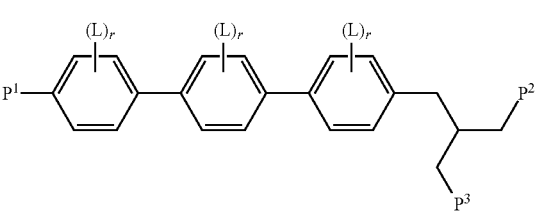

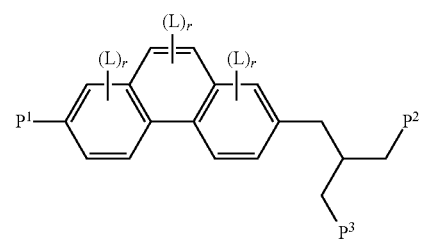
M28

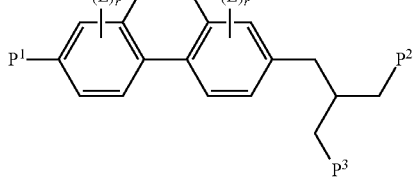
M29

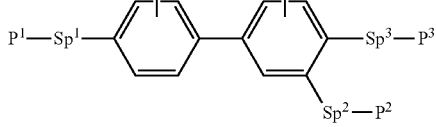
M30

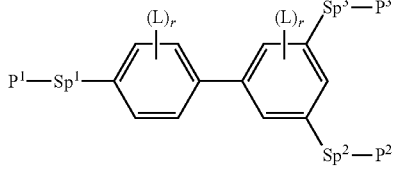
M31 in which the individual radicals, on each occurrence identically or differently, and each, independently of one another, have the following meaning:

$P^1$, $P^2$, $P^3$ are each, independently, a polymerisable group, preferably selected from vinyloxy, acrylate, methacrylate, fluoroacrylate, chloroacrylate, oxetane and epoxy, $Sp^1$, $Sp^2$, $Sp^3$ are each, independently, a single bond or a spacer group where, in addition, one or more of the radicals $P^1$-$Sp^1$-, $P^1$-$Sp^2$- and $P^3$-$Sp^3$- may denote $R^{aa}$, with the proviso that at least one of the radicals $P^1$-$Sp^1$-, $P^2$-$Sp^2$- and $P^3$-$Sp^3$- present is different from $R^{aa}$, preferably —$(CH_2)_{p1}$—, —$(CH_2)_{p1}$—O—, —$(CH_2)_{p1}$—CO—O— or —$(CH_2)_{p1}$—O—CO—O—, wherein p1 is an integer from 1 to 12, $R^{aa}$ is H, F, Cl, CN or straight-chain or branched alkyl having 1 to 25 C atoms, in which, in addition, one or more non-adjacent $CH_2$ groups may each be replaced, independently of one another, by —C($R^0$)=C($R^{00}$)—, —C≡C—, —N($R^0$)—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or $P^1$-$Sp^1$-, particularly preferably straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms (where the alkenyl and alkynyl radicals have at least two C atoms and the branched radicals have at least three C atoms), $R^0$, $R^{00}$ are each, independently, H or alkyl having 1 to 12 C atoms, $R^y$ and $R^z$ are each, independently, H, F, $CH_3$ or $CF_3$, $X^1$, $X^2$, $X^3$ are each, independently, —CO—O—, —O—CO— or a single bond, $Z^{M1}$ are each, independently, —O—, —CO—, —C($R^y R^z$)— or —$CF_2CF_2$—, $Z^{M2}$, $Z^{M3}$ are each, independently, —CO—O—, —O—CO—, —$CH_2O$—, —$OCH_2$—, —$CF_2O$—, —$OCF_2$— or —$(CH_2)_n$—, where n is 2, 3 or 4, L is F, Cl, CN or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, L', L" are each, independently, H, F or Cl, r is 0, 1, 2, 3 or 4, s is 0, 1, 2 or 3, t is 0, 1 or 2, and x is 0 or 1.

Especially preferred are compounds of formulae M2 and M13.

Further preferred are tri-reactive compounds M15 to M31, in particular M17, M18, M19, M22, M23, M24, M25, M30 and M31.

In the compounds of formulae M1 to M31 the group

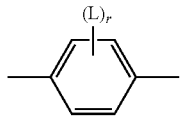

is preferably

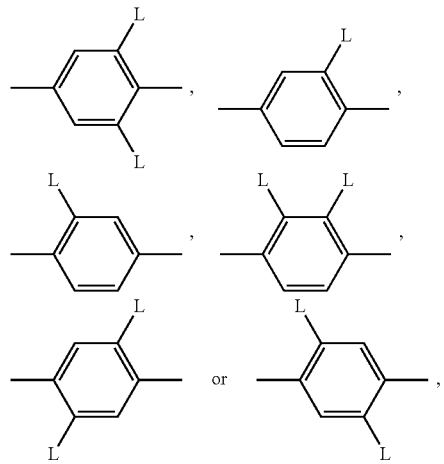

wherein L on each occurrence, identically or differently, has one of the meanings given above or below, and is preferably F, Cl, CN, NO$_2$, CH$_3$, C$_2$H$_5$, C(CH$_3$)$_3$, CH(CH$_3$)$_2$, CH$_2$CH(CH$_3$)C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$, OC$_2$F$_5$ or P-Sp-, very preferably F, Cl, CN, CH$_3$, C$_2$H$_5$, OCH$_3$, COCH$_3$, OCF$_3$ or P-Sp-, more preferably F, Cl, CH$_3$, OCH$_3$, COCH$_3$ oder OCF$_3$, especially F or CH$_3$.

Preferred compounds of formulae M1 to M31 are those wherein P$^1$, P$^2$ and P$^3$ denote an acrylate, methacrylate, oxetane or epoxy group, very preferably an acrylate or methacrylate group.

Further preferred compounds of formulae M1 to M31 are those wherein Sp$^1$, Sp$^2$ and Sp$^3$ are a single bond.

Further preferred compounds of formulae M1 to M31 are those wherein one of Sp$^1$, Sp$^2$ and Sp$^3$ is a single bond and another one of Sp$^1$, Sp$^2$ and Sp$^3$ is different from a single bond.

Further preferred compounds of formulae M1 to M31 are those wherein those groups Sp$^1$, Sp$^2$ and Sp$^3$ that are different from a single bond denote —(CH$_2$)$_{s1}$—X"—, wherein s1 is an integer from 1 to 6, preferably 2, 3, 4 or 5, and X" is X" is the linkage to the benzene ring and is —O—, —O—CO—, —CO—O—, —O—CO—O— or a single bond.

Further preferred polymerisable compounds of formulae M1 to M31 are those selected from Table D below.

Particular preference is given to LC media comprising one, two or three polymerisable compounds of formula M, preferably selected from formulae M1 to M31.

Preferably the proportion of polymerisable compounds of formula M in the LC medium is from 0.01 to 5%, very preferably from 0.05 to 1%, most preferably from 0.1 to 0.5%.

It was observed that the addition of one or more polymerisable compounds of formula M to the LC medium leads to advantageous properties like fast response times. Such an LC medium is especially suitable for use in PSA displays where it shows low image sticking, a quick and complete polymerisation, the quick generation of a low pretilt angle which is stable after UV exposure, a high reliability, high VHR value after UV exposure, and a high birefringence. By appropriate selection of the polymerisable compounds it is possible to increase the absorption of the LC medium at longer UV wavelengths, so that it is possible to use such longer UV wavelengths for polymerisation, which is advantageous for the display manufacturing process.

The polymerisable group P is a group which is suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C=C double bond or —C≡C— triple bond, and groups which are suitable for polymerisation with ring opening, such as, for example, oxetane or epoxide groups.

Preferred groups P are selected from the group consisting of CH$_2$=CW$^1$—CO—O—, CH$_2$=CW$^1$—CO—,

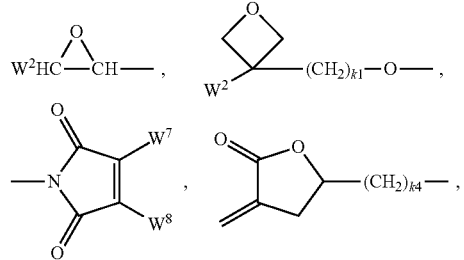

CH$_2$=CW$^2$—(O)$_{k3}$—, CW$^1$=CH—CO—(O)$_{k3}$—, CW$^1$=CH—CO—NH—, CH$_2$=CW$^1$—CO—NH—, CH$_3$—CH=CH—O—, (CH$_2$=CH)$_2$CH—OCO—, (CH$_2$=CH—CH$_2$)$_2$CH—OCO—, (CH$_2$=CH)$_2$CH—O—, (CH$_2$=CH—CH$_2$)$_2$N—, (CH$_2$=CH—CH$_2$)$_2$N—CO—, HO—CW$^2$W$^3$—, HS—CW$^2$W$^3$—, HW$^2$N—, HO—CW$^2$W$^3$—NH—, CH$_2$=CW$^1$—CO—NH—, CH$_2$=CH—(COO)$_{k1}$-Phe-(O)$_{k2}$—, CH$_2$=CH—(CO)$_{k1}$-Phe-(O)$_{k2}$—, Phe-CH=CH—, HOOC—, OCN— and W$^4$W$^5$W$^6$Si—, in which W$^1$ denotes H, F, Cl, CN, CF$_3$, phenyl or alkyl having 1 to 5 C atoms, in particular H, F, Cl or CH$_3$, W$^2$ and W$^3$ each, independently of one another, denote H or alkyl having 1 to 5 C atoms, in particular H, methyl, ethyl or n-propyl, W$^4$, W$^5$ and W$^6$ each, independently of one another, denote Cl, oxaalkyl or oxacarbonylalkyl having 1 to 5 C atoms, W$^7$ and W$^8$ each, independently of one another, denote H, Cl or alkyl having 1 to 5 C atoms, Phe denotes 1,4-phenylene, which is optionally substituted by one or more radicals L as defined above which are other than P-Sp-, k$_1$, k$_2$ and k$_3$ each, independently of one another, denote 0 or 1, k$_3$ preferably denotes 1, and k$_4$ denotes an integer from 1 to 10.

Very preferred groups P are selected from the group consisting of CH$_2$=CW$^1$—CO—O—, CH$_2$=CW$^1$—CO—

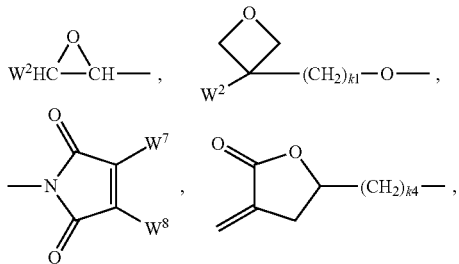

CH$_2$=CW$^2$—O—, CH$_2$=CW$^2$—, CW$^1$=CH—CO—(O)$_{k3}$—, CW$^1$=CH—CO—NH—, CH$_2$=CW$^1$—CO—NH—, (CH$_2$=CH)$_2$CH—OCO—, (CH$_2$=CH—CH$_2$)$_2$CH—OCO—, (CH$_2$=CH)$_2$CH—O—, (CH$_2$=CH—CH$_2$)$_2$N—, (CH$_2$=CH—CH$_2$)$_2$N—CO—, CH$_2$=CW$^1$—CO—NH—, CH$_2$=CH—(COO)$_{k1}$-Phe-(O)$_{k2}$—, CH$_2$=CH—(CO)$_{k1}$-Phe-(O)$_{k2}$—, Phe-CH=CH— and W$^4$W$^5$W$^6$Si—, in which W$^1$ denotes H, F, Cl, CN, CF$_3$, phenyl or alkyl having 1 to 5 C atoms, in particular H, F, Cl or CH$_3$, W$^2$ and W$^3$ each, independently of one another, denote H or alkyl having 1 to 5 C atoms, in particular H, methyl, ethyl or n-propyl, W$^4$, W$^5$ and W$^6$ each, independently of one another, denote Cl, oxaalkyl or oxacarbonylalkyl having 1 to 5 C atoms, W$^7$ and W$^8$ each, independently of one another, denote H, Cl or alkyl having 1 to 5 C atoms, Phe denotes 1,4-phenylene, k$_1$, k$_2$ and k$_3$ each, independently of one another, denote 0 or 1, k$_3$ preferably denotes 1, and k$_4$ denotes an integer from 1 to 10.

Very particularly preferred groups P are selected from the group consisting of CH$_2$=CW$^1$—CO—O—, in particular CH$_2$=CH—CO—O—, CH$_2$=C(CH$_3$)—CO—O— and CH$_2$=CF—CO—O—, furthermore CH$_2$=CH—O—, (CH$_2$=CH)$_2$CH—O—CO—, (CH$_2$=CH)$_2$CH—O—,

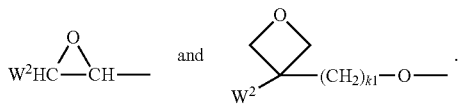

Further preferred polymerisable groups P are selected from the group consisting of vinyloxy, acrylate, methacrylate, fluoroacrylate, chloroacrylate, oxetane and epoxide, most preferably from acrylate and methacrylate.

If Sp is different from a single bond, it is preferably of the formula Sp"—X", so that the respective radical P-Sp- conforms to the formula P-Sp"—X"—, wherein Sp" denotes alkylene having 1 to 20, preferably 1 to 12, C atoms, which is optionally mono- or polysubstituted by F, Cl, Br, I or CN and in which, in addition, one or more non-adjacent CH$_2$ groups may each be replaced, independently of one another, by —O—, —S—, —NH—, —N(R$^{00}$)—, —Si(R$^0$R$^{00}$)—, —CO—, —CO—O—, —O—CO—, —O—CO—O—, —S—CO—, —CO—S—, —N(R$^{00}$)—CO—O—, —O—CO—N(R$^0$)—, —N(R$^0$)—CO—N(R$^{00}$)—, —CH=CH— or —C≡C— in such a way that O and/or S atoms are not linked directly to one another, X" denotes —O—, —S—, —CO—, —CO—O—, —O—CO—, —O—CO—O—, —CO—N(R$^0$)—, —N(R$^0$)—CO—, —N(R$^0$)—CO—N(R$^{00}$)—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^0$—, —CY$^2$=CY$^3$—, —C≡C—, —CH=CH—CO—O—, —O—CO—CH=CH— or a single bond, R$^0$ and R$^{00}$ each, independently of one another, denote H or alkyl having 1 to 20 C atoms, and Y$^2$ and Y$^3$ each, independently of one another, denote H, F, Cl or CN.

X" is preferably —O—, —S—, —CO—, —COO—, —OCO—, —O—COO—, —CO—NR$^0$—, —NR$^0$—CO—, —NR$^0$—CO—NR$^0$— or a single bond.

Typical spacer groups Sp and -Sp"—X"— are, for example, —(CH$_2$)$_{p1}$—, —(CH$_2$CH$_2$O)$_{q1}$—CH$_2$CH$_2$—, —CH$_2$CH$_2$—S—CH$_2$CH$_2$—, —CH$_2$CH$_2$—NH—CH$_2$CH$_2$— or —(SiR$^0$R$^{00}$—O)$_{p1}$—, in which p1 is an integer from 1 to 12, q1 is an integer from 1 to 3, and R$^0$ and R$^{00}$ have the meanings indicated above.

Particularly preferred groups Sp and -Sp"—X"— are —(CH$_2$)$_{p1}$—, —(CH$_2$)$_{p1}$—O—, —(CH$_2$)$_{p1}$—O—CO—, —(CH$_2$)$_{p1}$—CO—O—, —(CH$_2$)$_{p1}$—O—CO—O—, in which p1 and q1 have the meanings indicated above.

Particularly preferred groups Sp" are, in each case straight-chain, ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

For the production of PSA displays, the polymerisable compounds contained in the LC medium are polymerised or crosslinked (if one compound contains two or more polymerisable groups) by in-situ polymerisation in the LC medium between the substrates of the LC display, optionally while a voltage is applied to the electrodes.

The structure of the PSA displays according to the invention corresponds to the usual geometry for PSA displays, as described in the prior art cited at the outset. Geometries without protrusions are preferred, in particular those in which, in addition, the electrode on the colour filter side is unstructured and only the electrode on the TFT side has slots. Particularly suitable and preferred electrode structures for PS-VA displays are described, for example, in US 2006/0066793 A1.

The combination of compounds of the preferred embodiments mentioned above with the polymerised compounds described above causes low threshold voltages, low rotational viscosities and very good low-temperature stabilities in the LC media according to the invention at the same time as constantly high clearing points and high VHR values.

The use of LC media containing polymerisable compounds allows the rapid establishment of a particularly low pretilt angle in PSA displays. In particular, the LC media exhibit significantly shortened response times, in particular also the grey-shade response times, in PSA displays compared with the media from the prior art.

Preference is generally given to LC media which have a nematic LC phase, and preferably have no chiral liquid crystal phase.

The LC media of the present invention preferably have a nematic phase range ≥80 K, very preferably ≥100 K, and preferably a rotational viscosity ≤250 mPa·s, very preferably ≤200 mPa·s, at 20° C.

In the VA-type displays according to the invention, the molecules in the layer of the LC medium in the switched-off state are aligned perpendicular to the electrode surfaces (homeotropically) or have a a tilted homeotropic alignment. On application of an electrical voltage to the electrodes, a realignment of the LC molecules takes place with the longitudinal molecular axes parallel to the electrode surfaces.

LC media according to the invention based on compounds with negative dielectric anisotropy according to the first preferred embodiment, in particular for use in displays of the VA and UB-FFS type, preferably have a negative dielectric anisotropy Δε from −0.5 to −10, very preferably from −2.5 to −7.5, at 20° C. and 1 kHz.

The birefringence Δn in LC media according to the invention for use in displays of the VA and UB-FFS type is preferably below 0.16, particularly preferably from 0.06 to 0.14, very particularly preferably from 0.07 to 0.12.

LC media according to the invention based on compounds with positive dielectric anisotropy according to the second preferred embodiment, in particular for use in displays of the IPS and FFS type, preferably have a positive dielectric anisotropy Δε from +2 to +30, very preferably from +3 to +20, at 20° C. and 1 kHz.

The birefringence Δn in LC media according to the invention for use in displays of the IPS or FFS is preferably from 0.07 to 0.15, particularly preferably from 0.08 to 0.13.

The LC media according to the invention may also comprise further additives which are known to the person skilled in the art and are described in the literature, such as, for example, polymerisation initiators, inhibitors, stabilizers, surface-active substances or chiral dopants. These may be polymerisable or non-polymerisable.

In a preferred embodiment the LC media contain one or more chiral dopants, preferably in a concentration from 0.01 to 1% by weight, very preferably from 0.05 to 0.5% by weight. The chiral dopants are preferably selected from the group consisting of compounds from Table B below, very preferably from the group consisting of R- or S-1011, R- or S-2011, R- or S-3011, R- or S-4011, and R- or S-5011.

In another preferred embodiment the LC media contain a racemate of one or more chiral dopants, which are preferably selected from the chiral dopants mentioned in the previous paragraph.

Furthermore, it is possible to add to the LC media, for example, 0 to 15% by weight of pleochroic dyes, furthermore nanoparticles, conductive salts, preferably ethyldimethyldodecylammonium 4-hexoxybenzoate, tetrabutylammonium tetraphenylborate or complex salts of crown ethers (cf., for example, Haller et al., Mol. Cryst. Liq. Cryst. 24, 249-258 (1973)), for improving the conductivity, or substances for modifying the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

The individual components of the preferred embodiments a)-w) and aa) to hh) of the LC media according to the invention are either known or methods for the preparation thereof can readily be derived from the prior art by the person skilled in the relevant art, since they are based on standard methods described in the literature. Corresponding compounds of the formula CY are described, for example, in EP-A-0 364 538. Corresponding compounds of the formula ZK are described, for example, in DE-A-26 36 684 and DE-A-33 21 373.

The LC media which can be used in accordance with the invention are prepared in a manner conventional per se, for example by mixing one or more of the above-mentioned compounds with one or more polymerisable compounds as defined above, and optionally with further liquid-crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing. The invention furthermore relates to the process for the preparation of the LC media according to the invention.

It goes without saying to the person skilled in the art that the LC media according to the invention may also comprise compounds in which, for example, H, N, O, Cl, F have been replaced by the corresponding isotopes like deuterium etc.

The following examples explain the present invention without restricting it. However, they show the person skilled in the art preferred mixture concepts with compounds preferably to be employed and the respective concentrations thereof and combinations thereof with one another. In addition, the examples illustrate which properties and property combinations are accessible.

Throughout the patent application, 1,4-cyclohexylene rings and 1,4-phenylene rings are represented as follows:

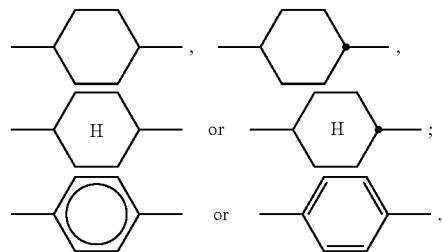

The cyclohexylene rings are trans-1,4-cyclohexylene rings.

Throughout the patent application and in the working examples, the structures of the liquid-crystal compounds are indicated by means of acronyms. Unless indicated otherwise, the transformation into chemical formulae takes place in accordance with Tables I-III. All radicals $C_nH_{2n+1}$, $C_mH_{2m+1}$, $C_nH_{2n}$, $C_mH_{2m}$ and $C_kH_{2k}$ are straight-chain alkyl radicals or alkenyl radicals respectively, in each case having n, m or k C atoms; n and m each, independently of one another, denote 1, 2, 3, 4, 5, 6, 7, 8, 9, 10, 11 or 12, preferably 1, 2, 3, 4, 5 or 6, and k is 0, 1, 2, 3, 4, 5 or 6. In Table I the ring elements of the respective compound are coded, in Table II the bridging members are listed and in Table III the meanings of the symbols for the left-hand and right-hand side chains of the compounds are indicated.

TABLE I

| Ring elements | |
|---|---|
| | A |
| | AI |
| | B |

TABLE I-continued
Ring elements
| | |
|---|---|
| 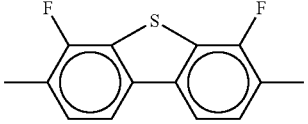 | B(S) |
| 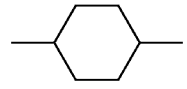 | C |
| 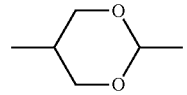 | D |
| 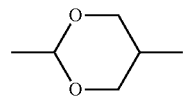 | DI |
| 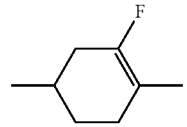 | F |
| 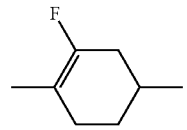 | FI |
| 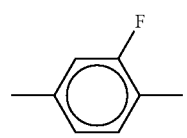 | G |
| 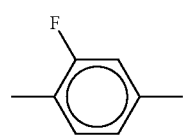 | GI |
| 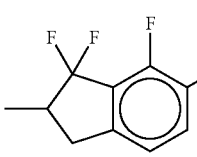 | K |
| 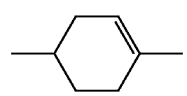 | L |
| 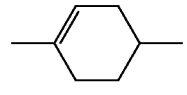 | LI |
| 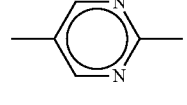 | M |
| 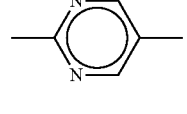 | MI |
|  | N |
|  | NI |
|  | P |
| 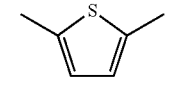 | S |
| 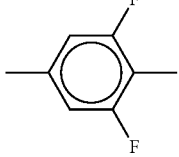 | U |
| 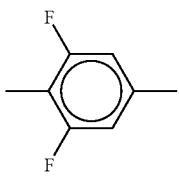 | UI |
| 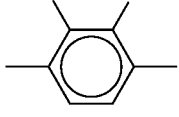 | Y |
| 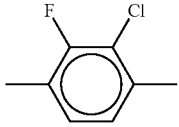 | Y(F, Cl) |
| 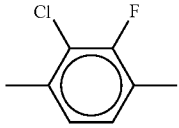 | Y(Cl, F) |
TABLE II
| | Bridging members | | |
|---|---|---|---|
| E | —CH$_2$CH$_2$— | | |
| V | —CH═CH— | | |
| T | —C≡C— | | |
| W | —CF$_2$CF$_2$— | | |
| Z | —COO— | ZI | —OCO— |
| O | —CH$_2$O— | OI | —OCH$_2$— |
| Q | —CF$_2$O— | QI | —OCF$_2$— |

TABLE III

| Side chains | | | |
|---|---|---|---|
| Left-hand side chain | | Right-hand side chain | |
| n- | $C_nH_{2n+1}-$ | -n | $-C_nH_{2n+1}$ |
| nO- | $C_nH_{2n+1}-O-$ | -On | $-O-C_nH_{2n+1}$ |
| V- | $CH_2=CH-$ | -V | $-CH=CH_2$ |
| nV- | $C_nH_{2n+1}-CH=CH-$ | -nV | $-C_nH_{2n}-CH=CH_2$ |
| Vn- | $CH_2=CH-C_nH_{2n}-$ | -Vn | $-CH=CH-C_nH_{2n+1}$ |
| nVm- | $C_nH_{2n+1}-CH=CH-C_mH_{2m}-$ | -nVm | $-C_nH_{2n}-CH=CH-C_mH_{2m+1}$ |
| N- | $N\equiv C-$ | -N | $-C\equiv N$ |
| F- | $F-$ | -F | $-F$ |
| Cl- | $Cl-$ | Cl | $-Cl$ |
| M- | $CFH_2-$ | -M | $-CFH_2$ |
| D- | $CF_2H-$ | -D | $-CF_2H$ |
| T- | $CF_3-$ | -T | $-CF_3$ |
| MO- | $CFH_2O-$ | -OM | $-OCFH_2$ |
| DO- | $CF_2HO-$ | -OD | $-OCF_2H$ |
| TO- | $CF_3O-$ | -OT | $-OCF_3$ |
| T- | $CF_3-$ | -T | $-CF_3$ |
| A- | $H-C\equiv C-$ | -A | $-C\equiv C-H$ |
| FXO- | $CF_2=CHO-$ | -OXF | $-OCH=CF_2$ |

Preferred mixture components are shown in Tables A1 and A2 below. The compounds shown in Table A1 are especially suitable for use in LC mixtures with positive dielectric anisotropy. The compounds shown in Table A2 are especially suitable for use in LC mixtures with negative dielectric anisotropy.

TABLE A1

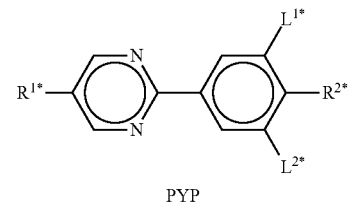

PYP

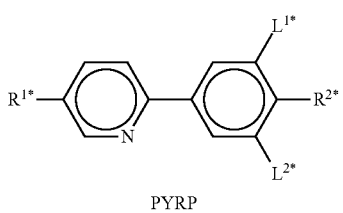

PYRP

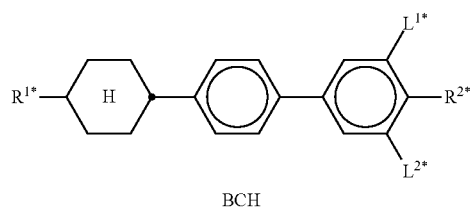

BCH

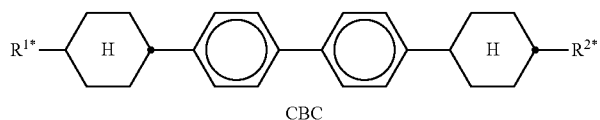

CBC

CCH

TABLE A1-continued
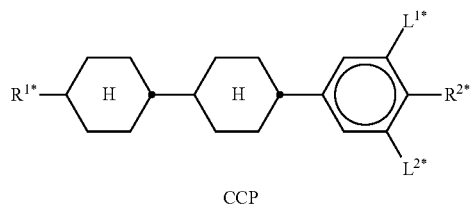
CCP
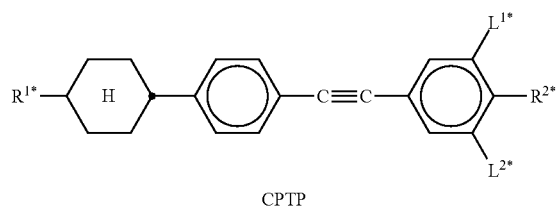
CPTP
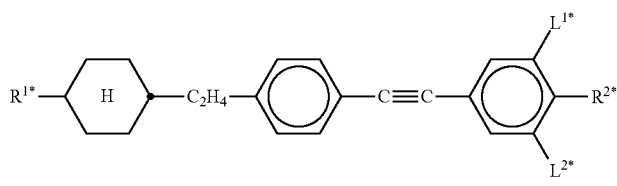
CEPTP
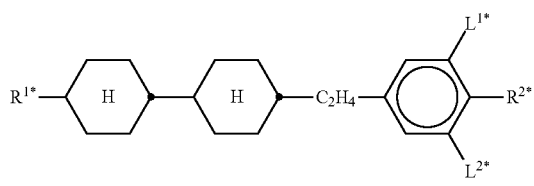
ECCP
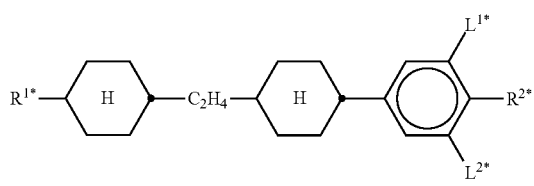
CECP
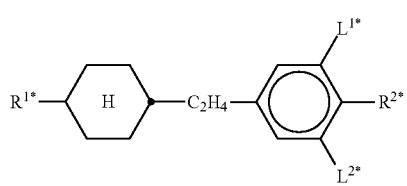
EPCH
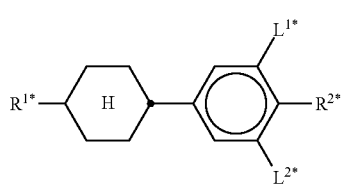
PCH
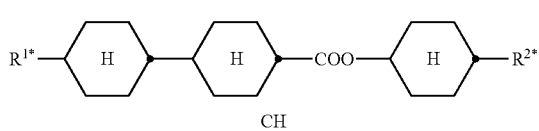
CH TABLE A1-continued
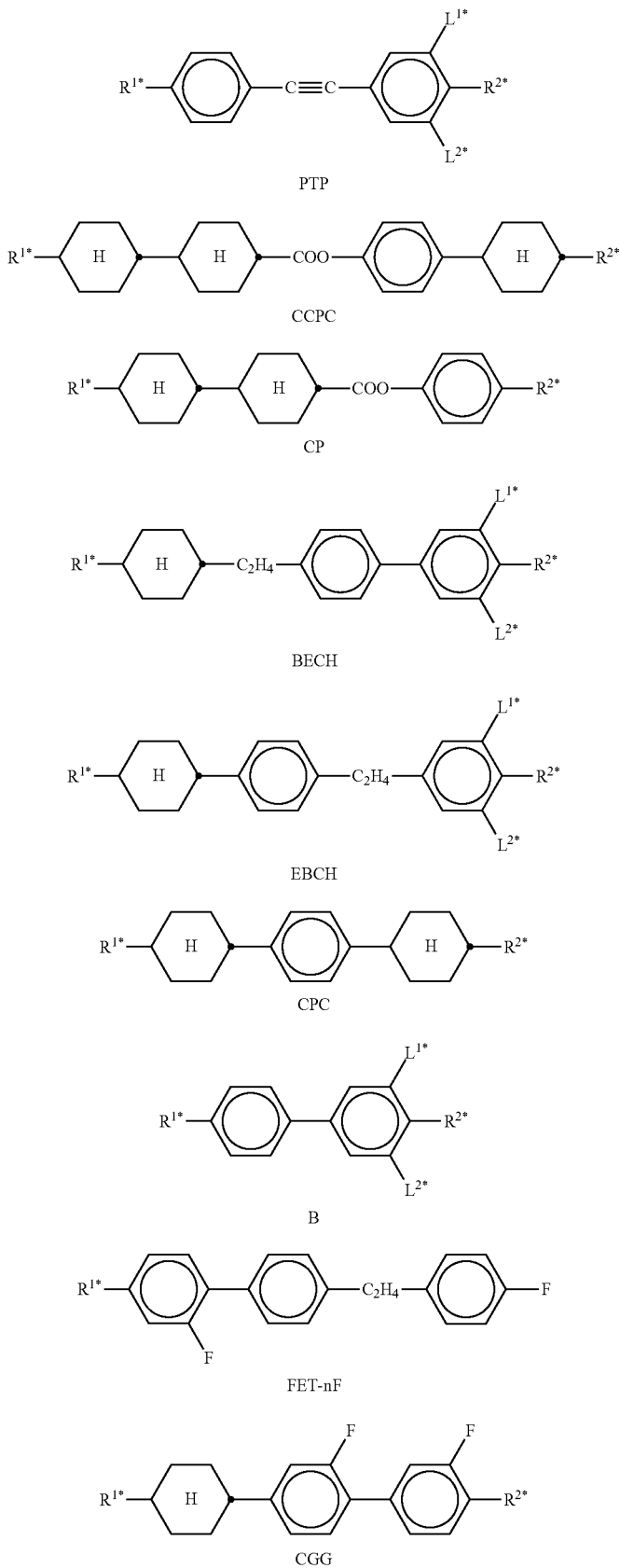

TABLE A1-continued
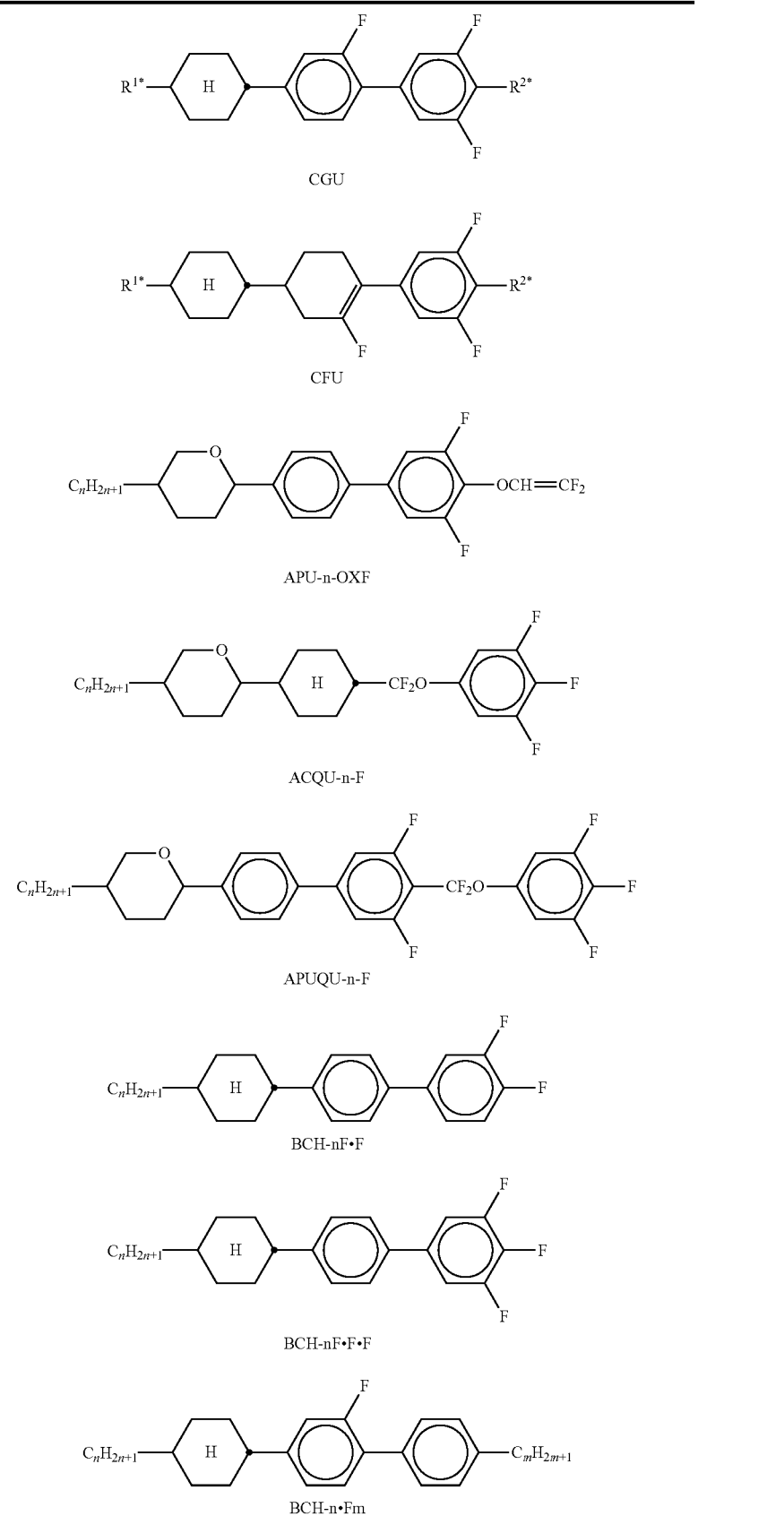

TABLE A1-continued
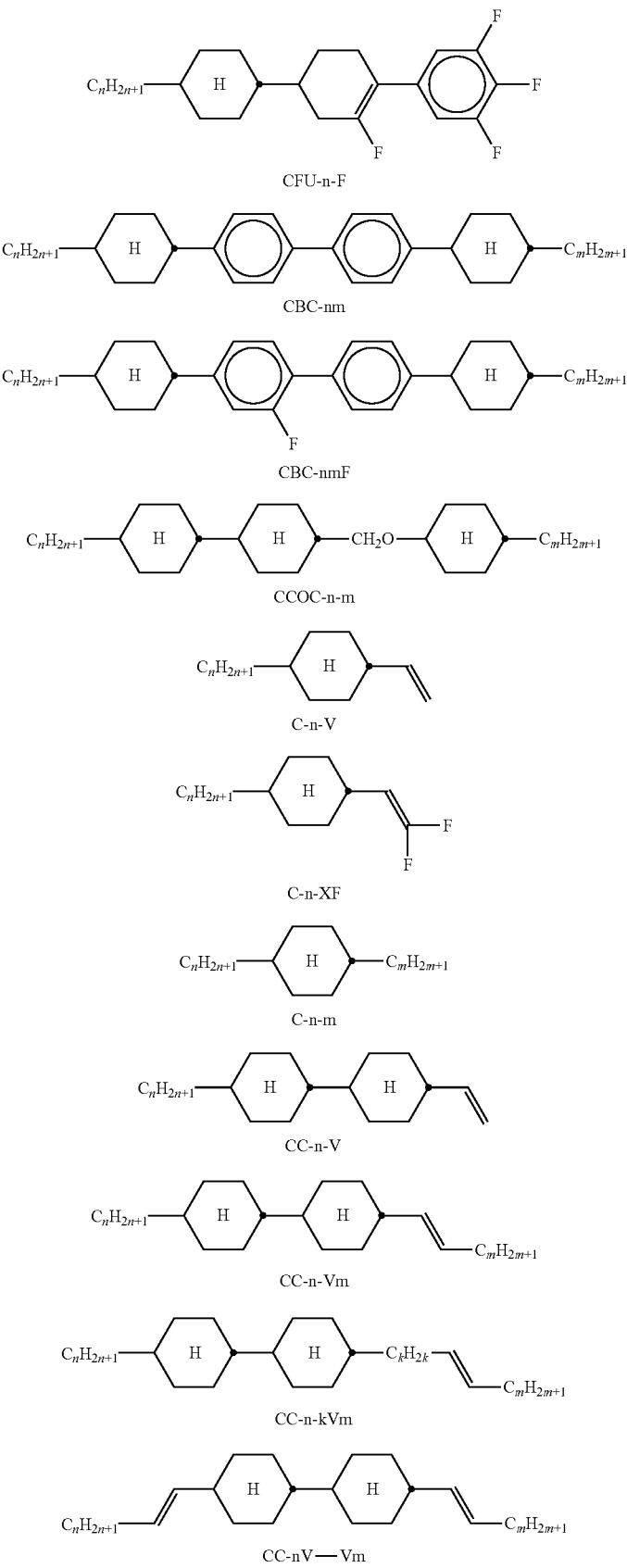

TABLE A1-continued
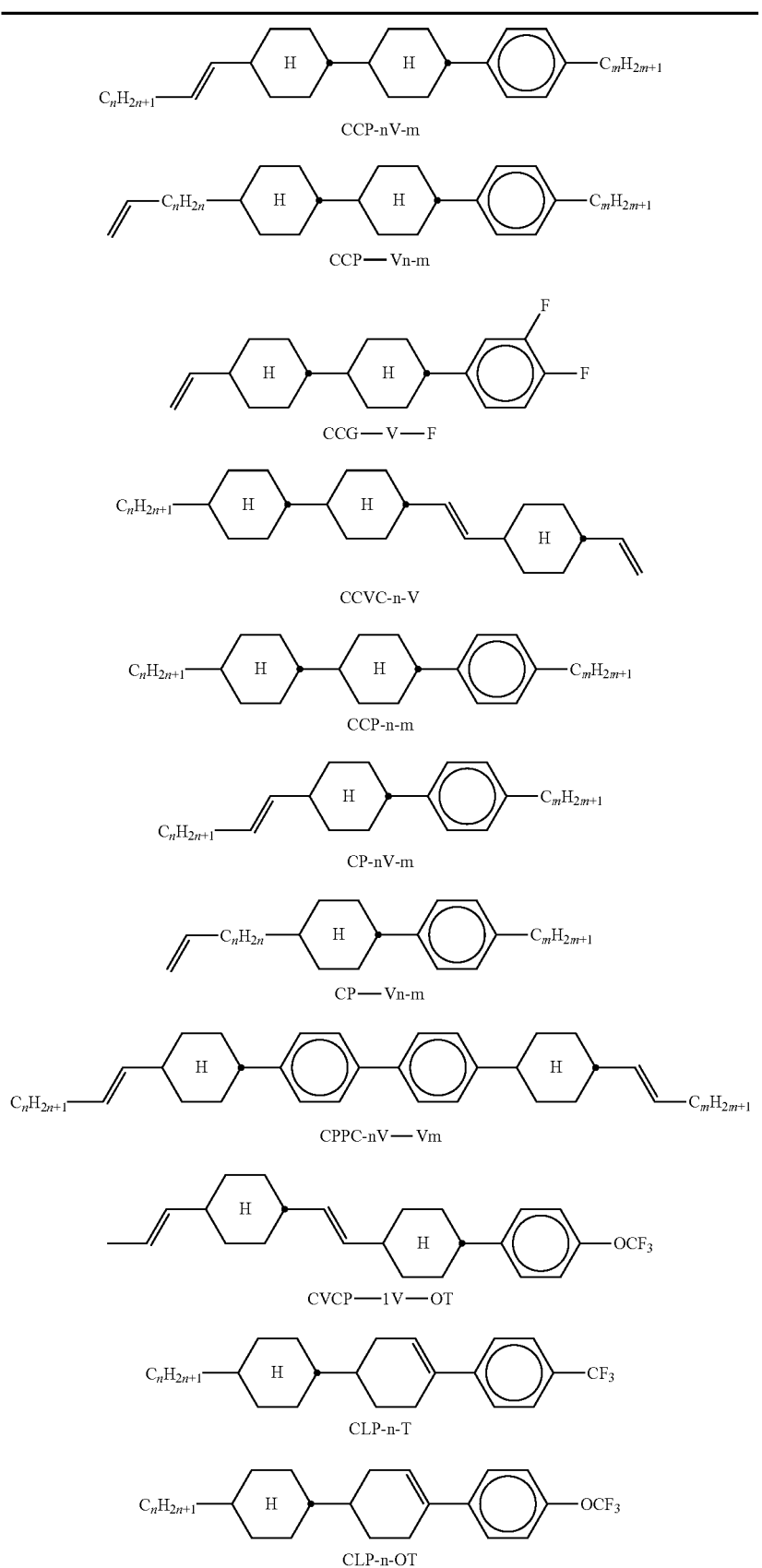

TABLE A1-continued
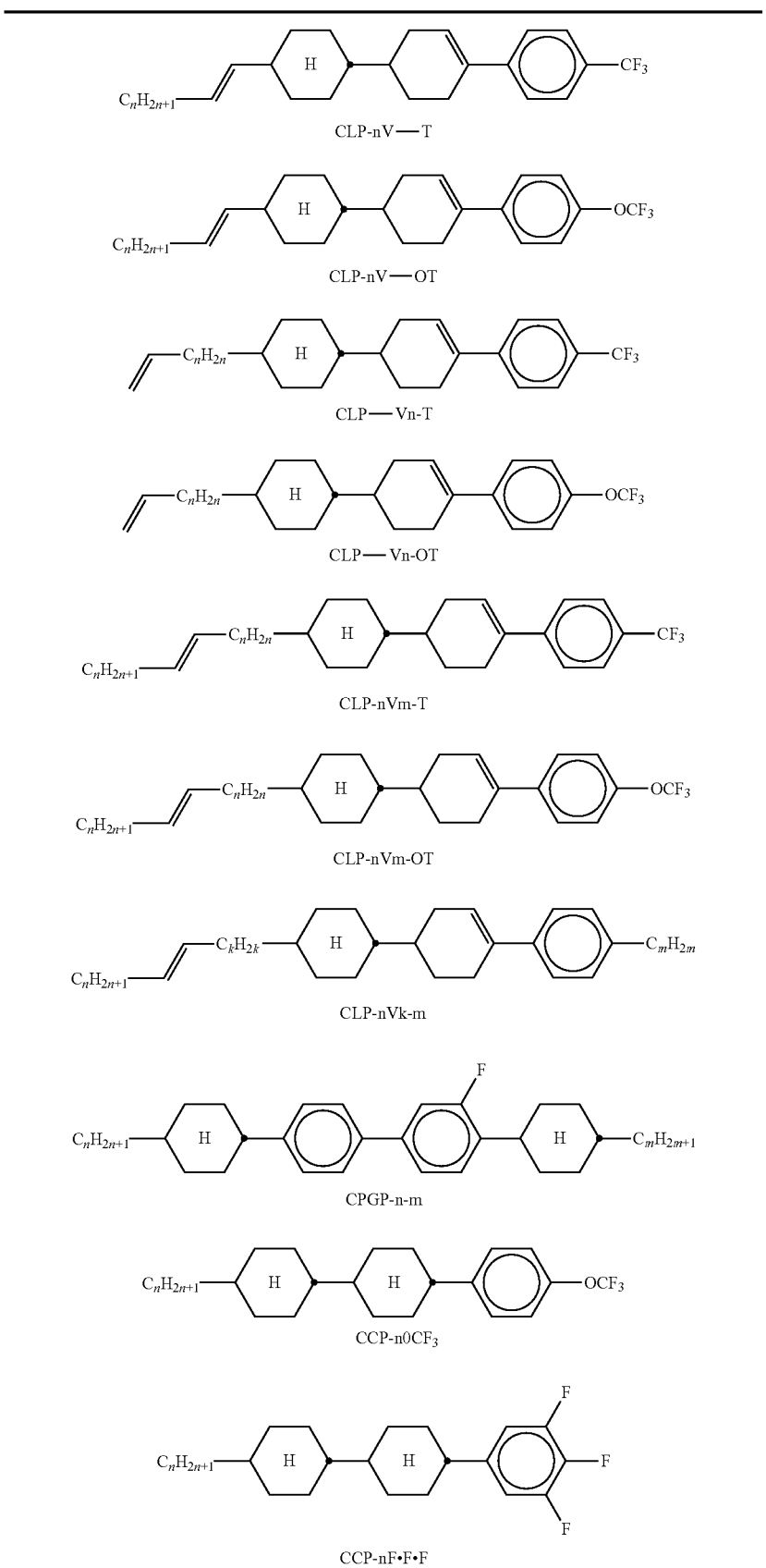

TABLE A1-continued
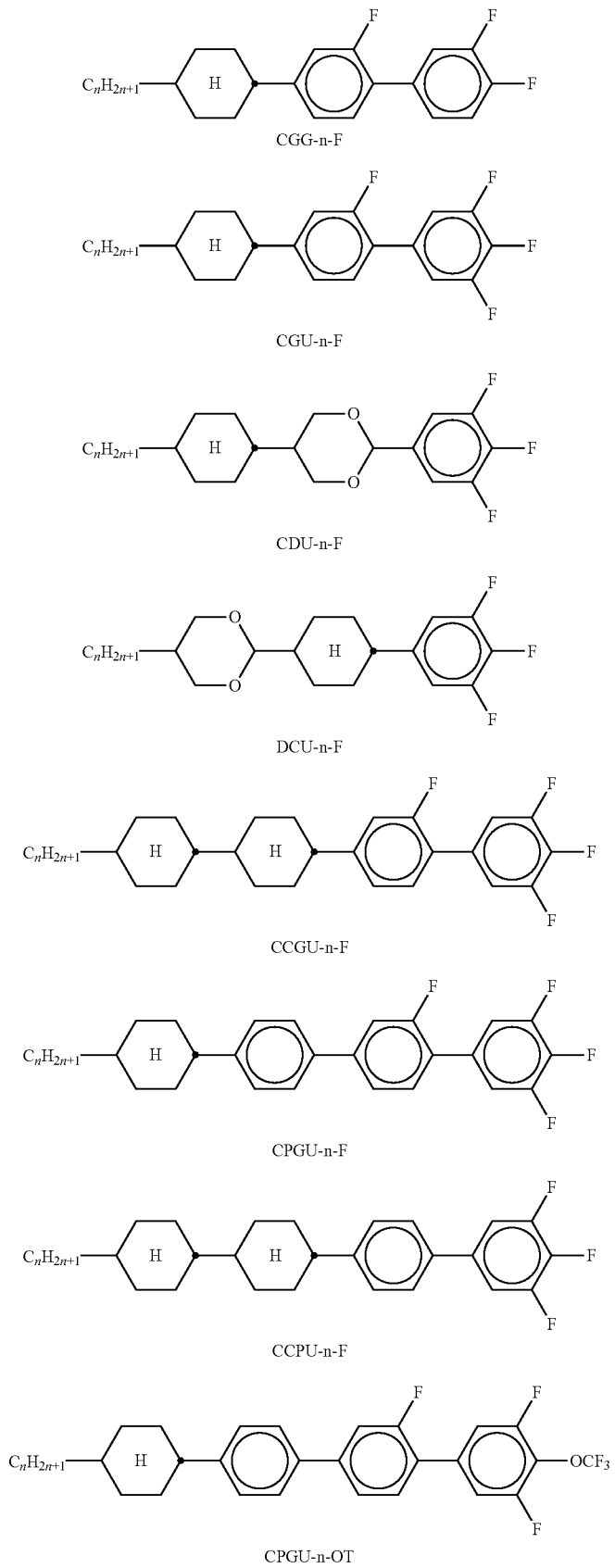

TABLE A1-continued
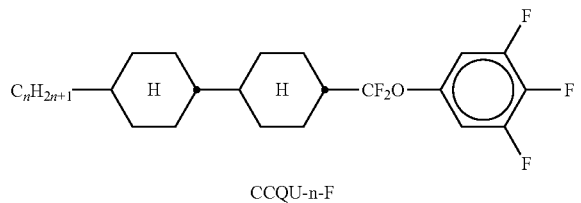
CCQU-n-F
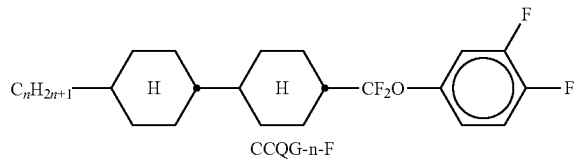
CCQG-n-F
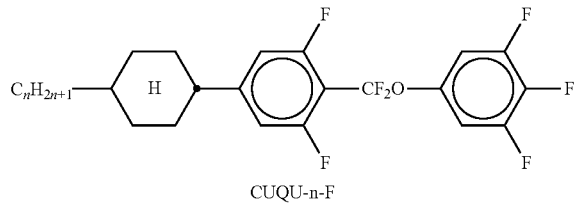
CUQU-n-F
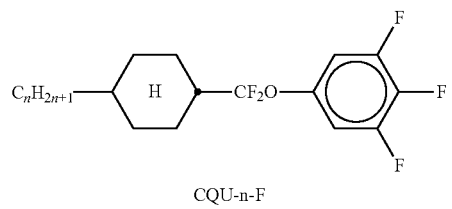
CQU-n-F
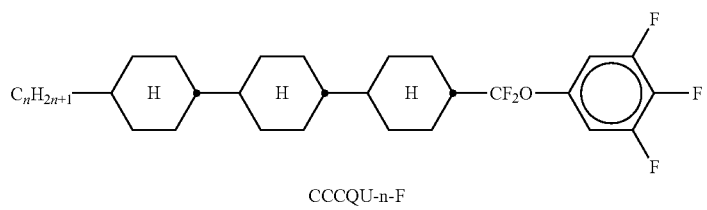
CCCQU-n-F
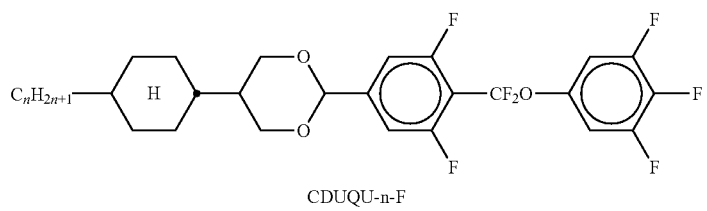
CDUQU-n-F
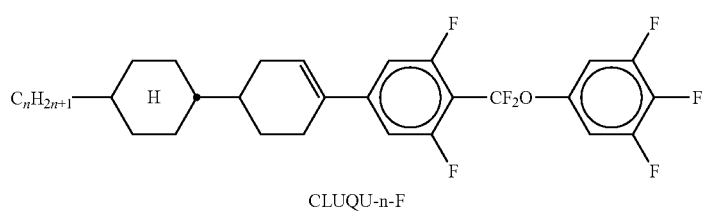
CLUQU-n-F TABLE A1-continued
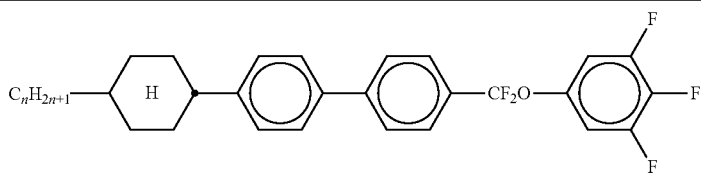
CPPQU-n-F
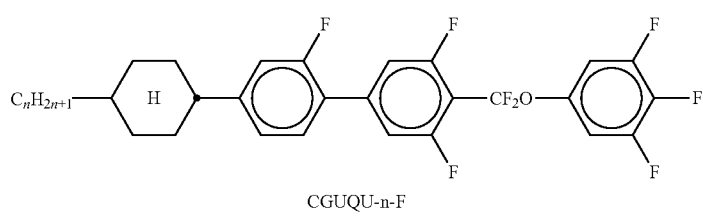
CGUQU-n-F
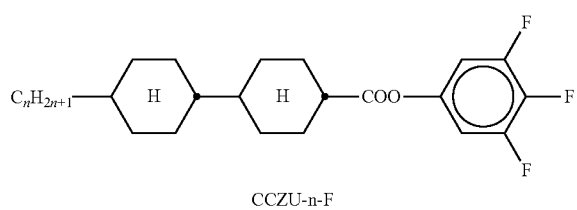
CCZU-n-F
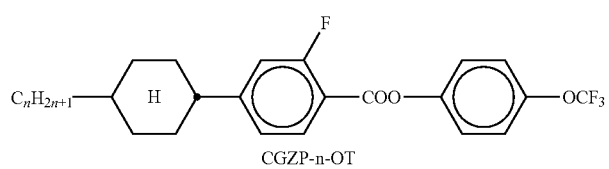
CGZP-n-OT
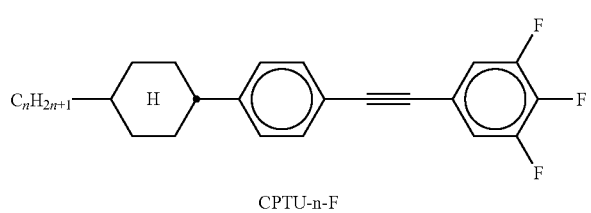
CPTU-n-F
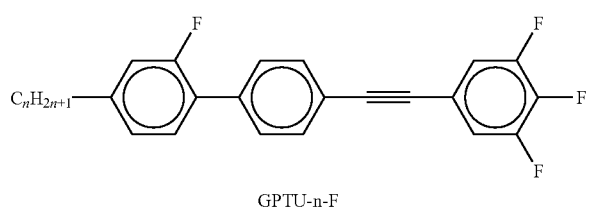
GPTU-n-F
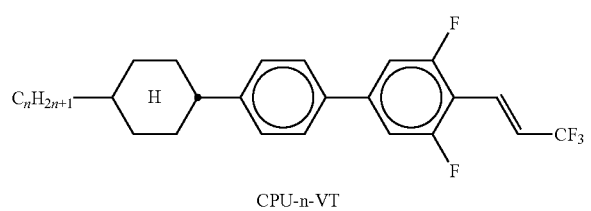
CPU-n-VT
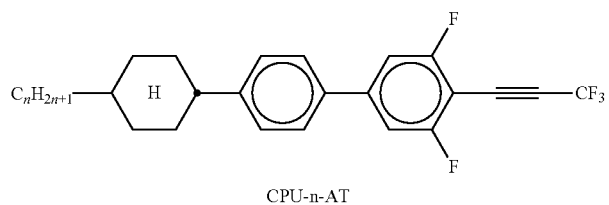
CPU-n-AT TABLE A1-continued
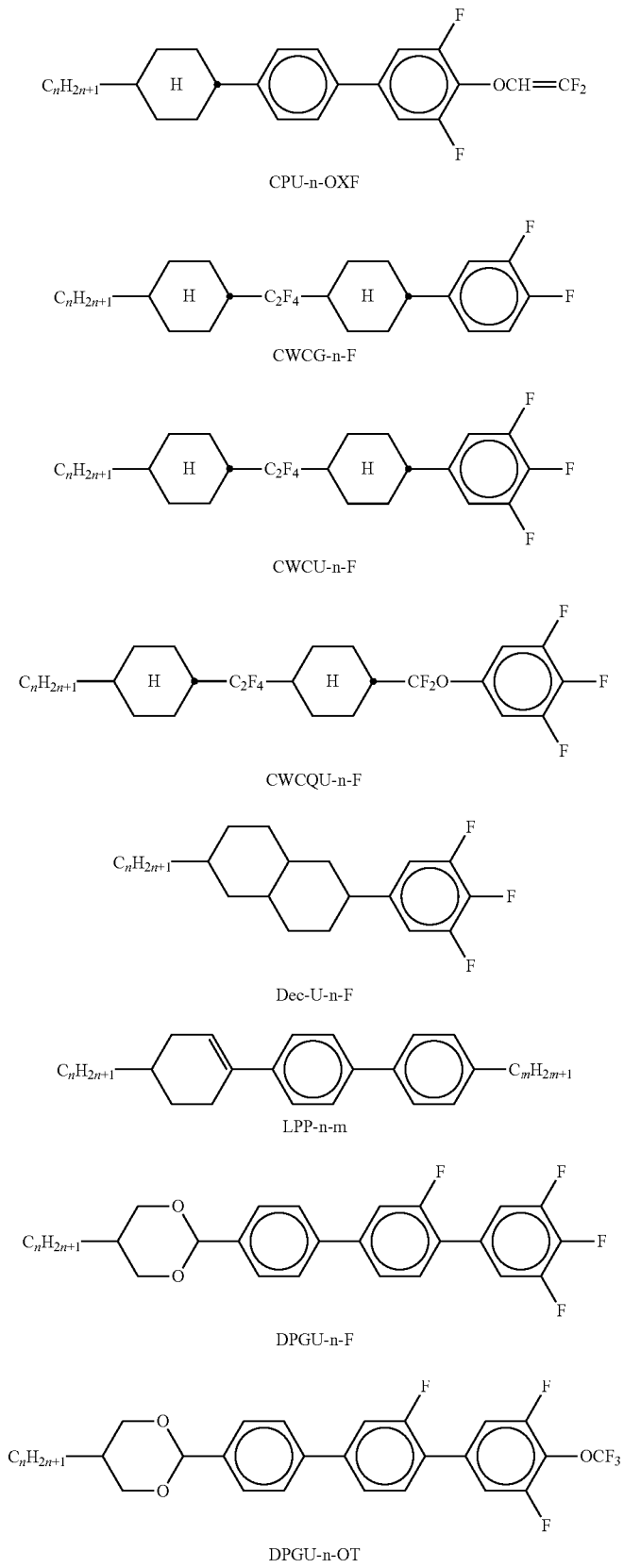

TABLE A1-continued
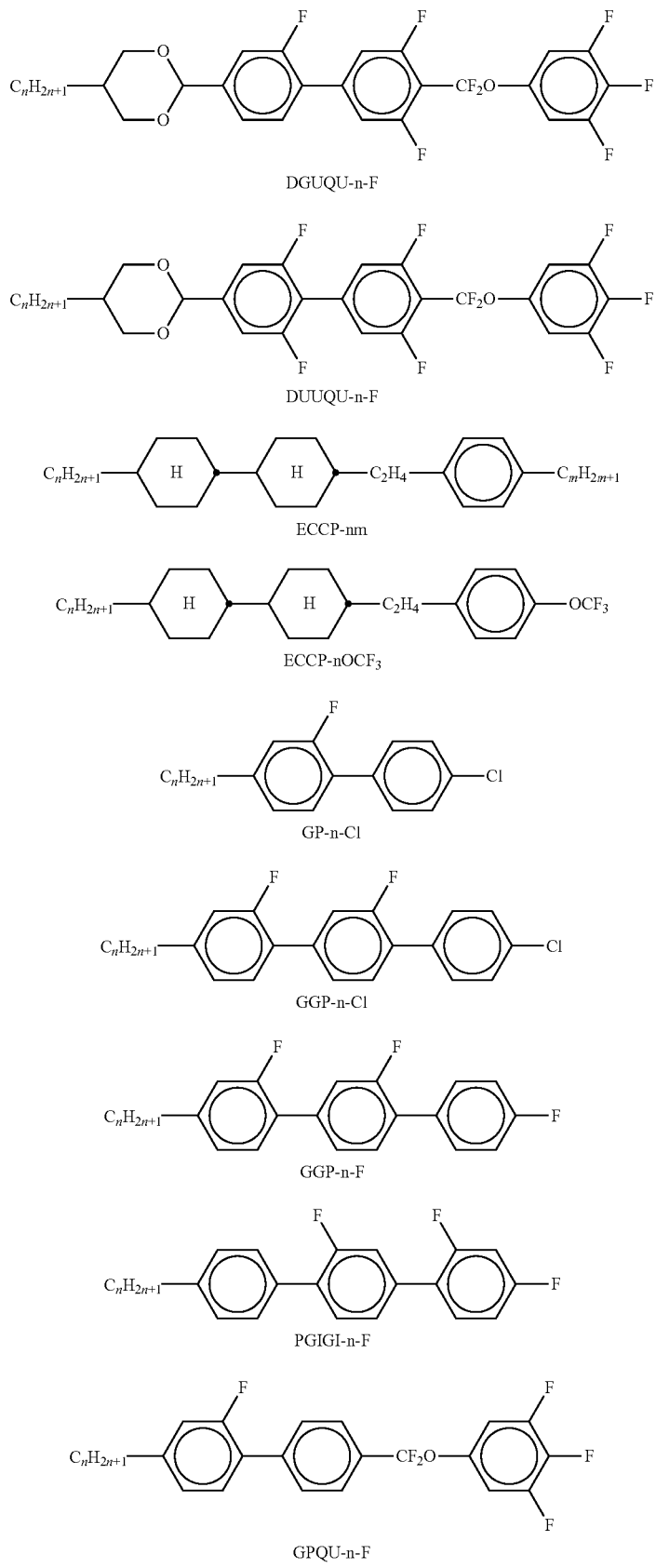

TABLE A1-continued
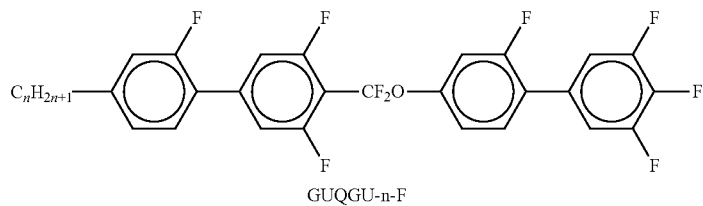
GUQGU-n-F
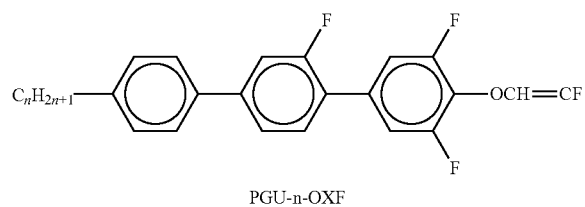
PGU-n-OXF
MPP-n-F
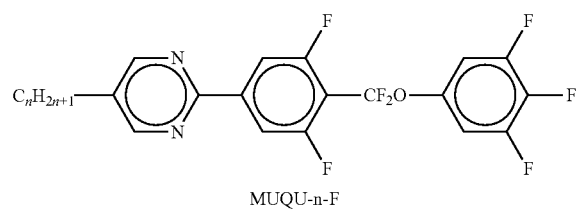
MUQU-n-F
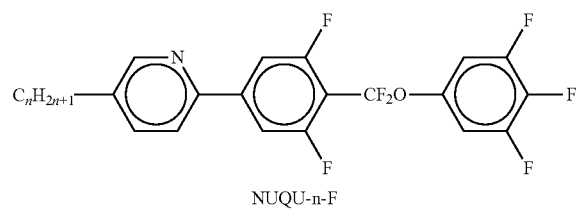
NUQU-n-F
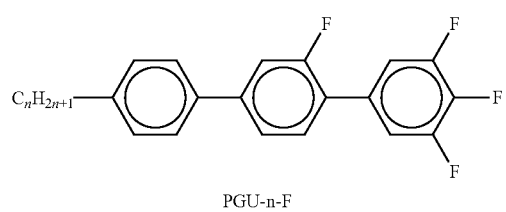
PGU-n-F
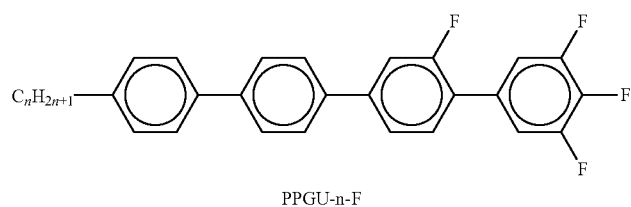
PPGU-n-F
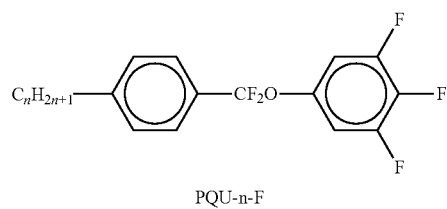
PQU-n-F

TABLE A1-continued
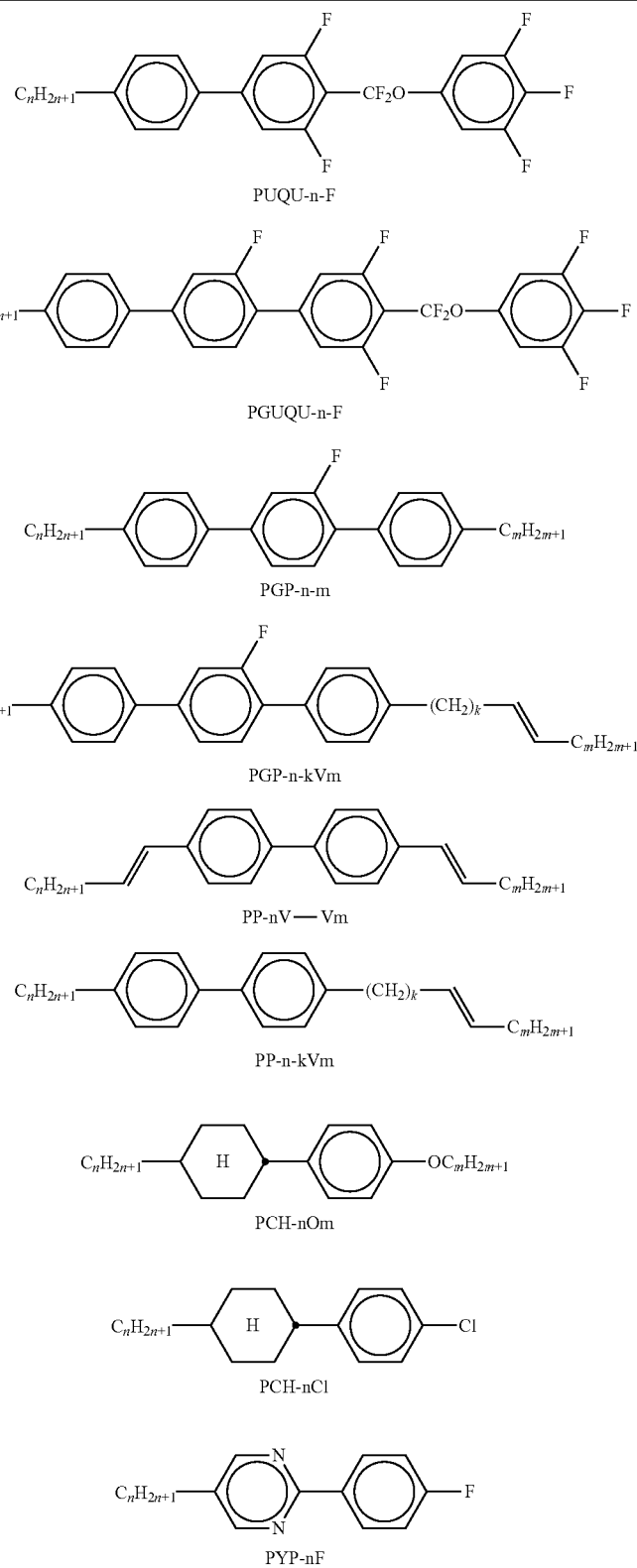
In Table A1, $R^{1*}$ denotes a group selected from the left-hand side chains and $R^{2*}$ denotes a group selected from the right-hand side chains listed in Table III, $L^1$ and $L^{2*}$ are independently of each other H or F, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.

TABLE A2
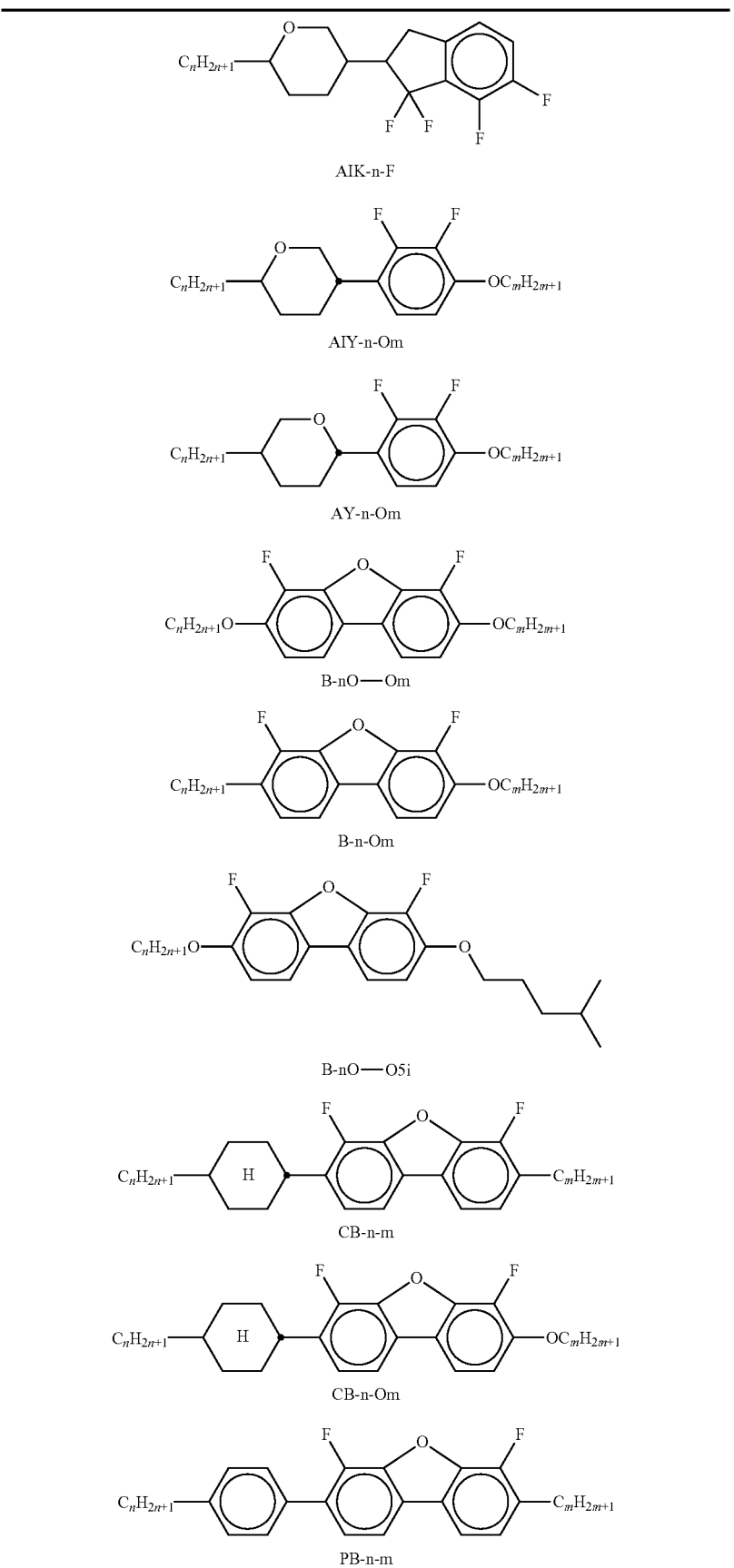

TABLE A2-continued
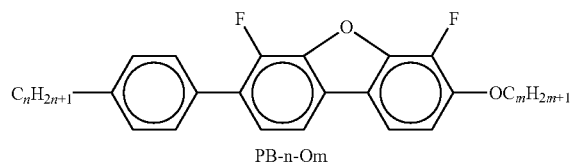
PB-n-Om
BCH-nm
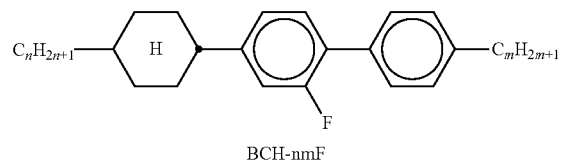
BCH-nmF
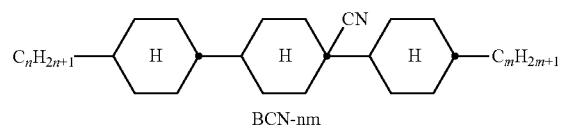
BCN-nm
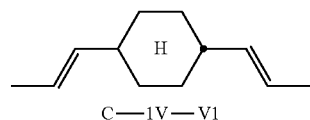
C—1V—V1
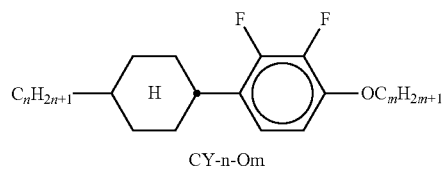
CY-n-Om
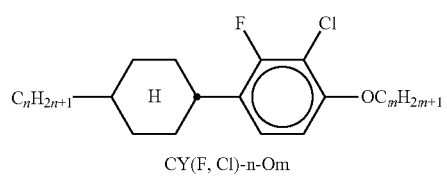
CY(F, Cl)-n-Om
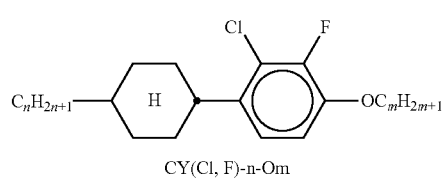
CY(Cl, F)-n-Om
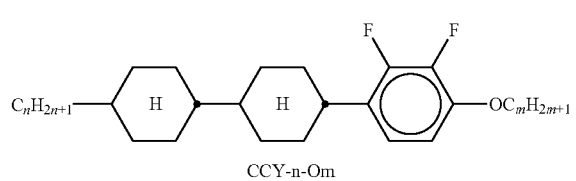
CCY-n-Om TABLE A2-continued
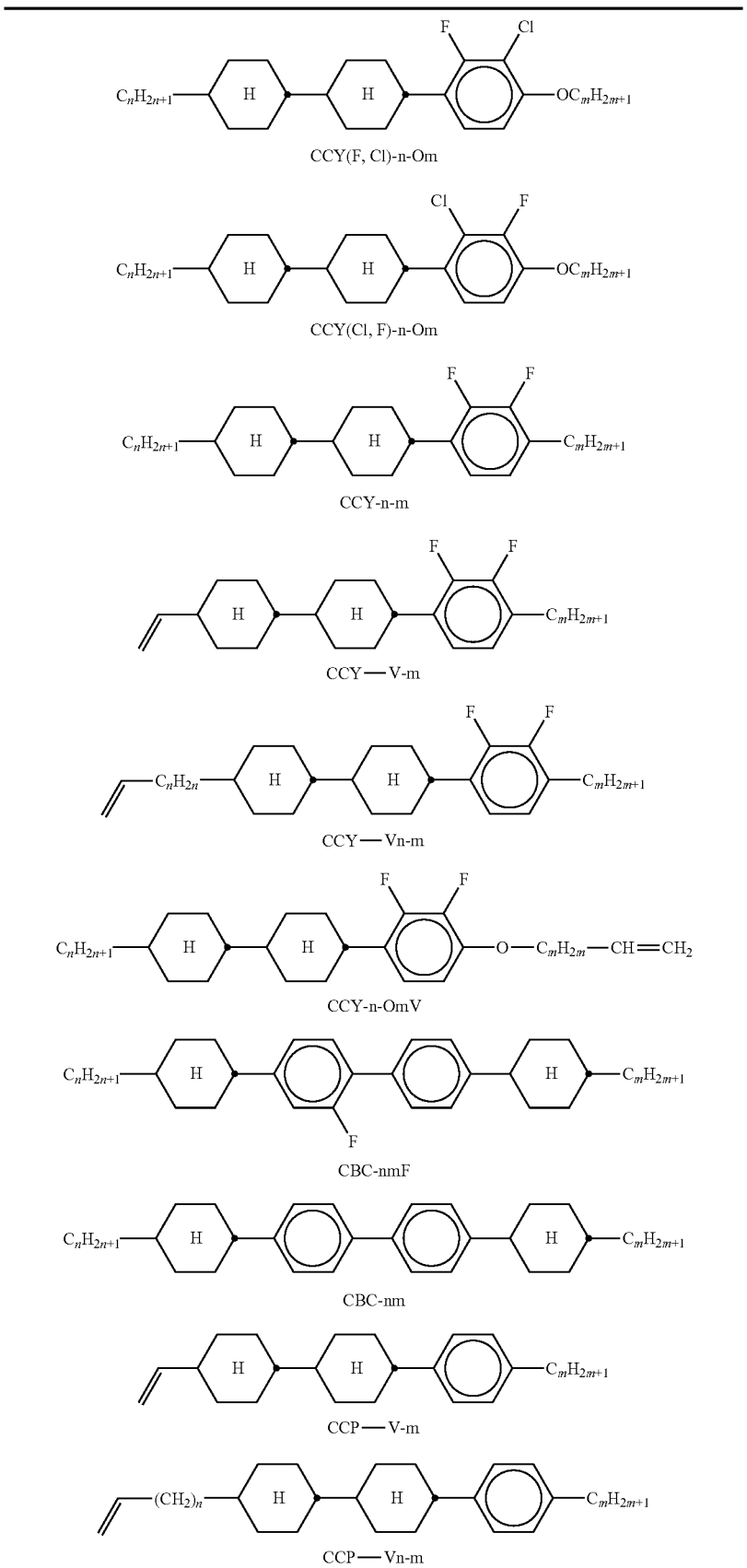

TABLE A2-continued
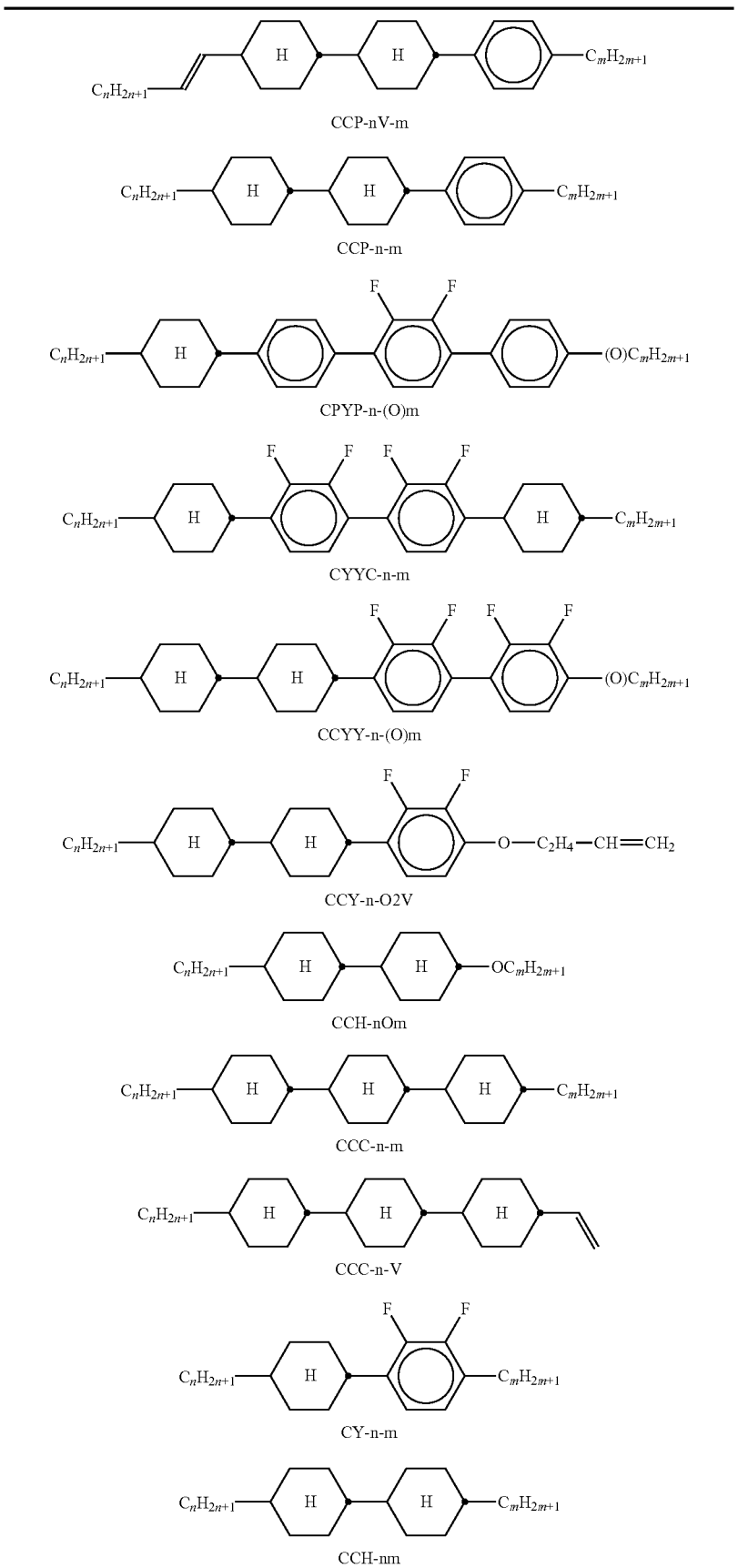

TABLE A2-continued
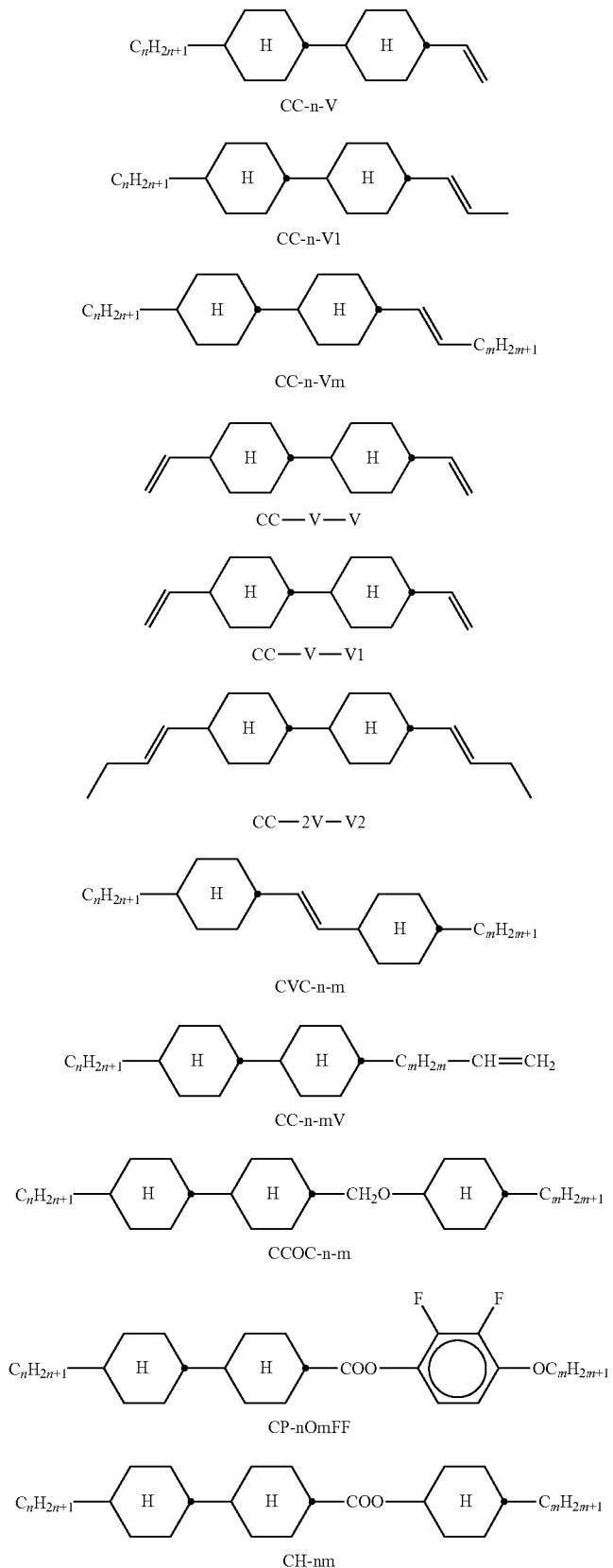

TABLE A2-continued
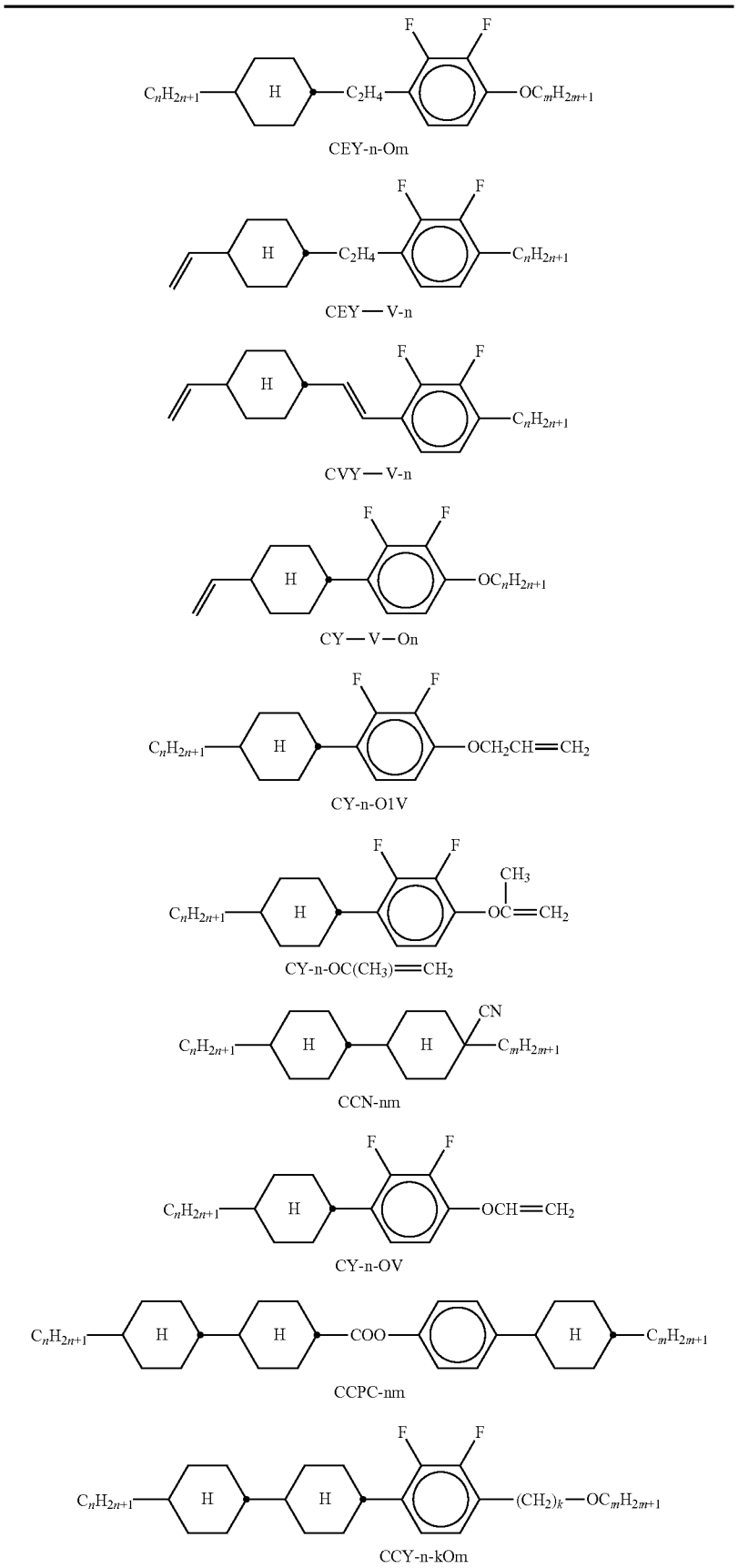

TABLE A2-continued
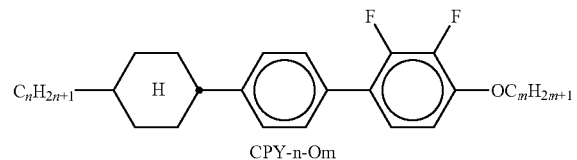
CPY-n-Om
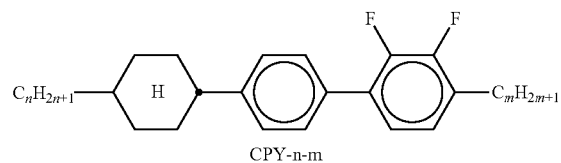
CPY-n-m
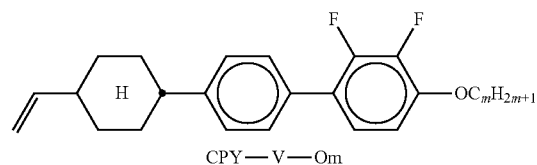
CPY—V—Om
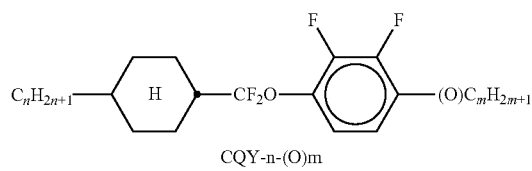
CQY-n-(O)m
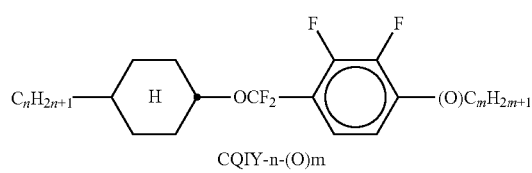
CQIY-n-(O)m
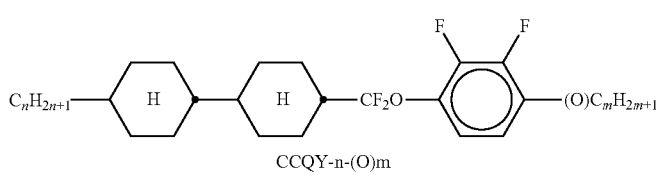
CCQY-n-(O)m
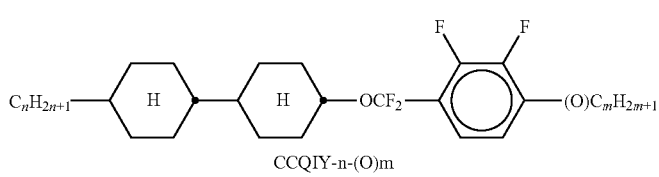
CCQIY-n-(O)m
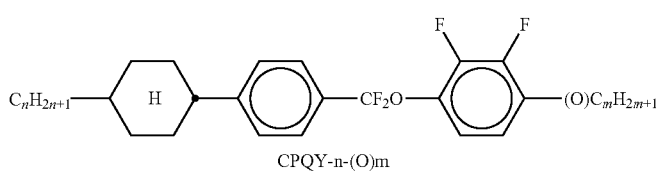
CPQY-n-(O)m
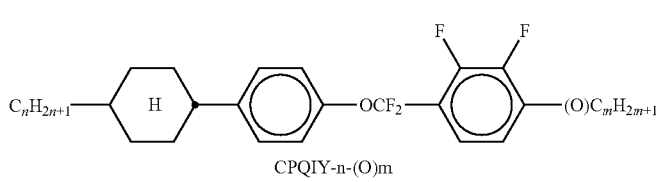
CPQIY-n-(O)m TABLE A2-continued
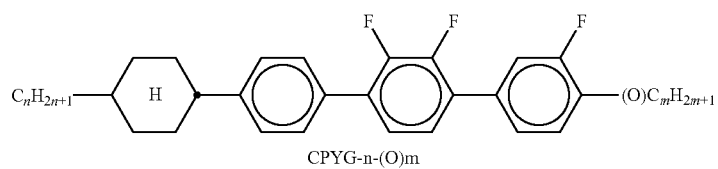
CPYG-n-(O)m
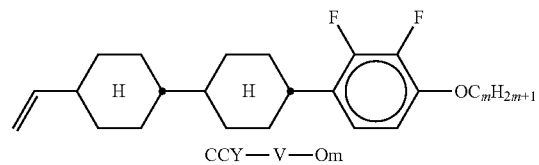
CCY—V—Om
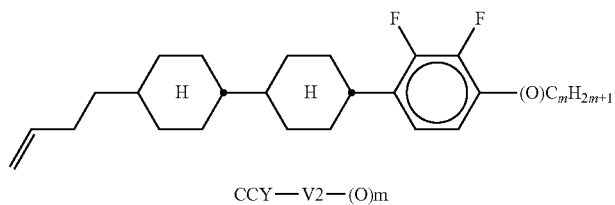
CCY—V2—(O)m
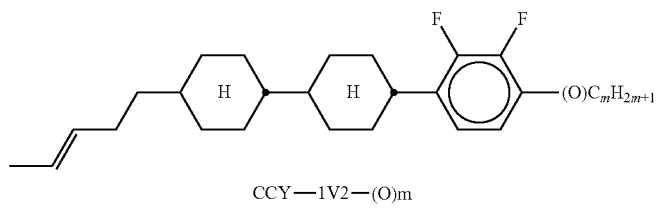
CCY—1V2—(O)m
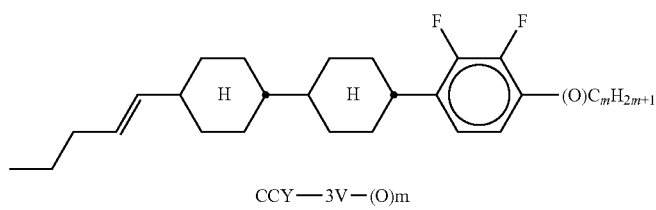
CCY—3V—(O)m
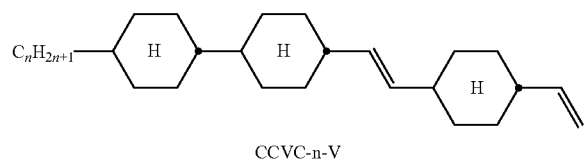
CCVC-n-V
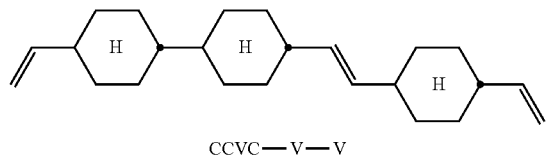
CCVC—V—V
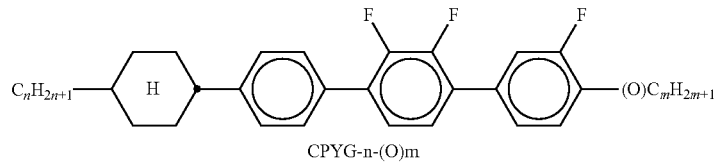
CPYG-n-(O)m TABLE A2-continued
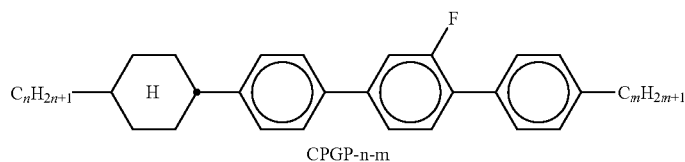
CPGP-n-m
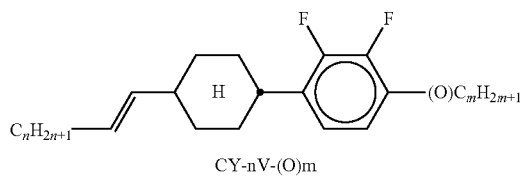
CY-nV-(O)m
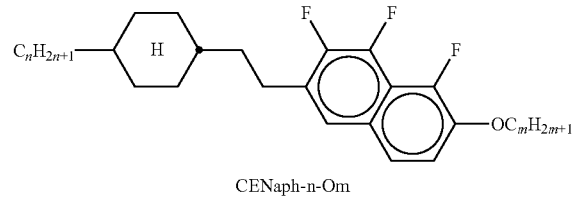
CENaph-n-Om
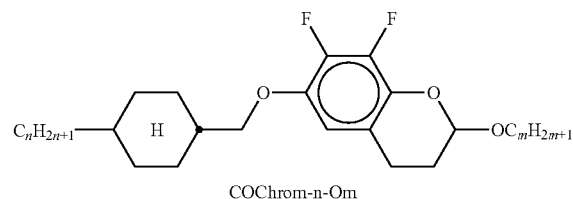
COChrom-n-Om
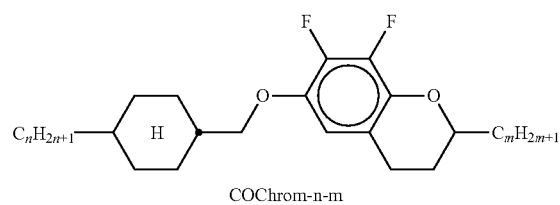
COChrom-n-m
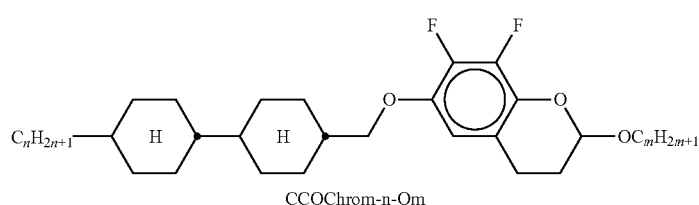
CCOChrom-n-Om
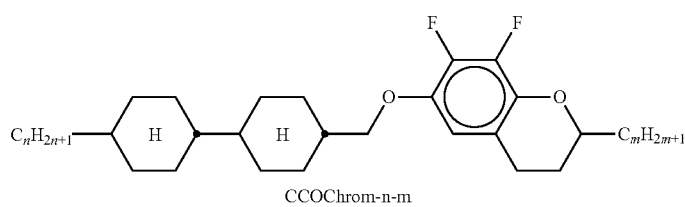
CCOChrom-n-m
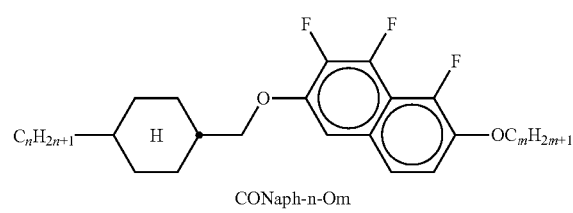
CONaph-n-Om TABLE A2-continued
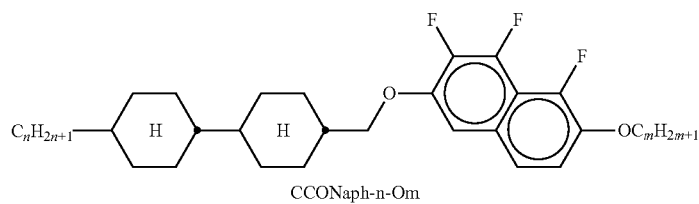
CCONaph-n-Om
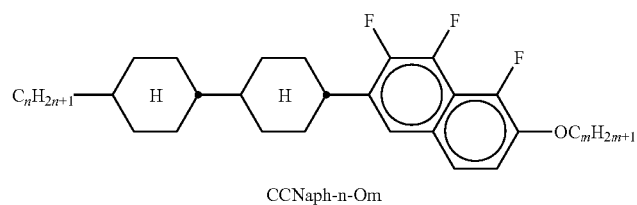
CCNaph-n-Om
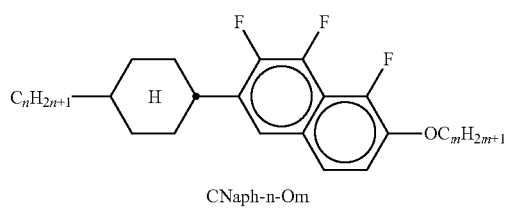
CNaph-n-Om
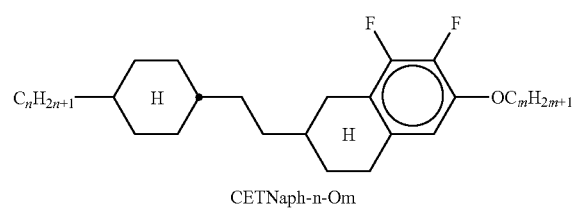
CETNaph-n-Om
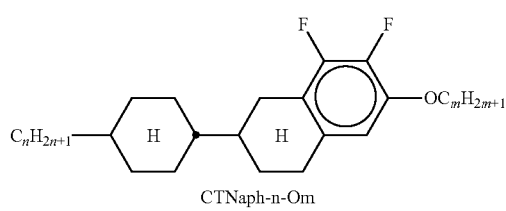
CTNaph-n-Om
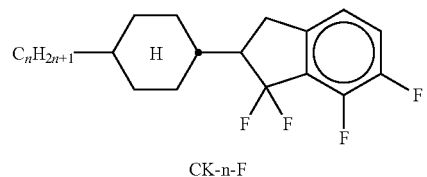
CK-n-F
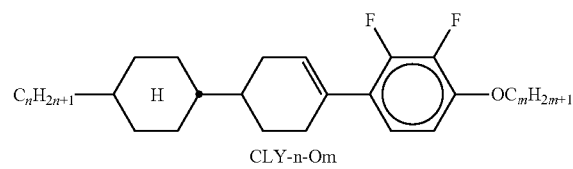
CLY-n-Om
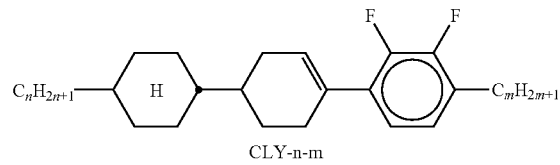
CLY-n-m TABLE A2-continued
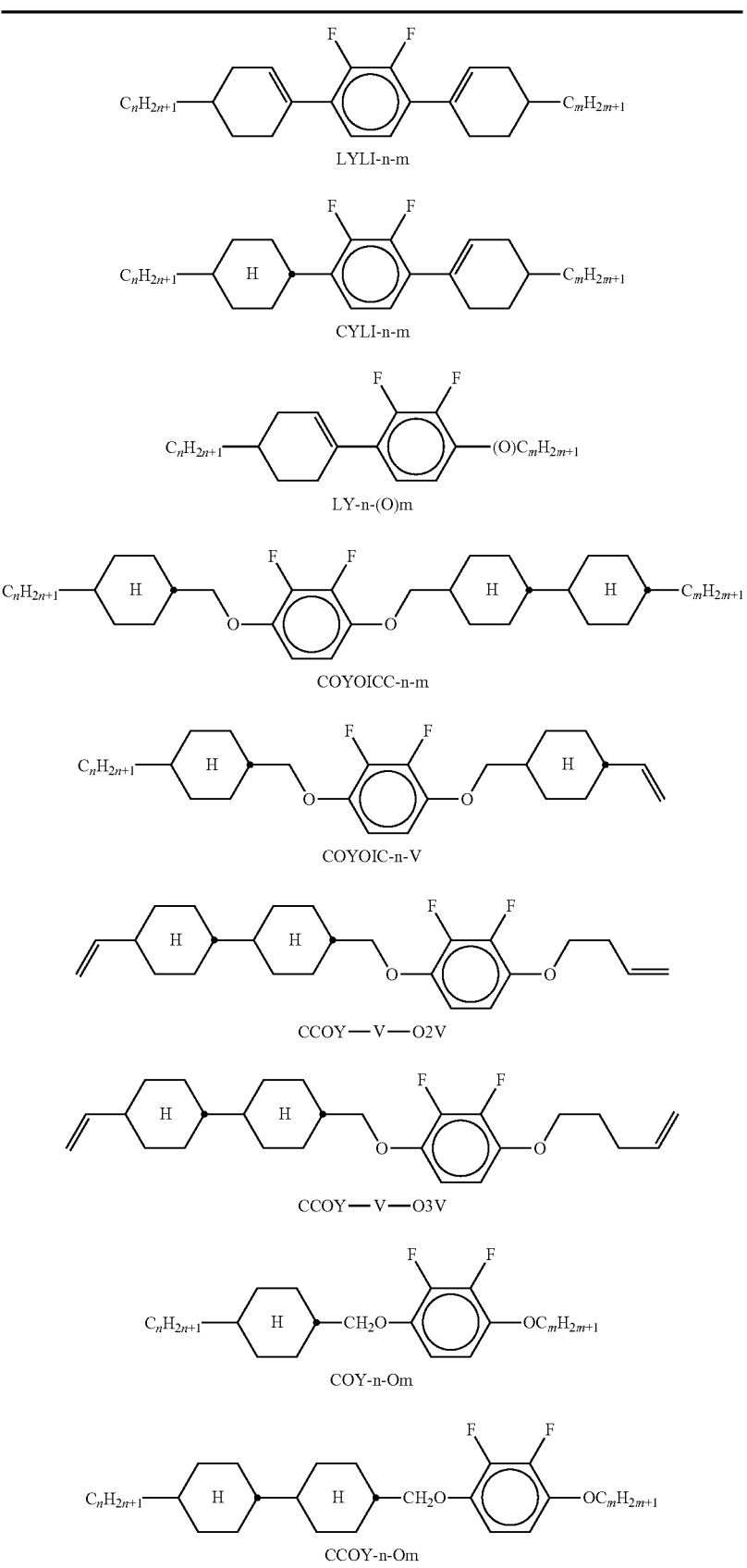

TABLE A2-continued
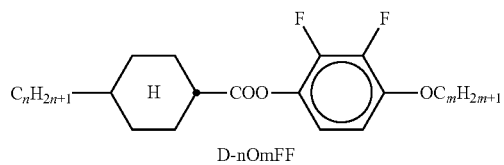
D-nOmFF
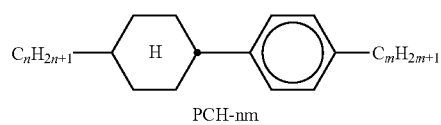
PCH-nm
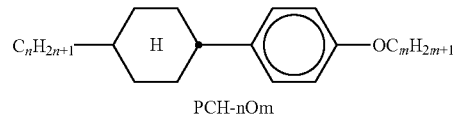
PCH-nOm
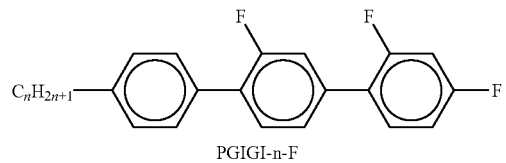
PGIGI-n-F
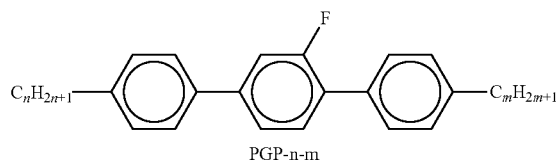
PGP-n-m
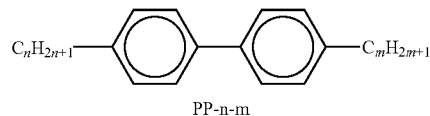
PP-n-m
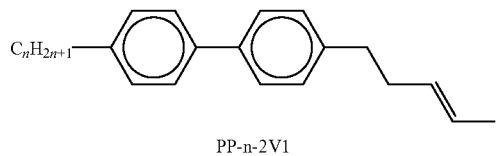
PP-n-2V1
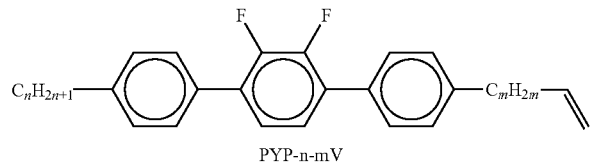
PYP-n-mV
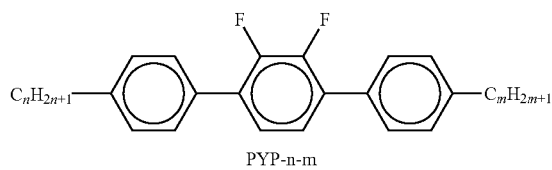
PYP-n-m
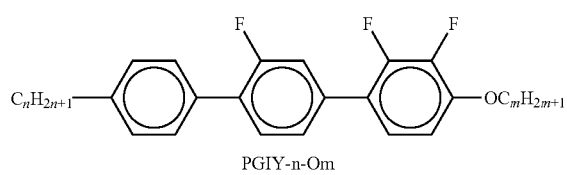
PGIY-n-Om TABLE A2-continued
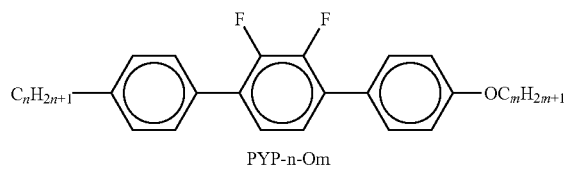
PYP-n-Om
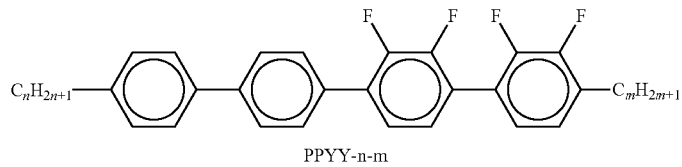
PPYY-n-m
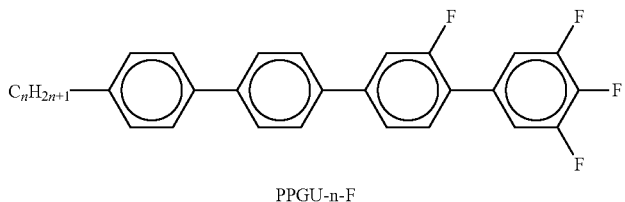
PPGU-n-F
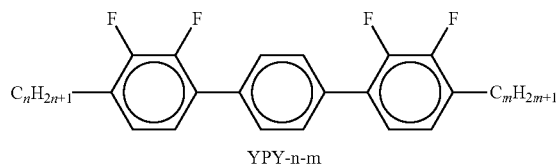
YPY-n-m
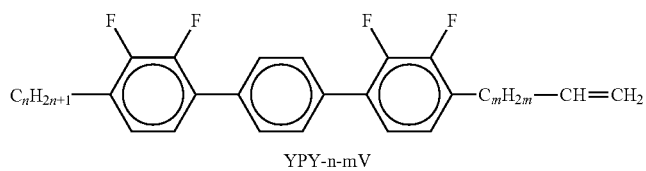
YPY-n-mV
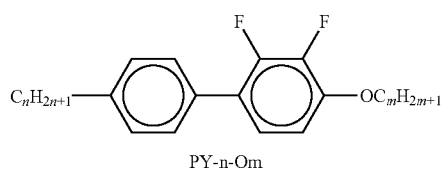
PY-n-Om
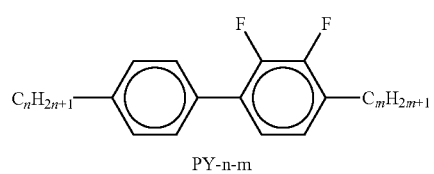
PY-n-m
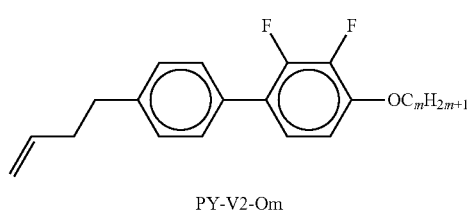
PY-V2-Om TABLE A2-continued
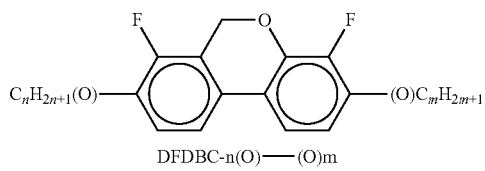
DFDBC-n(O)—(O)m
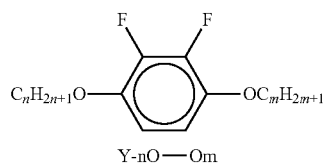
Y-nO—Om
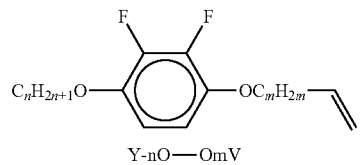
Y-nO—OmV
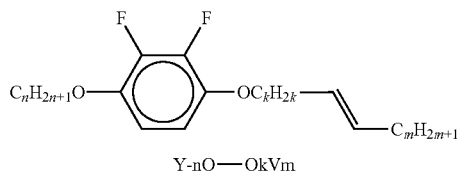
Y-nO—OkVm
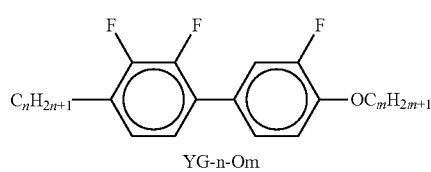
YG-n-Om
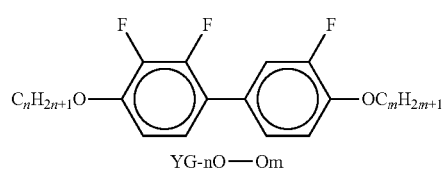
YG-nO—Om
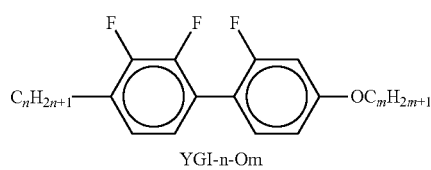
YGI-n-Om
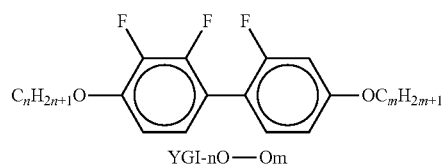
YGI-nO—Om
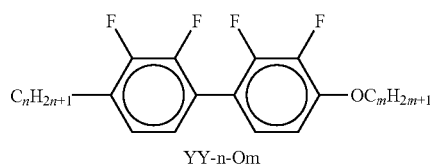
YY-n-Om TABLE A2-continued

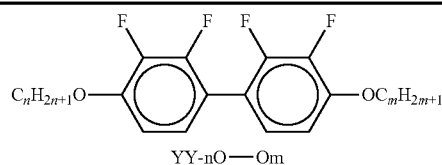

YY-nO—Om

In the formulae below m and n are independently of each other an integer from 1 to 12, preferably 1, 2, 3, 4, 5 or 6, k is 0, 1, 2, 3, 4, 5 or 6 and $(O)C_mH_{2m+1}$ means $C_mH_{2m+1}$ or $OC_mH_{2m+1}$.

In a first preferred embodiment of the present invention, the LC media according to the invention, especially those with positive dielectric anisotropy, comprise one or more compounds selected from the group consisting of compounds from Table A1.

In a second preferred embodiment of the present invention, the LC media according to the invention, especially those with negative dielectric anisotropy, comprise one or more compounds selected from the group consisting of compounds from Table A2.

TABLE B

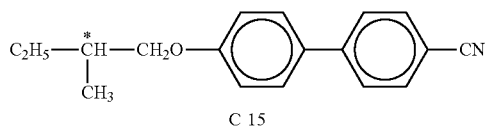

C 15

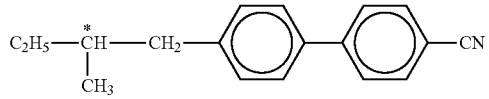

CB 15

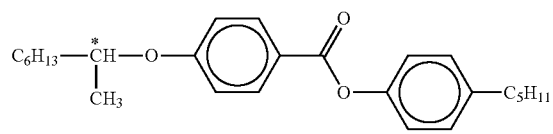

CM 21

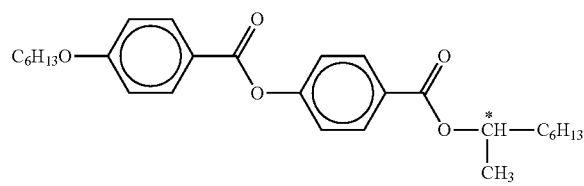

R/S-811

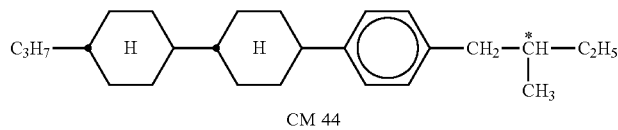

CM 44

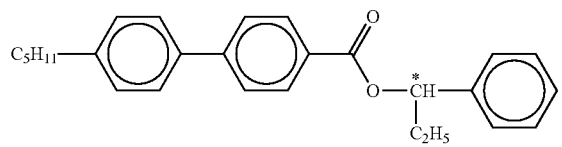

CM 45

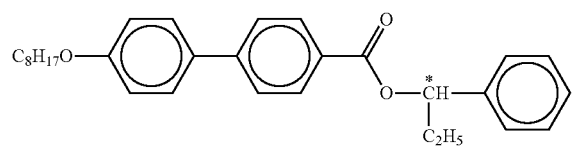

CM 47

TABLE B-continued

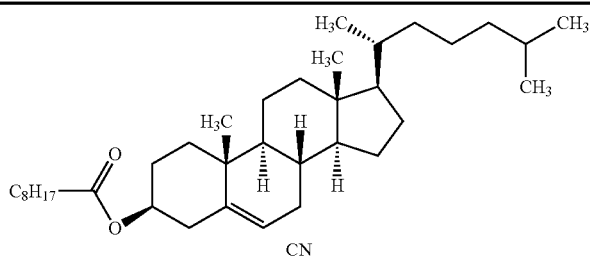

R/S-2011

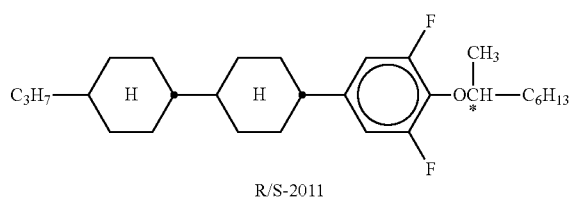

R/S-3011

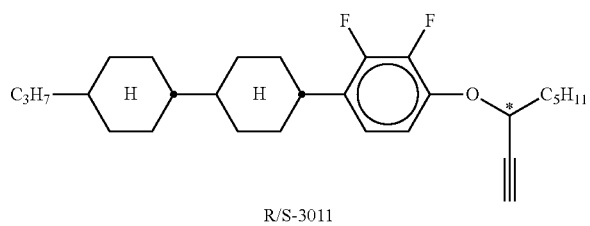

R/S-4011

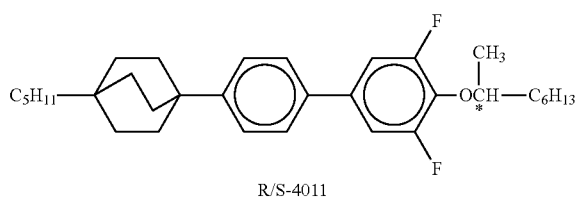

R/S-5011

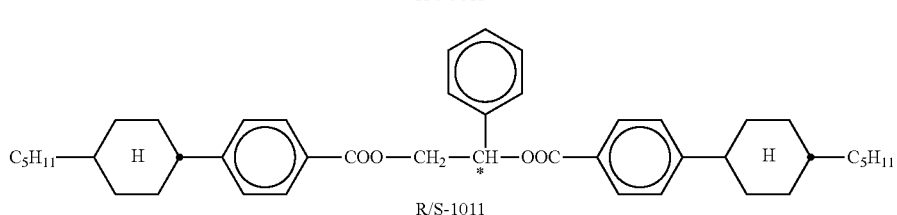

R/S-1011

Table B shows possible chiral dopants which can be added to the LC media according to the invention.

The LC media preferably comprise 0 to 10% by weight, in particular 0.01 to 5% by weight, particularly preferably 0.1 to 3% by weight, of dopants. The LC media preferably comprise one or more dopants selected from the group consisting of compounds from Table B.

TABLE C
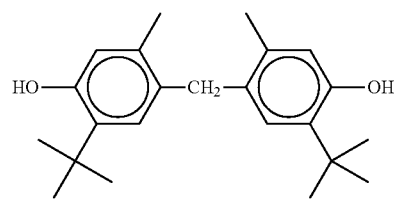
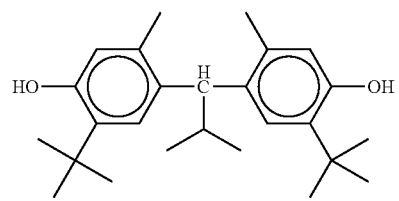
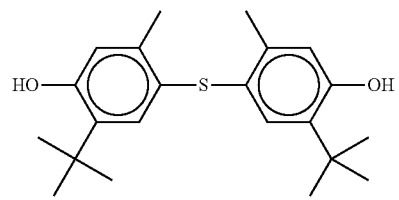
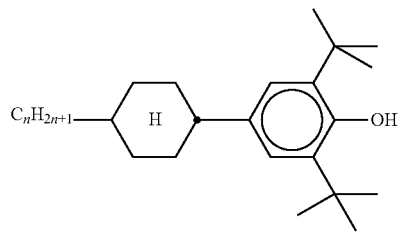
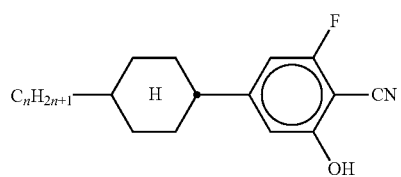
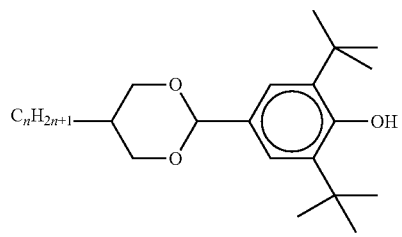
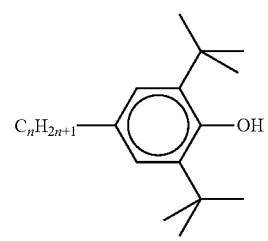

TABLE C-continued
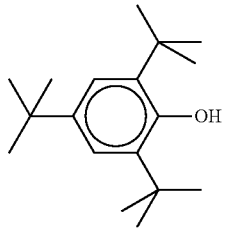
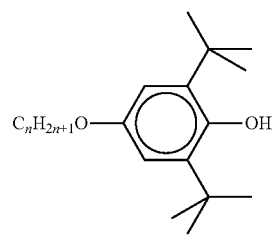
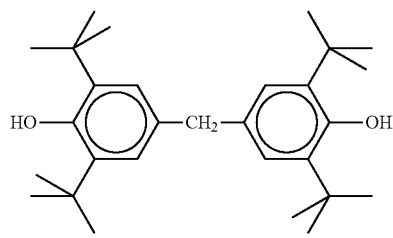
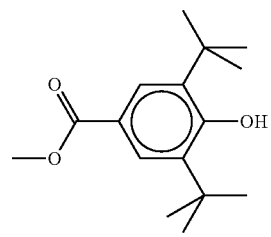
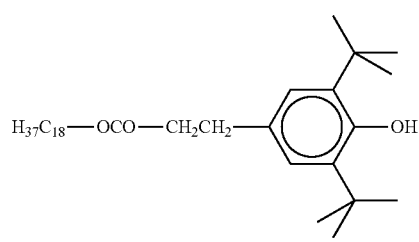
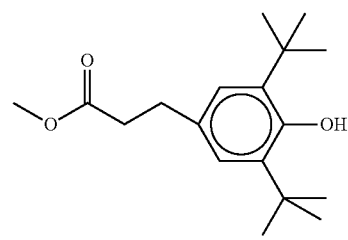

TABLE C-continued
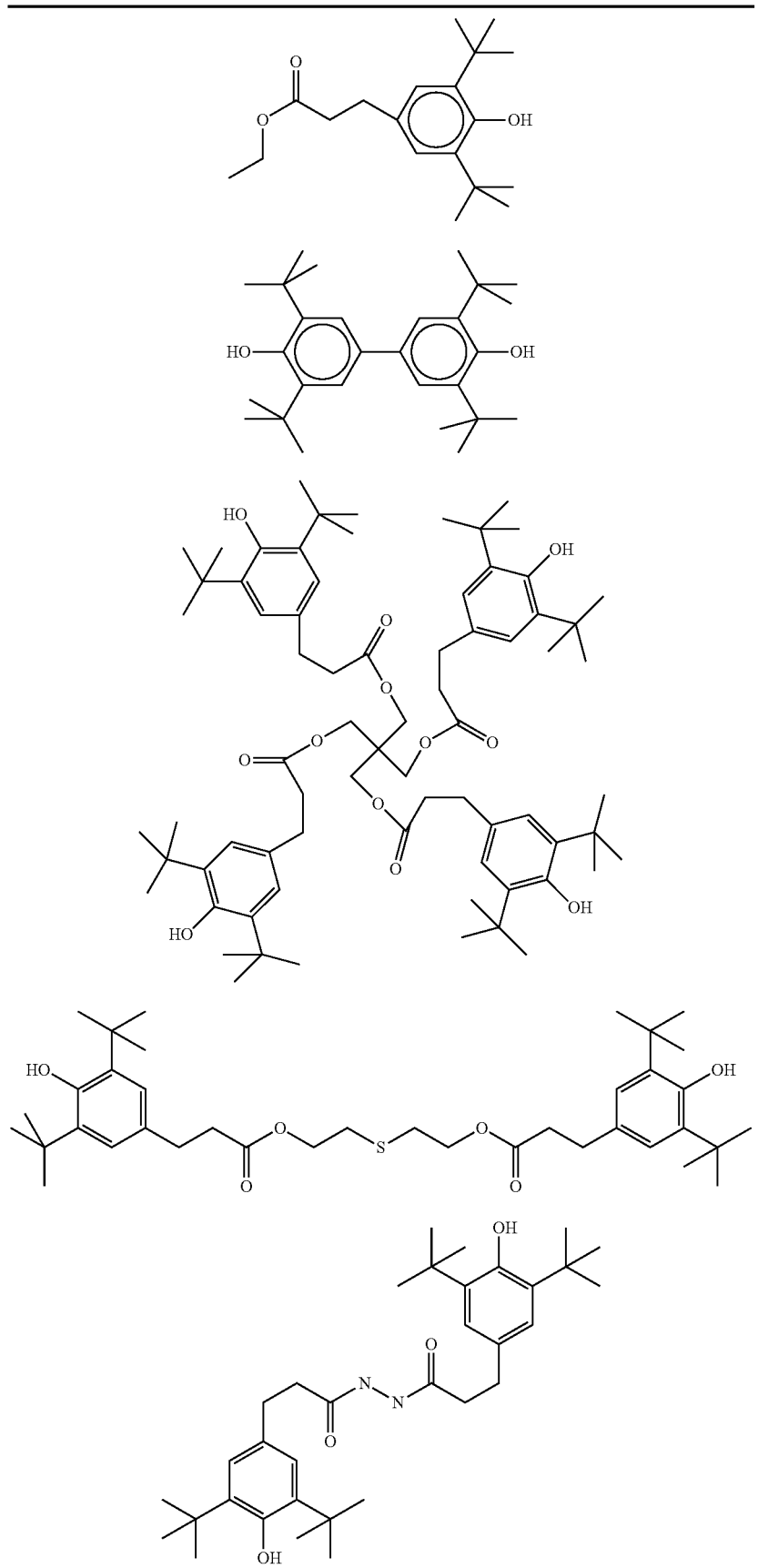

TABLE C-continued
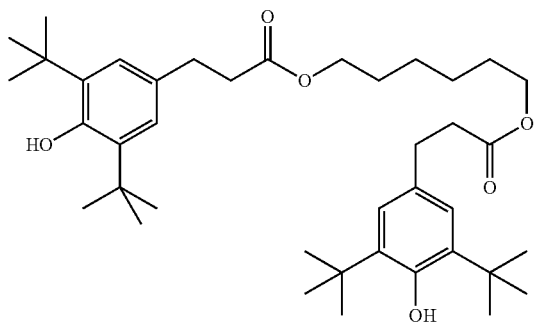 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
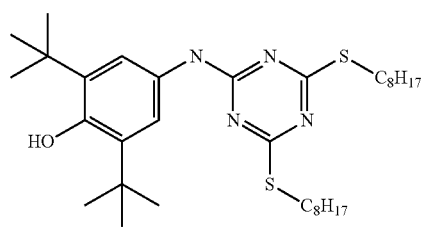
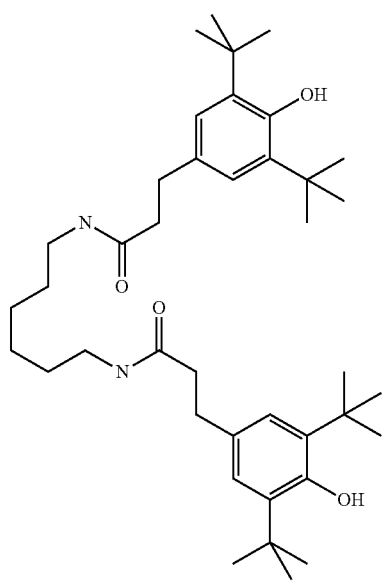 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
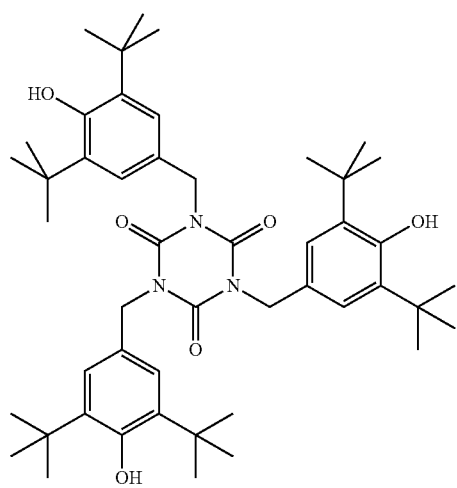 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]

TABLE C-continued
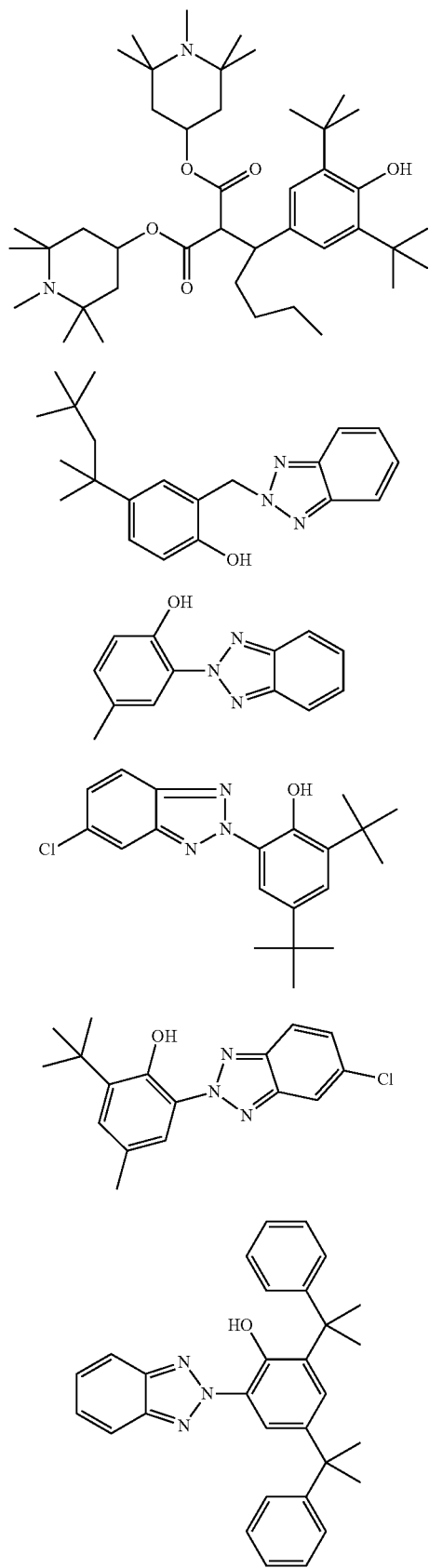

TABLE C-continued
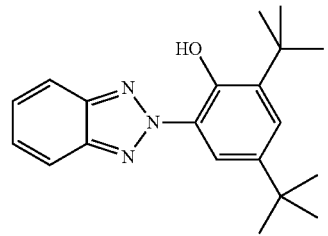 [SMILES: CC(C)(C)c1cc(-n2nc3ccccc3n2)c(O)c(C(C)(C)C)c1]
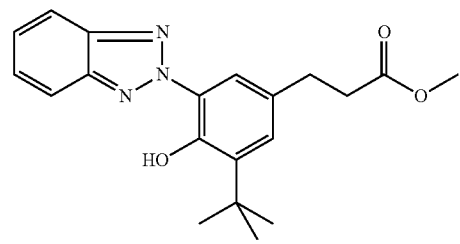 [SMILES: COC(=O)CCc1cc(-n2nc3ccccc3n2)c(O)c(C(C)(C)C)c1]
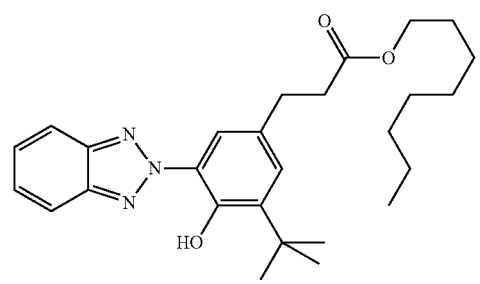 [SMILES: CCCCCCCCOC(=O)CCc1cc(-n2nc3ccccc3n2)c(O)c(C(C)(C)C)c1]
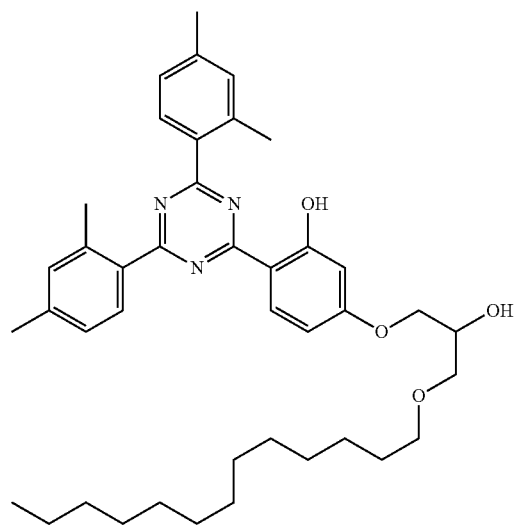 [SMILES: CCCCCCCCCCCCCOCC(O)COc1ccc(-c2nc(-c3ccc(C)cc3C)nc(-c3ccc(C)cc3C)n2)c(O)c1]

TABLE C-continued
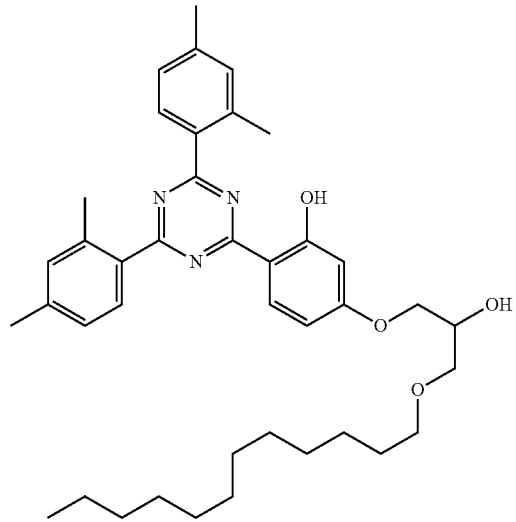 [SMILES: CCCCCCCCCCCCOCC(O)COc1ccc(-c2nc(-c3ccc(C)cc3C)nc(-c3ccc(C)cc3C)n2)c(O)c1]
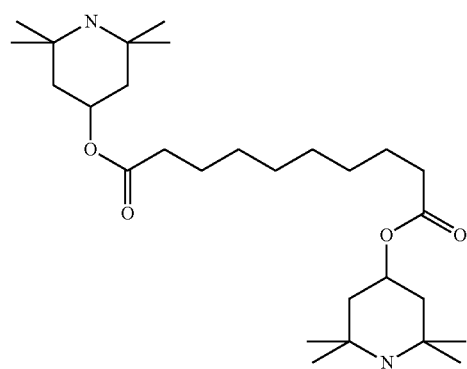
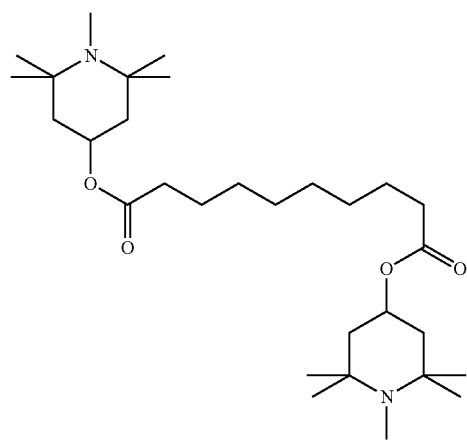

TABLE C-continued
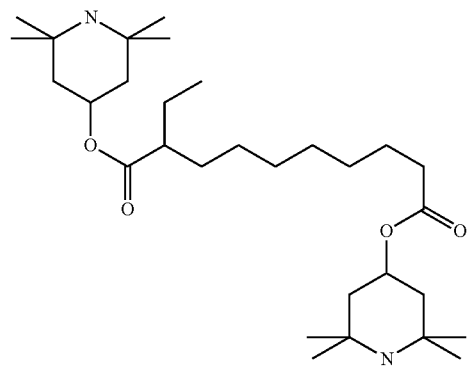
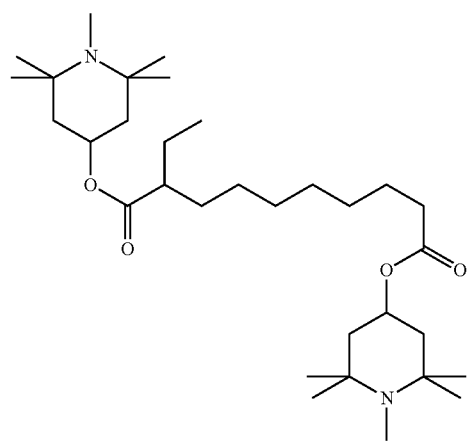
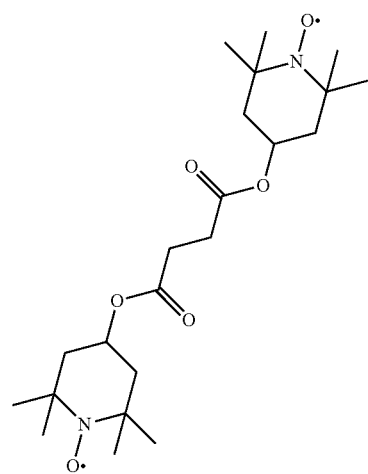

TABLE C-continued
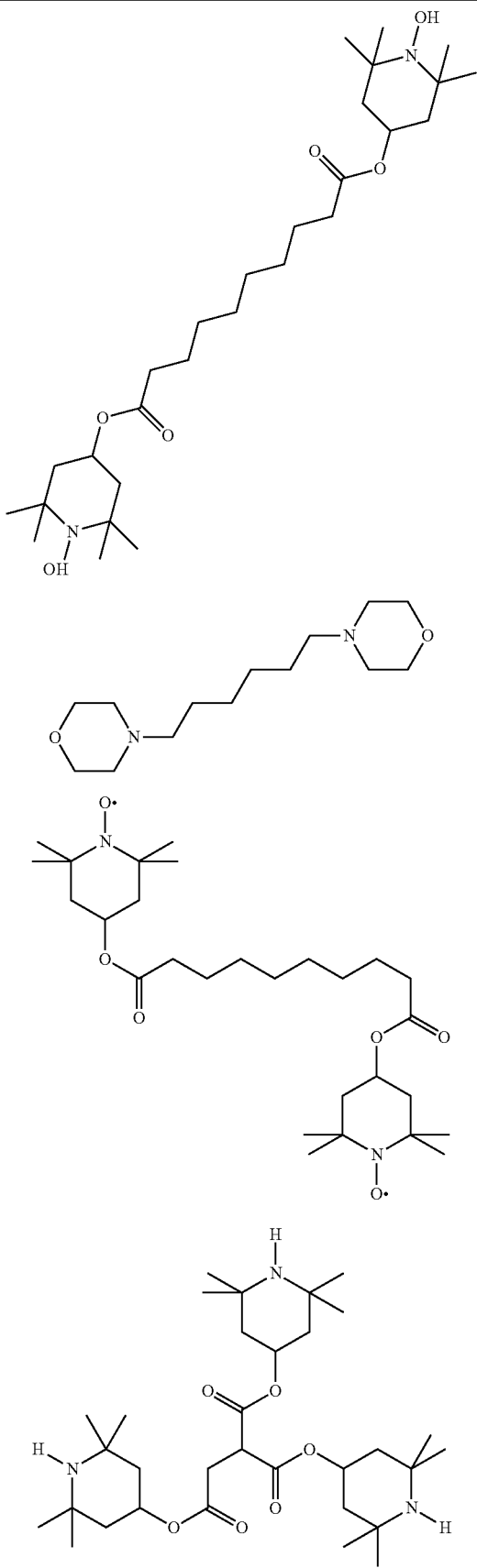

TABLE C-continued
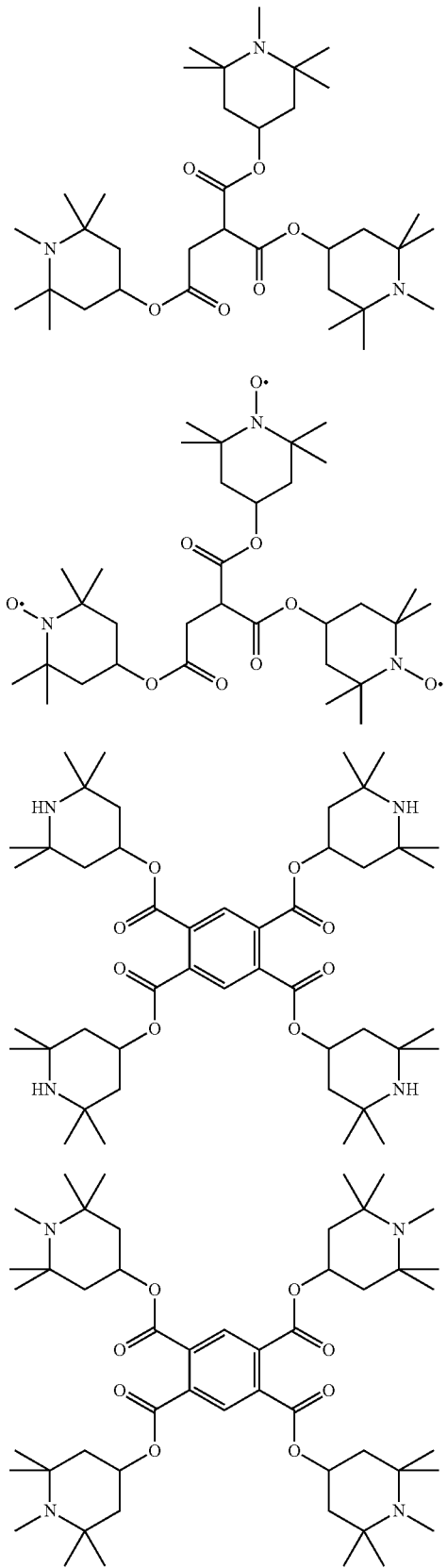

TABLE C-continued

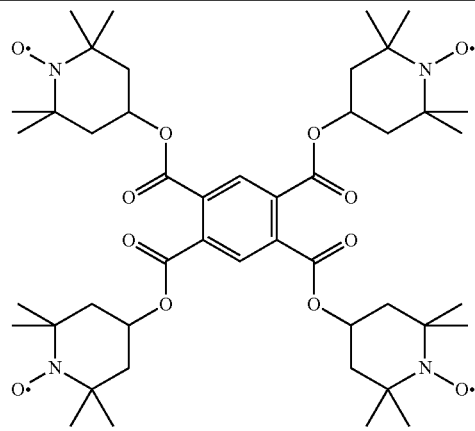

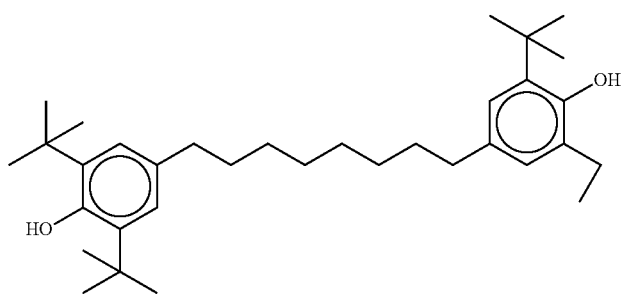

Table C shows possible stabilisers which can be added to the LC media according to the invention. Therein n denotes an integer from 1 to 12, preferably 1, 2, 3, 4, 5, 6, 7 or 8, and terminal methyl groups are not shown.

The LC media preferably comprise 0 to 10% by weight, in particular 1 ppm to 5% by weight, particularly preferably 1 ppm to 1% by weight, of stabilisers. The LC media preferably comprise one or more stabilisers selected from the group consisting of compounds from Table C.

TABLE D

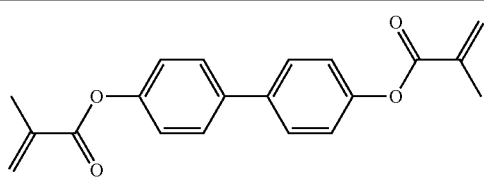

RM-1

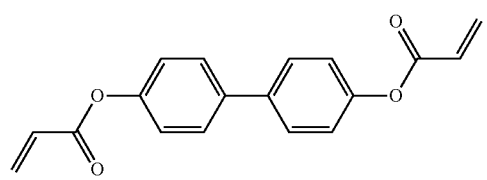

RM-2

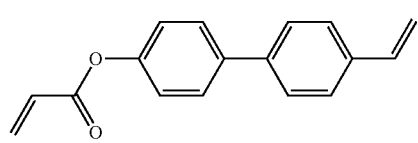 [SMILES: C=CC(=O)Oc1ccc(-c2ccc(C=C)cc2)cc1]

RM-3

TABLE D-continued
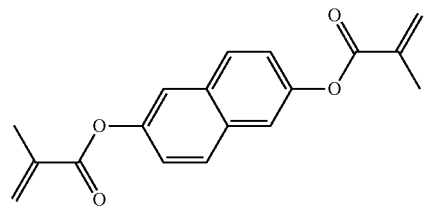 [SMILES: C=C(C)C(=O)Oc1ccc2cc(OC(=O)C(=C)C)ccc2c1] RM-4
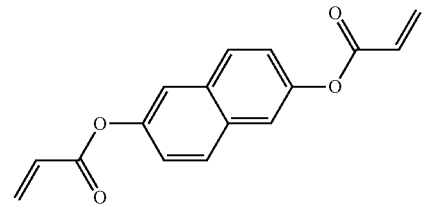 [SMILES: C=CC(=O)Oc1ccc2cc(OC(=O)C=C)ccc2c1] RM-5
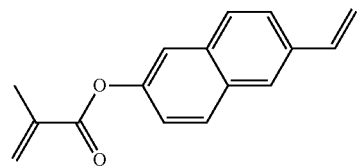 [SMILES: C=Cc1ccc2cc(OC(=O)C(=C)C)ccc2c1] RM-6
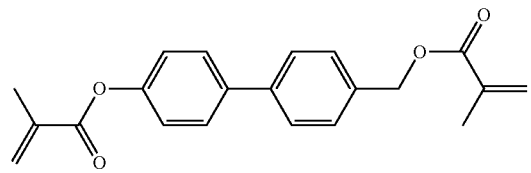 [SMILES: C=C(C)C(=O)OCc1ccc(-c2ccc(OC(=O)C(=C)C)cc2)cc1] RM-7
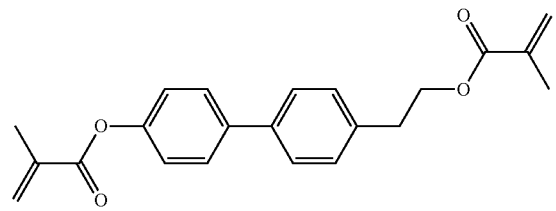 [SMILES: C=C(C)C(=O)OCCc1ccc(-c2ccc(OC(=O)C(=C)C)cc2)cc1] RM-8
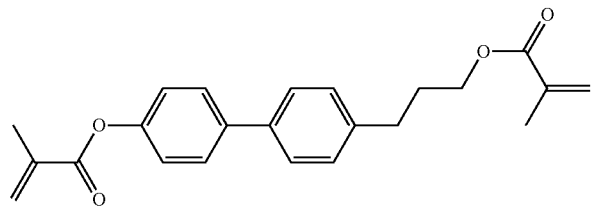 [SMILES: C=C(C)C(=O)OCCCc1ccc(-c2ccc(OC(=O)C(=C)C)cc2)cc1] RM-9
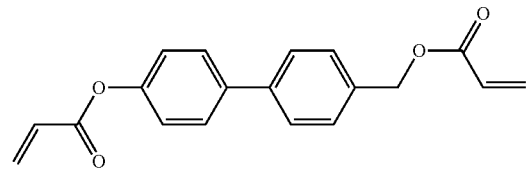 [SMILES: C=CC(=O)OCc1ccc(-c2ccc(OC(=O)C=C)cc2)cc1] RM-10
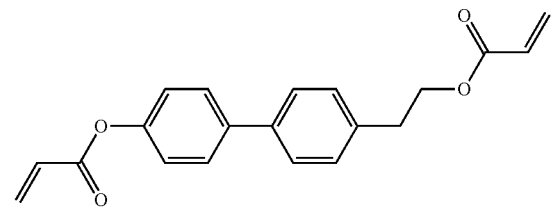 [SMILES: C=CC(=O)OCCc1ccc(-c2ccc(OC(=O)C=C)cc2)cc1] RM-11

TABLE D-continued
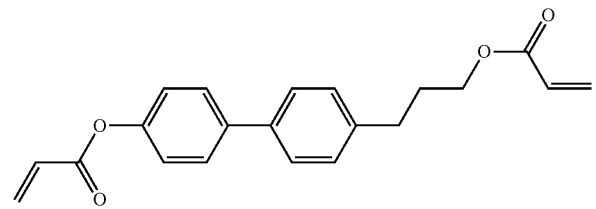 [SMILES: C=CC(=O)OCCCc1ccc(-c2ccc(OC(=O)C=C)cc2)cc1] RM-12
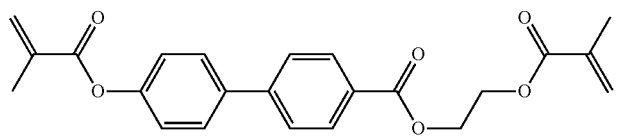 RM-13
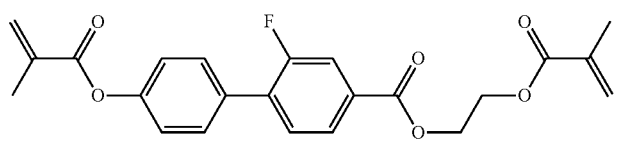 [SMILES: C=C(C)C(=O)OCCOC(=O)c1ccc(-c2ccc(OC(=O)C(=C)C)cc2)c(F)c1] RM-14
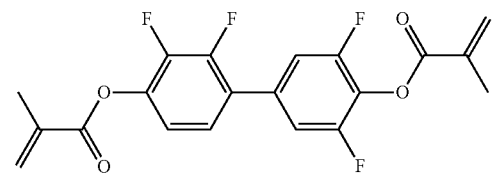 RM-15
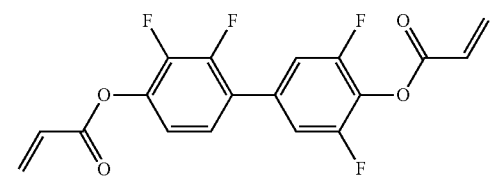 [SMILES: C=CC(=O)Oc1ccc(-c2cc(F)c(OC(=O)C=C)c(F)c2)c(F)c1F] RM-16
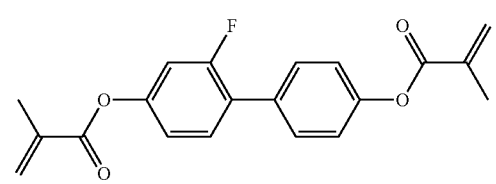 RM-17
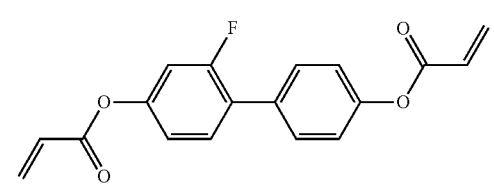 [SMILES: C=CC(=O)Oc1ccc(-c2ccc(OC(=O)C=C)cc2F)cc1] RM-18
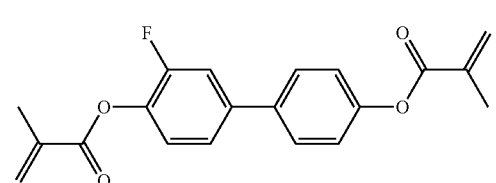 RM-19
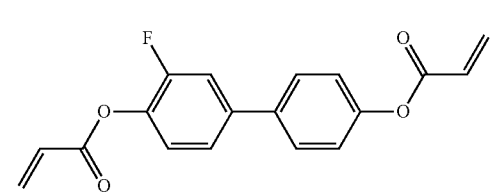 RM-20

TABLE D-continued
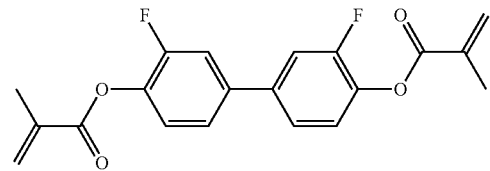 RM-21
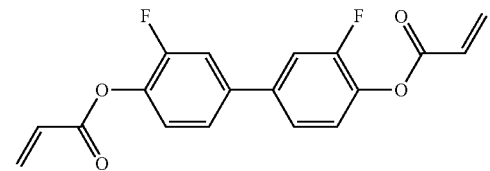 [SMILES: C=CC(=O)Oc1ccc(-c2ccc(OC(=O)C=C)c(F)c2)cc1] RM-22
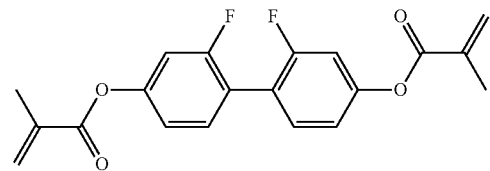 RM-23
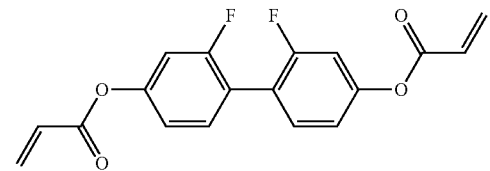 RM-24
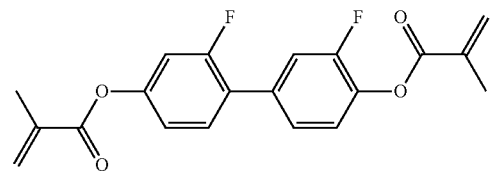 [SMILES: C=C(C)C(=O)Oc1ccc(-c2ccc(OC(=O)C(=C)C)c(F)c2)c(F)c1] RM-25
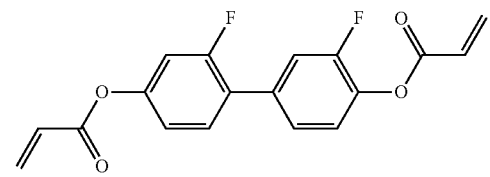 [SMILES: C=CC(=O)Oc1ccc(-c2ccc(OC(=O)C=C)c(F)c2)c(F)c1] RM-26
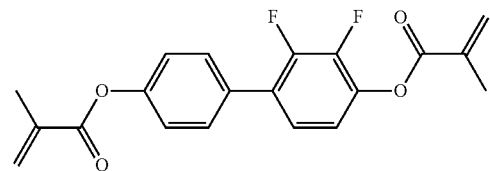 RM-27
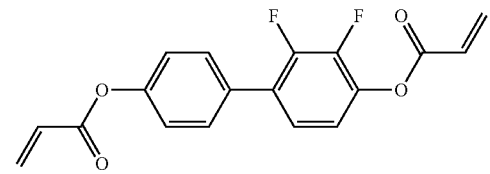 [SMILES: C=CC(=O)Oc1ccc(-c2ccc(OC(=O)C=C)c(F)c2F)cc1] RM-28
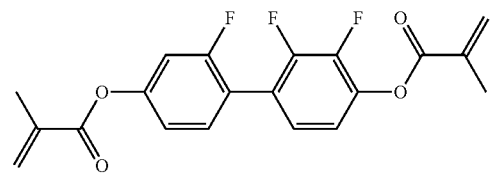 [SMILES: C=C(C)C(=O)Oc1ccc(-c2ccc(OC(=O)C(=C)C)c(F)c2F)c(F)c1] RM-29

TABLE D-continued

| | |
|---|---|
| (structure) | RM-30 |
| (structure) | RM-31 |
| (structure) | RM-32 |
| (structure) | RM-33 |
| (structure) | RM-34 |
| (structure) | RM-35 |
| (structure) | RM-36 |
| (structure) | RM-37 |
| (structure) | RM-38 |

TABLE D-continued
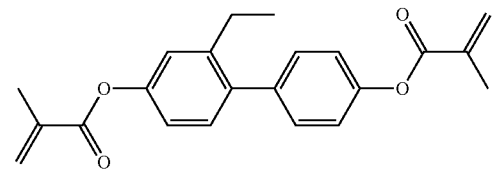 RM-39
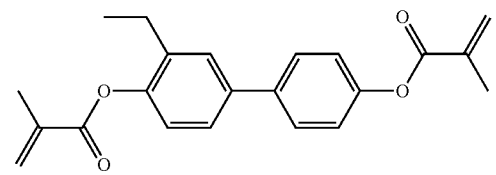 RM-40
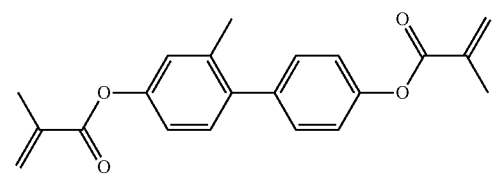 [SMILES: C=C(C)C(=O)Oc1ccc(-c2ccc(OC(=O)C(=C)C)cc2C)cc1] RM-41
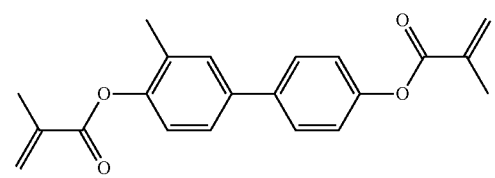 RM-42
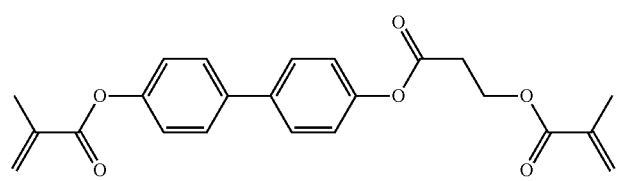 [SMILES: C=C(C)C(=O)OCCC(=O)Oc1ccc(-c2ccc(OC(=O)C(=C)C)cc2)cc1] RM-43
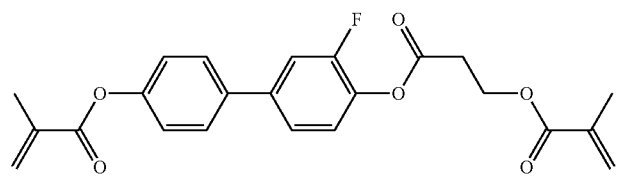 RM-44
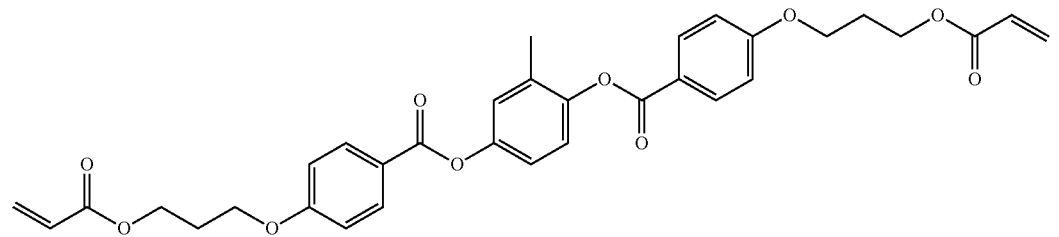 [SMILES: C=CC(=O)OCCCOc1ccc(C(=O)Oc2ccc(OC(=O)c3ccc(OCCCOC(=O)C=C)cc3)c(C)c2)cc1] RM-45

TABLE D-continued
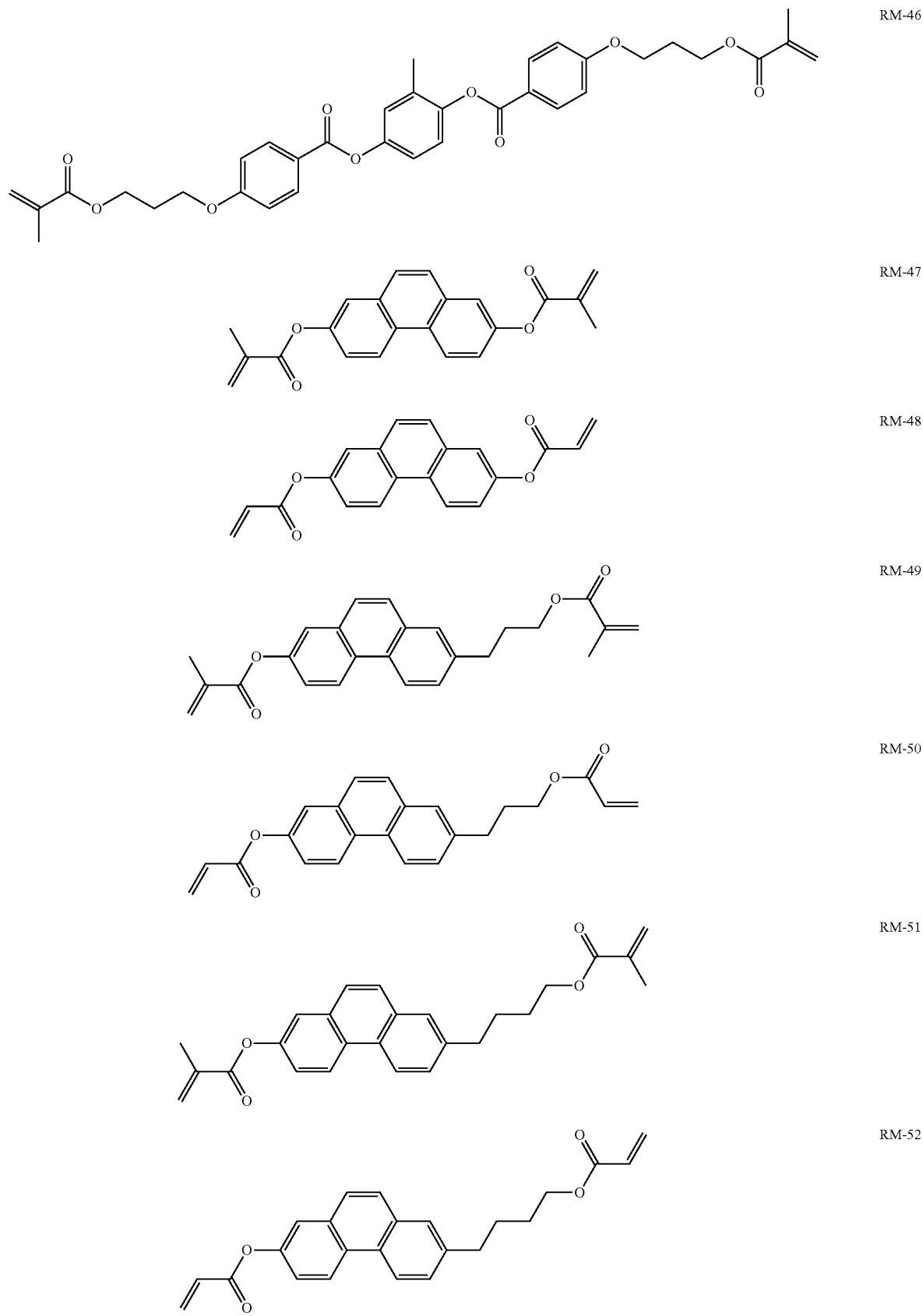

TABLE D-continued

| | |
|---|---|
| (structure) | RM-53 |
| (structure) | RM-54 |
| (structure) | RM-55 |
| (structure) | RM-56 |
| (structure) | RM-57 |
| (structure) | RM-58 |
| (structure) | RM-59 |
| (structure) | RM-60 |

TABLE D-continued
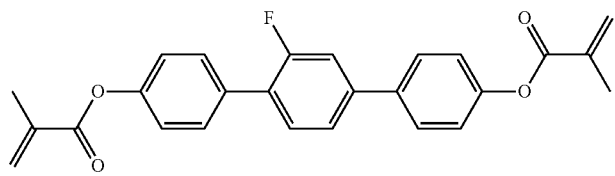 [SMILES: C=C(C)C(=O)Oc1ccc(-c2ccc(-c3ccc(OC(=O)C(=C)C)cc3)c(F)c2)cc1]
RM-61
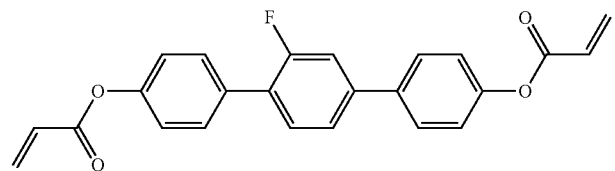 [SMILES: C=CC(=O)Oc1ccc(-c2ccc(-c3ccc(OC(=O)C=C)cc3)c(F)c2)cc1]
RM-62
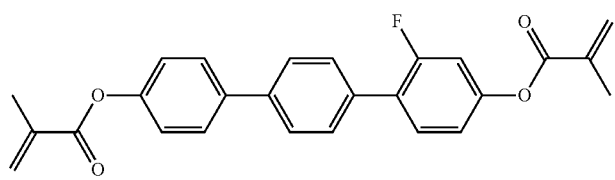
RM-63
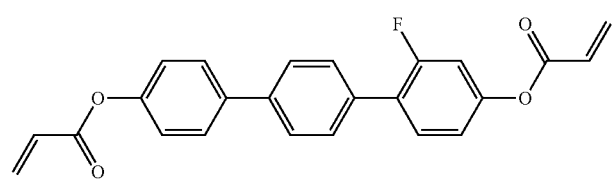 [SMILES: C=CC(=O)Oc1ccc(-c2ccc(-c3ccc(OC(=O)C=C)cc3F)cc2)cc1]
RM-64
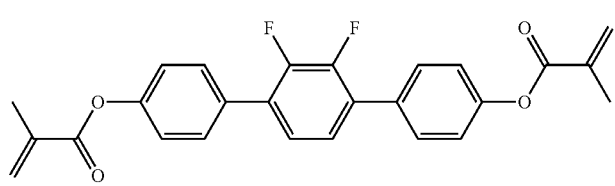
RM-65
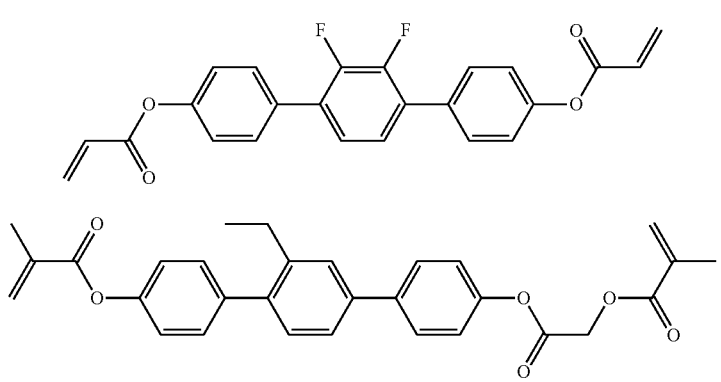
RM-66
RM-67
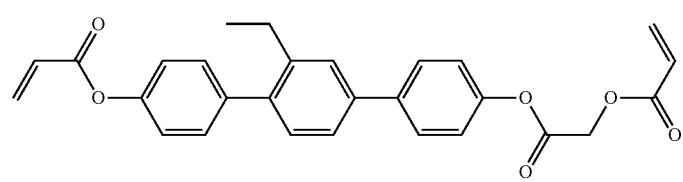 [SMILES: C=CC(=O)OCC(=O)Oc1ccc(-c2ccc(-c3ccc(OC(=O)C=C)cc3)c(CC)c2)cc1]
RM-68
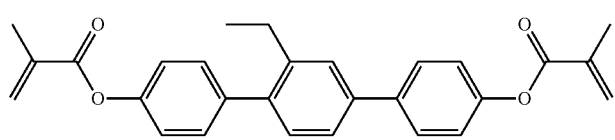
RM-69

TABLE D-continued
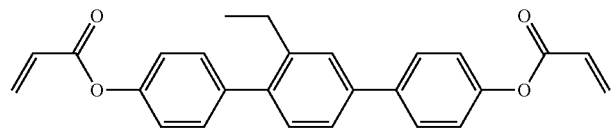 [SMILES: C=CC(=O)Oc1ccc(-c2ccc(-c3ccc(OC(=O)C=C)cc3)c(CC)c2)cc1] RM-70
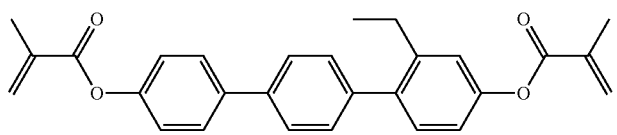 [SMILES: C=C(C)C(=O)Oc1ccc(-c2ccc(-c3ccc(OC(=O)C(=C)C)cc3CC)cc2)cc1] RM-71
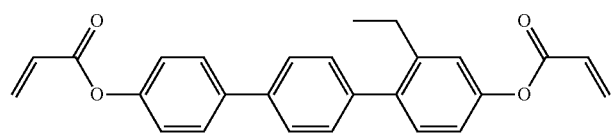 RM-72
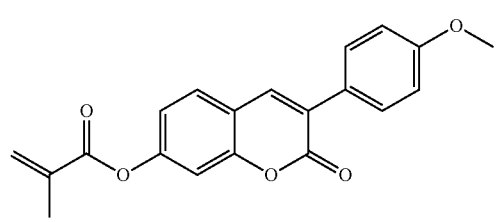 [SMILES: C=C(C)C(=O)Oc1ccc2cc(-c3ccc(OC)cc3)c(=O)oc2c1] RM-73
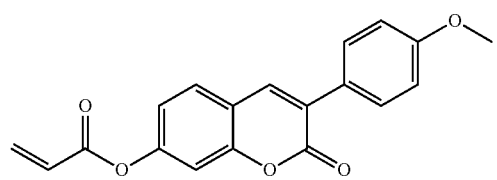 [SMILES: C=CC(=O)Oc1ccc2cc(-c3ccc(OC)cc3)c(=O)oc2c1] RM-74
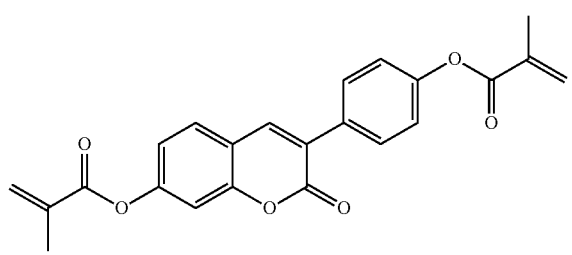 [SMILES: C=C(C)C(=O)Oc1ccc(-c2cc3ccc(OC(=O)C(=C)C)cc3oc2=O)cc1] RM-75
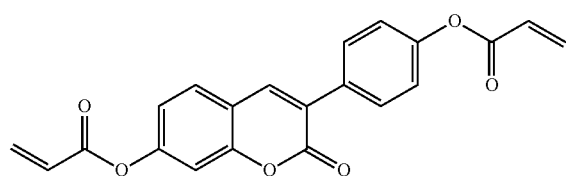 [SMILES: C=CC(=O)Oc1ccc(-c2cc3ccc(OC(=O)C=C)cc3oc2=O)cc1] RM-76
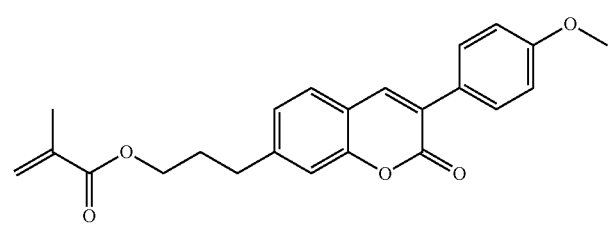 [SMILES: C=C(C)C(=O)OCCCc1ccc2cc(-c3ccc(OC)cc3)c(=O)oc2c1] RM-77

TABLE D-continued
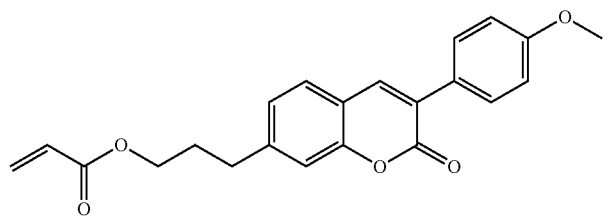 [SMILES: C=CC(=O)OCCCc1ccc2cc(-c3ccc(OC)cc3)c(=O)oc2c1] RM-78
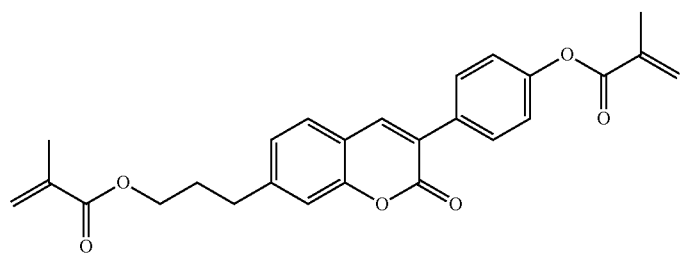 [SMILES: C=C(C)C(=O)OCCCc1ccc2cc(-c3ccc(OC(=O)C(=C)C)cc3)c(=O)oc2c1] RM-79
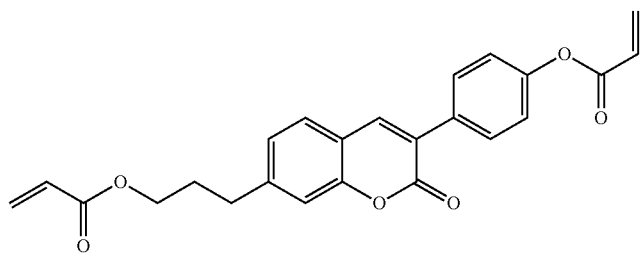 [SMILES: C=CC(=O)OCCCc1ccc2cc(-c3ccc(OC(=O)C=C)cc3)c(=O)oc2c1] RM-80
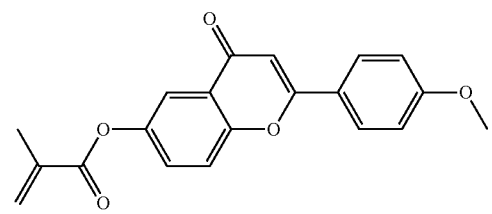 [SMILES: C=C(C)C(=O)Oc1ccc2oc(-c3ccc(OC)cc3)cc(=O)c2c1] RM-81
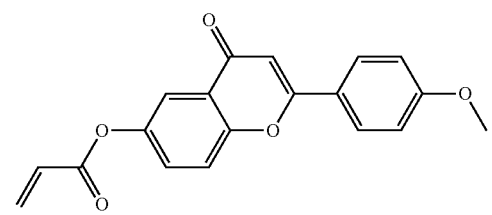 [SMILES: C=CC(=O)Oc1ccc2oc(-c3ccc(OC)cc3)cc(=O)c2c1] RM-82
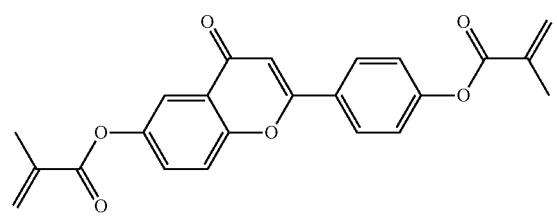 [SMILES: C=C(C)C(=O)Oc1ccc(-c2cc(=O)c3cc(OC(=O)C(=C)C)ccc3o2)cc1] RM-83
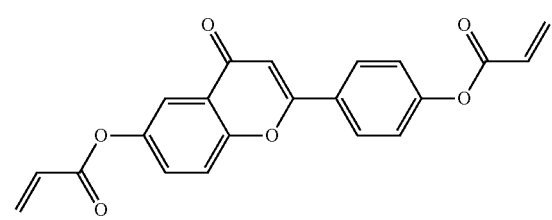 [SMILES: C=CC(=O)Oc1ccc(-c2cc(=O)c3cc(OC(=O)C=C)ccc3o2)cc1] RM-84

TABLE D-continued
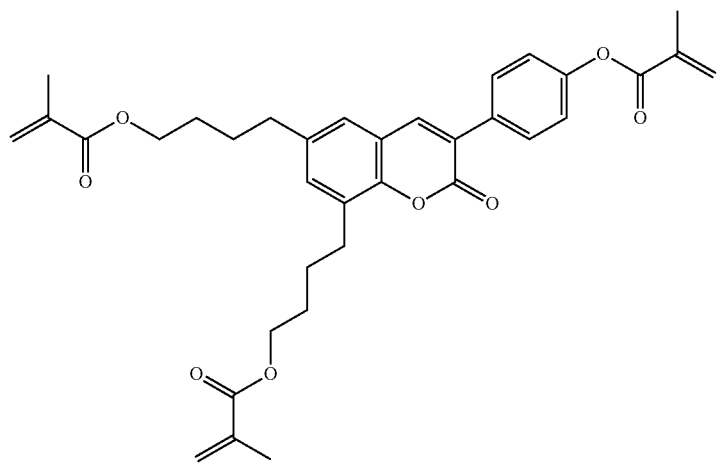 [SMILES: C=C(C)C(=O)OCCCCc1cc(CCCCOC(=O)C(=C)C)c2oc(=O)c(-c3ccc(OC(=O)C(=C)C)cc3)cc2c1]
RM-85
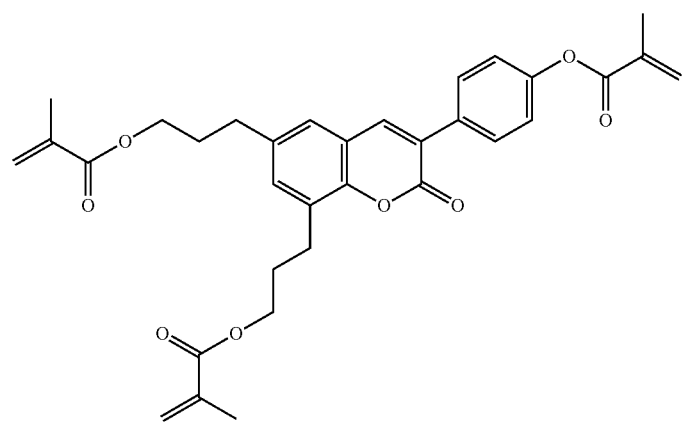 [SMILES: C=C(C)C(=O)OCCCc1cc(CCCOC(=O)C(=C)C)c2oc(=O)c(-c3ccc(OC(=O)C(=C)C)cc3)cc2c1]
RM-86
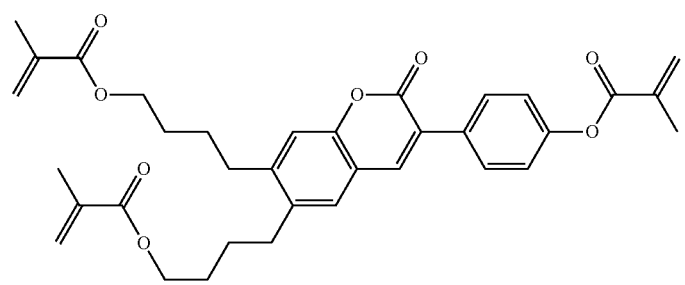 [SMILES: C=C(C)C(=O)OCCCCc1cc2cc(-c3ccc(OC(=O)C(=C)C)cc3)c(=O)oc2cc1CCCCOC(=O)C(=C)C]
RM-87
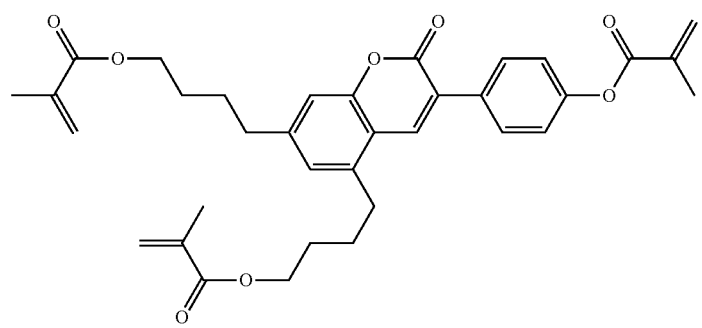 [SMILES: C=C(C)C(=O)OCCCCc1cc(CCCCOC(=O)C(=C)C)c2cc(-c3ccc(OC(=O)C(=C)C)cc3)c(=O)oc2c1]
RM-88

TABLE D-continued
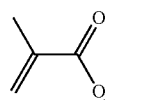
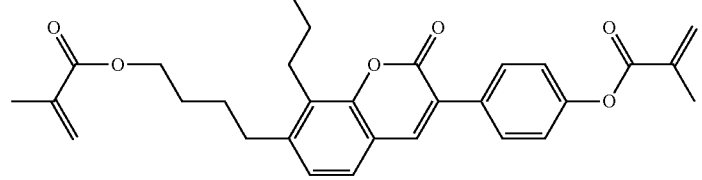
RM-89
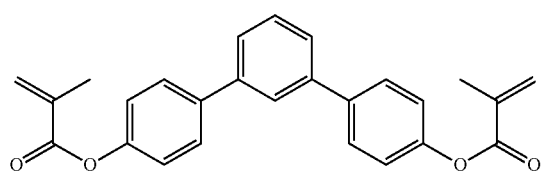 [SMILES: C=C(C)C(=O)Oc1ccc(-c2cccc(-c3ccc(OC(=O)C(=C)C)cc3)c2)cc1]
RM-90
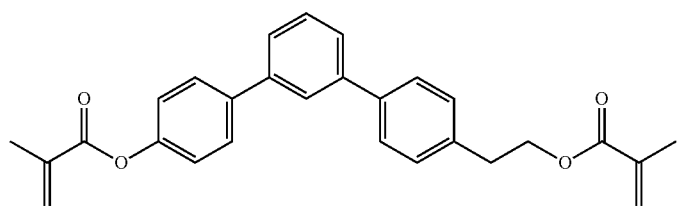 [SMILES: C=C(C)C(=O)OCCc1ccc(-c2cccc(-c3ccc(OC(=O)C(=C)C)cc3)c2)cc1]
RM-91
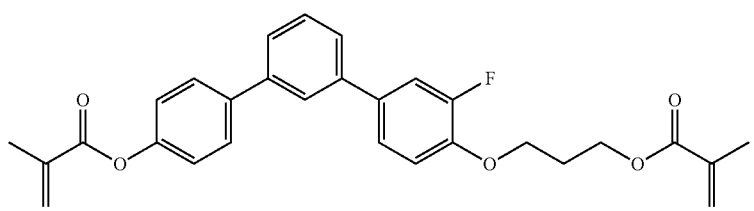 [SMILES: C=C(C)C(=O)OCCCOc1ccc(-c2cccc(-c3ccc(OC(=O)C(=C)C)cc3)c2)cc1F]
RM-92
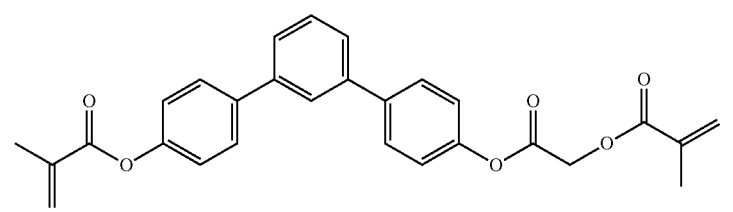 [SMILES: C=C(C)C(=O)OCC(=O)Oc1ccc(-c2cccc(-c3ccc(OC(=O)C(=C)C)cc3)c2)cc1]
RM-93
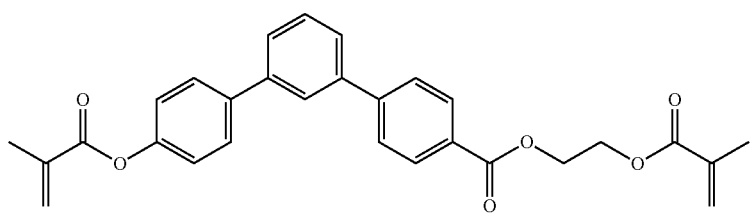 [SMILES: C=C(C)C(=O)OCCOC(=O)c1ccc(-c2cccc(-c3ccc(OC(=O)C(=C)C)cc3)c2)cc1]
RM-94

TABLE D-continued
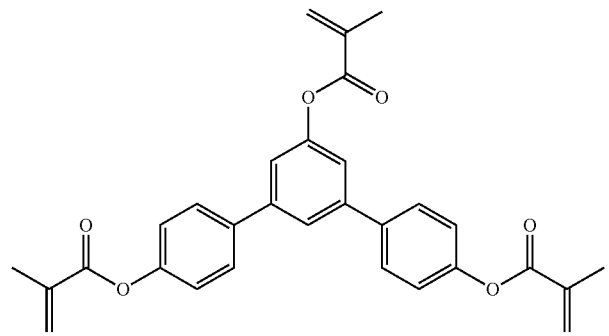 [SMILES: C=C(C)C(=O)Oc1ccc(-c2cc(OC(=O)C(=C)C)cc(-c3ccc(OC(=O)C(=C)C)cc3)c2)cc1]
RM-95
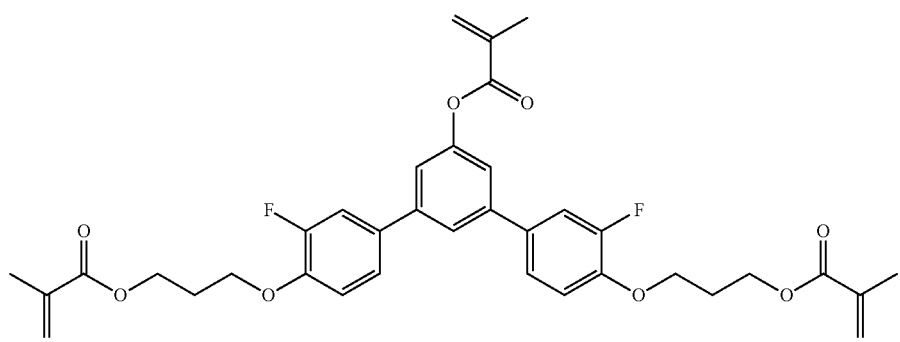 [SMILES: C=C(C)C(=O)OCCCOc1ccc(-c2cc(OC(=O)C(=C)C)cc(-c3ccc(OCCCOC(=O)C(=C)C)c(F)c3)c2)cc1F]
RM-96
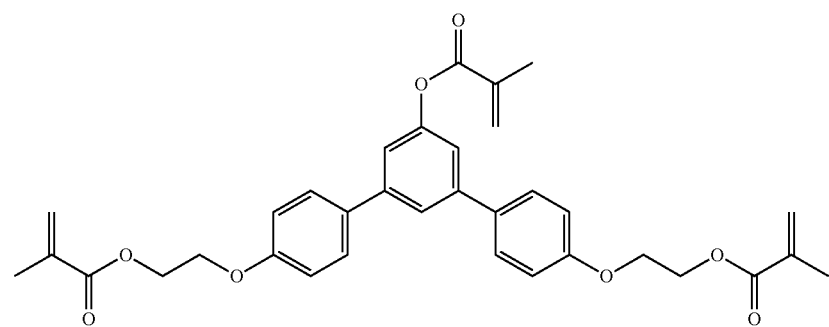 [SMILES: C=C(C)C(=O)OCCOc1ccc(-c2cc(OC(=O)C(=C)C)cc(-c3ccc(OCCOC(=O)C(=C)C)cc3)c2)cc1]
RM-97
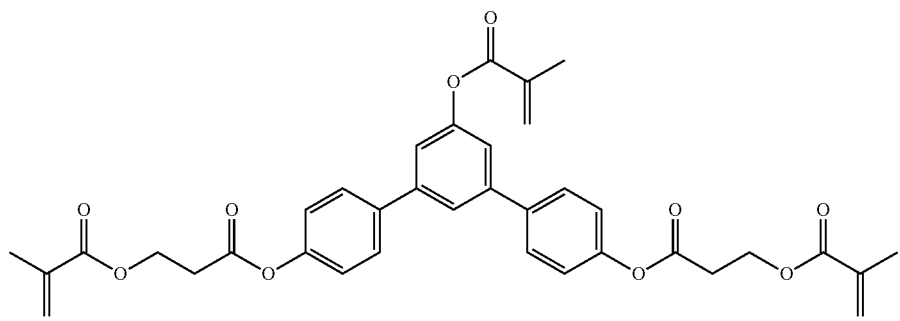 [SMILES: C=C(C)C(=O)OCCC(=O)Oc1ccc(-c2cc(OC(=O)C(=C)C)cc(-c3ccc(OC(=O)CCOC(=O)C(=C)C)cc3)c2)cc1]
RM-98

TABLE D-continued
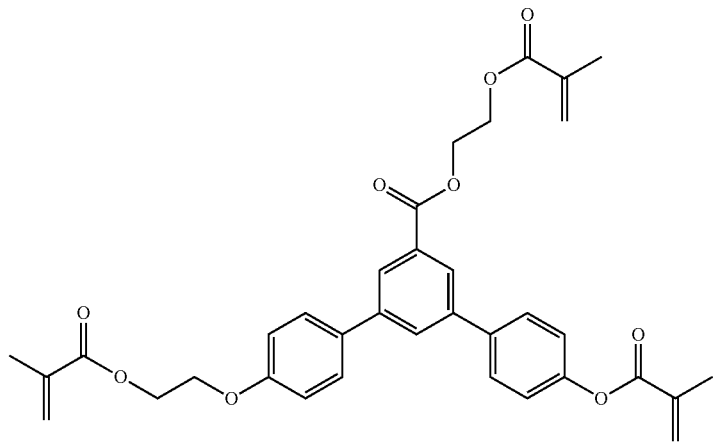 [SMILES: C=C(C)C(=O)OCCOC(=O)c1cc(-c2ccc(OCCOC(=O)C(=C)C)cc2)cc(-c2ccc(OC(=O)C(=C)C)cc2)c1]
RM-99
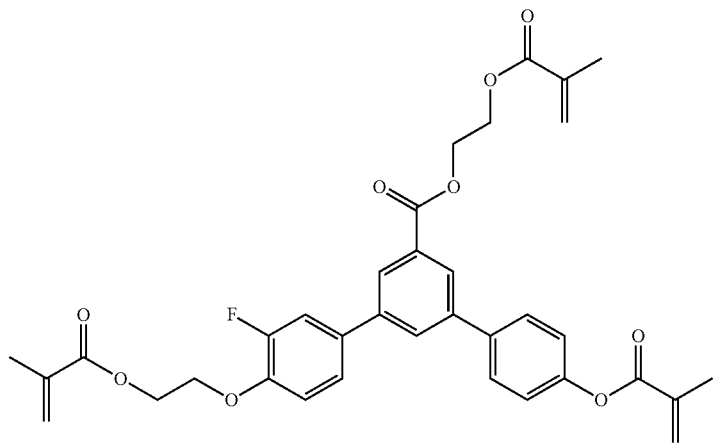 [SMILES: C=C(C)C(=O)OCCOC(=O)c1cc(-c2ccc(OC(=O)C(=C)C)cc2)cc(-c2ccc(OCCOC(=O)C(=C)C)c(F)c2)c1]
RM-100
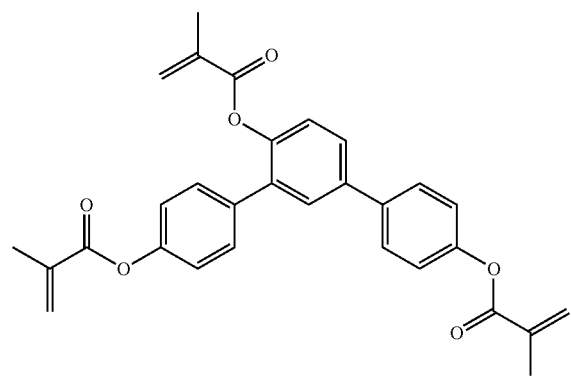 [SMILES: C=C(C)C(=O)Oc1ccc(-c2ccc(OC(=O)C(=C)C)c(-c3ccc(OC(=O)C(=C)C)cc3)c2)cc1]
RM-101
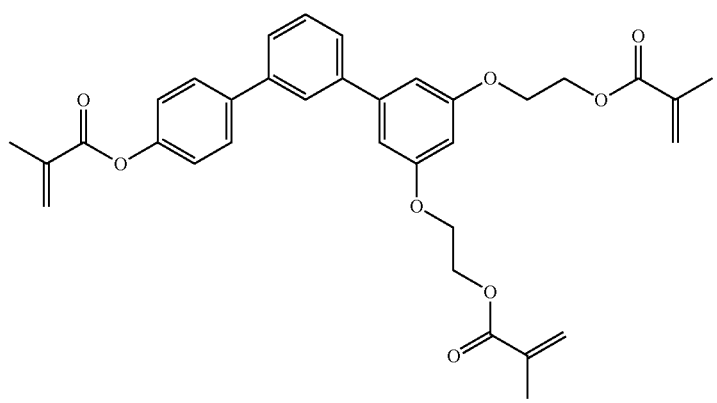 [SMILES: C=C(C)C(=O)OCCOc1cc(OCCOC(=O)C(=C)C)cc(-c2cccc(-c3ccc(OC(=O)C(=C)C)cc3)c2)c1]
RM-102

TABLE D-continued
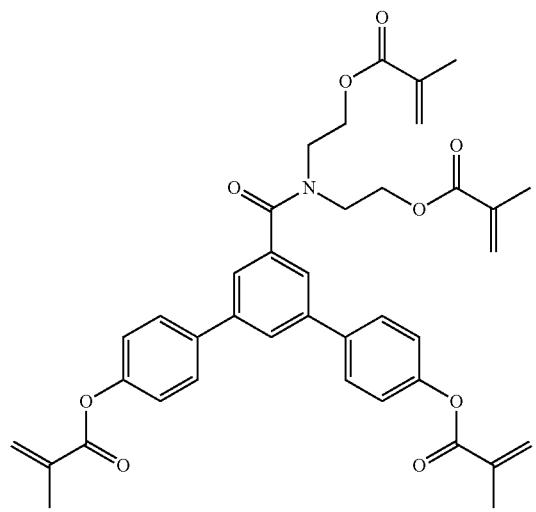 [SMILES: C=C(C)C(=O)OCCN(CCOC(=O)C(=C)C)C(=O)c1cc(-c2ccc(OC(=O)C(=C)C)cc2)cc(-c2ccc(OC(=O)C(=C)C)cc2)c1]
RM-103
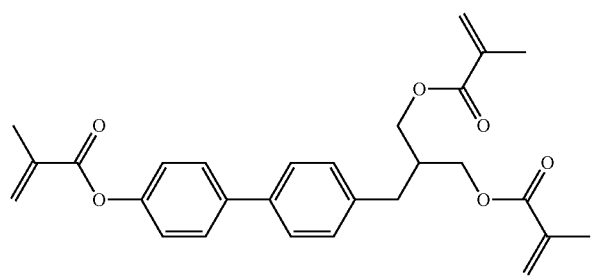 [SMILES: C=C(C)C(=O)OCC(COC(=O)C(=C)C)Cc1ccc(-c2ccc(OC(=O)C(=C)C)cc2)cc1]
RM-104
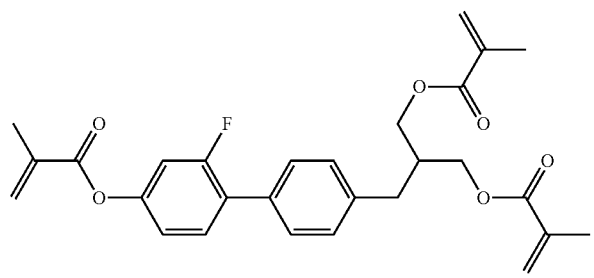 [SMILES: C=C(C)C(=O)OCC(COC(=O)C(=C)C)Cc1ccc(-c2ccc(OC(=O)C(=C)C)cc2F)cc1]
RM-105
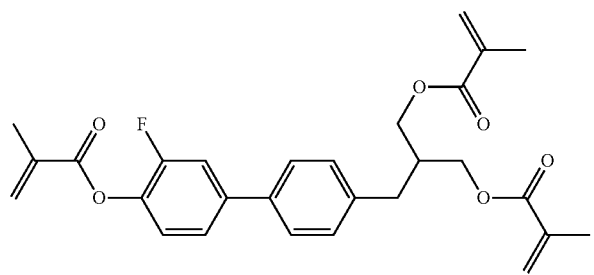 [SMILES: C=C(C)C(=O)OCC(COC(=O)C(=C)C)Cc1ccc(-c2ccc(OC(=O)C(=C)C)c(F)c2)cc1]
RM-106

TABLE D-continued
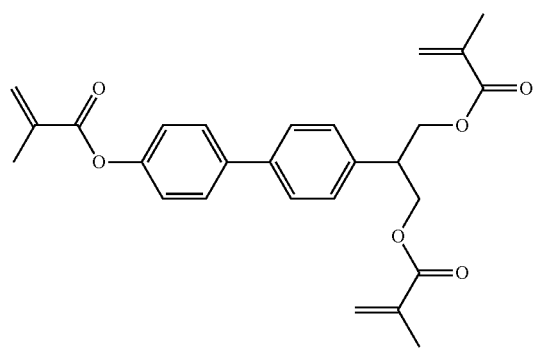 [SMILES: C=C(C)C(=O)OCC(COC(=O)C(=C)C)c1ccc(-c2ccc(OC(=O)C(=C)C)cc2)cc1]
RM-107
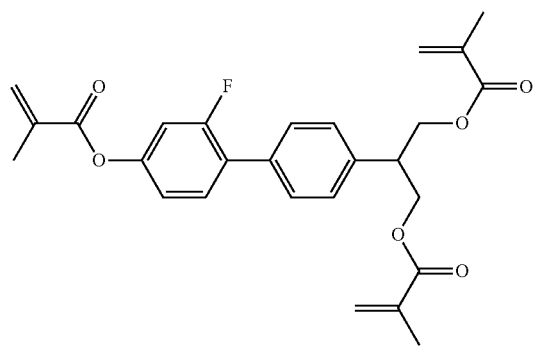 [SMILES: C=C(C)C(=O)OCC(COC(=O)C(=C)C)c1ccc(-c2ccc(OC(=O)C(=C)C)cc2F)cc1]
RM-108
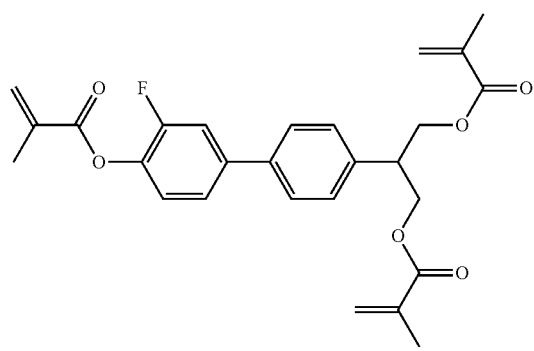
RM-109
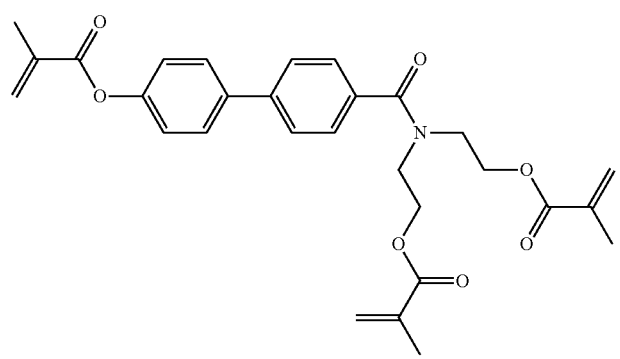 [SMILES: C=C(C)C(=O)OCCN(CCOC(=O)C(=C)C)C(=O)c1ccc(-c2ccc(OC(=O)C(=C)C)cc2)cc1]
RM-110

TABLE D-continued
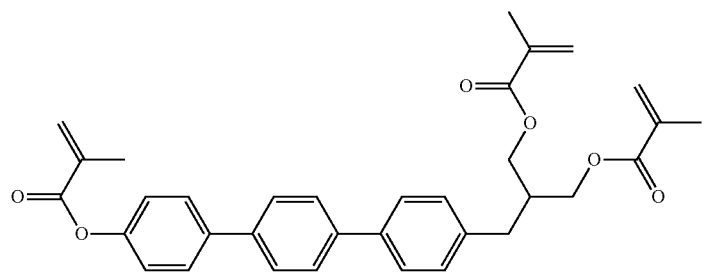
RM-111
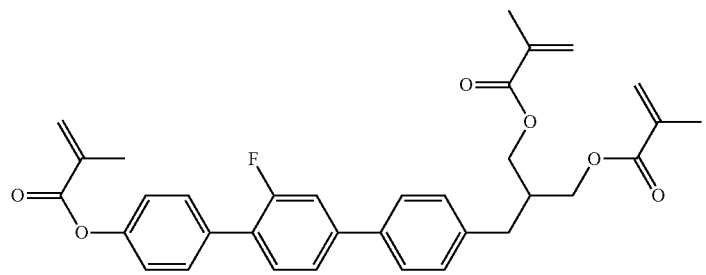 [SMILES: C=C(C)C(=O)OCC(COC(=O)C(=C)C)Cc1ccc(-c2ccc(-c3ccc(OC(=O)C(=C)C)cc3)cc2)cc1]
RM-112
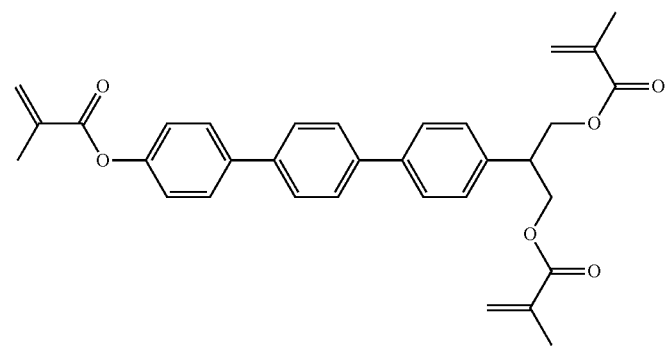
RM-113
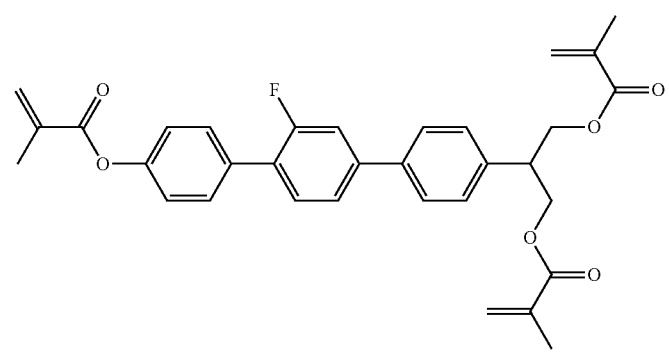 [SMILES: C=C(C)C(=O)OCC(COC(=O)C(=C)C)c1ccc(-c2ccc(-c3ccc(OC(=O)C(=C)C)cc3)cc2)cc1]
RM-114
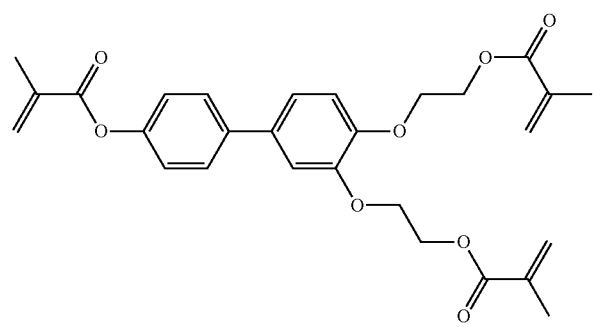 [SMILES: C=C(C)C(=O)OCCOc1ccc(-c2ccc(OC(=O)C(=C)C)cc2)cc1OCCOC(=O)C(=C)C]
RM-115

TABLE D-continued
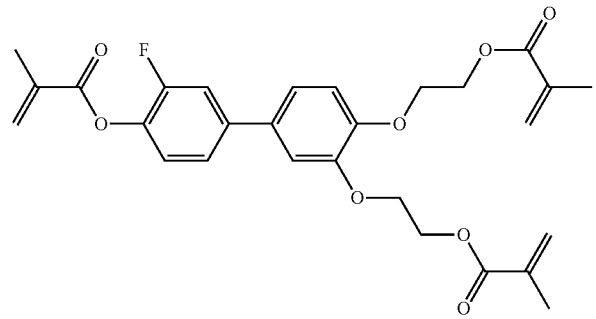 [SMILES: C=C(C)C(=O)OCCOc1ccc(-c2ccc(OC(=O)C(=C)C)c(F)c2)cc1OCCOC(=O)C(=C)C]
RM-116
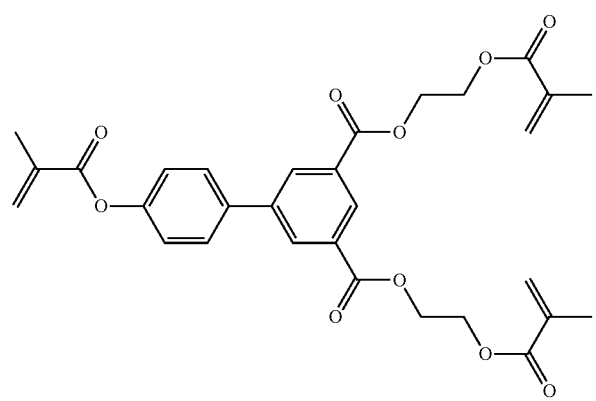 [SMILES: C=C(C)C(=O)OCCOC(=O)c1cc(C(=O)OCCOC(=O)C(=C)C)cc(-c2ccc(OC(=O)C(=C)C)cc2)c1]
RM-117
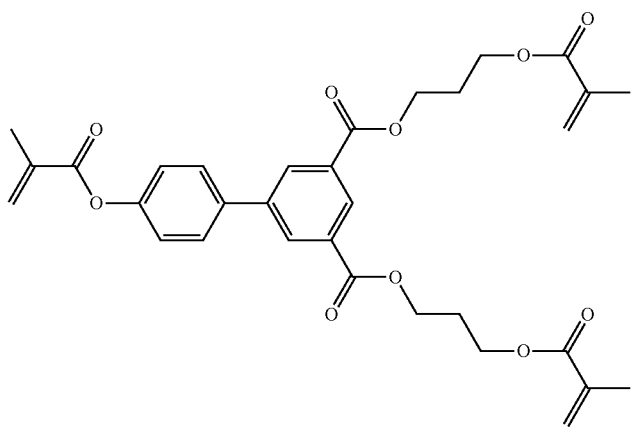 [SMILES: C=C(C)C(=O)OCCCOC(=O)c1cc(C(=O)OCCCOC(=O)C(=C)C)cc(-c2ccc(OC(=O)C(=C)C)cc2)c1]
RM-118
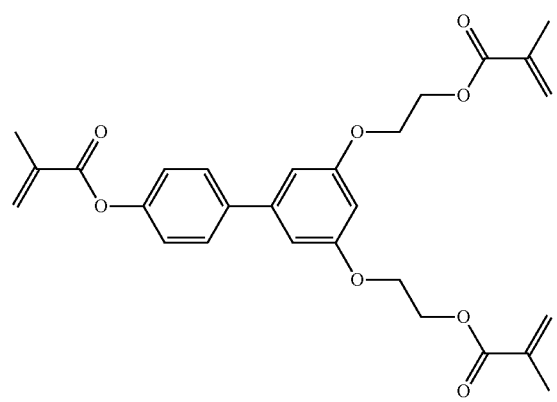 [SMILES: C=C(C)C(=O)OCCOc1cc(OCCOC(=O)C(=C)C)cc(-c2ccc(OC(=O)C(=C)C)cc2)c1]
RM-119

TABLE D-continued
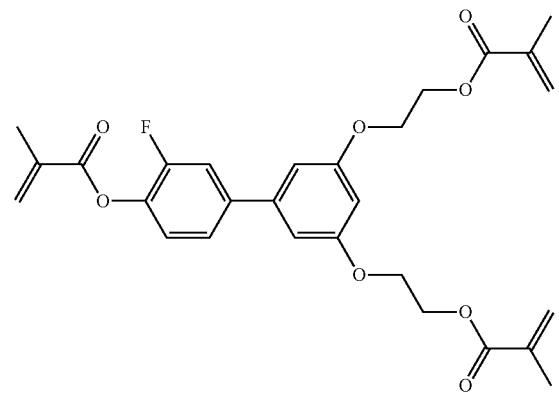
RM-120
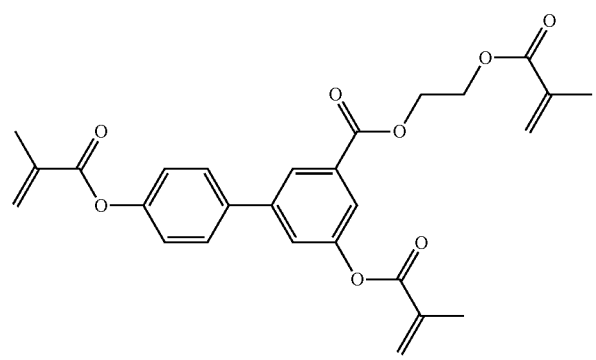 [SMILES: C=C(C)C(=O)OCCOC(=O)c1cc(OC(=O)C(=C)C)cc(-c2ccc(OC(=O)C(=C)C)cc2)c1]
RM-121
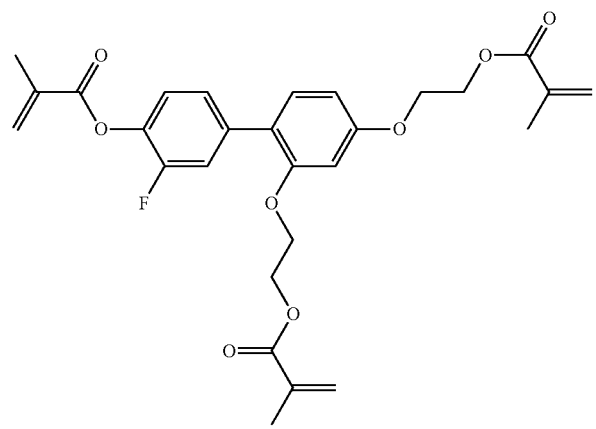 [SMILES: C=C(C)C(=O)OCCOc1ccc(-c2ccc(OC(=O)C(=C)C)c(F)c2)c(OCCOC(=O)C(=C)C)c1]
RM-122
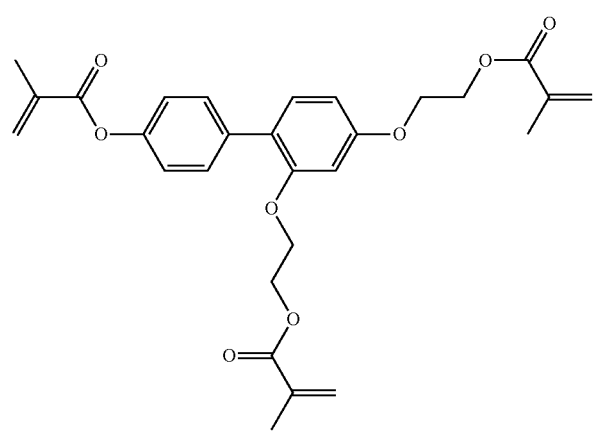 [SMILES: C=C(C)C(=O)OCCOc1ccc(-c2ccc(OC(=O)C(=C)C)cc2)c(OCCOC(=O)C(=C)C)c1]
RM-123

TABLE D-continued
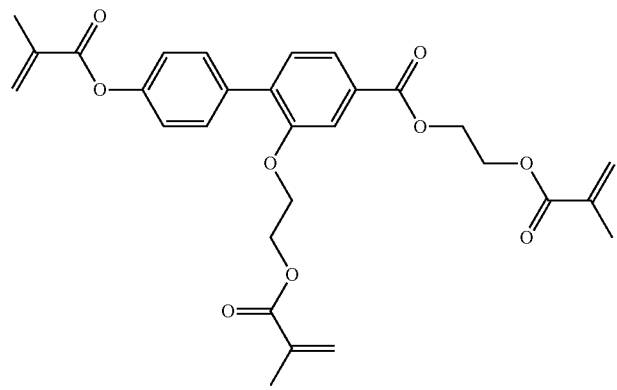 [SMILES: C=C(C)C(=O)OCCOC(=O)c1ccc(-c2ccc(OC(=O)C(=C)C)cc2)c(OCCOC(=O)C(=C)C)c1]
RM-124
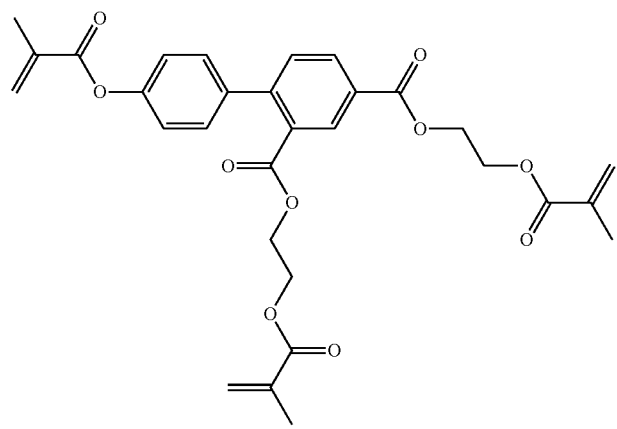 [SMILES: C=C(C)C(=O)OCCOC(=O)c1ccc(-c2ccc(OC(=O)C(=C)C)cc2)c(C(=O)OCCOC(=O)C(=C)C)c1]
RM-125
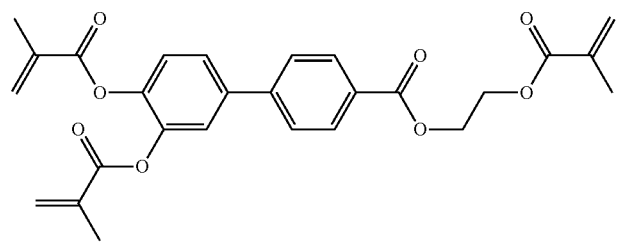 [SMILES: C=C(C)C(=O)OCCOC(=O)c1ccc(-c2ccc(OC(=O)C(=C)C)c(OC(=O)C(=C)C)c2)cc1]
RM-126
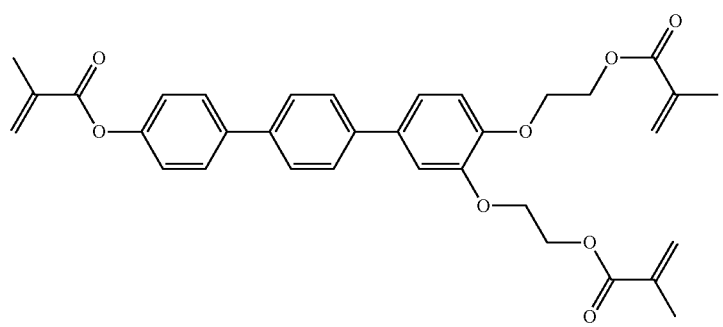 [SMILES: C=C(C)C(=O)OCCOc1ccc(-c2ccc(-c3ccc(OC(=O)C(=C)C)cc3)c(F)c2)cc1OCCOC(=O)C(=C)C]
RM-127

TABLE D-continued

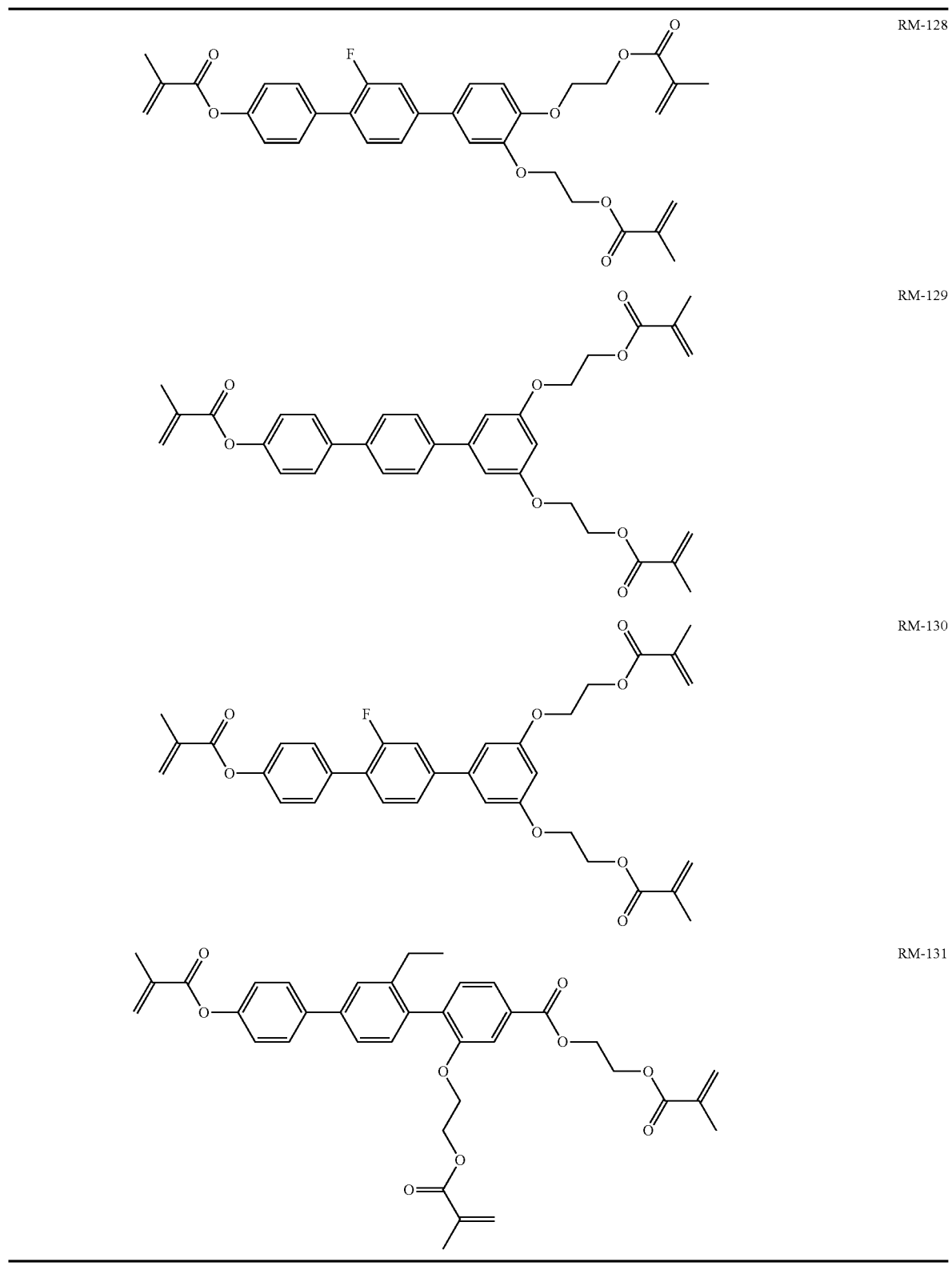

RM-128

RM-129

RM-130

RM-131

Table D shows illustrative reactive mesogenic compounds which can be used in the LC media in accordance with the present invention.

In a preferred embodiment, the mixtures according to the invention comprise one or more polymerisable compounds, preferably selected from the polymerisable compounds of the formulae RM-1 to RM-131. Of these, compounds RM-1, RM-4, RM-8, RM-17, RM-19, RM-35, RM-37, RM-43, RM-47, RM-49, RM-51, RM-59, RM-69, RM-71, RM-83, RM-97, RM-98, RM-104, RM-112, RM-115 and RM-116 are particularly preferred.

In addition, the following abbreviations and symbols are used:

$V_0$ threshold voltage, capacitive [V] at 20° C.,
$n_e$ extraordinary refractive index at 20° C. and 589 nm,
$n_o$ ordinary refractive index at 20° C. and 589 nm,
$\Delta n$ optical anisotropy at 20° C. and 589 nm,
$\varepsilon_\perp$ dielectric permittivity perpendicular to the director at 20° C. and 1 kHz,
$\varepsilon_\parallel$ dielectric permittivity parallel to the director at 20° C. and 1 kHz,
$\Delta\varepsilon$ dielectric anisotropy at 20° C. and 1 kHz,
cl.p., T(N,I) clearing point [° C.],
$\gamma_1$ rotational viscosity at 20° C. [mPa·s],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN].

Unless explicitly noted otherwise, all concentrations in the present application are quoted in percent by weight and relate to the corresponding mixture as a whole, comprising all solid or liquid-crystalline components, without solvents.

Unless explicitly noted otherwise, all temperature values indicated in the present application, such as, for example, for the melting point T(C,N), the transition from the smectic (S) to the nematic (N) phase T(S,N) and the clearing point T(N,I), are quoted in degrees Celsius (° C.). M.p. denotes melting point, cl.p.=clearing point. Furthermore, C=crystalline state, N=nematic phase, S=smectic phase and I=isotropic phase. The data between these symbols represent the transition temperatures.

All physical properties are and have been determined in accordance with "Merck Liquid Crystals, Physical Properties of Liquid Crystals", Status November 1997, Merck KGaA, Germany, and apply for a temperature of 20° C., and $\Delta n$ is determined at 589 nm and $\Delta\varepsilon$ at 1 kHz, unless explicitly indicated otherwise in each case.

The term "threshold voltage" for the present invention relates to the capacitive threshold ($V_0$), also known as the Freedericks threshold, unless explicitly indicated otherwise. In the examples, the optical threshold may also, as generally usual, be quoted for 10% relative contrast ($V_{10}$).

The display used for measurement of the capacitive threshold voltage consists of two plane-parallel glass outer plates at a separation of 25 μm, each of which has on the inside an electrode layer and an unrubbed polyimide alignment layer on top, which effect a homeotropic edge alignment of the liquid-crystal molecules.

The VHR value is measured as follows: The LC mixture is introduced into VHR test cells which comprise an unrubbed polyimide alignment layer. The LC-layer thickness d is approx. 6 μm, unless stated otherwise. The VHR value is determined before and after UV exposure at 1 V, 60 Hz, 64 μs pulse (measuring instrument: Autronic-Melchers VHRM-105).

EXAMPLE 1

An LC mixture with negative dielectric anisotropy is formulated as follows.

| CC-3-V | 29.00% | cl.p. | 80.1° C. |
|---|---|---|---|
| CCY-3-O1 | 8.00% | $\Delta n$ | 0.1052 |
| CCY-3-O2 | 6.00% | $\Delta\varepsilon$ | -4.7 |

-continued

| CCY-4-O2 | 2.00% | $\varepsilon_\parallel$ | 3.9 |
|---|---|---|---|
| CLY-3-O2 | 8.50% | $K_3/K_1$ | 1.10 |
| CLY-3-O3 | 7.50% | $\gamma_1$ | 125 mPa s |
| CPY-2-O2 | 10.00% | | |
| CPY-3-O2 | 7.50% | | |
| CY-3-O2 | 6.50% | | |
| PY-3-O2 | 10.00% | | |
| Y-4O-O4 | 5.00% | | |

To the above mixture are added 200 ppm of stabilizer S1-2a and 400 ppm of stabilizer S2a.

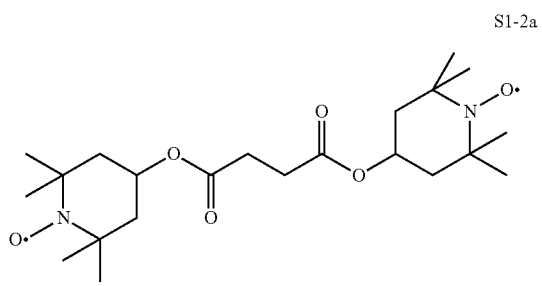

S1-2a

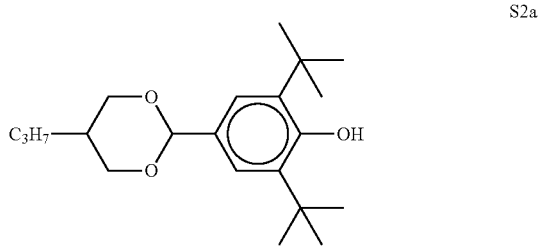

S2a

EXAMPLE 2

An LC mixture with negative dielectric anisotropy is formulated as follows.

| CC-3-V | 23.00% | cl.p. | 79.6° C. |
|---|---|---|---|
| CC-3-V1 | 5.00% | $\Delta n$ | 0.1156 |
| CCY-3-O1 | 5.00% | $\Delta\varepsilon$ | -4.7 |
| CCY-3-O2 | 1.00% | $\varepsilon_\parallel$ | 3.9 |
| CCY-4-O2 | 2.50% | $K_3/K_1$ | 1.12 |
| CLY-3-O2 | 8.00% | $\gamma_1$ | 133 mPa s |
| CLY-3-O3 | 7.00% | | |
| CPY-2-O2 | 10.00% | | |
| CPY-3-O2 | 11.00% | | |
| CY-3-O2 | 11.00% | | |
| PY-3-O2 | 16.50% | | |

To the above mixture are added 200 ppm of stabilizer S1-2a and 400 ppm of stabilizer S2a.

EXAMPLE 3

An LC mixture with negative dielectric anisotropy is formulated as follows.

| CC-3-V | 22.00% | cl.p. | 90.6° C. |
|---|---|---|---|
| CC-3-V1 | 5.00% | $\Delta n$ | 0.1063 |
| CCPC-33 | 3.00% | $\Delta\varepsilon$ | -4.6 |
| CCY-3-O1 | 6.00% | $\varepsilon_\parallel$ | 3.7 |
| CCY-3-O2 | 9.50% | $K_3/K_1$ | 1.18 |
| CCY-4-O2 | 9.00% | $\gamma_1$ | 160 mPa s |

-continued

| | |
|---|---|
| CPY-2-O2 | 10.00% |
| CPY-3-O2 | 10.00% |
| CY-3-O2 | 10.00% |
| CY-5-O2 | 6.50% |
| PY-3-O2 | 9.00% |

To the above mixture are added 200 ppm of stabilizer S1-2a and 400 ppm of stabilizer S2a.

EXAMPLE 4

An LC mixture with negative dielectric anisotropy is formulated as follows.

| | | | |
|---|---|---|---|
| BCH-32 | 2.00% | cl.p. | 80.1° C. |
| CC-3-V | 29.00% | $\Delta n$ | 0.1051 |
| CCY-3-O1 | 7.00% | $\Delta \varepsilon$ | −4.5 |
| CCY-3-O3 | 6.00% | $\varepsilon_{\parallel}$ | 4.0 |
| CCY-4-O2 | 8.00% | $K_3/K_1$ | 1.13 |
| CLY-3-O2 | 6.00% | $\gamma_1$ | 123 mPa s |
| CPY-2-O2 | 10.00% | | |
| CPY-3-O2 | 11.00% | | |
| CY-3-O2 | 7.00% | | |
| PY-3-O2 | 9.00% | | |
| Y-4O-O4 | 5.00% | | |

To the above mixture are added 150 ppm of stabilizer S1-2a and 400 ppm of stabilizer S2a.

EXAMPLE 5

An LC mixture with negative dielectric anisotropy is formulated as follows.

| | | | |
|---|---|---|---|
| CC-3-V | 29.50% | cl.p. | 84.7° C. |
| CC-3-V1 | 4.00% | $\Delta n$ | 0.0966 |
| CCY-3-O2 | 7.00% | $\Delta \varepsilon$ | −3.6 |
| CCY-3-O3 | 5.00% | $\varepsilon_{\parallel}$ | 3.6 |
| CCY-4-O2 | 6.00% | $K_3/K_1$ | 1.13 |
| CCY-5-O2 | 7.00% | $\gamma_1$ | 128 mPa s |
| CPY-3-O2 | 9.00% | | |
| CPY-2-O2 | 8.50% | | |
| CY-3-O4 | 10.00% | | |
| CY-5-O2 | 10.00% | | |
| PGIGI-3-F | 4.00% | | |

To the above mixture are added 100 ppm of stabilizer S1-2a and 400 ppm of stabilizer S2a.

EXAMPLE 6

An LC mixture with negative dielectric anisotropy is formulated as follows.

| | | | |
|---|---|---|---|
| CC-3-V | 33.00% | cl.p. | 80.8° C. |
| CCY-3-O1 | 6.00% | $\Delta n$ | 0.1066 |
| CCY-3-O2 | 6.00% | $\Delta \varepsilon$ | −4.0 |
| CCY-4-O2 | 8.00% | $\varepsilon_{\parallel}$ | 3.7 |
| CCY-5-O2 | 3.00% | $K_3/K_1$ | 1.13 |
| CPY-2-O2 | 9.00% | $\gamma_1$ | 116 mPa s |
| CPY-3-O2 | 9.00% | | |
| CY-3-O2 | 9.00% | | |
| CY-5-O2 | 3.00% | | |
| PY-3-O2 | 9.00% | | |
| PYP-2-3 | 5.00% | | |

To the above mixture are added 150 ppm of stabilizer S1-2a and 400 ppm of stabilizer S2a.

EXAMPLE 7

An LC mixture with negative dielectric anisotropy is formulated as follows.

| | | | |
|---|---|---|---|
| BCH-32 | 6.50% | cl.p. | 74.9° C. |
| CC-3-V | 33.00% | $\Delta n$ | 0.1009 |
| CCY-3-O1 | 4.00% | $\Delta \varepsilon$ | −3.7 |
| CCY-3-O2 | 4.50% | $\varepsilon_{\parallel}$ | 3.8 |
| CCY-3-O3 | 6.00% | $K_3/K_1$ | 1.11 |
| CCY-4-O2 | 6.00% | $\gamma_1$ | 10 mPa s |
| CPY-2-O2 | 9.00% | | |
| CPY-3-O2 | 10.00% | | |
| CY-3-O2 | 9.00% | | |
| PY-3-O2 | 7.00% | | |
| Y-4O-O4 | 5.00% | | |

To the above mixture are added 100 ppm of stabilizer S1-2a and 400 ppm of stabilizer S2a.

EXAMPLE 8

An LC mixture with negative dielectric anisotropy is formulated as follows.

| | | | |
|---|---|---|---|
| BCH-32 | 2.00% | cl.p. | 80.3° C. |
| CC-3-V | 29.00% | $\Delta n$ | 0.1042 |
| CCY-3-O1 | 7.00% | $\Delta \varepsilon$ | −4.3 |
| CCY-3-O3 | 7.00% | $\varepsilon_{\parallel}$ | 4.0 |
| CCY-4-O2 | 8.00% | $K_3/K_1$ | 1.11 |
| CLY-3-O2 | 6.00% | $\gamma_1$ | 118 mPa s |
| CPY-2-O2 | 9.00% | | |
| CPY-3-O2 | 11.00% | | |
| CY-3-O2 | 7.00% | | |
| PY-3-O2 | 9.00% | | |
| Y-4O-O4 | 5.00% | | |

To the above mixture are added 100 ppm of stabilizer S1-2a and 400 ppm of stabilizer S2a.

EXAMPLE 9

An LC mixture with negative dielectric anisotropy is formulated as follows.

| | | | |
|---|---|---|---|
| CC-3-V | 32.00% | cl.p. | 85.3° C. |
| CCY-3-O1 | 6.50% | $\Delta n$ | 0.1112 |
| CCY-3-O2 | 6.00% | $\Delta \varepsilon$ | −4.0 |
| CCY-4-O2 | 6.00% | $\varepsilon_{\parallel}$ | 3.8 |
| CLY-3-O3 | 13.00% | $K_3/K_1$ | 1.07 |
| CPY-2-O2 | 9.00% | $\gamma_1$ | 128 mPa s |
| CPY-3-O2 | 7.50% | | |
| PP-1-2V1 | 2.50% | | |
| PY-1-O4 | 9.00% | | |
| PY-3-O2 | 8.50% | | |

To the above mixture are added 200 ppm of stabilizer S1-2a and 400 ppm of stabilizer S2a.

EXAMPLE 10

An LC mixture with positive dielectric anisotropy is formulated as follows.

| | | | |
|---|---|---|---|
| APUQU-2-F | 4.00% | cl.p. | 85.0° C. |
| CC-3-V | 39.00% | $\Delta n$ | 0.1011 |
| CC-3-V1 | 5.50% | $\Delta \varepsilon$ | 5.9 |
| CCP-30CF3 | 6.00% | $\varepsilon_{\parallel}$ | 9.3 |

-continued

| | | | |
|---|---|---|---|
| CCP-V-1 | 14.00% | $K_3/K_1$ | 1.12 |
| CPGU-3-OT | 3.00% | $\gamma_1$ | 66 mPa s |
| PGP-2-2V | 4.50% | | |
| DPGU-4-F | 3.00% | | |
| PPGU-3-F | 1.00% | | |
| PUQU-3-F | 14.00% | | |
| CCY-3-O2 | 6.00% | | |

To the above mixture are added 100 ppm of stabilizer S1-2a and 300 ppm of stabilizer S2a.

EXAMPLE 11

An LC mixture with positive dielectric anisotropy is formulated as follows.

| | | | |
|---|---|---|---|
| APUQU-2-F | 5.50% | cl.p. | 80.3° C. |
| CC-3-V | 38.50% | $\Delta n$ | 0.1124 |
| CCP-V-1 | 12.50% | $\Delta\varepsilon$ | 10.1 |
| CCP-V2-1 | 4.50% | $\varepsilon_\parallel$ | 14.4 |
| CDUQU-3-F | 2.50% | $K_3/K_1$ | 1.13 |
| DGUQU-4-F | 5.50% | $\gamma_1$ | 77 mPa s |
| DPGU-4-F | 4.50% | | |
| PGP-2-2V | 6.00% | | |
| PGUQU-3-F | 7.00% | | |
| PGUQU-4-F | 6.50% | | |
| PPGU-3-F | 1.00% | | |
| Y-4O-O4 | 6.00% | | |

To the above mixture are added 150 ppm of stabilizer S1-2a and 300 ppm of stabilizer S2a.

EXAMPLE 12

An LC mixture with positive dielectric anisotropy is formulated as follows.

| | | | |
|---|---|---|---|
| APUQU-2-F | 5.50% | cl.p. | 80.3° C. |
| CC-3-V | 38.50% | $\Delta n$ | 0.1124 |
| CCP-V-1 | 12.50% | $\Delta\varepsilon$ | 10.1 |
| CCP-V2-1 | 4.50% | $\varepsilon_\parallel$ | 14.4 |
| CDUQU-3-F | 2.50% | $K_3/K_1$ | 1.13 |
| DGUQU-4-F | 5.50% | $\gamma_1$ | 77 mPa s |
| DPGU-4-F | 4.50% | | |
| PGP-2-2V | 6.00% | | |
| PGUQU-3-F | 7.00% | | |
| PGUQU-4-F | 6.50% | | |
| PPGU-3-F | 1.00% | | |
| Y-4O-O4 | 6.00% | | |

To the above mixture are added 100 ppm of stabilizer S1-1a and 400 ppm of stabilizer S2a.

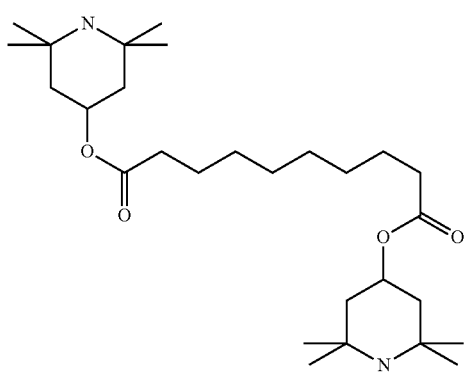

S1-1a

EXAMPLE 13

An LC mixture with positive dielectric anisotropy is formulated as follows.

| | | | |
|---|---|---|---|
| BCH-3F.F.F | 10.00% | cl.p. | 85.4° C. |
| CC-3-V | 23.50% | $\Delta n$ | 0.1071 |
| CC-3-V1 | 7.00% | $\Delta\varepsilon$ | 6.8 |
| CCGU-3-F | 5.00% | $\varepsilon_\parallel$ | 10.3 |
| CCP-30CF3 | 9.00% | $K_3/K_1$ | 1.10 |
| CCP-3-F.F.F | 8.00% | $\gamma_1$ | 83 mPa s |
| CCP-V-1 | 11.00% | | |
| CCP-V2-1 | 3.00% | | |
| DPGU-4-F | 3.00% | | |
| PGP-2-2V | 3.00% | | |
| PPGU-3-F | 1.00% | | |
| PUQU-3-F | 10.50% | | |
| PY-3-O2 | 6.00% | | |

To the above mixture are added 100 ppm of stabilizer S1-2a and 400 ppm of stabilizer S2a.

EXAMPLE 14

An LC mixture with positive dielectric anisotropy is formulated as follows.

| | | | |
|---|---|---|---|
| BCH-3F.F.F | 7.00% | cl.p. | 100.0° C. |
| CBC-33 | 3.00% | $\Delta n$ | 0.1009 |
| CC-3-V | 25.00% | $\Delta\varepsilon$ | 4.5 |
| CCGU-3-F | 6.00% | $\varepsilon_\parallel$ | 8.3 |
| CCP-3-1 | 4.50% | $K_3/K_1$ | 1.17 |
| CCP-30CF3 | 8.00% | $\gamma_1$ | 125 mPa s |
| CCP-V-1 | 13.50% | | |
| CCP-V2-1 | 6.00% | | |
| CCQU-3-F | 8.00% | | |
| CPGP-5-2 | 3.00% | | |
| DPGU-4-F | 2.50% | | |
| PPGU-3-F | 1.00% | | |
| PUQU-3-F | 4.50% | | |
| Y-4O-O4 | 8.00% | | |

To the above mixture are added 100 ppm of stabilizer S1-2a and 400 ppm of stabilizer S2a.

EXAMPLE 15

An LC mixture with positive dielectric anisotropy is formulated as follows.

| | | | |
|---|---|---|---|
| APUQU-2-F | 3.00% | cl.p. | 80.7° C. |
| CC-3-V | 37.50% | $\Delta n$ | 0.1103 |
| CCP-3-1 | 3.00% | $\Delta\varepsilon$ | 9.5 |
| CCP-30CF3 | 3.00% | | |
| CCP-V-1 | 15.00% | | |
| CDUQU-3-F | 5.50% | | |
| CPGU-3-OT | 1.50% | | |
| DPGU-4-F | 5.00% | | |
| PGU-2-F | 6.00% | | |
| PGU-3-F | 6.00% | | |
| PGUQU-3-F | 5.00% | | |
| PGUQU-4-F | 5.00% | | |
| PPGU-3-F | 0.50% | | |
| Y-4O-O4 | 4.00% | | |

To the above mixture are added 100 ppm of stabilizer S1-1a and 400 ppm of stabilizer S2a.

USE EXAMPLES

The LC medium M10 formulated as in Example 10 is filled into VHR test cells as described above.

The test cells are subjected to thermal stress (100° C.). The VHR is measured as described above after various time intervals.

For comparison purpose the measurement is repeated with reference LC medium MC, which is formulated as in Example 10 except that it only contains stabilizer S1-2a but does not contain stabilizer S2a.

The VHR values are shown in Table 1 below.

TABLE 1

| Heat load time/h | MC VHR/% | M10 VHR/% |
|---|---|---|
| 0 | 95.1 | 96.5 |
| 24 | 90.4 | 93.3 |
| 48 | 89.2 | 92.6 |
| 120 | 86.4 | 91.7 |

It can be seen that LC medium M10, which contains both stabilizers S1-2a and S2a, shows significantly lower decrease of the VHR after long heat exposure compared to LC medium MC, which only contains stabilizer S1-2a but does not contain stabilizer S2a.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosure[s] of all applications, patents and publications, cited herein and of corresponding EP Application No. 16170390.5, filed May 19, 2016 is [are] incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A liquid crystal (LC) medium comprising one or more compounds selected from the compounds of formulae Y, CY, PY and LY, one or more compounds selected from the compounds of formula S1 and one or more compounds selected from the compounds of formula S2, and wherein the medium has positive dielectric anisotropy:

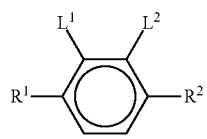

Y

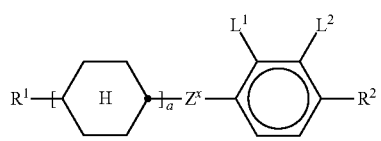

CY

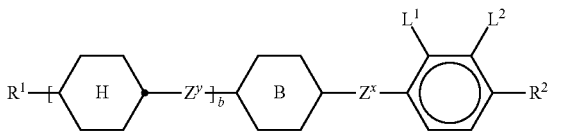

PY

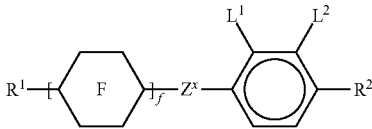

LY

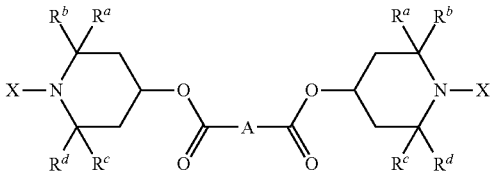

S1

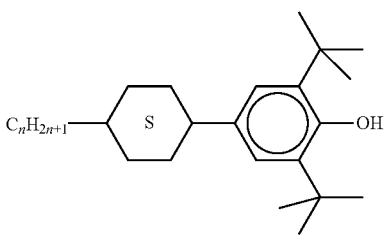

S2 wherein the individual radicals, independently of each other and on each occurrence identically or differently, have the following meanings:

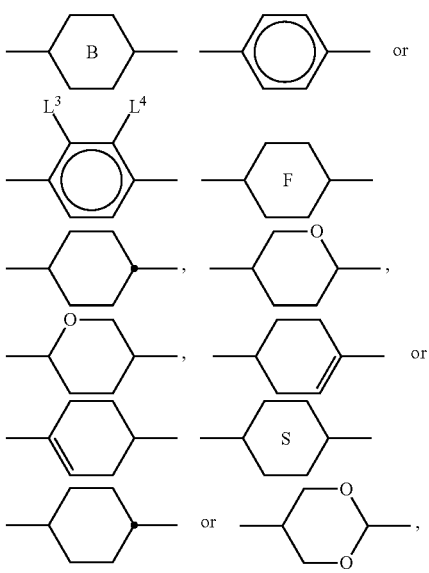

with at least one ring

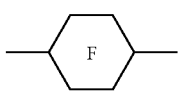

being cyclohexenylene,

R$^1$, R$^2$ are, each independently, alkyl having 1 to 12 C atoms, where, in addition, one or two non-adjacent CH$_2$ groups may be replaced by —O—, —CH=CH—, —CO—, —OCO— or —COO— in such a way that O atoms are not linked directly to one another, Z$^x$, Z$^y$ are, each independently, —CH$_2$CH$_2$—, —CH=CH—, —CF$_2$O—, —OCF$_2$—, —CH$_2$O—, —OCH$_2$—, —CO—O—, —O—CO—, —C$_2$F$_4$—, —CF=CF—, —CH=CH—CH$_2$O- or a single bond, L$^{1-4}$ are, each independently, F, Cl, OCF$_3$, CF$_3$, CH$_3$, CH$_2$F, or CHF$_2$, R$^{a-d}$ are, each independently, straight chain or branched alkyl with 1 to 10 C atoms, X is H, CH$_3$, OH or O$^\bullet$, A is a straight-chain, branched or cyclic alkylene with 1 to 20 C-atoms which is optionally substituted, a is 1 or 2, b is 0 or 1, f is 1 or 2, n is an integer from 1 to 6.

2. The LC medium according to claim 1, wherein the compounds of formula S1 are selected from the compounds of the following subformulae:

S1-1

S1-2

S1-3

S1-4 wherein n1 is an integer from 2 to 12 and wherein one or more H-atoms in the radical (CH$_2$)$_{n1}$ are optionally replaced by a methyl, ethyl, propyl, butyl, pentyl or hexyl group.

3. The LC medium according to claim 2, wherein the compounds of formula S1 are selected from the compounds of the following subformulae:

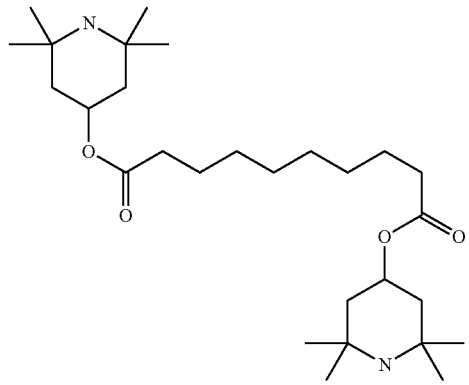

S1-1a

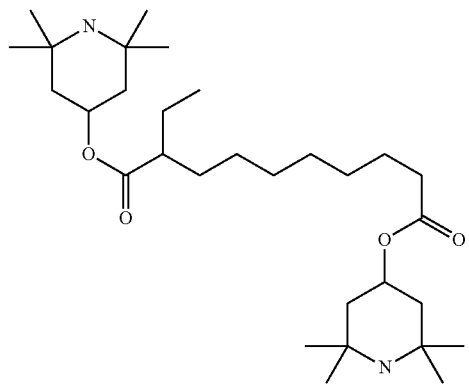

S1-1b

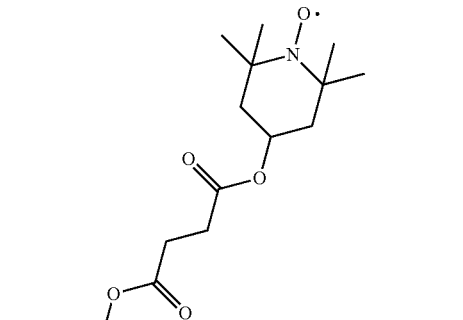

S1-2a

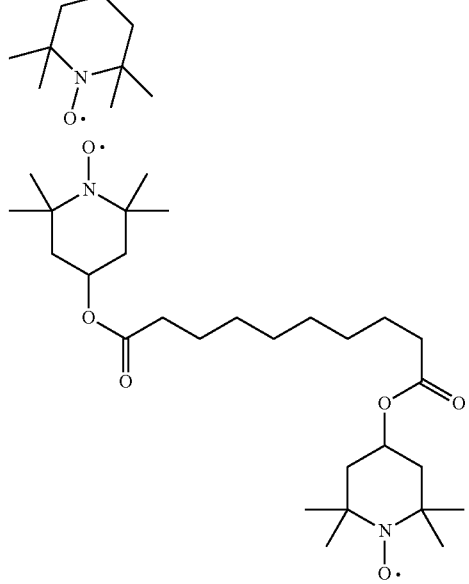

S1-2b

-continued

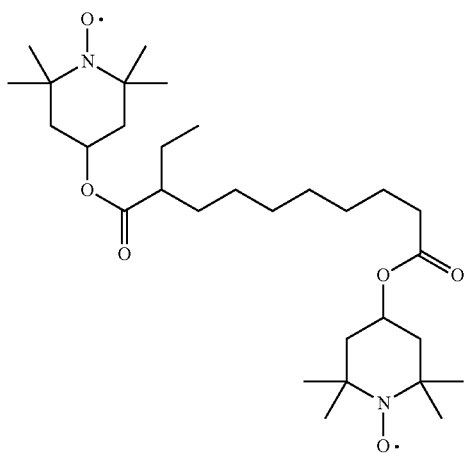
S1-2c

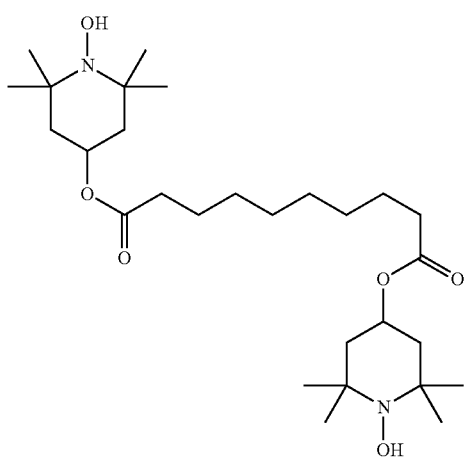
S1-3a

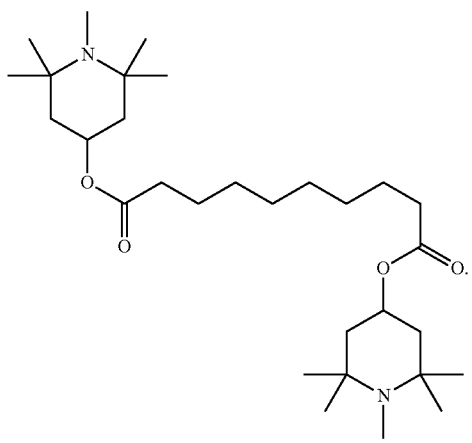
S1-4a

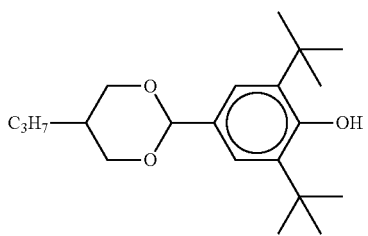
S2-1a

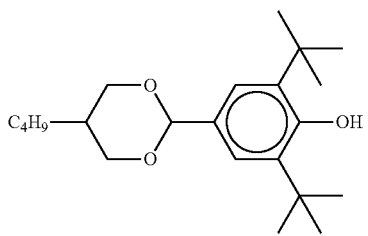
S2-1b

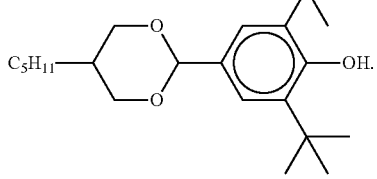
S2-1c

5. The LC medium according to claim 1, which additionally comprises one or more compounds selected from the compounds of formulae AA and BB:

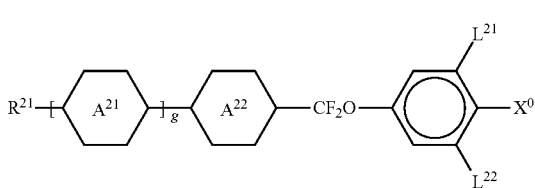
AA

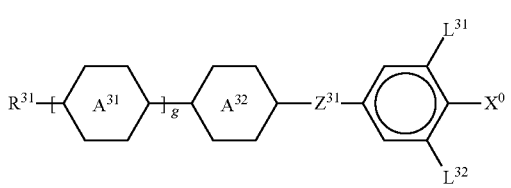
BB in which the individual radicals have the following meanings:

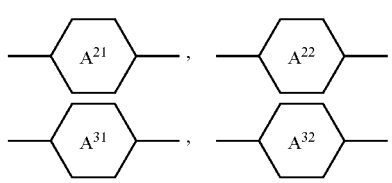

4. The LC medium according to claim 1, wherein the compounds of formula S2 are selected from the compounds of the following subformulae:

are each, independently of one another, and on each occurrence, identically or differently

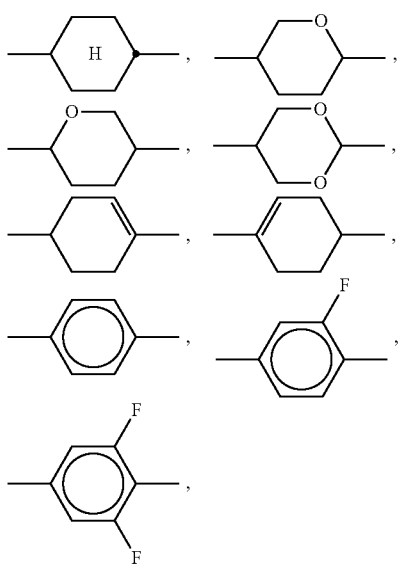

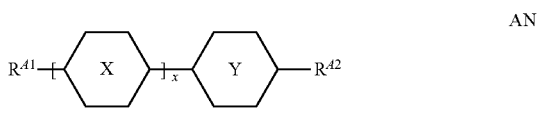

$R^{21}$, $R^{31}$, each, independently of one another, denote alkyl, alkoxy, oxaalkyl or alkoxyalkyl having 1 to 9 C atoms or alkenyl or alkenyloxy having 2 to 9 C atoms, all of which are optionally fluorinated, $X^0$ denotes F, Cl, halogenated alkyl or alkoxy having 1 to 6 C atoms or halogenated alkenyl or alkenyloxy having 2 to 6 C atoms, $Z^{31}$ is —CH$_2$CH$_2$—, —CF$_2$CF$_2$—, —COO—, trans-CH=CH-, trans-CF=CF-, —CH$_2$O— or a single bond, $L^{21}$, $L^{22}$, $L^{31}$, $L^{32}$ denote, each independently, H or F, g denotes 0, 1, 2 or 3.

6. The LC medium according to claim 1, which additionally comprises one or more compounds selected from the compounds of formula CC:

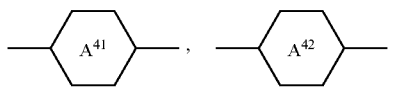

CC in which the individual radicals have the following meanings:

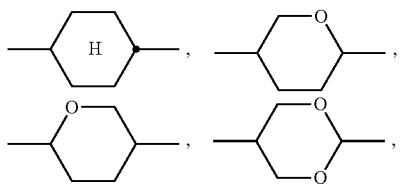

each, independently of one another, and on each occurrence, identically or differently, are $R^{41}$, $R^{42}$ each, independently of one another, are alkyl, alkoxy, oxaalkyl or alkoxyalkyl having 1 to 9 C atoms or alkenyl or alkenyloxy having 2 to 9 C atoms, all of which are optionally fluorinated, $Z^{41}$, $Z^{42}$ each, independently of one another, are —CH$_2$CH$_2$—, —COO—, trans-CH=CH-, trans-CF=CF-, —CH$_2$O—, —CF$_2$O—, —C≡C— or a single bond, h 0, 1, 2 or 3.

7. The LC medium according to claim 1, which additionally comprises one or more compounds selected from the compounds of formulae AN and AY:

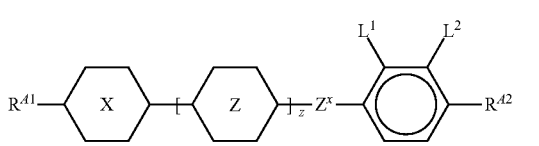

AN

AY in which the individual radicals, on each occurrence identically or differently, and each, independently of one another, have the following meaning:

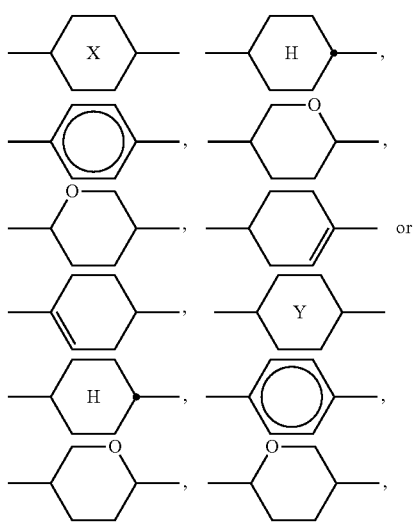

-continued

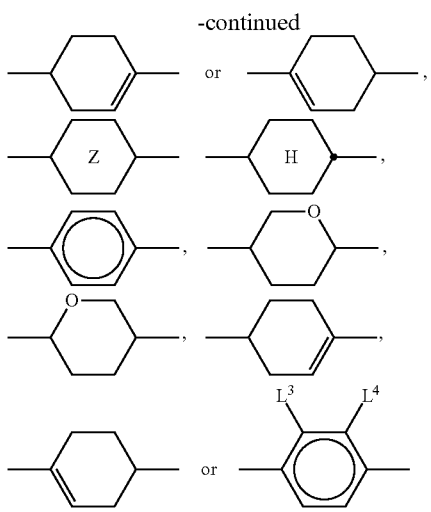

$R^{A1}$ is alkenyl having 2 to 9 C atoms or, if at least one of the rings X, Y and Z denotes cyclohexenyl, also one of the meanings of $R^{A2}$, $R^{A2}$ is alkyl having 1 to 12 C atoms, in which, in addition, one or two non-adjacent $CH_2$ groups may be replaced by —O—, —CH=CH—, —CO—, —OCO— or —COO— in such a way that O atoms are not linked directly to one another, $Z^x$ is —$CH_2CH_2$—, —CH=CH—, —$CF_2O$—, —$OCF_2$—, —$CH_2O$—, —$OCH_2$—, —CO—O—, —O—CO—, —$C_2F_4$—, —CF=CF—, —CH=CH—$CH_2O$—, or a single bond, $L^{1,2}$ are, each independently, H, F, Cl, $OCF_3$, $CF_3$, $CH_3$, $CH_2F$ or $CHF_2H$, x is 1 or 2, z is 0 or 1.

8. An LC display comprising an LC medium as defined in claim 1.

9. The LC display according to claim 8, which is a VA, PSA, PS-VA, PA-VA, PALC, FFS, PS-FFS, IPS or PS-IPS display.

10. The LC medium according to claim 1, wherein:
$R^1$, $R^2$ are, each independently, alkyl or alkoxy having 1 to 6 C atoms,
$Z^x$, $Z^y$ are each a single bond,
$R^{a-d}$ are, each independently, straight chain or branched alkyl with 1 to 6 C atoms,
and
n is the integer 3.

11. The LC medium according to claim 1, wherein $R^{a-d}$ are each methyl.

* * * * *